Oct. 28, 1952 C. D. LAKE ET AL 2,615,569

RECORD CONTROLLED MACHINE

Filed Jan. 31, 1949 53 Sheets-Sheet 1

INVENTORS
C. D. LAKE
B. M. DURFEE
BY [signature]
ATTORNEY

INVENTORS
C. D. LAKE
B. M. DURFEE
BY [signature]
ATTORNEY

RECORD CONTROLLED MACHINE

INVENTORS
C. D. LAKE
B. M. DURFEE
BY [signature]
ATTORNEY

RECORD CONTROLLED MACHINE

INVENTORS
C. D. LAKE
B. M. DURFEE
BY [signature]
ATTORNEY

INVENTORS
C. D. LAKE
B. M. DURFEE
BY [signature]
ATTORNEY

Oct. 28, 1952 C. D. LAKE ET AL 2,615,569

RECORD CONTROLLED MACHINE

Filed Jan. 31, 1949 53 Sheets-Sheet 6

INVENTORS
C. D. LAKE
B. M. DURFEE
BY [signature]
ATTORNEY

Oct. 28, 1952 C. D. LAKE ET AL 2,615,569

RECORD CONTROLLED MACHINE

Filed Jan. 31, 1949 53 Sheets-Sheet 7

INVENTORS
C. D. LAKE
B. M. DURFEE
BY
ATTORNEY

INVENTORS
C. D. LAKE
B. M. DURFEE
BY [signature]
ATTORNEY

INVENTORS
C. D. LAKE
B. M. DURFEE
BY [signature]
ATTORNEY

INVENTORS
C. D. LAKE
B. M. DURFEE
BY [signature]
ATTORNEY

INVENTORS
C. D. LAKE
B. M. DURFEE
BY
ATTORNEY

INVENTORS
C. D. LAKE
B. M. DURFEE
BY
ATTORNEY

INVENTORS
C.D. LAKE
B.M. DURFEE
BY [signature]
ATTORNEY

INVENTORS
C. D. LAKE
B. M. DURFEE
BY [signature]
ATTORNEY

INVENTORS
C. D. LAKE
B. M. DURFEE
BY [signature]
ATTORNEY

INVENTORS
C. D. LAKE
B. M. DURFEE
BY [signature]
ATTORNEY

Oct. 28, 1952 C. D. LAKE ET AL 2,615,569

RECORD CONTROLLED MACHINE

Filed Jan. 31, 1949 53 Sheets-Sheet 17

INVENTORS
C. D. LAKE
B. M. DURFEE

BY

ATTORNEY

Oct. 28, 1952 C. D. LAKE ET AL 2,615,569

RECORD CONTROLLED MACHINE

Filed Jan. 31, 1949 53 Sheets-Sheet 18

INVENTORS
C. D. LAKE
B. M. DURFEE
BY [signature]
ATTORNEY

FIG. 36
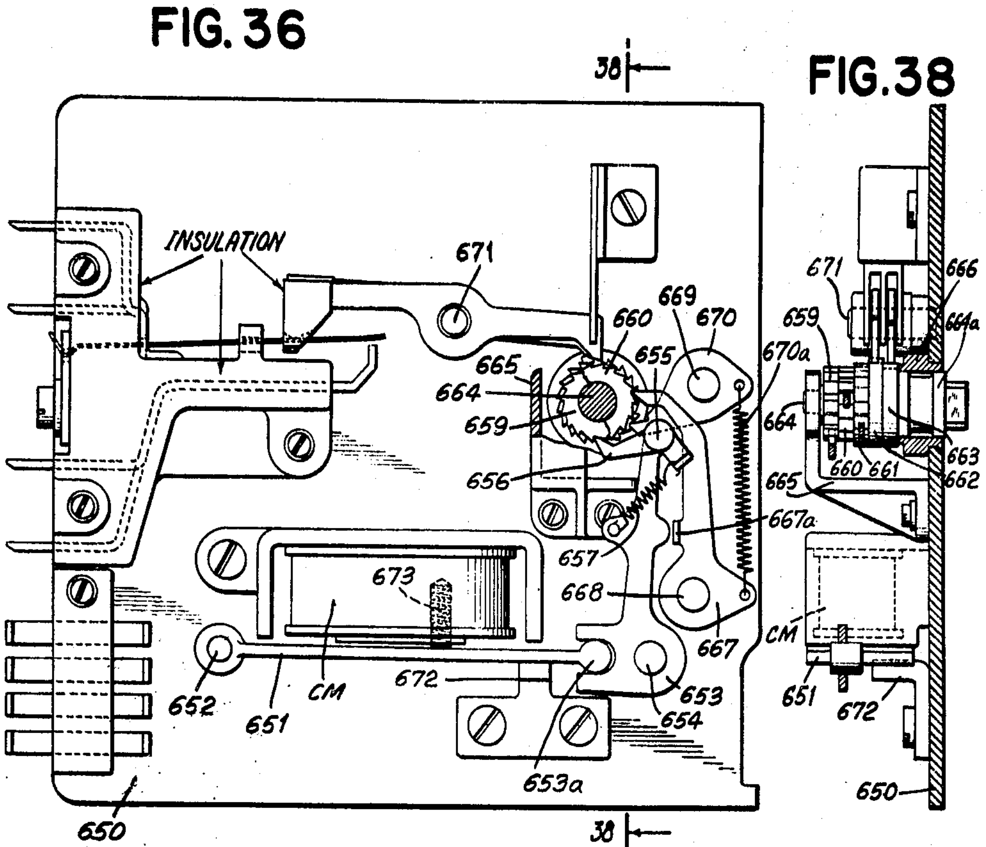
FIG. 36, FIG. 38
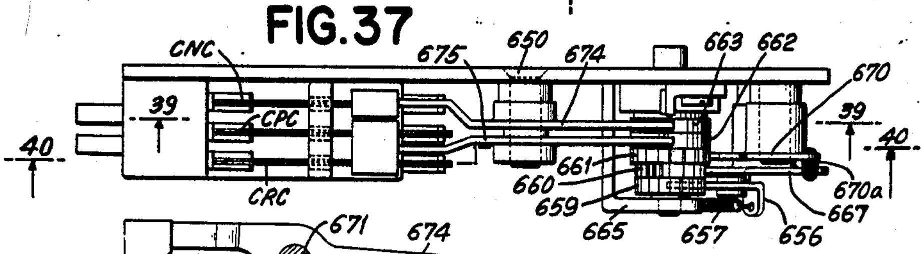
FIG. 37
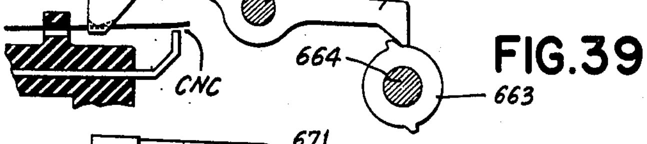
FIG. 39
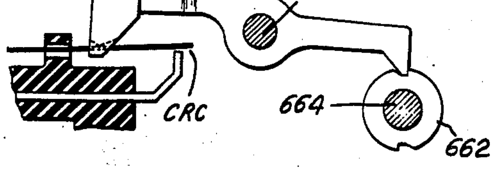
FIG. 40
INVENTORS
C. D. LAKE
B. M. DURFEE
BY [signature]
ATTORNEY

RECORD CONTROLLED MACHINE

Filed Jan. 31, 1949 53 Sheets-Sheet 20

INVENTORS
C. D. LAKE
B. M. DURFEE
BY
ATTORNEY

INVENTORS
C. D. LAKE
B. M. DURFEE
BY
ATTORNEY

INVENTORS
C. D. LAKE
B. M. DURFEE
BY
ATTORNEY

Oct. 28, 1952 C. D. LAKE ET AL 2,615,569

RECORD CONTROLLED MACHINE

Filed Jan. 31, 1949 53 Sheets-Sheet 23

INVENTORS
C. D. LAKE
B. M. DURFEE
BY [signature]
ATTORNEY

INVENTORS
C.D. LAKE
B.M. DURFEE
BY
ATTORNEY

Oct. 28, 1952 C. D. LAKE ET AL 2,615,569

RECORD CONTROLLED MACHINE

Filed Jan. 31, 1949 53 Sheets-Sheet 25

INVENTOR
C.D.LAKE
B.M.DURFEE
BY
ATTORNEY

Oct. 28, 1952 C. D. LAKE ET AL 2,615,569

RECORD CONTROLLED MACHINE

Filed Jan. 31, 1949 53 Sheets-Sheet 26

INVENTORS
C. D. LAKE
B. M. DURFEE
BY [signature]
ATTORNEY

INVENTORS
C. D. LAKE
B. M. DURFEE
BY [signature]
ATTORNEY

Oct. 28, 1952 C. D. LAKE ET AL 2,615,569

RECORD CONTROLLED MACHINE

Filed Jan. 31, 1949 53 Sheets-Sheet 28

INVENTORS
C. D. LAKE
B. M. DURFEE
BY
ATTORNEY

RECORD CONTROLLED MACHINE

INVENTORS
C. D. LAKE
B. M. DURFEE
BY [signature]
ATTORNEY

INVENTORS
C.D. LAKE
B.M. DURFEE
BY [signature]
ATTORNEY

INVENTORS
C.D. LAKE
B.M. DURFEE
BY
ATTORNEY

INVENTORS
C. D. LAKE
B. M. DURFEE
BY
ATTORNEY

RECORD CONTROLLED MACHINE

INVENTORS
C. D. LAKE
B. M. DURFEE
BY [signature]
ATTORNEY

INVENTORS
C. D. LAKE
B. M. DURFEE
BY [signature]
ATTORNEY

INVENTORS
C.D. LAKE
B.M. DURFEE
BY
ATTORNEY

INVENTORS
C. D. LAKE
B. M. DURFEE
BY [signature]
ATTORNEY

Oct. 28, 1952 C. D. LAKE ET AL 2,615,569

RECORD CONTROLLED MACHINE

Filed Jan. 31, 1949 53 Sheets-Sheet 37

INVENTORS
C. D. LAKE
B. M. DURFEE
BY [signature]
ATTORNEY

INVENTORS
C. D. LAKE
B. M. DURFEE
BY [signature]
ATTORNEY

INVENTORS
C. D. LAKE
B. M. DURFEE
BY [signature]
ATTORNEY

INVENTORS
C. D. LAKE
B. M. DURFEE
BY
ATTORNEY

INVENTORS
C. D. LAKE
B. M. DURFEE
BY [signature]
ATTORNEY

Oct. 28, 1952 C. D. LAKE ET AL 2,615,569

RECORD CONTROLLED MACHINE

Filed Jan. 31, 1949 53 Sheets-Sheet 42

INVENTORS
C. D. LAKE
B. M. DURFEE
BY [signature]
ATTORNEY

Oct. 28, 1952 C. D. LAKE ET AL 2,615,569

RECORD CONTROLLED MACHINE

Filed Jan. 31, 1949 53 Sheets-Sheet 43

INVENTORS
C. D. LAKE
B. M. DURFEE
BY
ATTORNEY

INVENTORS
C. D. LAKE
B. M. DURFEE
BY [signature]
ATTORNEY

INVENTORS
C.D. LAKE
B.M. DURFEE
BY [signature]
ATTORNEY

INVENTORS
C. D. LAKE
B. M. DURFEE
BY [signature]
ATTORNEY

INVENTORS
C. D. LAKE
B. M. DURFEE
BY E. W. Gifford
ATTORNEY

Oct. 28, 1952 C. D. LAKE ET AL 2,615,569

RECORD CONTROLLED MACHINE

Filed Jan. 31, 1949 53 Sheets-Sheet 48

NORMAL DECIMAL SEQUENCE SORTING

INVENTORS
C. D. LAKE
B. M. DURFEE
BY [signature]
ATTORNEY

Oct. 28, 1952 C. D. LAKE ET AL 2,615,569

RECORD CONTROLLED MACHINE

Filed Jan. 31, 1949 53 Sheets-Sheet 49

ELIMINATION SORTING

INVENTORS
C. D. LAKE
B. M. DURFEE
BY [signature]
ATTORNEY

Oct. 28, 1952 C. D. LAKE ET AL 2,615,569

RECORD CONTROLLED MACHINE

Filed Jan. 31, 1949 53 Sheets-Sheet 50

ALPHABETIC LENGTH OF NAME SORTING

INVENTORS
C. D. LAKE
B. M. DURFEE
BY [signature]
ATTORNEY

Oct. 28, 1952 C. D. LAKE ET AL 2,615,569

RECORD CONTROLLED MACHINE

Filed Jan. 31, 1949 53 Sheets-Sheet 51

ALPHABETIC SEQUENCE SORTING

INVENTORS
C. D. LAKE
B. M. DURFEE
BY
ATTORNEY

GROUP SORTING

INVENTORS
C. D. LAKE
B. M. DURFEE
BY
ATTORNEY

Oct. 28, 1952 C. D. LAKE ET AL 2,615,569

RECORD CONTROLLED MACHINE

Filed Jan. 31, 1949 53 Sheets-Sheet 53

COUNTING AND ACCUMULATING

INVENTORS
C. D. LAKE
B. M. DURFEE
BY [signature]
ATTORNEY

Patented Oct. 28, 1952

2,615,569

UNITED STATES PATENT OFFICE 2,615,569

RECORD CONTROLLED MACHINE

Clair D. Lake and Benjamin M. Durfee, Binghamton, N. Y., assignors to International Business Machines Corporation, New York, N. Y., a corporation of New York Application January 31, 1949, Serial No. 73,844

4 Claims. (Cl. 209—110)

This invention relates to record controlled record distributing machines.

The primary object of the present invention is to provide a record distributing machine which is more flexible in its operation than machines now commercially available.

An object is to provide a record distributing machine which is particularly well adapted for census and related statistical purposes.

An object is to provide a record distributing machine which is capable of distributing records and segregating them in accordance with various combinations of data or data relationships which may have a particular statistical significance.

An object is to provide a record distributing machine in which the distribution of the records may be effected in accordance with arbitrary reclassifications or predetermined relationships of the data on the records.

An object is to provide a record distributing machine in which various facilities for certain kinds of special record distributing operations, such as serial number sorting and length of name sorting, are greatly simplified and arranged for more flexible and convenient operation, thereby avoiding the use of the various special devices with which commercial sorting and record distributing machines have in the past been equipped, the installation of certain of which often interferes with or prevents the installation of other special devices.

An object is to provide a record controlled distributing machine with means for detecting possible errors in punching the data in the records in order that records having data which appears to be inconsistent with well known facts may be segregated for the purpose of visually checking the data to ascertain if the records have been incorrectly designated.

An object is to provide a record distributing mechanism having various special controls for selecting and distributing cards in accordance with certain arbitrary designations such, for example, if the records are punched odd or even in particular column or field.

An object is to provide a record distributing machine with means for recoding or reclassifying the data on the records for the purpose of controlling an arbitrary distribution of the data or an arbitrary distribution of the record in accordance with the recoded data.

An object is to provide a record distributing machine with means for counting and tabulating the number of records having particular kinds of data, data relationships, or reclassified data.

An object is to provide a record distributing machine which is capable of simultaneously distributing the records in accordance with preselected original data designated on the records or recoded data and counting the number of records having either the original data or recoded data.

An object is to provide a record distributing machine which has a very large capacity for counting data, either original or reclassified, designated in the records.

An object is to provide a record distributing machine having provisions for arbitrarily reclassifying the data on the control records and/or sorting and counting the records in accordance with the reclassified data.

An object is to provide a record distributing machine having provisions for checking the operation of the record distributing mechanism against the original data or reclassified data to insure that the record will be actually distributed or segregated in accordance with the original data designations or recoded data. Reference is made to the application of Wilson and Durfee, filed on January 31, 1949, Serial No. 73,845, which claims feature of checking the actual destination of a card with its indicated destination, as shown in this application.

An object is to provide a means for checking the distribution of the record in accordance with original data or recoded data which is controlled by the actual position of the record in the record distributing mechanism.

An object is to provide a record distributing machine of the type described having provisions for counting records in accordance with original data or reclassified data and checking the count against the total number of records.

An object is to provide a record distributing and counting machine with means for proving the totals obtained by the counting means.

An object is to provide a record distributing machine of the class described in the foregoing objects with means for printing the accumulated totals of the counting devices.

An object is to provide a record distributing machine having flexible controls for counting, accumulating, classifying, reclassifying, checking, comparing, cross-checking, editing, and printing of the accumulated totals under control of original data recorded on the records.

An object is to provide a record distributing machine with means for effecting a flexible detailed analysis of the data on the records and carrying out checking, sorting, counting, totaling, and record distributing operations in accordance with the analysis of the data designated on the records.

Summarizing the foregoing objects, the principal object of the present invention is to provide an extremely flexible record distributing machine in which there are unlimited possibilities for the tabulation and distribution of records in accordance with data designated on the records by any suitable means such as perforations, conductive marks, or any of the other well known means for recording data.

In the present instance, the machine will be illustrated with reference to perforated records of the type used in the well known Hollerith or "IBM" system of recording accounting and statistical data. It will be understood, however, that such novel inventions as may be disclosed herein are not limited to records having perforations but they may be used with other means of designating records such as the well known conductive marks which are the means of controlling certain well known types of machines.

The inventions disclosed herein will be described with reference to an electronic means of sensing the data in the records and translating such data into electrical impulses which are utilized to control the functions of the machine, and for this purpose, the invention is disclosed as having electrical sensing brushes which may be connected to the control electrodes of electronic tubes. It is clear, however, that the brushes might be replaced by photocells or similar devices which do not necessarily have any direct contact with the record for the purpose of analyzing the data, or by a frictional sensing device.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a perspective view of the machine as viewed from its right-hand end.

Figs. 2A and 2B together form a plan view of the machine with part of the cabinet removed.

Fig. 36 is a vertical elevation of one of the unit counters.

Fig. 37 is a plan view of the counter shown in Fig. 36.

Fig. 38 is a vertical section on the line 38—38 of Fig. 36.

Fig. 39 is a vertical section on the line 39—39 in Fig. 37.

Fig. 40 is a vertical section on the line 40—40 in Fig. 37.

Figure 47A:
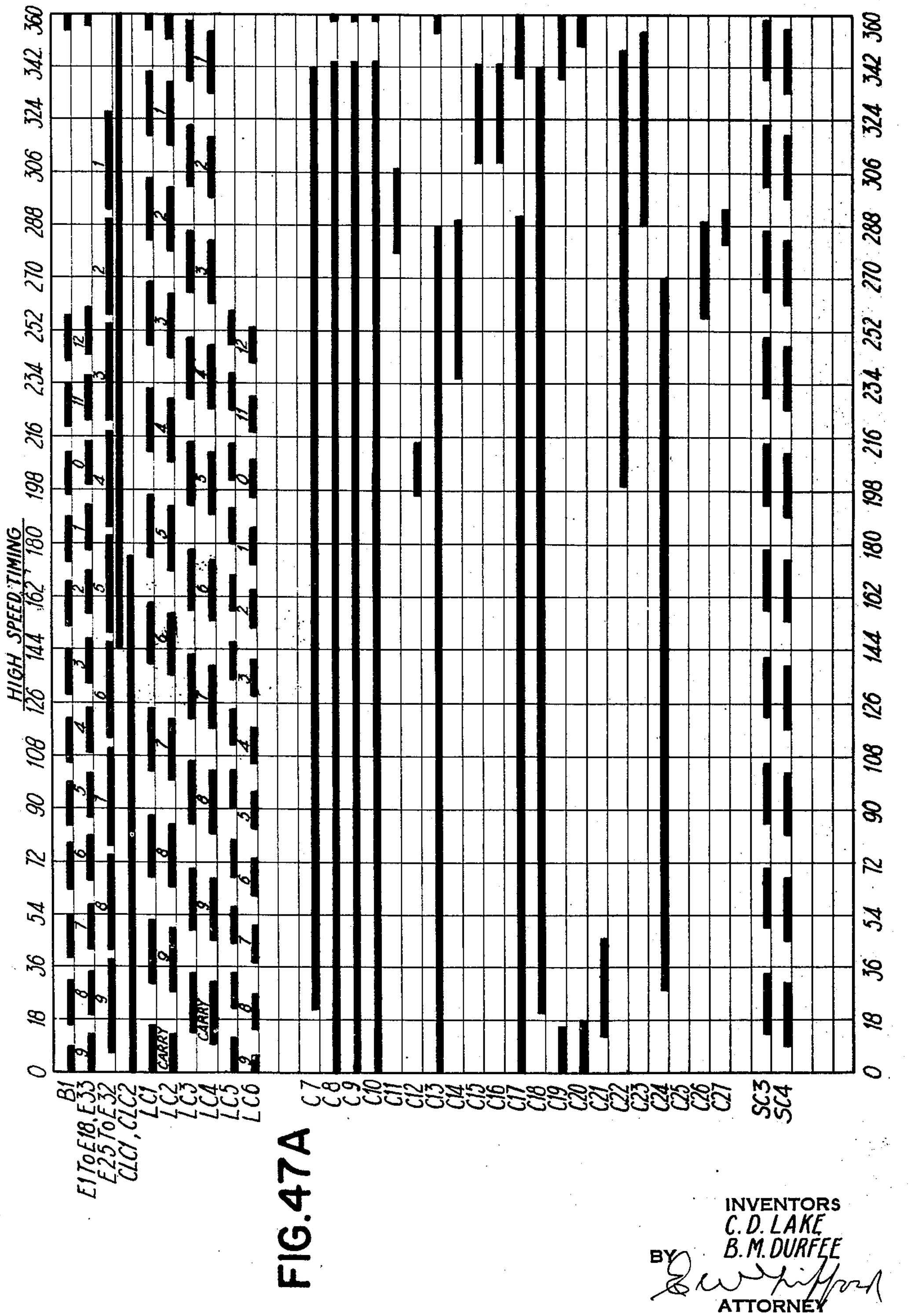
Figure 47B:
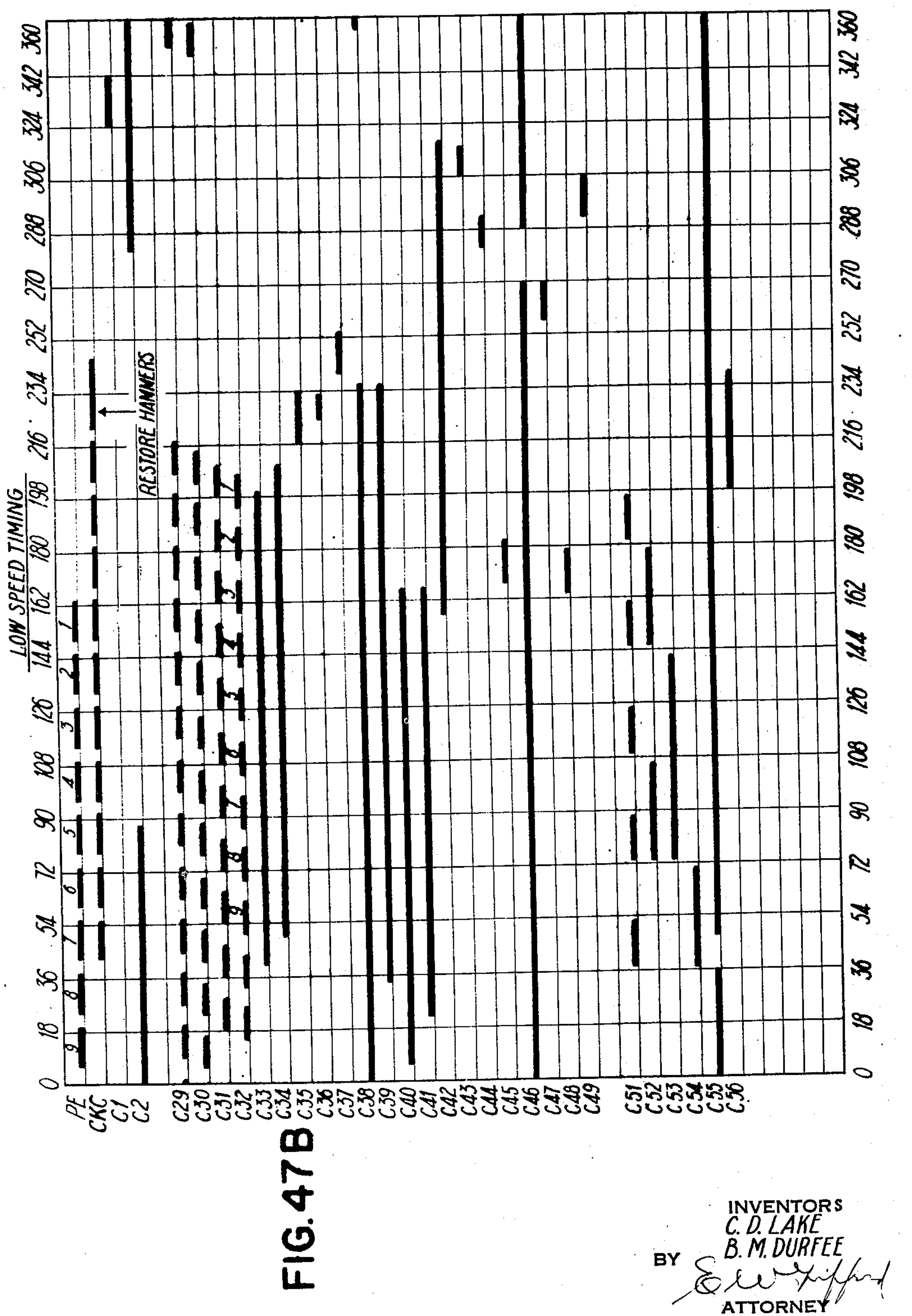

Figs. 47A and 47B taken together comprise an electrical timing chart.

Figure 48A:
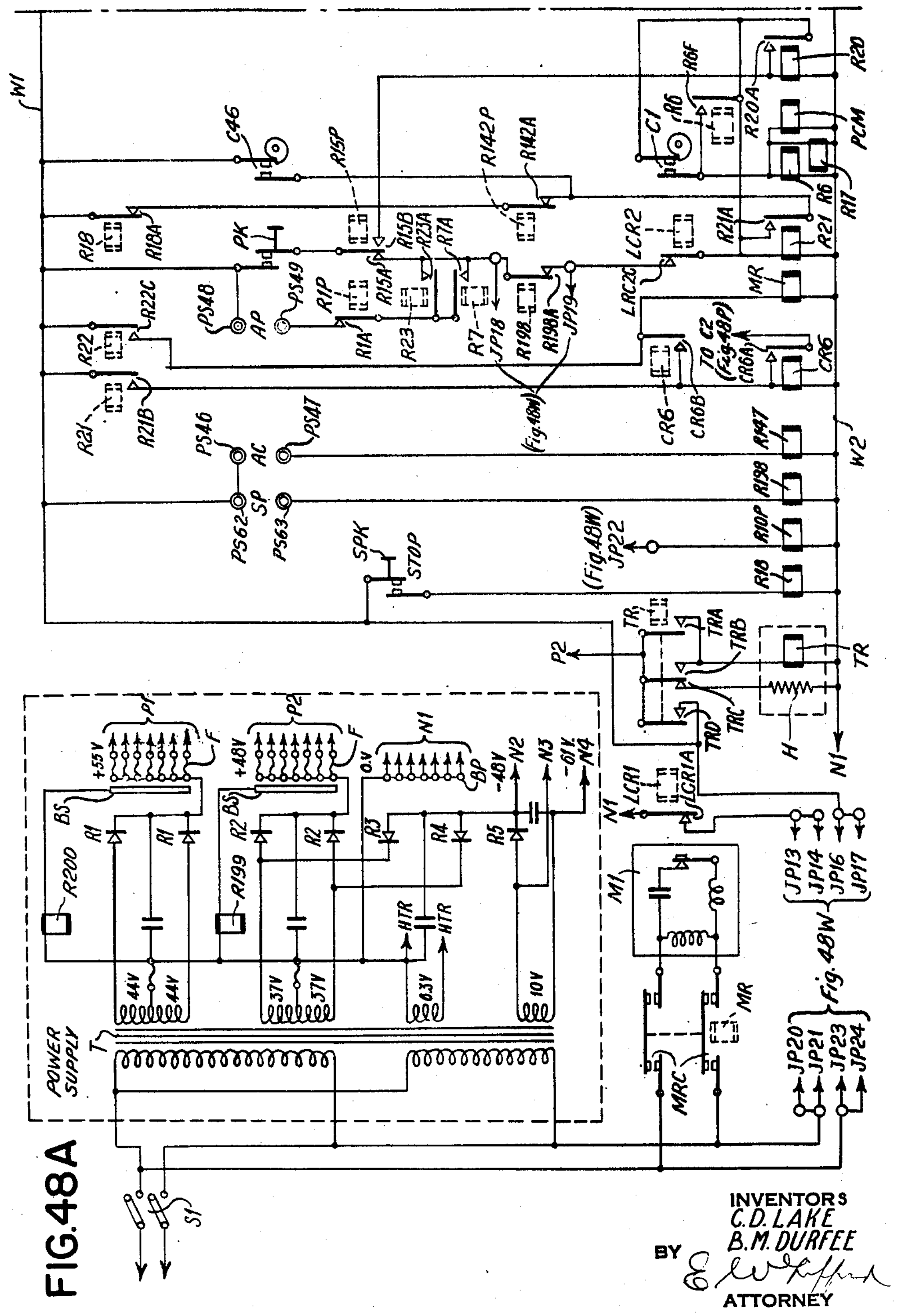
Figure 48B:
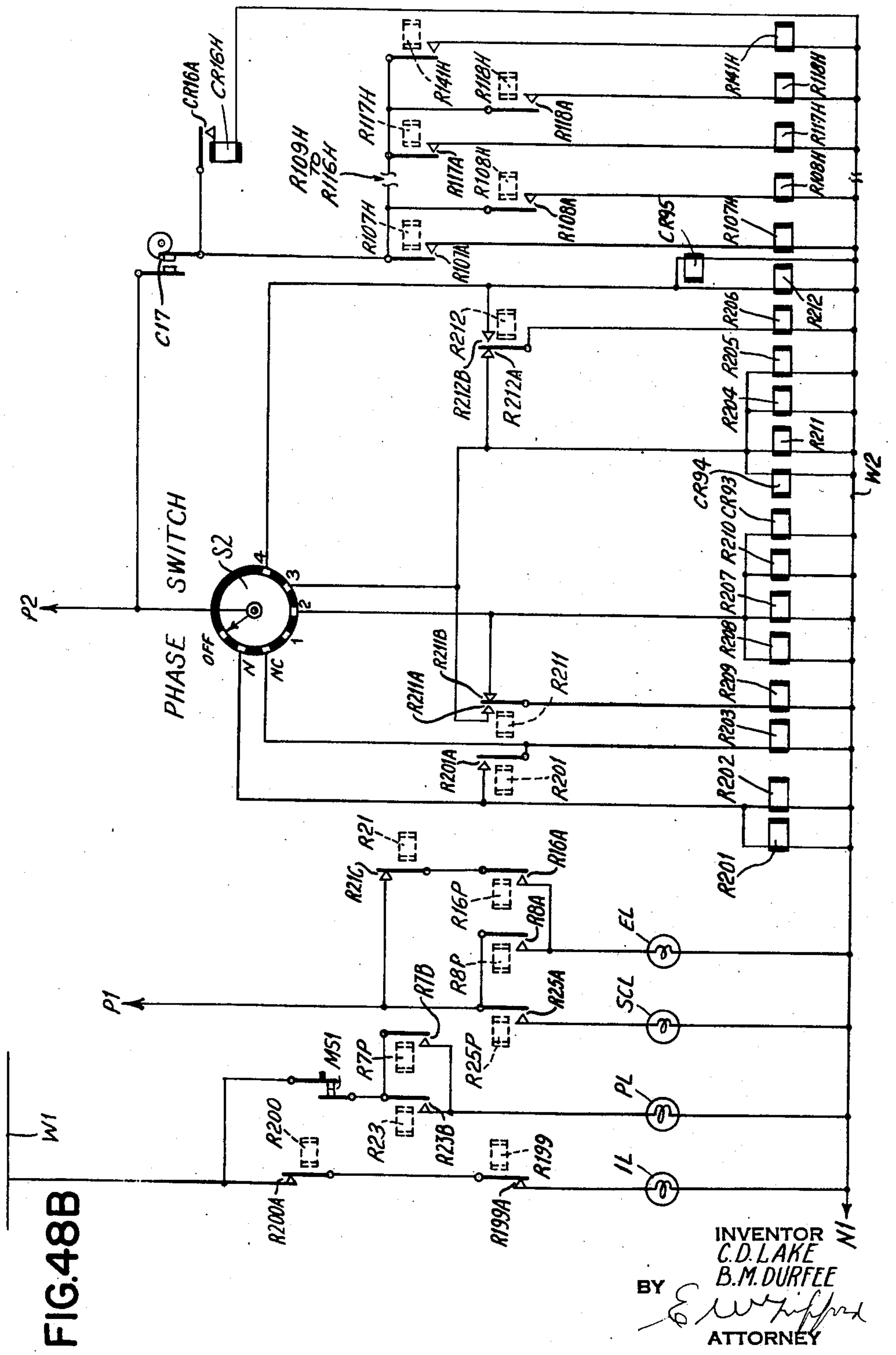
Figure 48C:
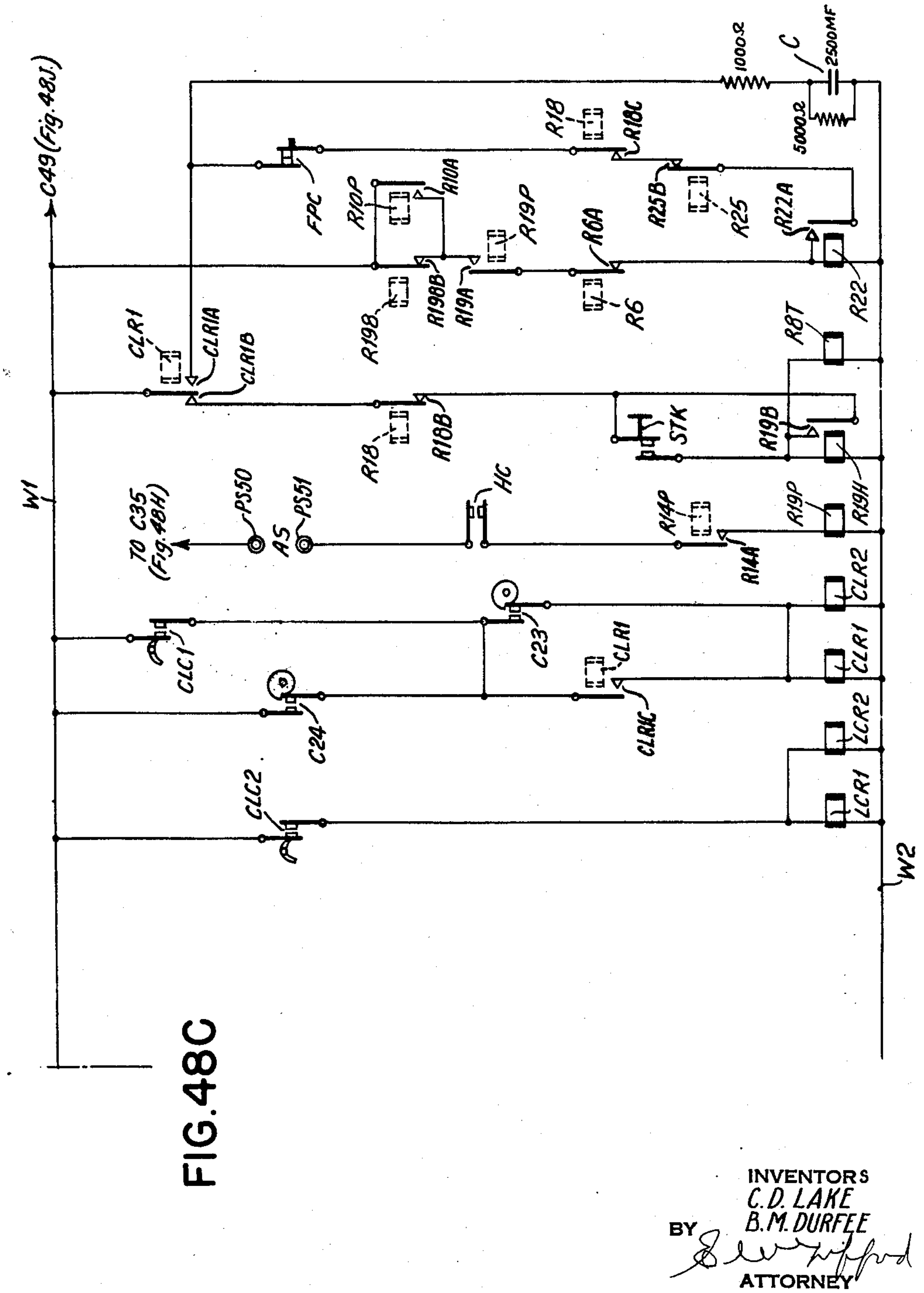
Figure 48D:
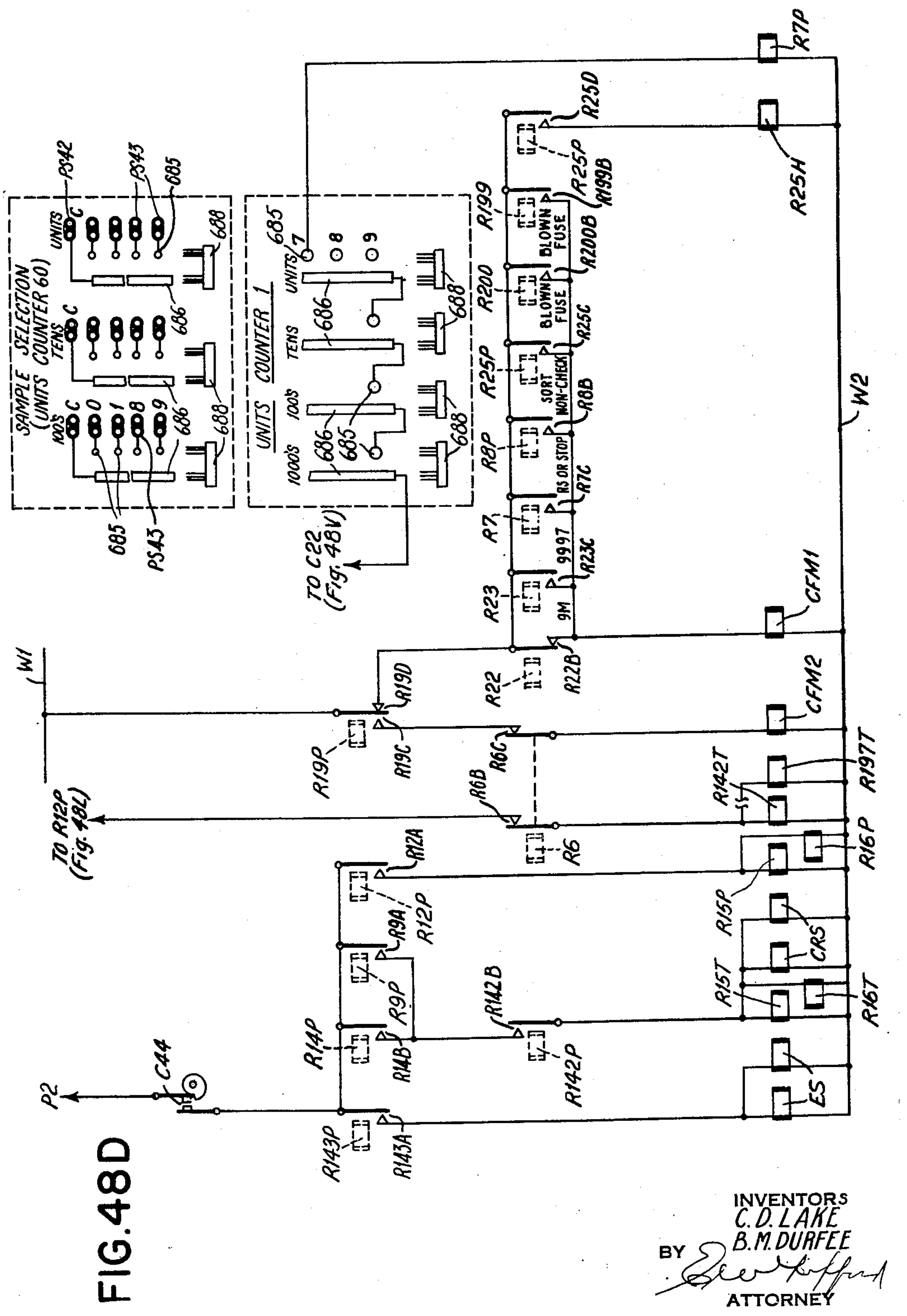
Figure 48E:
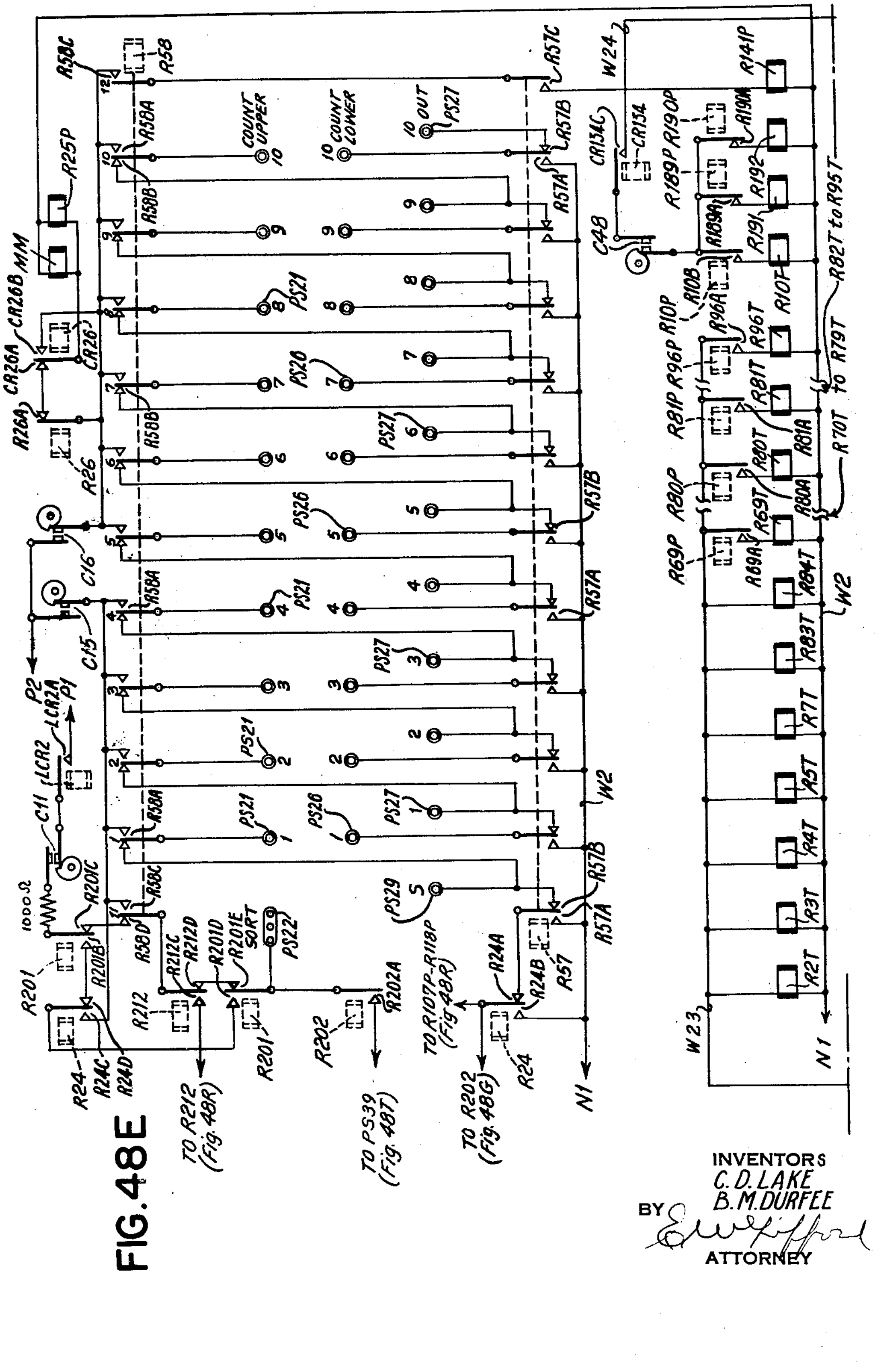
Figure 48F:
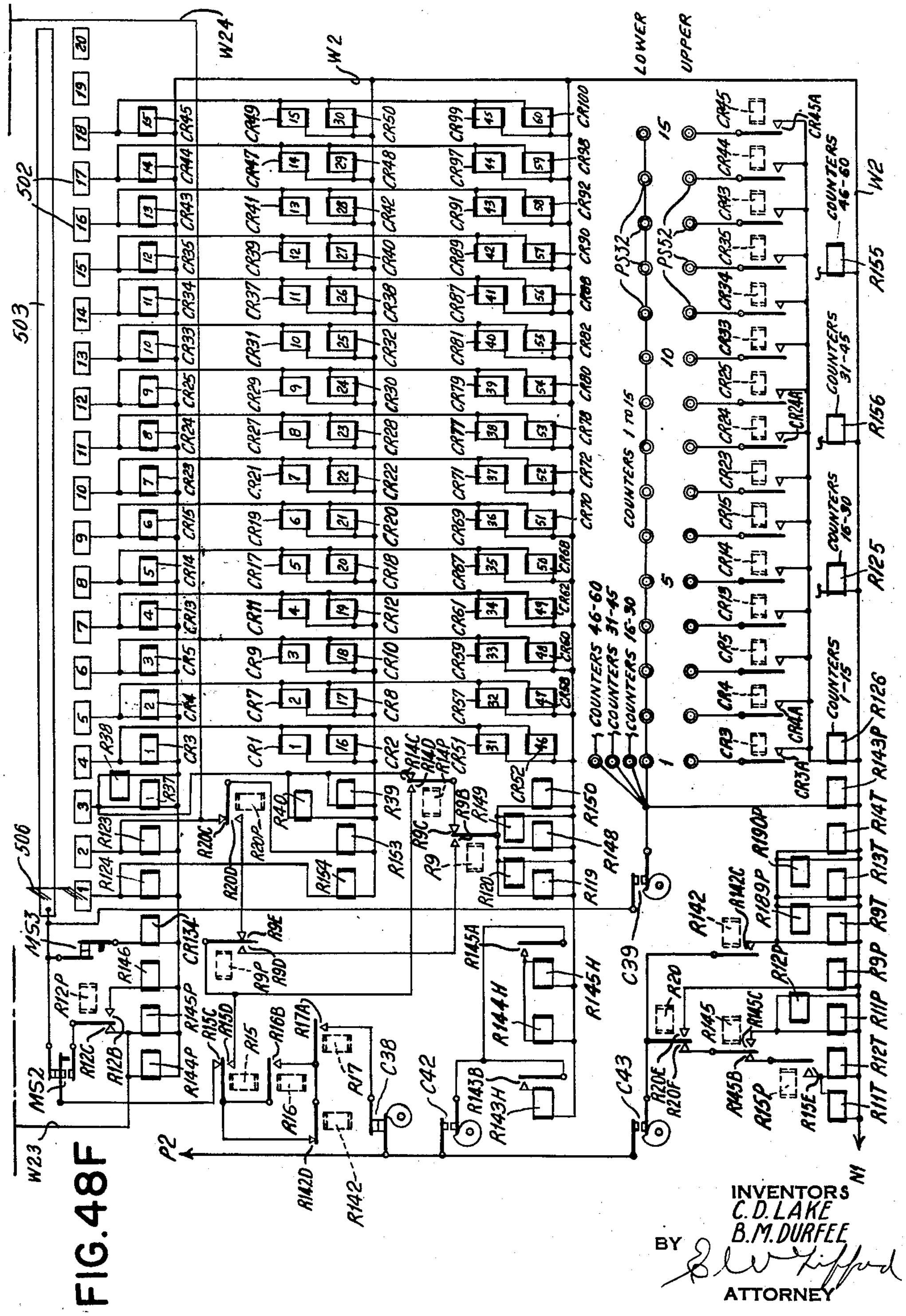
Figure 48G:
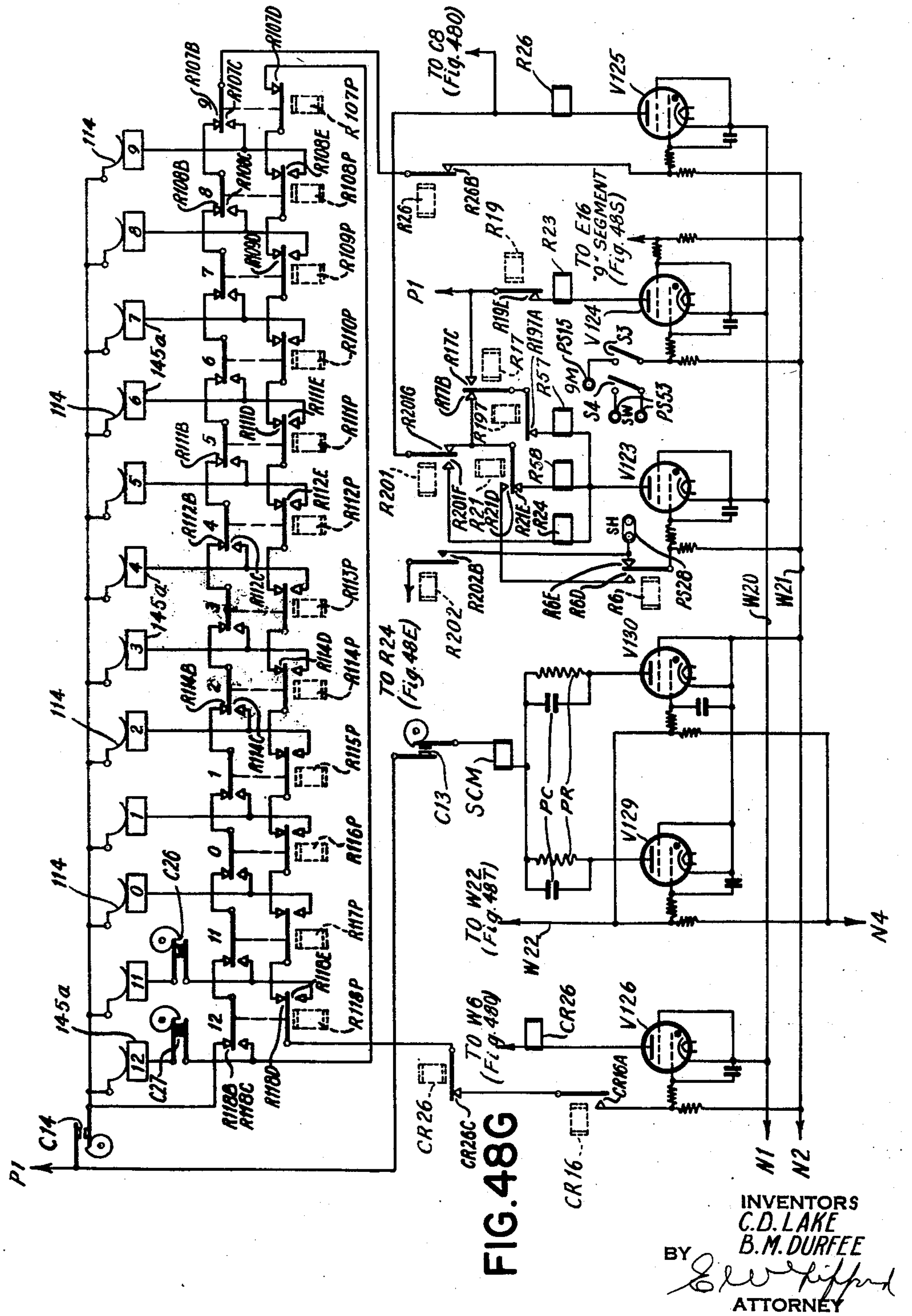
Figure 48H:
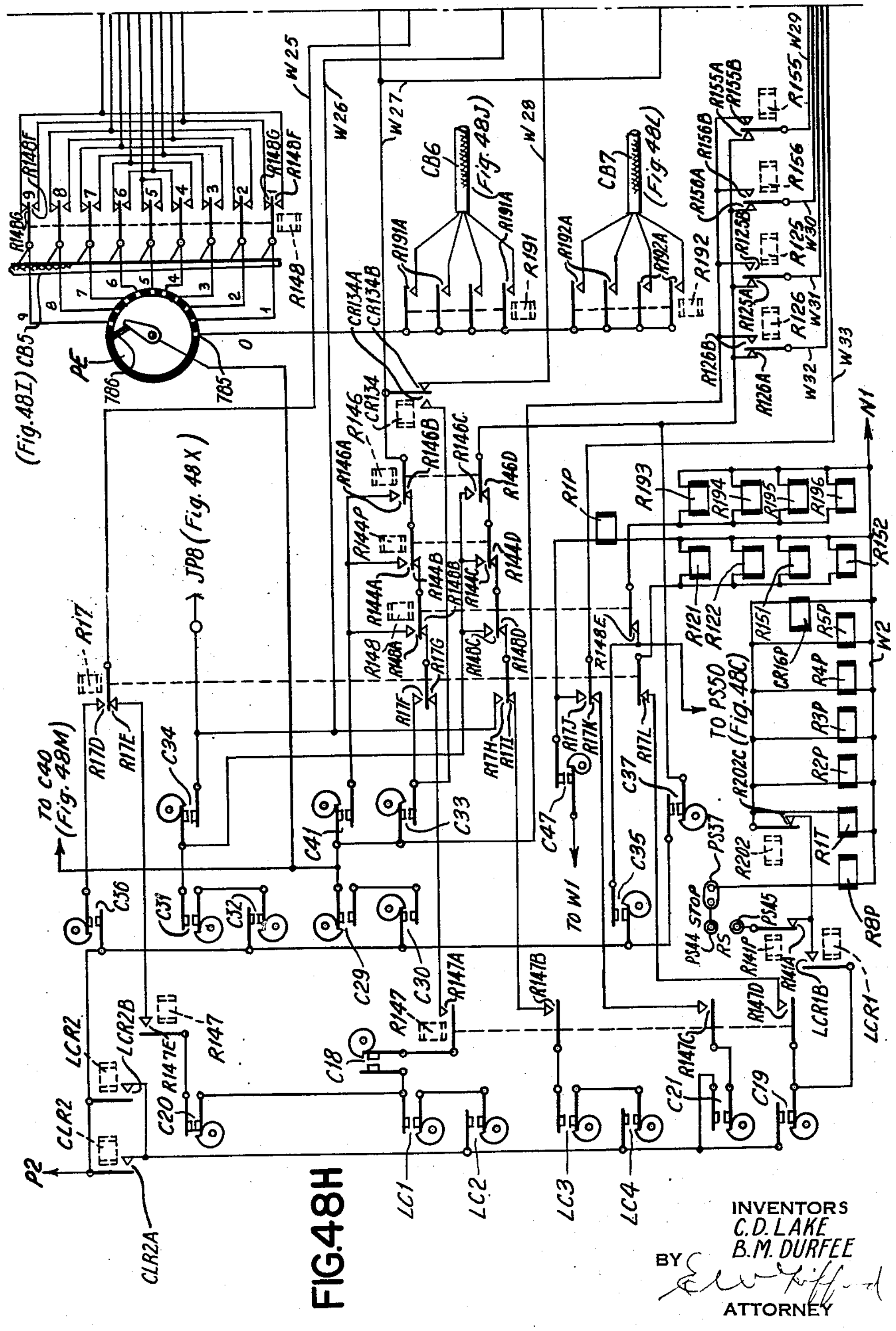
Figure 48I:
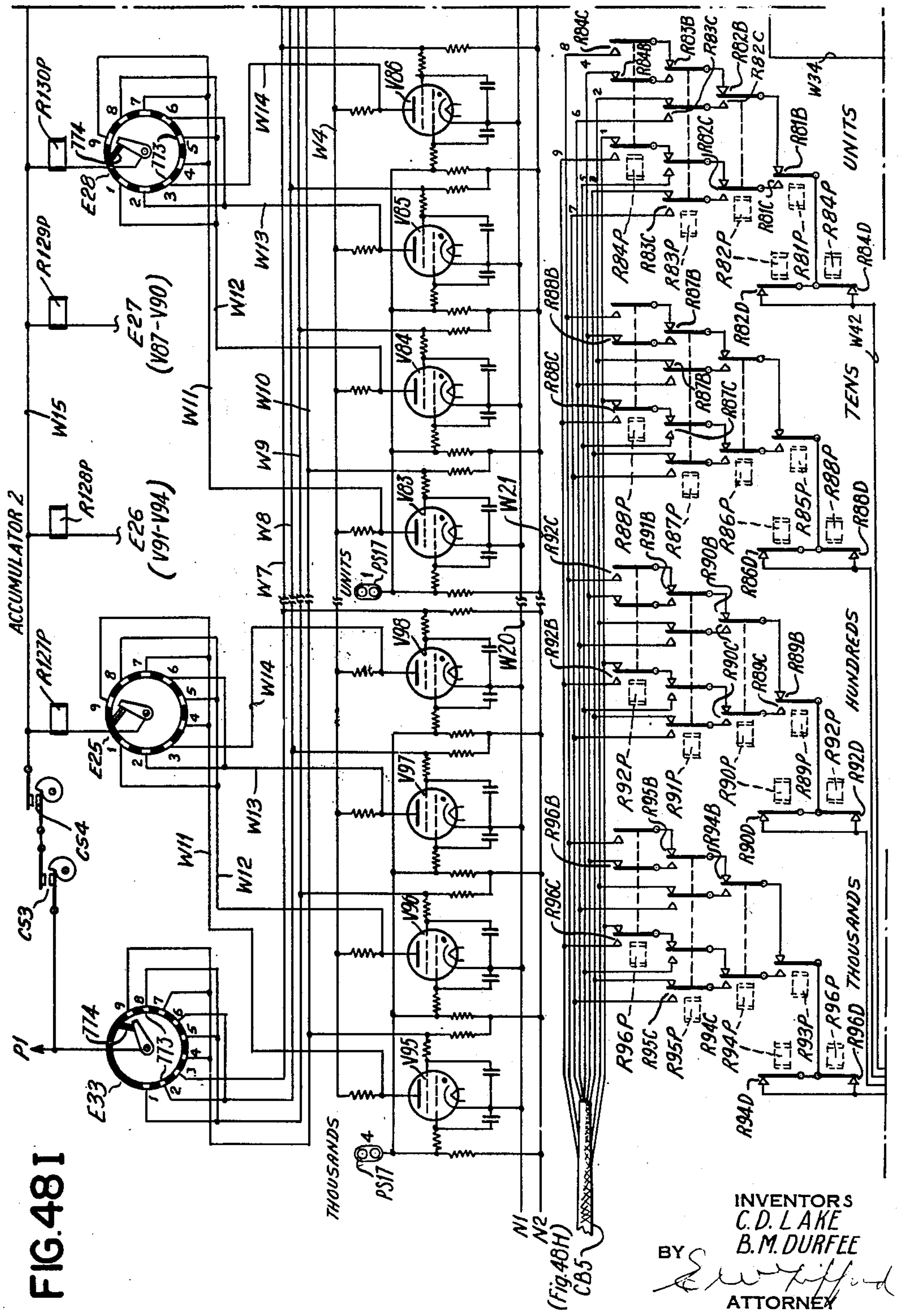
Figure 48J:
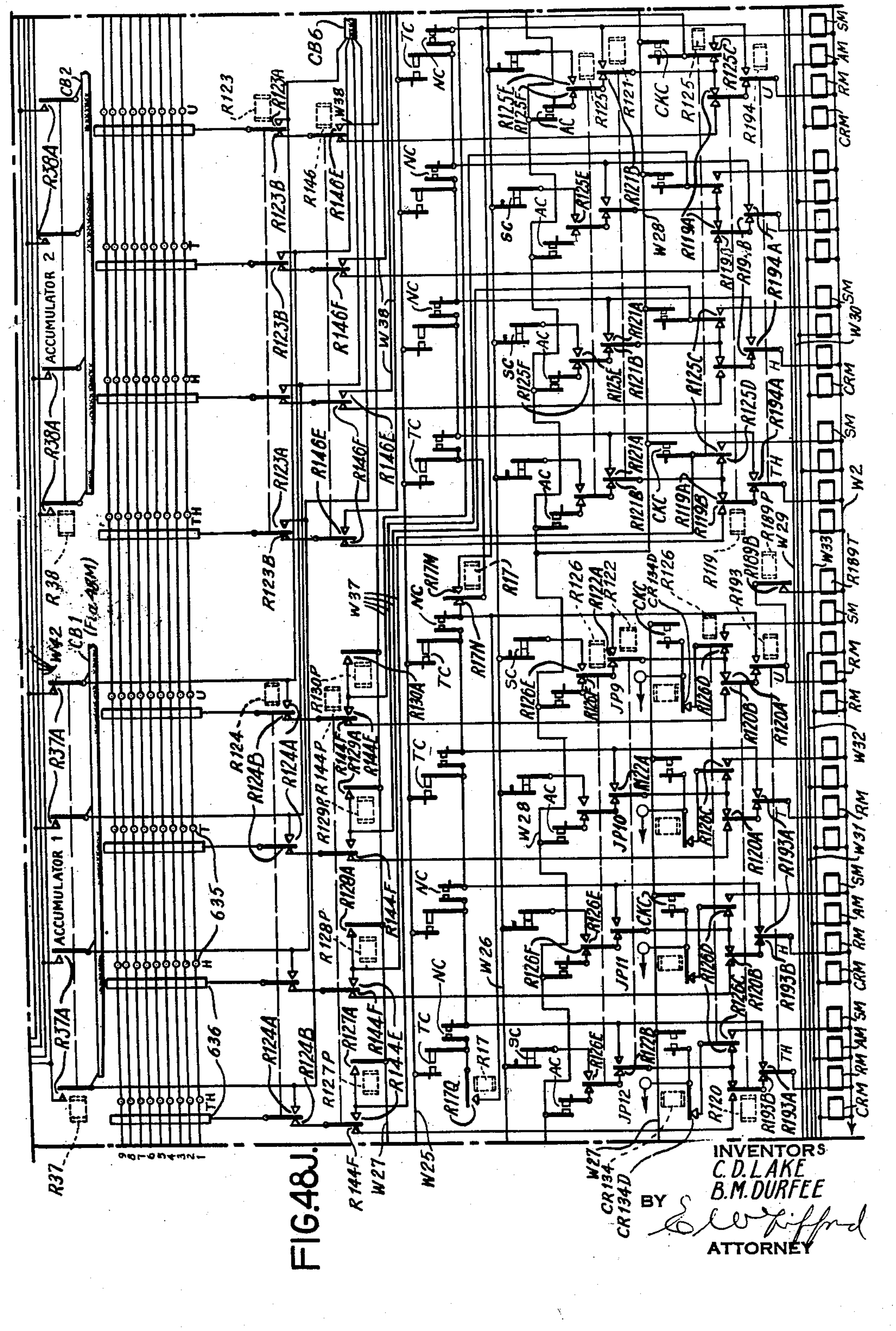
Figure 48K:
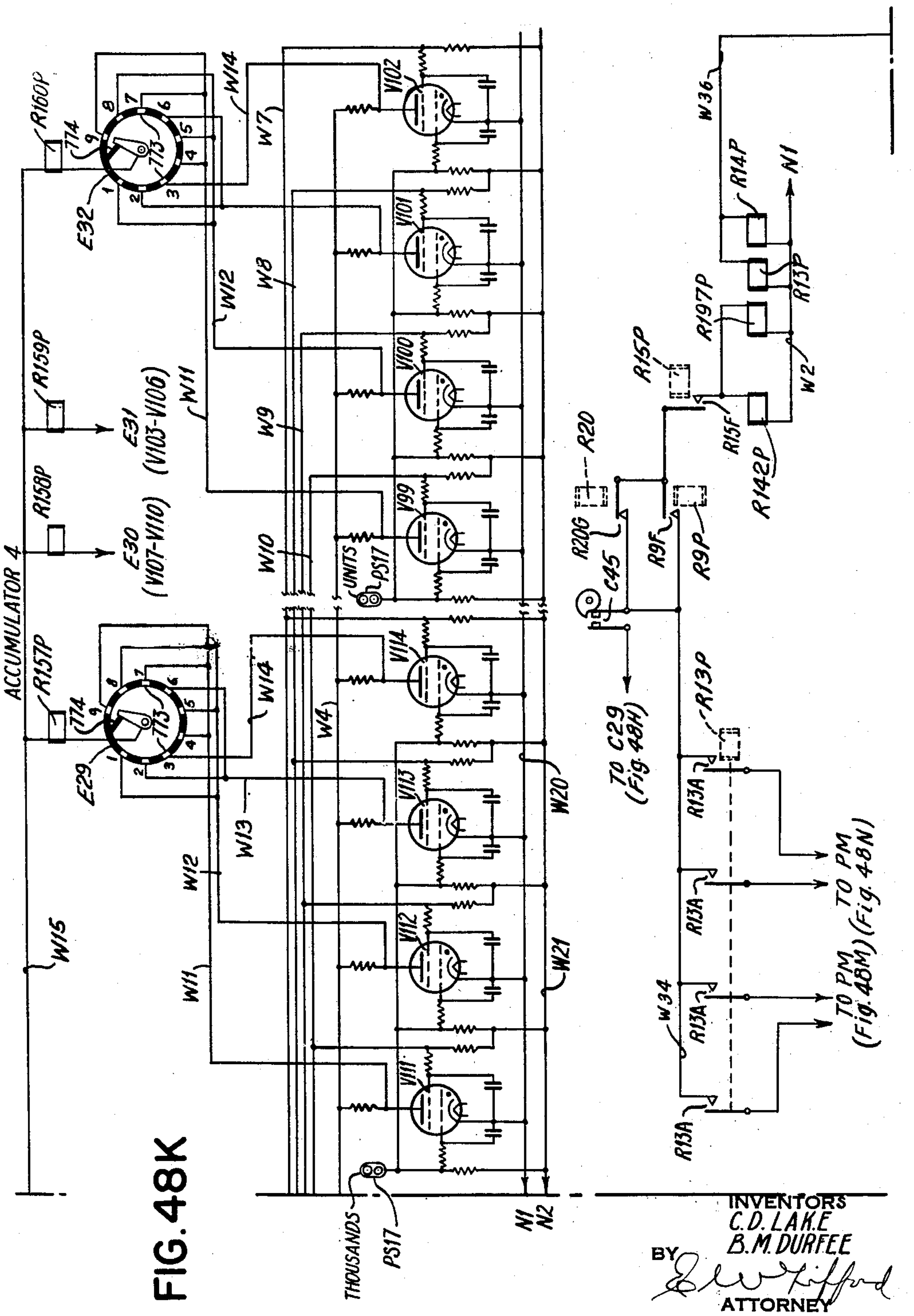
Figure 48L:
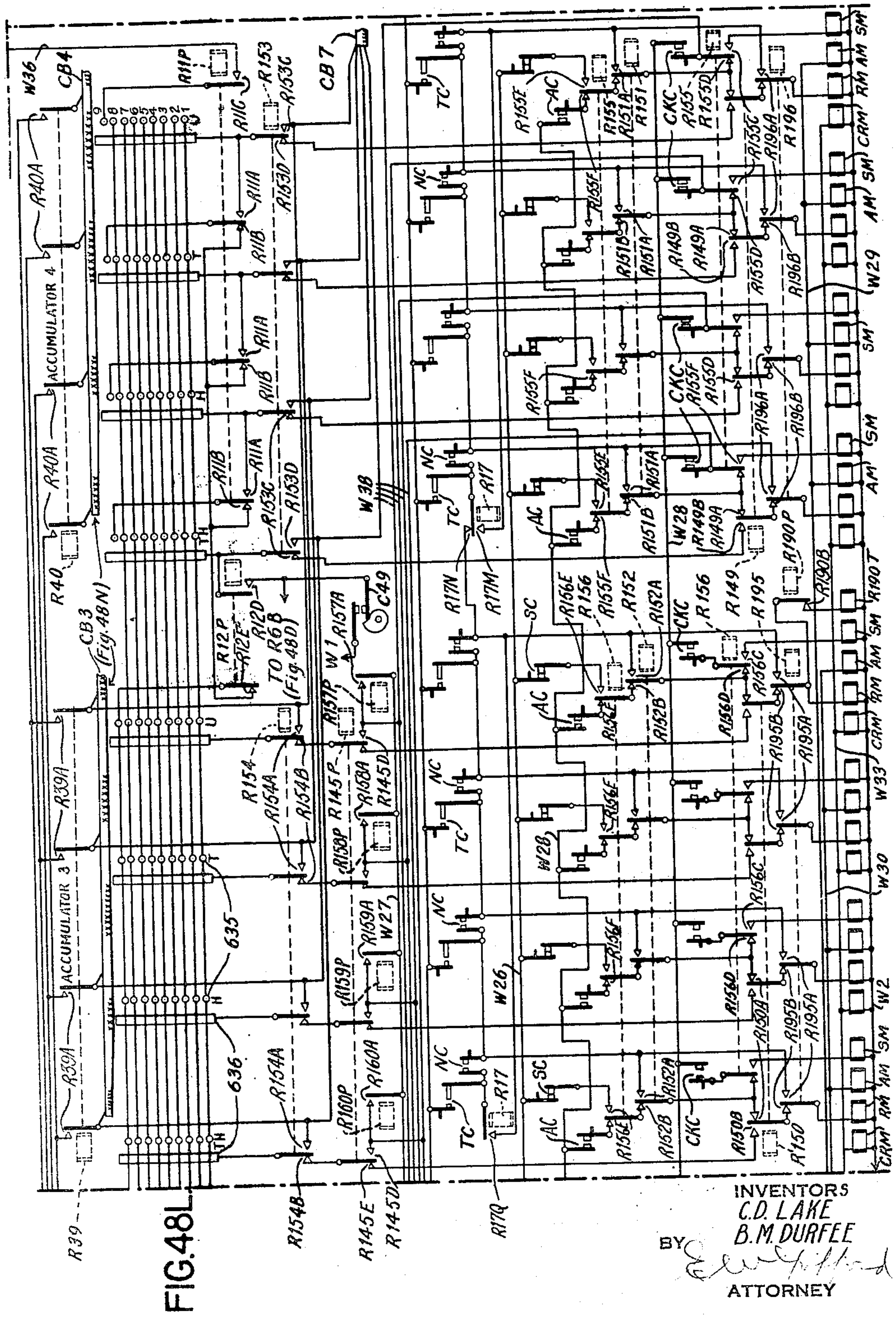
Figure 48M:
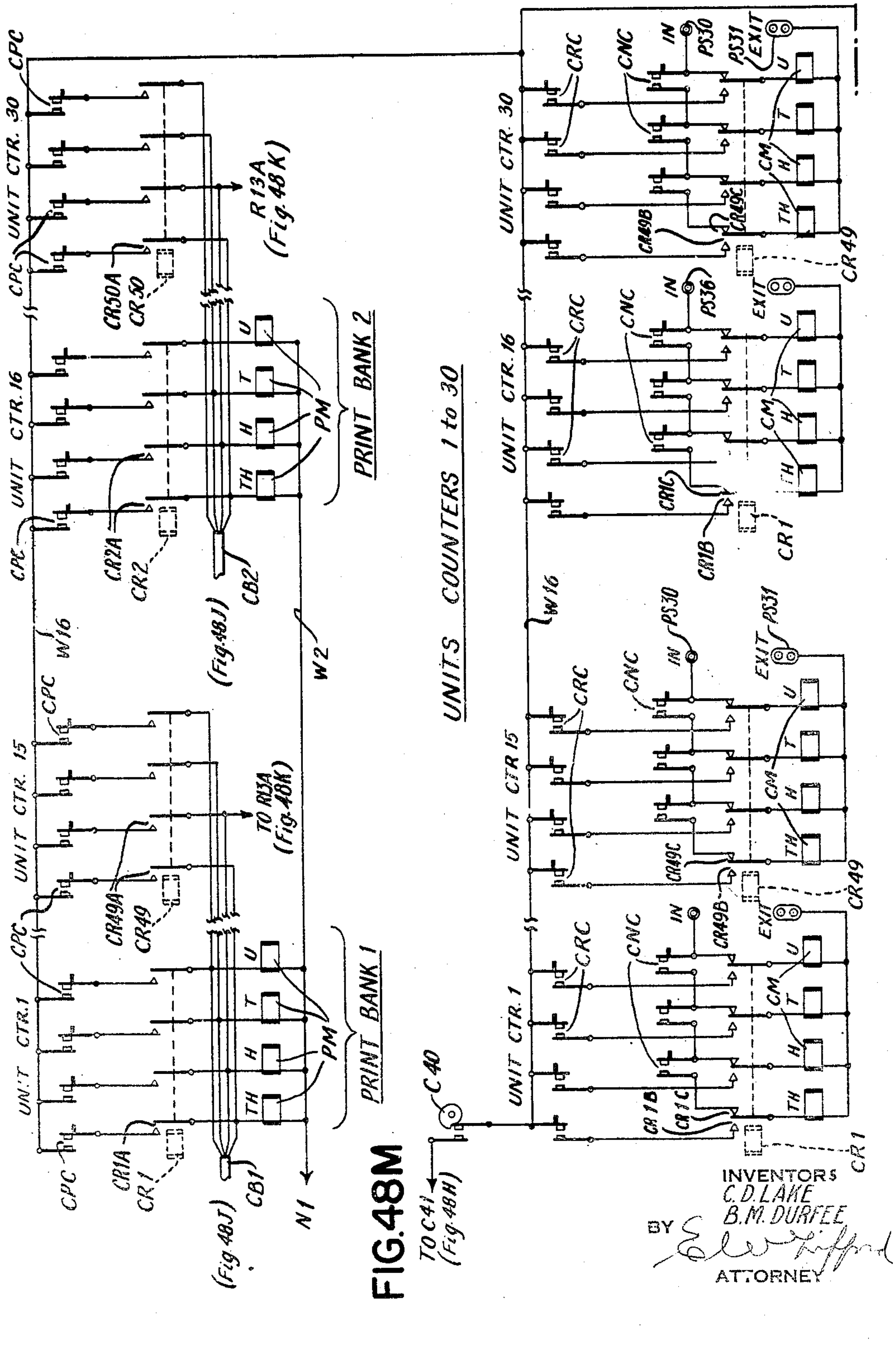
Figure 48N:
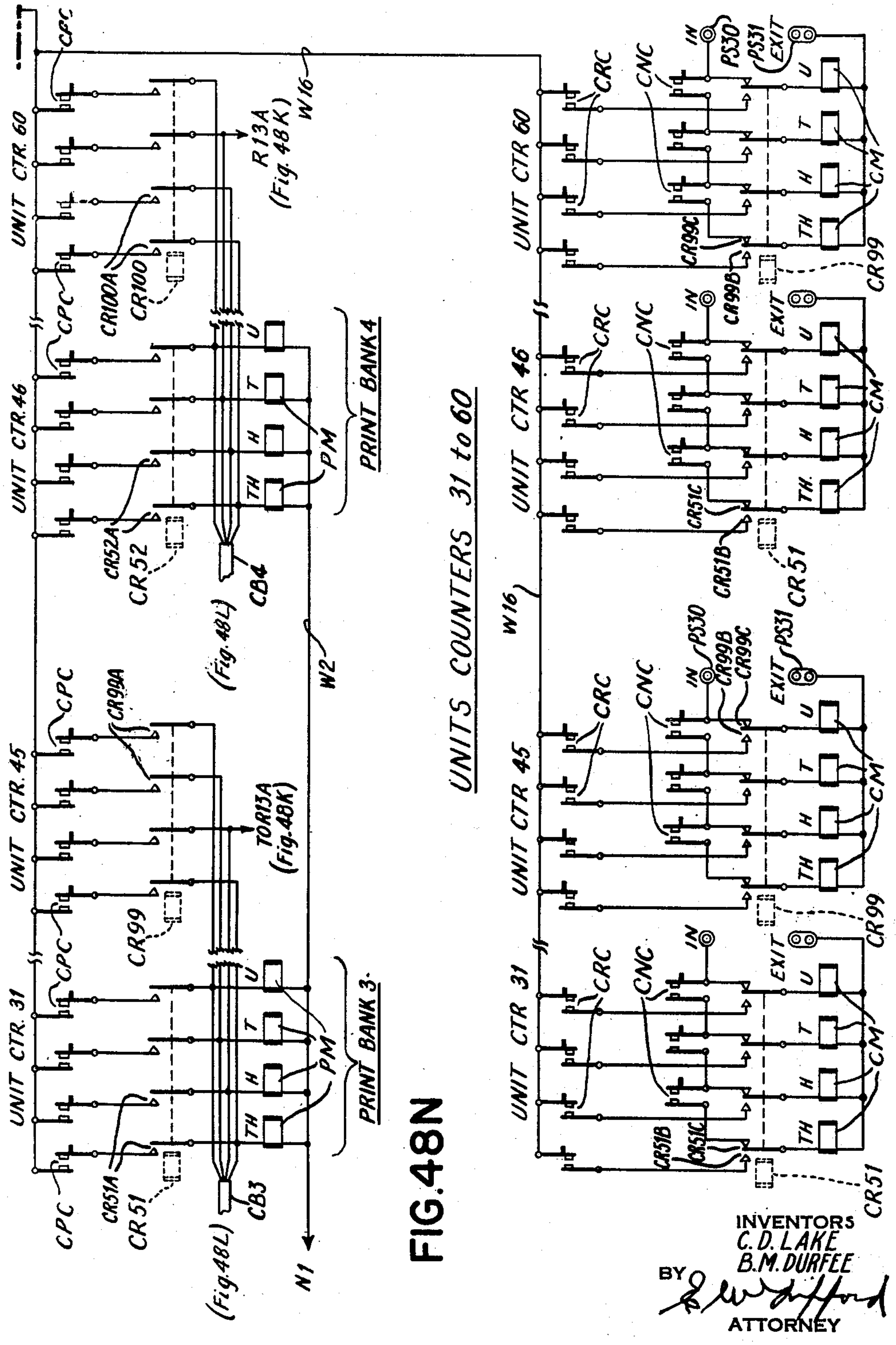
Figure 48O:
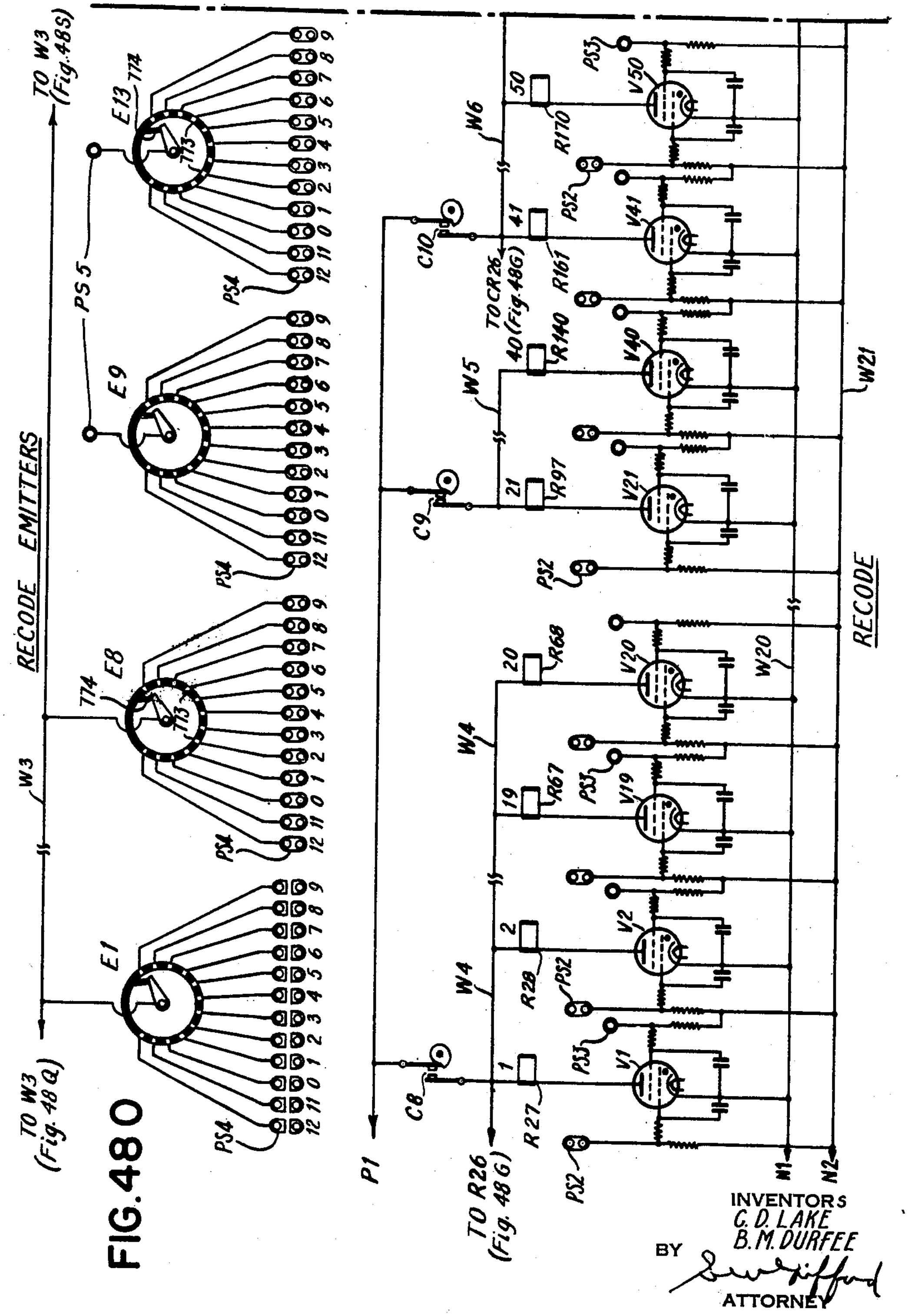
Figure 48P:
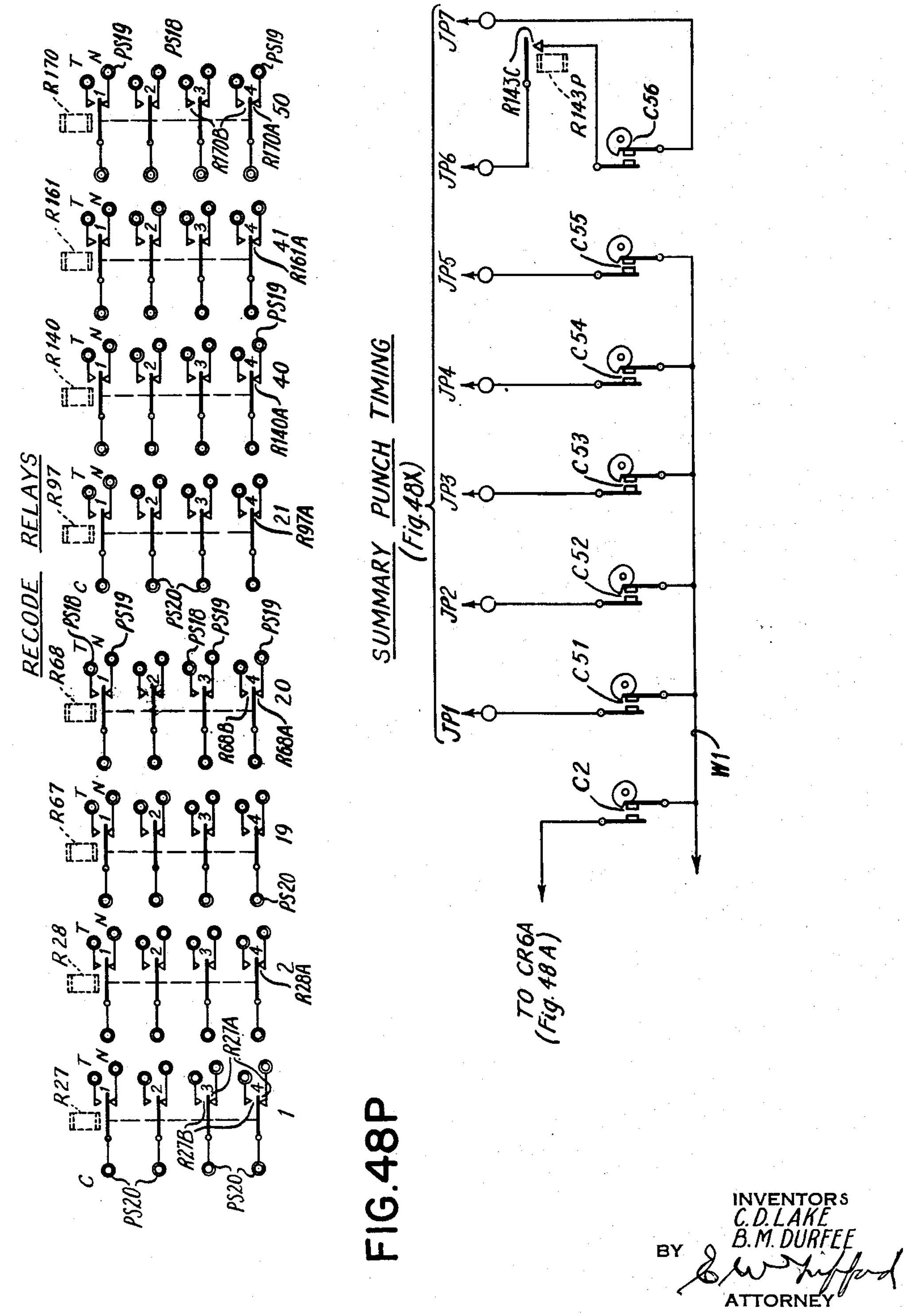
Figure 48Q:
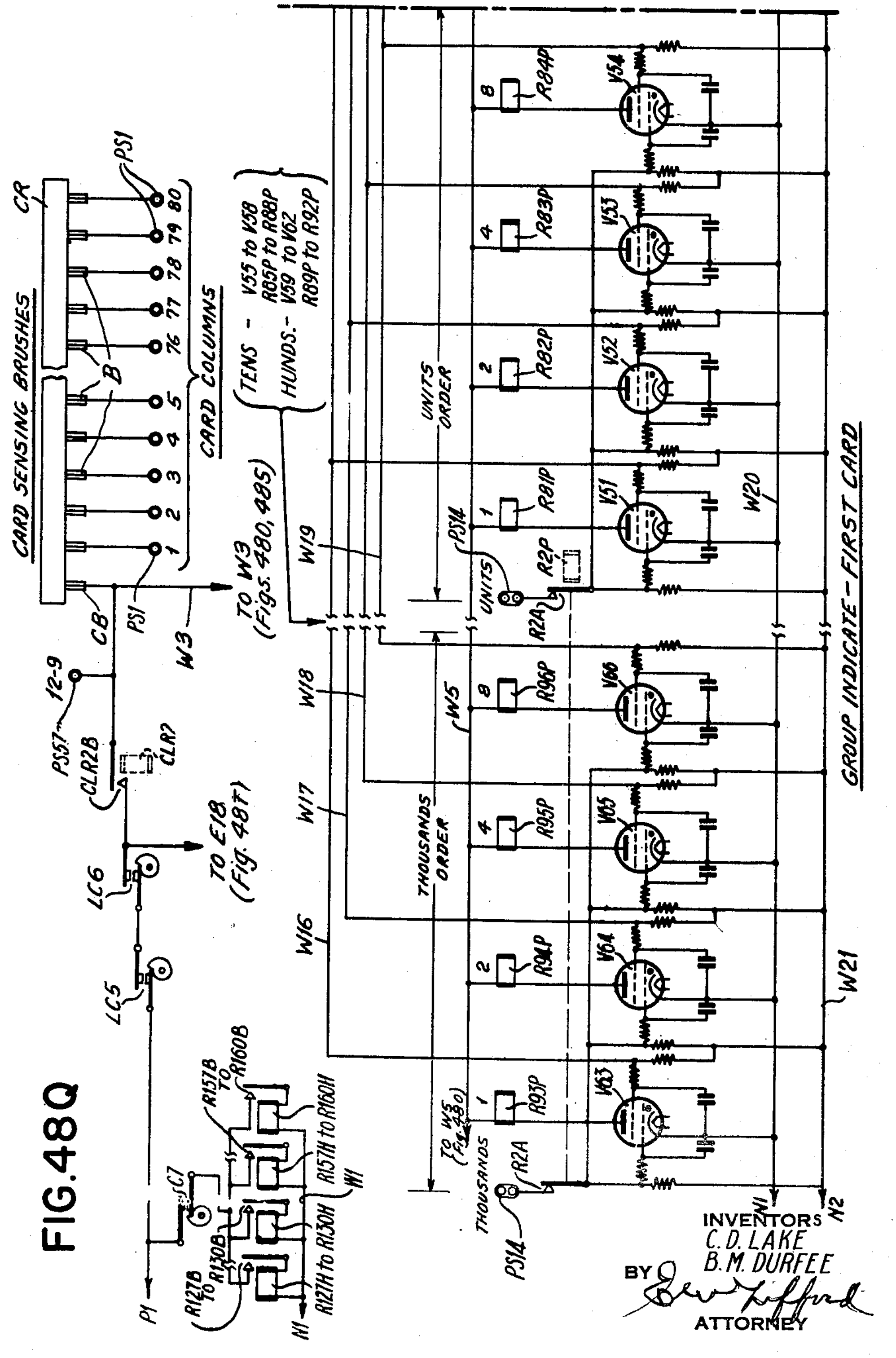
Figure 48R:
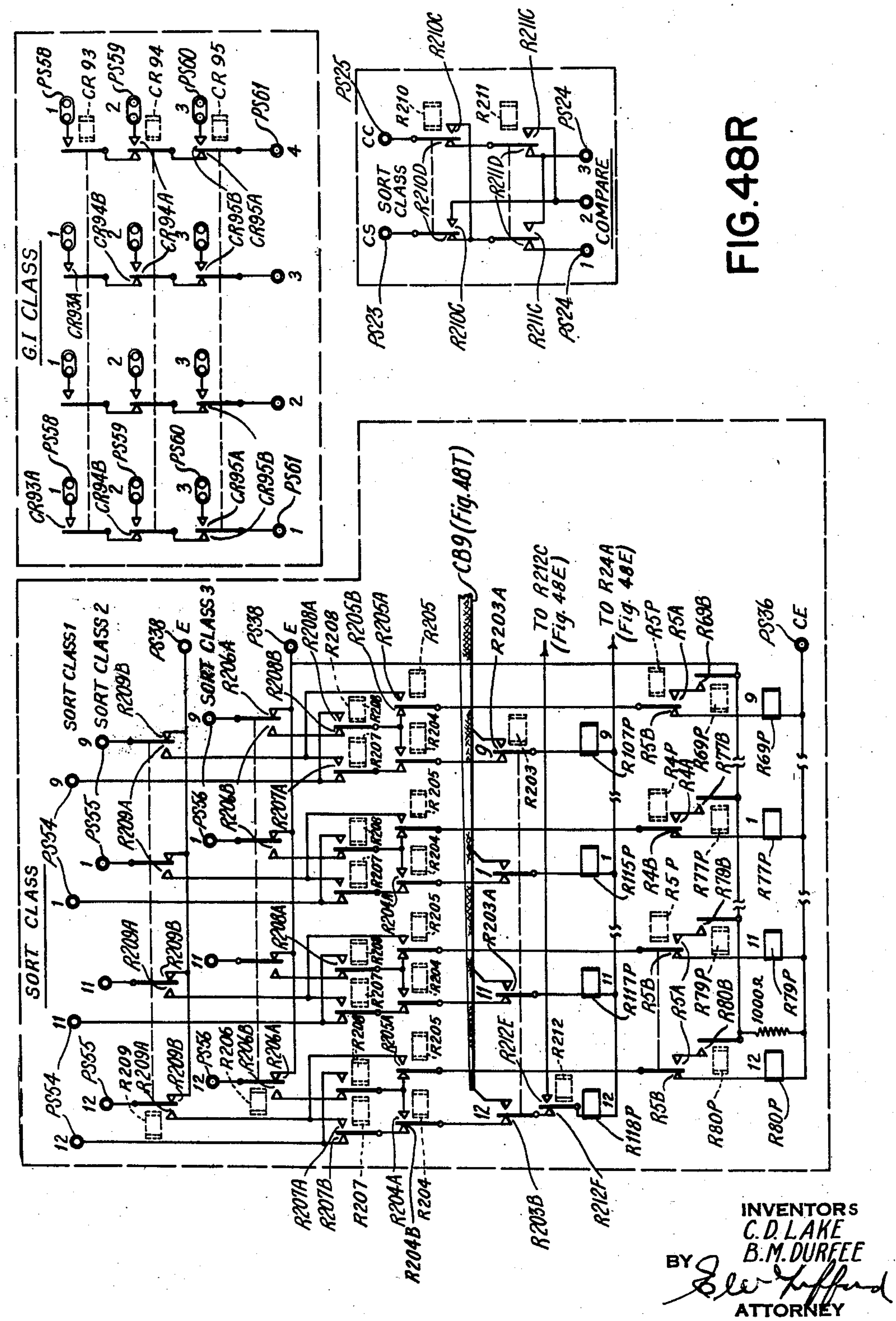
Figure 48S:
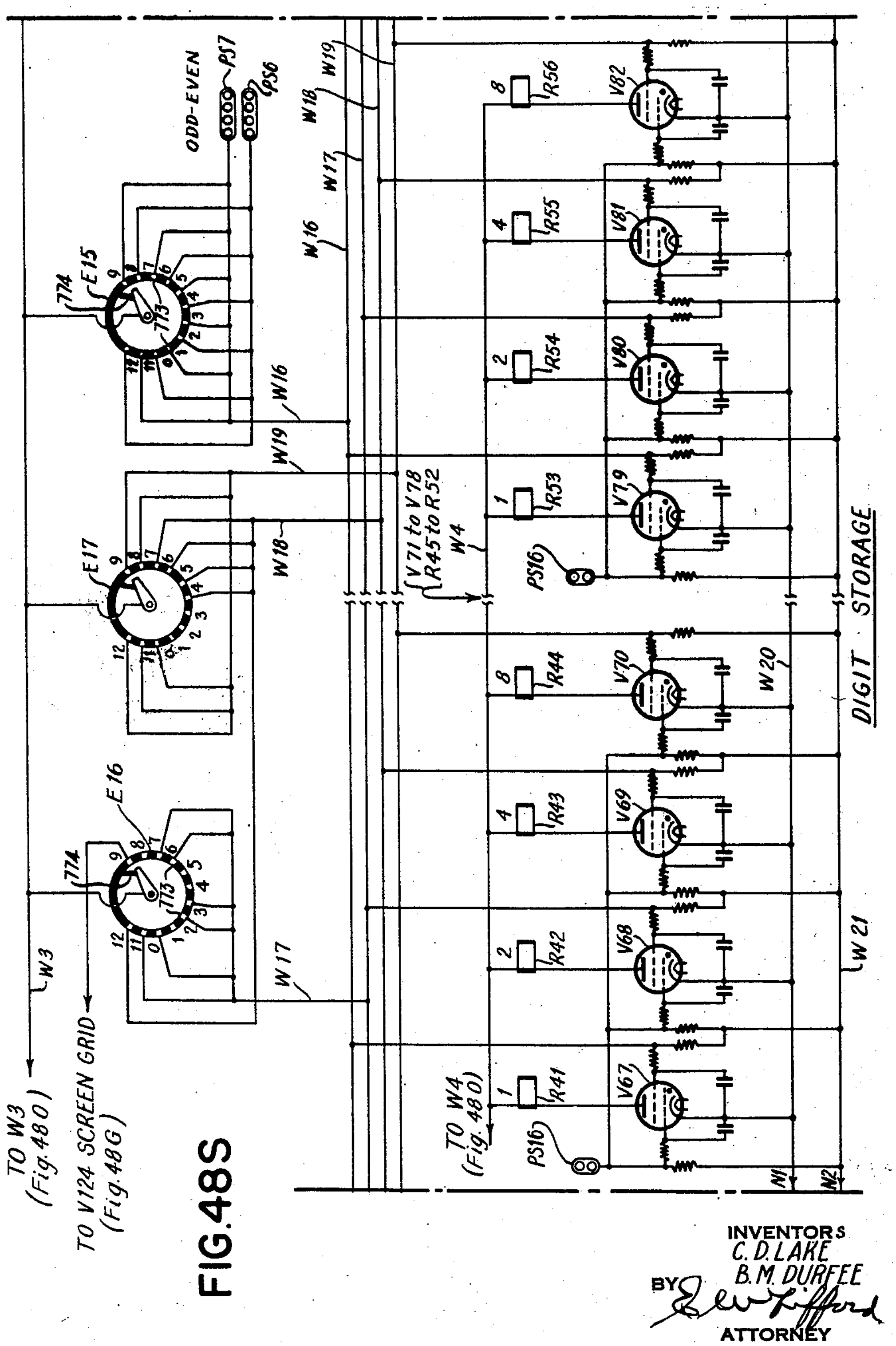
Figure 48T:
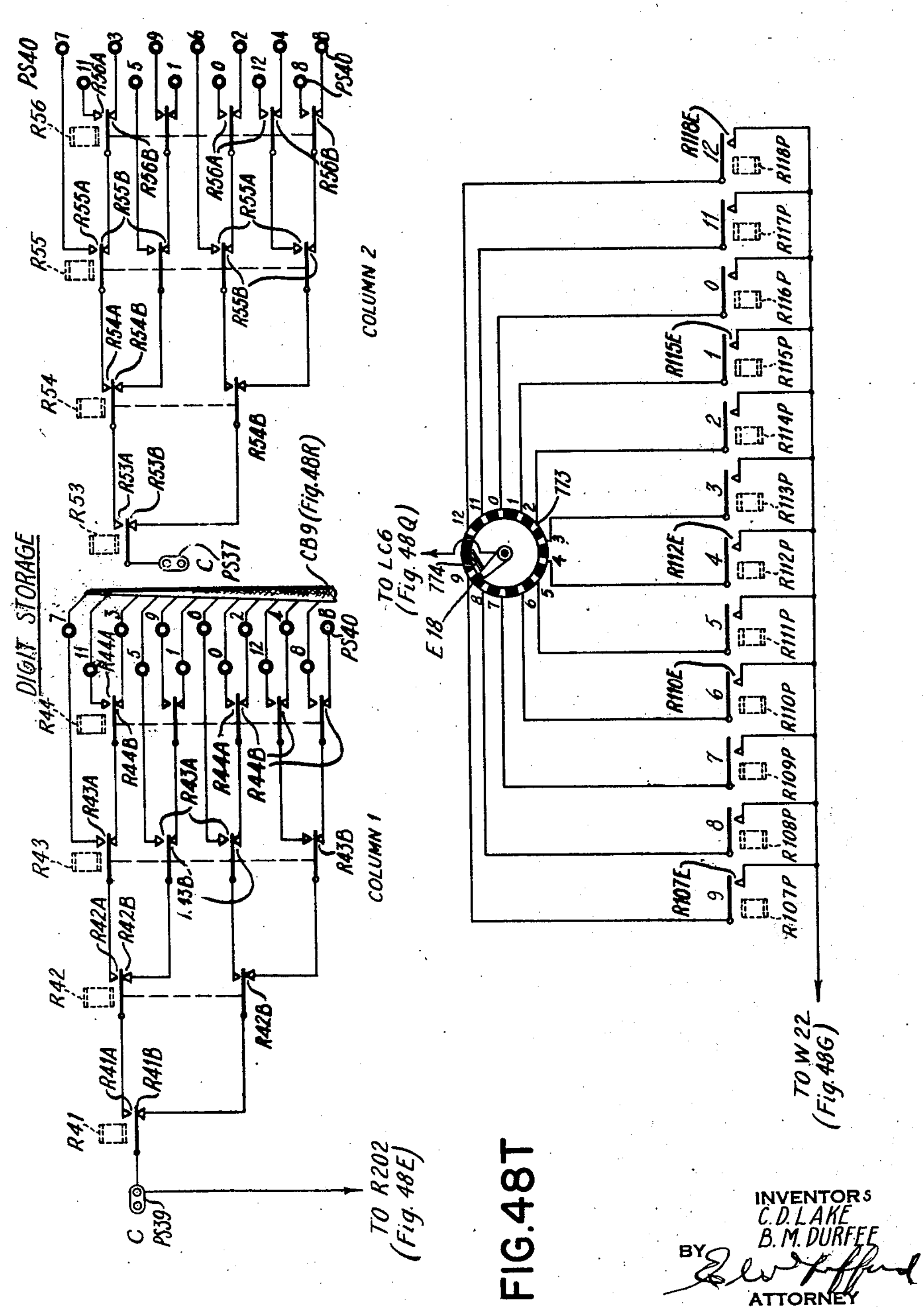
Figure 48U:
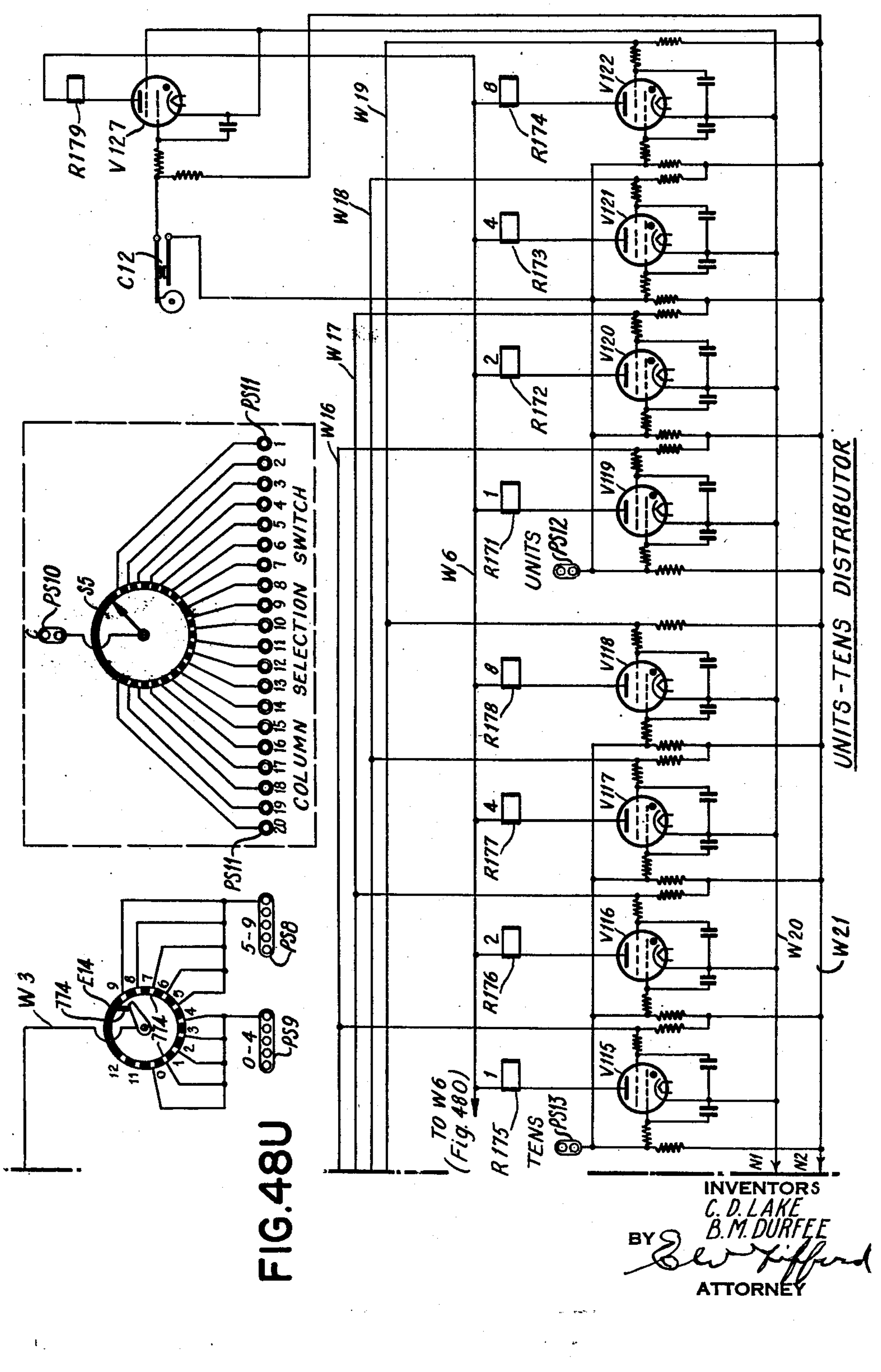
Figure 48V:
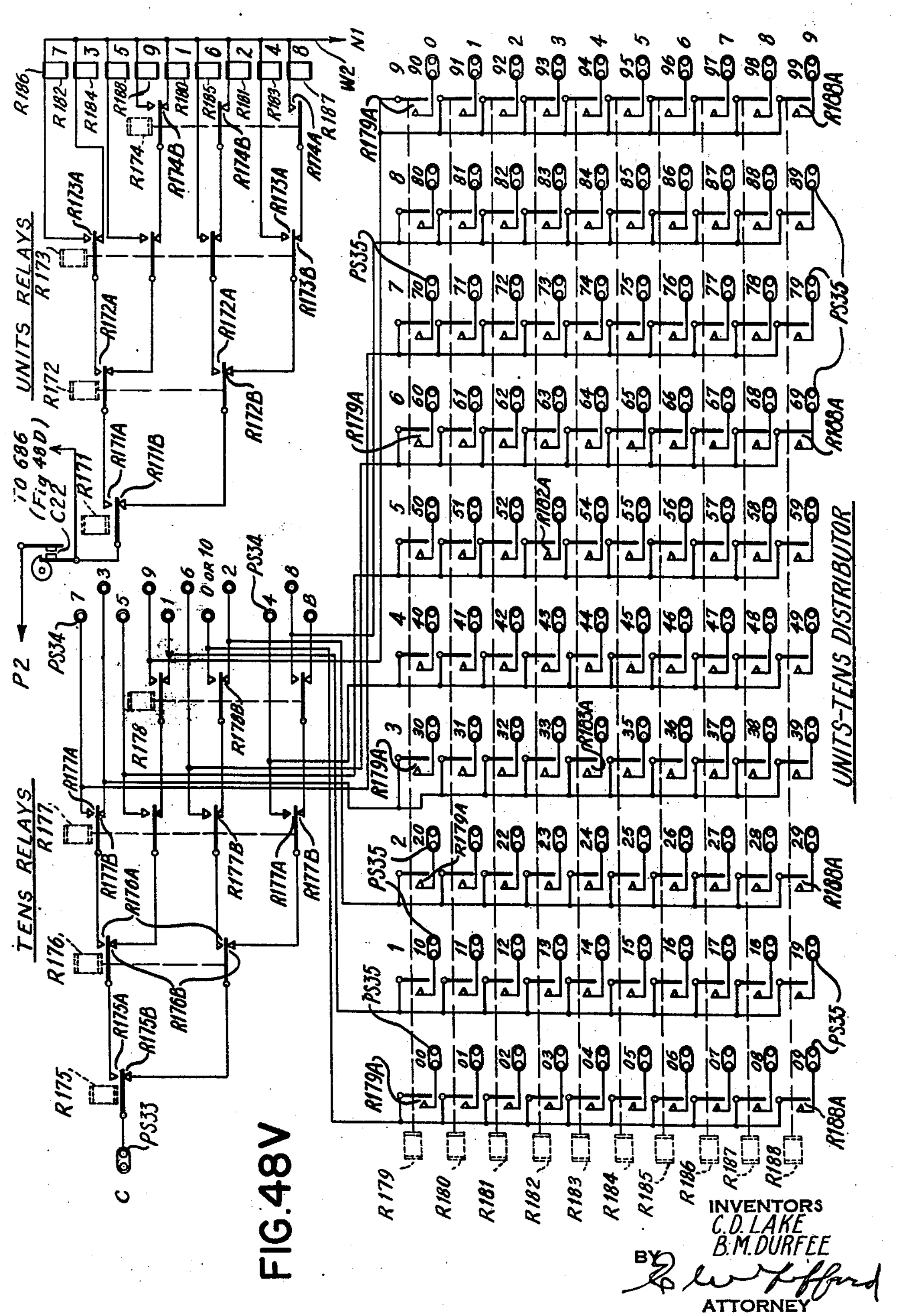
Figure 48W:
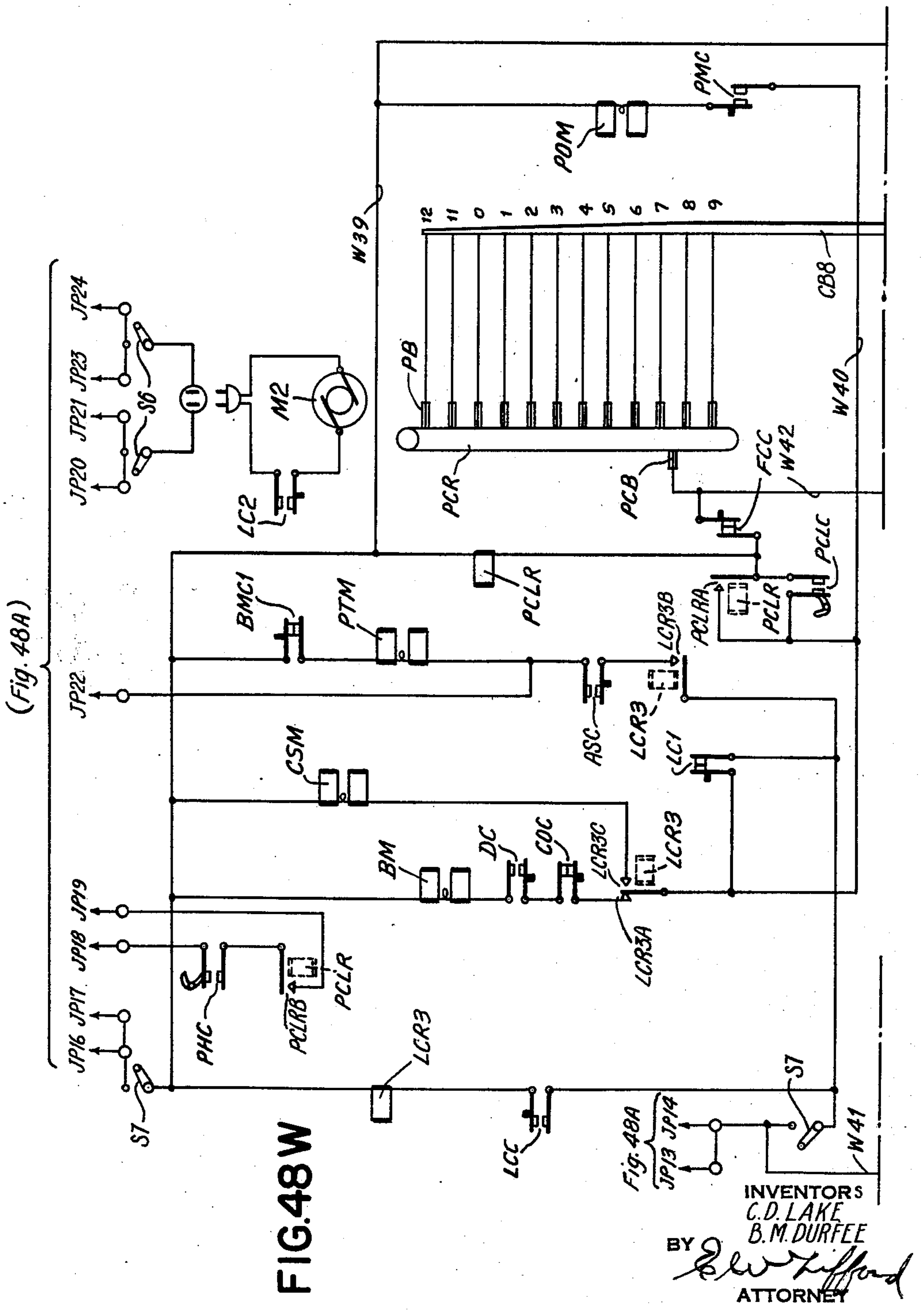
Figure 48X:
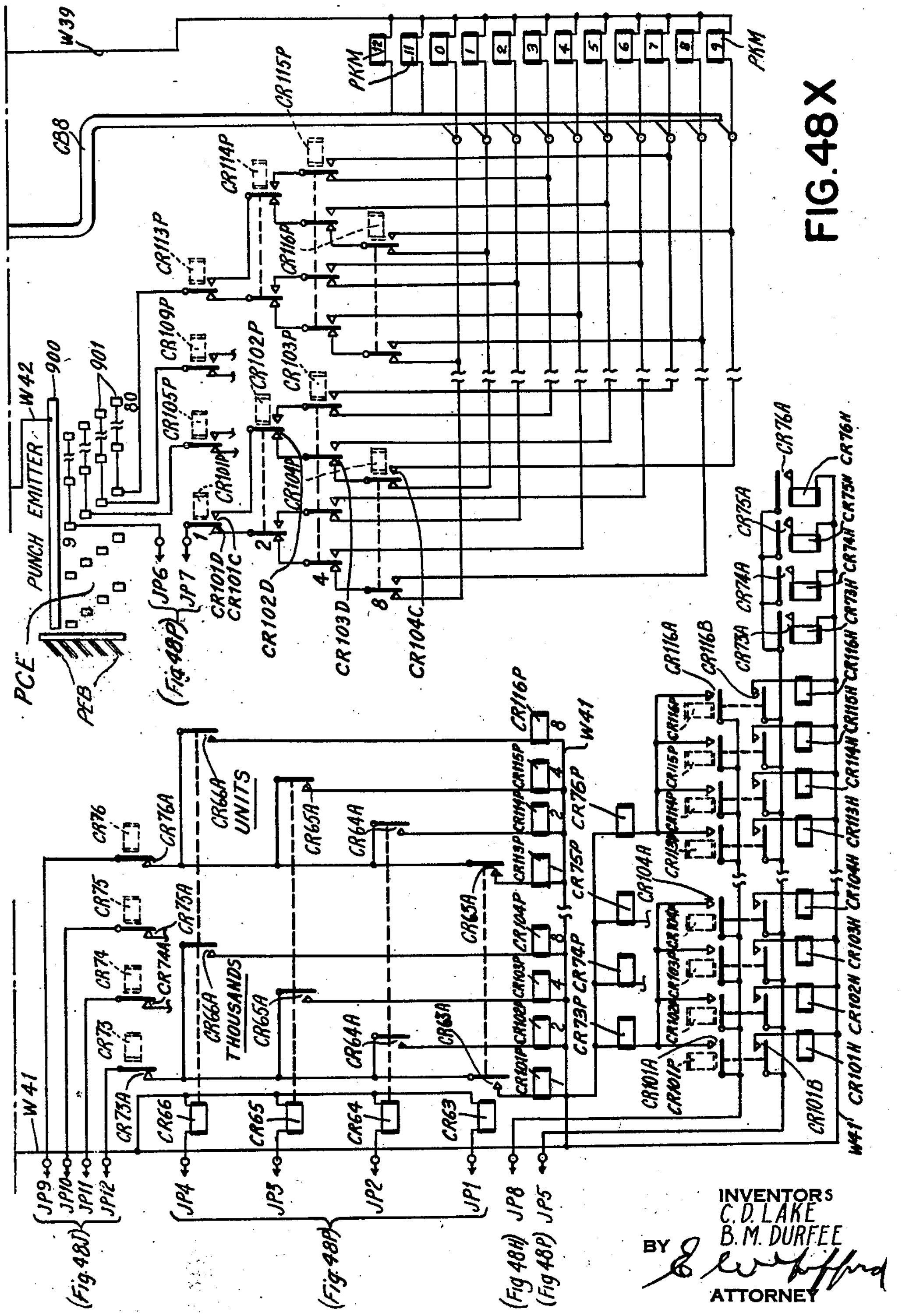

Figs. 48A to 48X comprise a wiring diagram of the machine.

Figs. 49A to 49F are plugboard charts showing the plugging of the machine for various kinds of operation.

The bulk of the mechanism of the machine is mounted on the top face of a large rectangular base casting 100 (Figs. 2A and 2B) which is suitably supported on a framework which includes the legs 101 (Fig. 3) and various cross braces and sub-frames (not shown) which support the non-mechanical components such as the electronic and electric control devices, power supply, the accumulators, the relays, and the item counters.

The machine is enclosed by a suitable cabinet 102 (Fig. 1) provided with a series of panels 102a which may be removed for access to the relay racks, the units counter, the electronic tubes, and the power supply of the machine. Similar panels are provided in the rear of the machine for access to the electric components mounted in the base. At the right-hand end of the machine, the cabinet 102 is provided with two articulated panels 102b which are movable to expose the plugboard for effecting changes in the plugging, or substitution of a different prewired plugboard, if necessary.

Mounted on top of the base casting 100 are the card feeding and analyzing mechanism and the card distributing mechanism which hereinafter may be collectively referred to as the sorting mechanism. This group of mechanisms takes up approximately one-half of the top surface of the base casting and, with certain modifications, is constructed very similarly to the well known "International" card sorting machine. Since this machine is now well known in the art, it will be described only very briefly herein with such modifications as are necessary for the special functioning of the machine as described in detail hereinafter.

Figure 4:
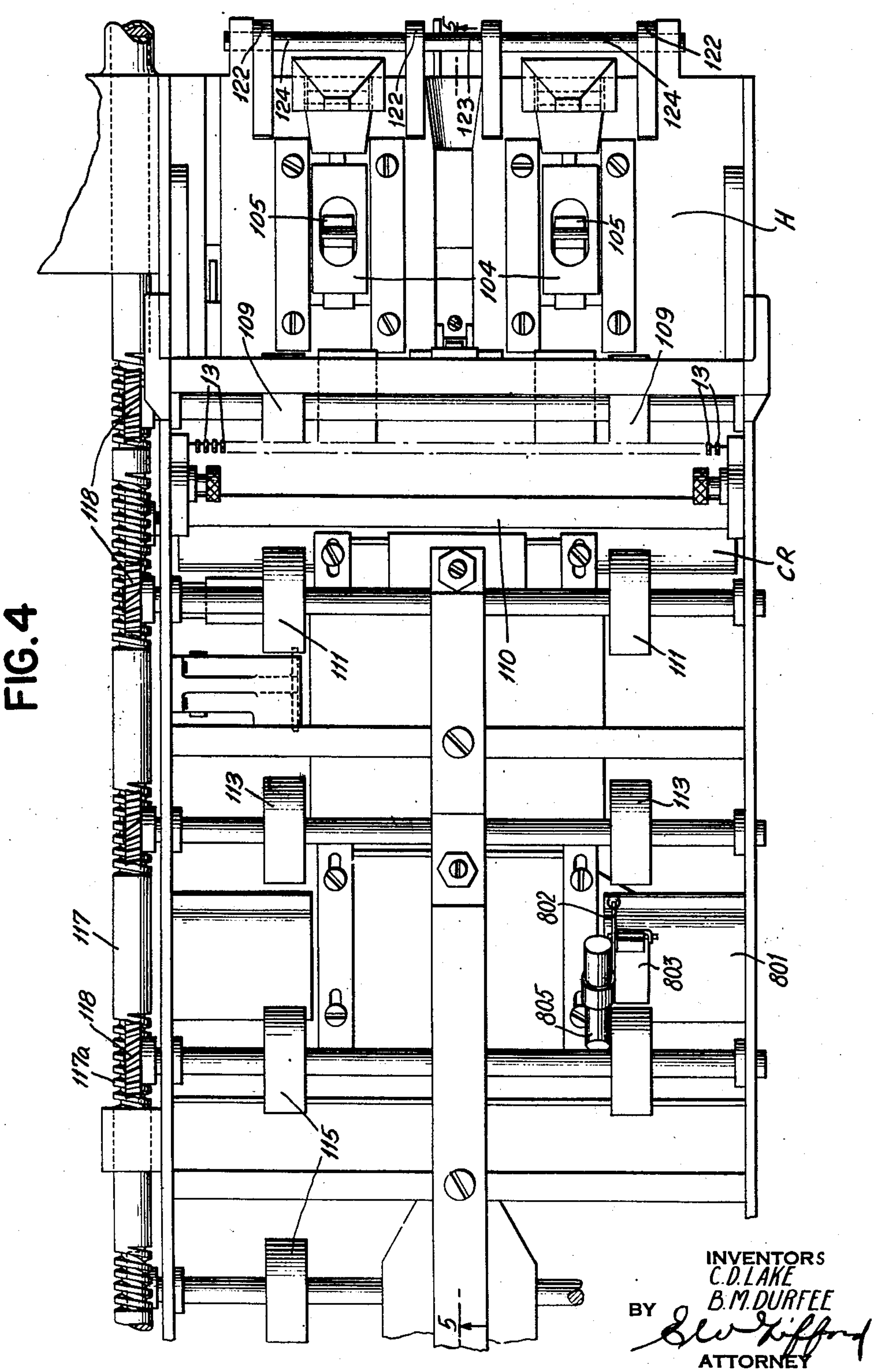
Fig. 4 is a large scale plan view of the card hopper and the card feeding mechanism.

The sorting machine section of the machine comprises a hopper H (Figs. 1, 2A, 4, and 5) which receives the perforated cards C and includes the usual follower weight W which keeps the cards flat in the hopper against any tendency to curl. The hopper H is provided with the usual card pickers 103 (Figs. 2A, 4, and 5) mounted on the picker slides 104 which have pin and slot connections to the arms 105 on the shaft 106. The arms 105 and shaft 106 are oscillated by means of links 107 connecting said arms to suitable cranks (not shown) formed in the crank shaft 108 journalled in the framework.

With each single revolution of the crank shaft 108, a card is ejected to the left (Figs. 4 and 5) from the hopper H and is gripped by the first feed rollers 109 which are suitably journalled in the framework. The feed rollers 109 carry the ejected card to the left past the contact roller CR and the card sensing brushes B of which there is one provided for every column in the record card.

The machine disclosed in the drawings was designed for use with standard 80-column "IBM" cards; consequently, the machine is provided with 80 brushes B which are mounted in a block of insulating material 110 removably mounted in the framework.

To the left of the contact roller CR (Figs. 2A, 4, and 5) the ejected card is tripped by the feed roller 111 and the idle roller 112, and by them is carried to the left to a third set of feed rollers 113. The latter feed rollers advance the card to the left past the ends of the sorting blades 114, of which there are twelve, to the first of a series of pairs of feed rollers 115 at regular intervals from right to left (Figs. 2A and 2B) to carry the cards to the sorting pockets. These pockets are designated RP and 0P to 9P, respectively, there being a pair of feed rollers 115 for each of these pockets.

The sorting pockets are provided with the usual card platforms 116 (Fig. 5) upon which the cards fall when they reach the pocket and which platforms descend under the weight of the cards until the pocket is full. In accordance with the usual practice, the card platforms actuate mechanism which operates the full pocket contacts FPC which are opened whenever any pocket becomes overfull of cards and controls the motor circuits to stop the machine. These contacts are well known in the machines of this type and for that reason will not be described in detail herein.

The picker knife shaft 108 and the shafts for the feed rolls 109, 111, 112, 114, and 115 are driven by a high speed shaft 117 (Figs. 2A, 2B, and 4) through suitable worms 117a formed on the shaft 117 and worm wheels 118 secured to the various feed roller shafts and the cross shaft 108. The shaft 117 is provided with a pulley 119 at its left-hand end (Figs. 2B and 3) connected by a belt 120 to a pulley 119a on the shaft 120 of the driving motor (not shown) whereby the shaft 117 is driven continually while the machine is in operation.

Means are provided for preventing the ejection of cards from the hopper H under certain conditions. This means includes a series of four card lifter levers 122 (Figs. 1, 2A, 4 and 5) which are shaped to extend underneath the cards in the hopper on each side of the picker knives 103. The vertical arms of levers 122 are joined together by a cross rod 123 which passes through all of the levers and is secured thereto. Short shafts 124, each passing through only two of the levers 122 and secured thereto, have one end of each journalled in a suitable fixed bearing so that all of the levers 122 and the cross shaft 123 pivot as a unit about the short shafts 124 which act as trunnions for the rigid frame including the two shafts 123, 124, and the levers 122. The vertical arms of the two central levers 122 are longer than the others and are provided with a fixed cross rod 125 on which is pivoted a latch 126 (Fig. 5) urged in a clockwise direction by a torsion spring 127 partly wound around the shaft 125. Normally the latch 126 is clear of a pin 128a carried by a cam follower lever 128 journalled on a fixed pivot 129 carried by the framework. The shaft 108 carries a cam 130 cooperating with a roller on the cam follower lever 128. The latch 126 is connected by a link 131 to the armature 132 of the card feed magnet CFM1.

When the magnet CFM1 is energized, the latch 126 will be drawn downwardly by the link 121 and hook over pin 128a. The latch 126 will then be drawn to the left by the lever 128 and rock the card lifter assembly including the levers 122 in a clockwise direction and raise the rear edges of the cards C in the hopper H high enough so that the picker 103 will be cleared and therefore unable to eject a card from the magazine. When the card lifter frame has been actuated in this fashion a latch 133 (Fig. 5A) snaps over a rectangular latch lug 125a formed in the rear end of the cross rod 125 and holds the card lifter frame in shifted position. The latch 133 is connected by a link 134 (Fig. 5) with the armature 135 of the card feed magnet CFM2. This armature is normally urged in a counterclockwise direction by a spring 136. Normally, when the machine is feeding cards, the latch 133 is pressed upwardly by the spring 136 into engagement with the lower side of the rectangular lug 125a and the spring 136 causes the latch to snap behind the lug 125a whenever the card lifter frame is operated as described. Energization of the card feed magnet CFM2 pulls down the link 134 and releases the latch 133 from the lug 125a and allows the card lifters to restore to the position of Fig. 5, assisted by the weight of the cards C and the follower weight W.

Figure 8:
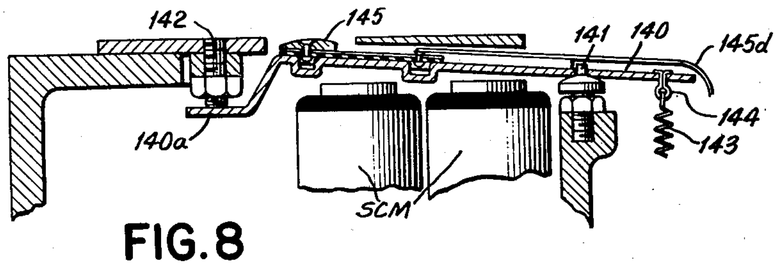
Fig. 8 is a vertical section on the line 8—8 in Fig. 6.

The mechanism for controlling the distribution of the cards to the different sorting pockets is shown in Figs. 5 to 9. This includes the sort controlling magnet SCM, commonly called the sorting magnet, which is fixedly mounted in the framework between the shafts for the feed rollers 113, and the first pair of feed rollers 115 approximately midway between the ends of a card fed thereby. Cooperating with the magnet SCM is an armature plate 140 which is pivotally mounted on two fixed studs 141 which have reduced pivot portions loosely received in holes in the plates 140. The plate is arranged with its vertical axis of symmetry, with reference to Fig. 9, disposed crosswise of the line of feed of the cards and is formed with a stop portion 140a held in engagement with a stop screw 142 carried by the framework by a spring 143 anchored to the plate 140 by means of a cotter pin 144. When the magnet SCM is energized, the plate 140 will be rocked downwardly or counterclockwise (Fig. 8).

Figures 5, 5A, 11:
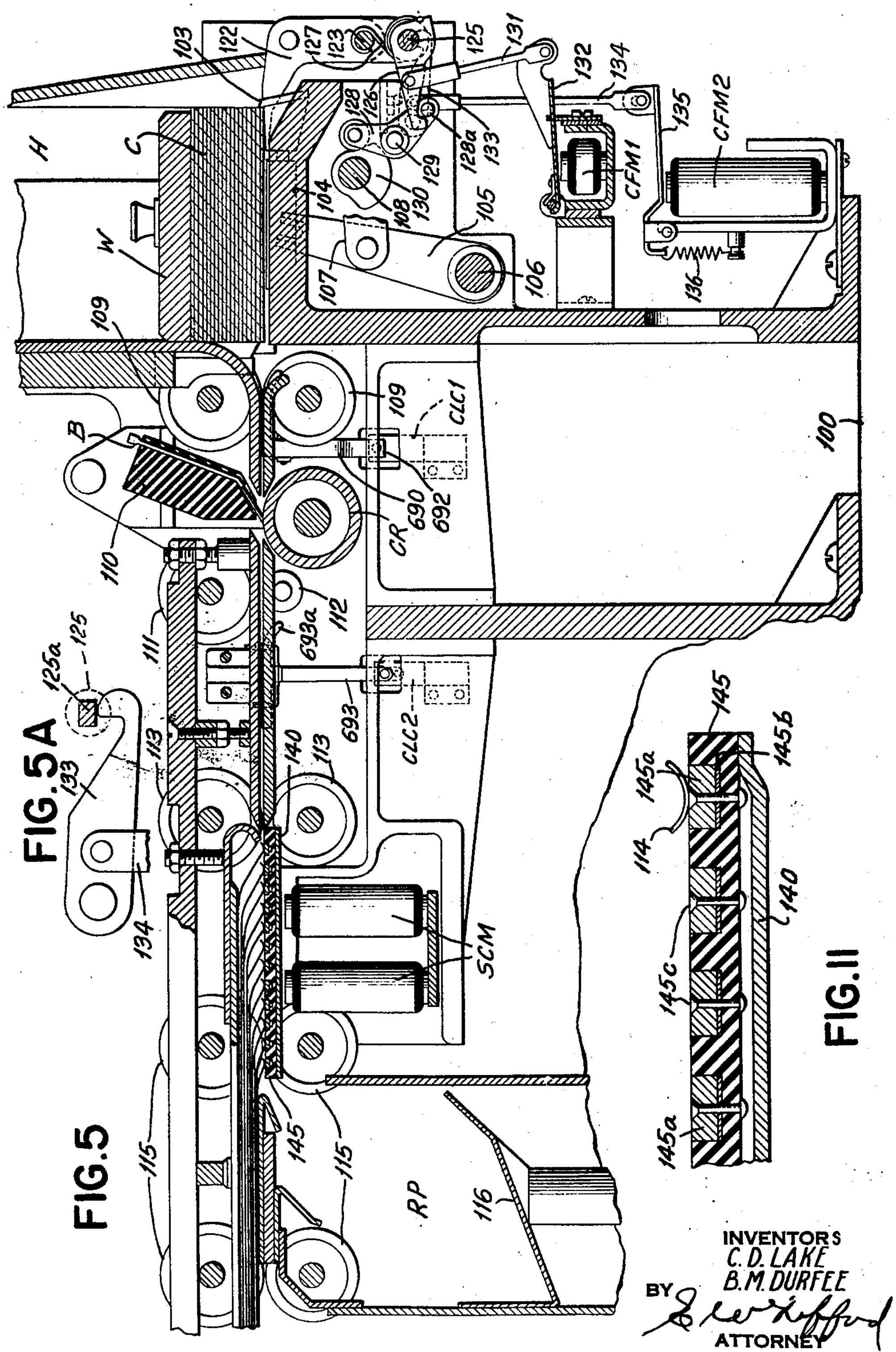
Fig. 5 is a vertical section on the line 5—5 in Fig. 4.
Fig. 5A is a detail view of the card lifter latch.
Fig. 11 is a large scale vertical section of the sort checking contact strip taken on the line 11—11 in Fig. 10.
Figure 7:
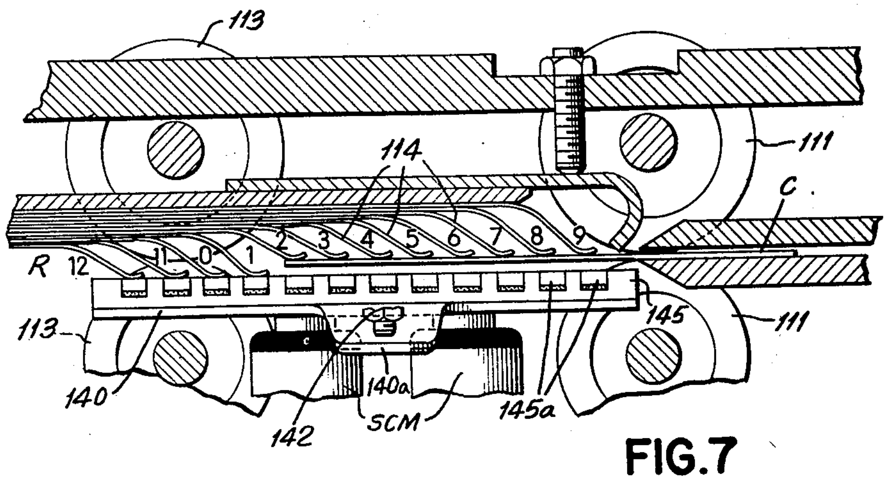
Fig. 7 is a view similar to Fig. 6, but showing the sorting control magnet energized under control of a "1" impulse.
Figure 6:
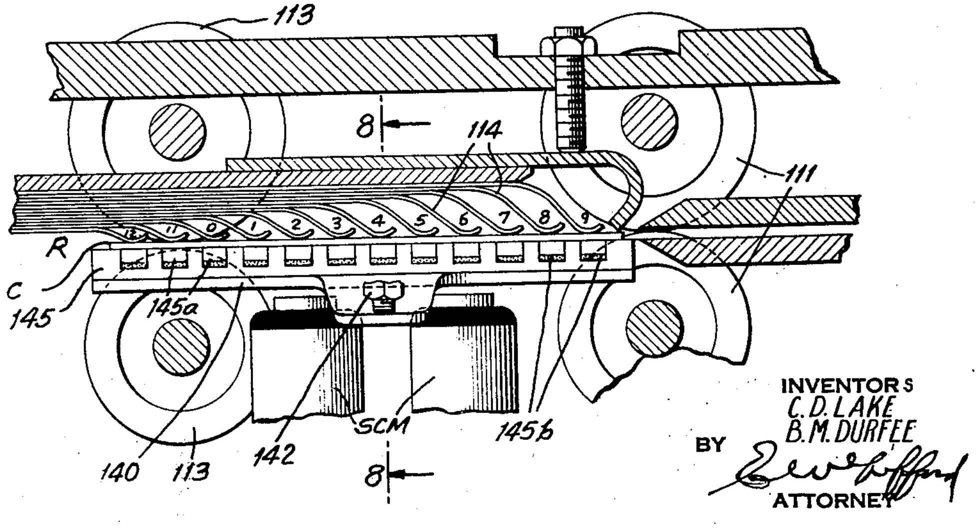
Fig. 6 is a large scale vertical section showing the sort checking contact strip.

The sorting blades 114 are reduced in size adjacent the plate 140 and will be allowed to drop when the plate 140 is actuated by the magnet SCM according to the position of a card passing the ends of the blades at the time of energization of the magnet SCM. Fig. 7 shows the position taken by the blades 114 when a "1" impulse is transmitted to the magnet SCM. This impulse will occur at a time when the card C (Fig. 7) has passed underneath the ends of the first eight blades and will allow that card to pass between the blade leading to the 1 pocket and the blade leading to the 2 pocket whereby the card will fall into the 1 pocket. In Figs. 6 and 7, the small numbers 0 to 12 and the letter R designate the spaces between the blades into which the card must pass to be conveyed to the correspondingly numbered sorting pockets, the letter R referring to the reject pocket. If no impulse is transmitted to the magnet SCM by the time the card has been advanced as far as shown in Fig. 6, the card will be conveyed to the reject pocket RP (Fig. 5). The small numbers 0 to 12 and the letters RP in Figs. 2A and 2B indicate the positions of the sorting pockets.

Provision is made for comparing the sorting controlling impulses with the actual position of the card as it passes the sorting blades in order to make sure that a card which should go in a particular pocket is properly positioned to pass into the space between the blades leading to that pocket. This is known as "sort checking." This checking means includes a contact strip consisting of a sheet of insulating material 145 fixed to plate 140 (Figs. 5 to 9 and 11) and having a series of twelve conductive inserts 145a disposed in a row transversely of the plate 140, parallel with the line of feed of the cards. There is an insert 145a located opposite each of the reduced portions of the sorting blades 114 and the reduced portions normally rest on the conductive inserts when there is no card passing the blades as illustrated at the left in Fig. 7 by those blades which are not supported by the card C. The blades 114 are insulatably mounted in the machine and form a common electrical connection to such of the inserts 145a as are not held up by the card. The inserts 145a are electrically connected by means of strips of conductive material 145b (Figs. 9 and 11) to the terminal rivets 145c to which are suitably fastened, as by soldering or welding, the wires 145d of a cable which connects the individual inserts 145a to the control circuits of which they are part. The manner in which the circuits closed by the blades 114 by contact with the conductive inserts 145a control the machine will be made clear hereinafter in describing the operation of the machine with reference to the circuit diagram.

The printing mechanism is designed for printing in columnar form on large multicolumn report sheets. Sixty units counters are provided and it is desired to print all of the totals in these counters on one line. Since the counters are of four digit capacity, this would require a work sheet wide enough to handle at least 240 digits and the printing of this large number of totals requires a great deal of time unless a type bar is provided for each digit position. This is not economically feasible and the problem is solved by dividing the work sheet into two two-part sections and providing two carriages, one for each two-part section of the work sheet. The printing mechanism is divided into four banks each containing four type bars and all of these banks are operated in a single printing cycle to print four totals in four columns of the work sheet. By dividing the sixty units counters into groups of fifteen, it is possible to print the sixty totals in only fifteen printing cycles, the totals corresponding to a group of fifteen of the counters being printed by a succession of fifteen printing cycles after each of which the carriage carrying the form for the reception of such totals is spaced to the next column.

Figure 1:
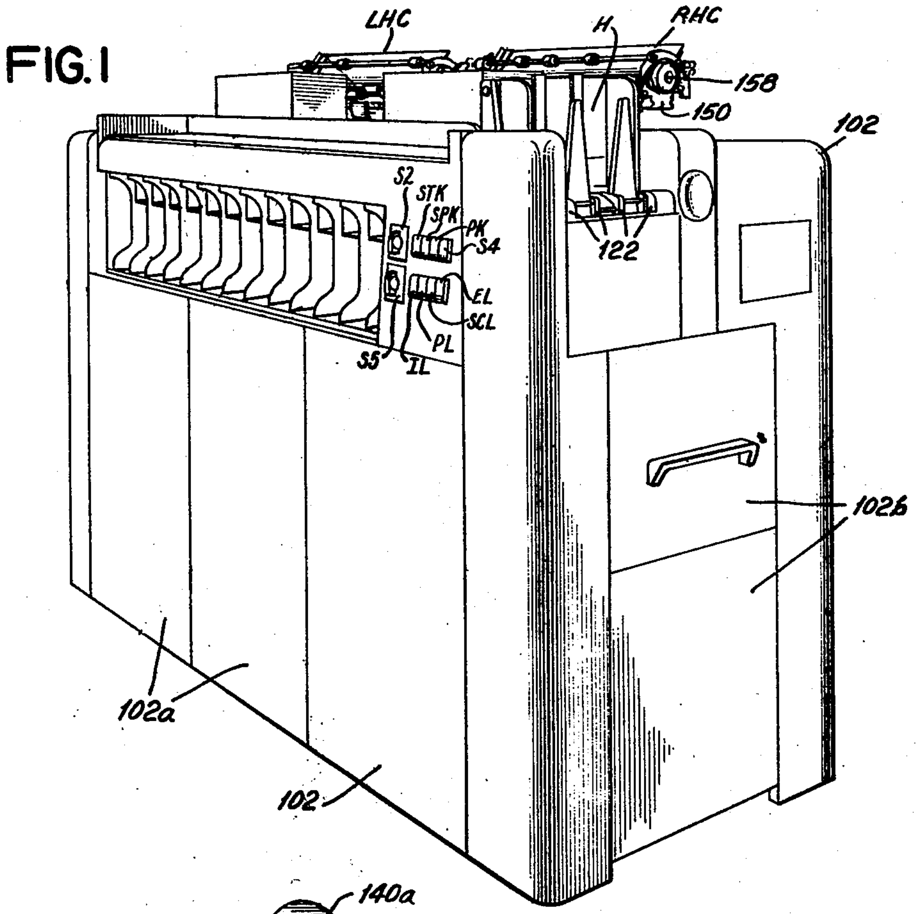
Figure 9:
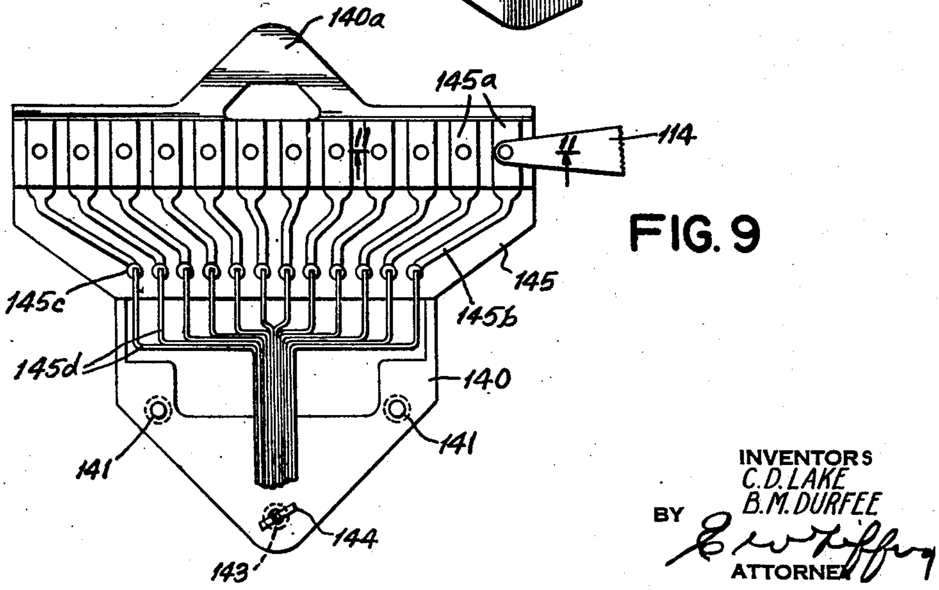
Fig. 9 is a plan view partly in section showing the sort checking contact strip.
Figure 2A:
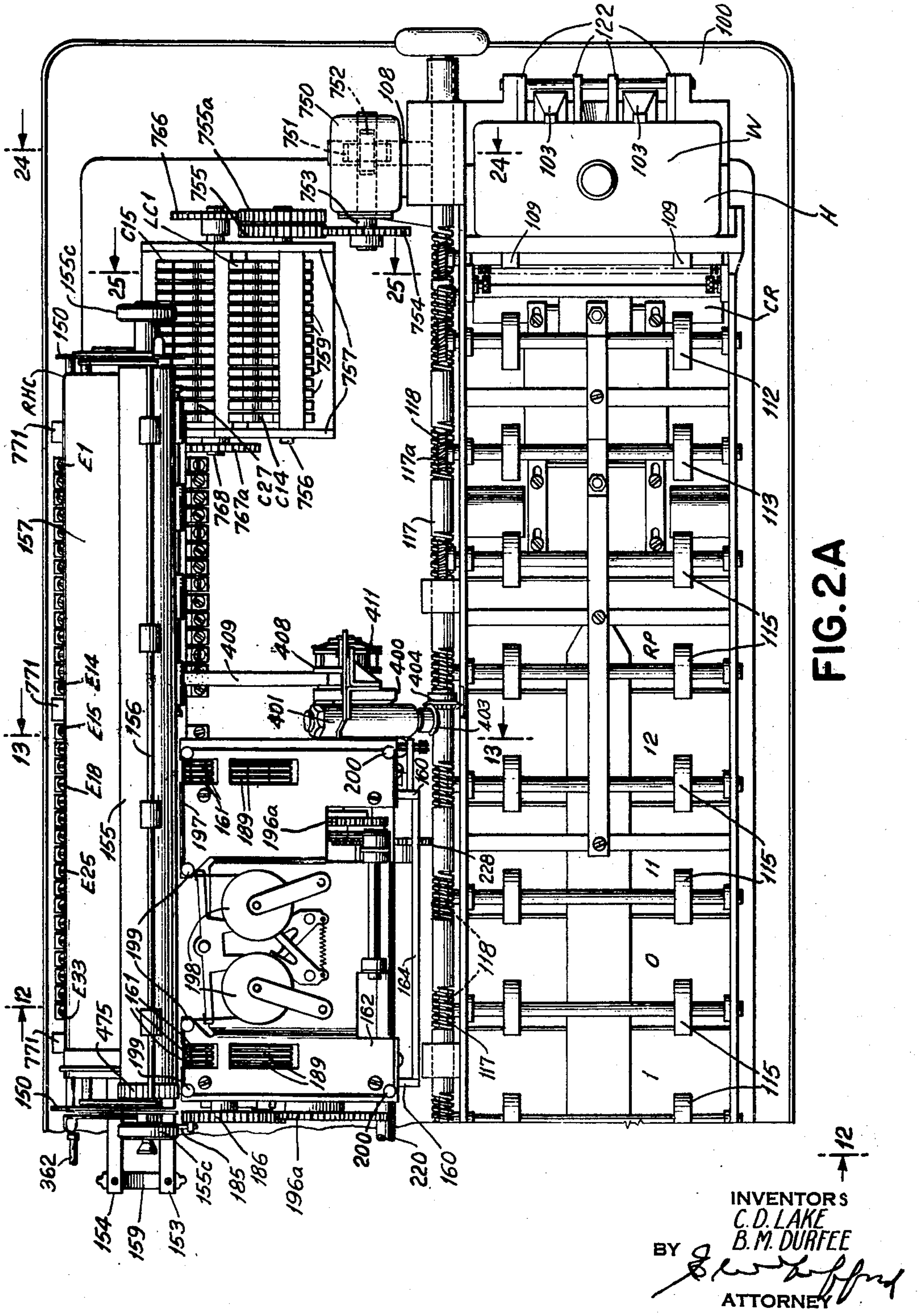
Figure 2B:
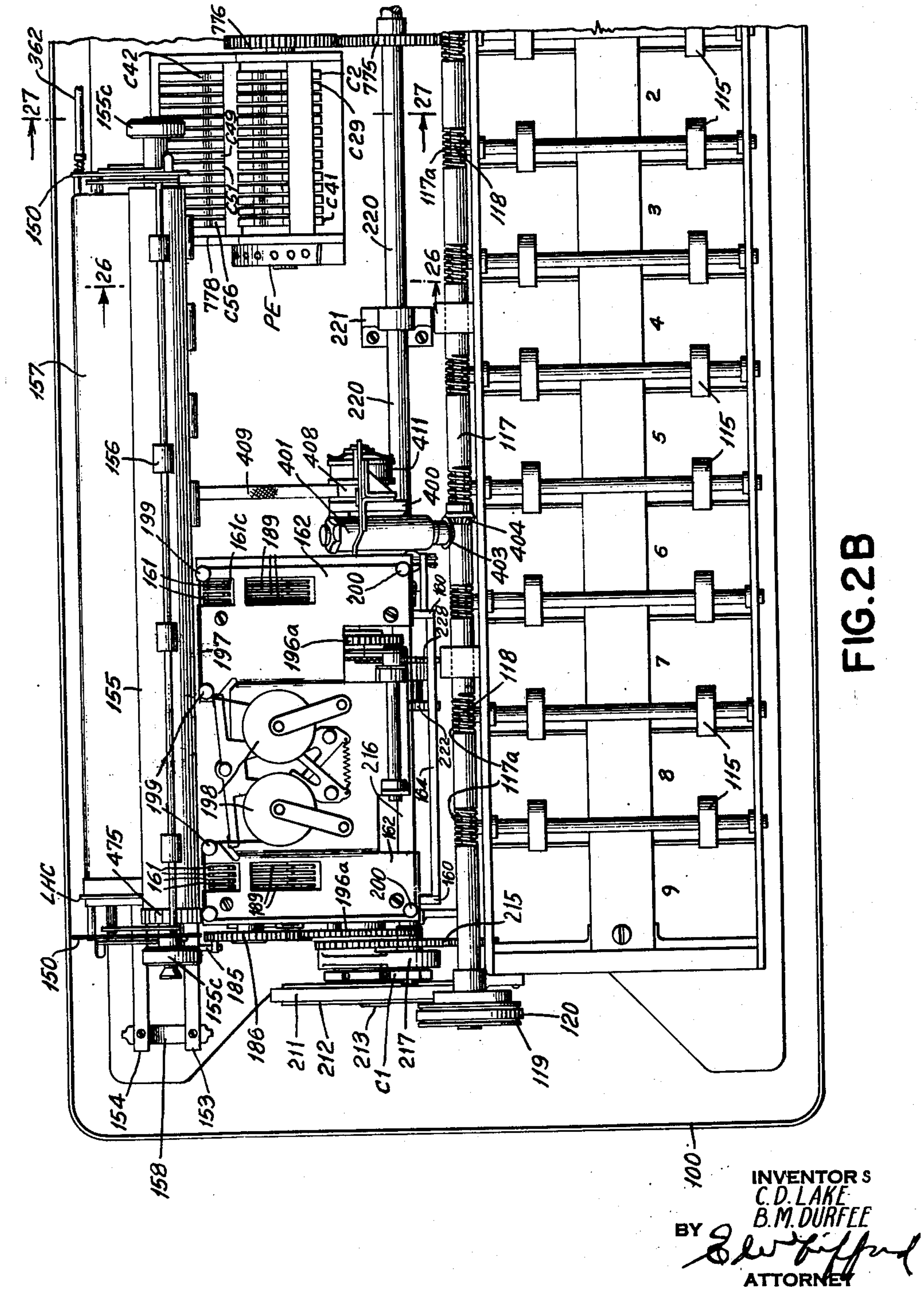
Figures 3, 10:
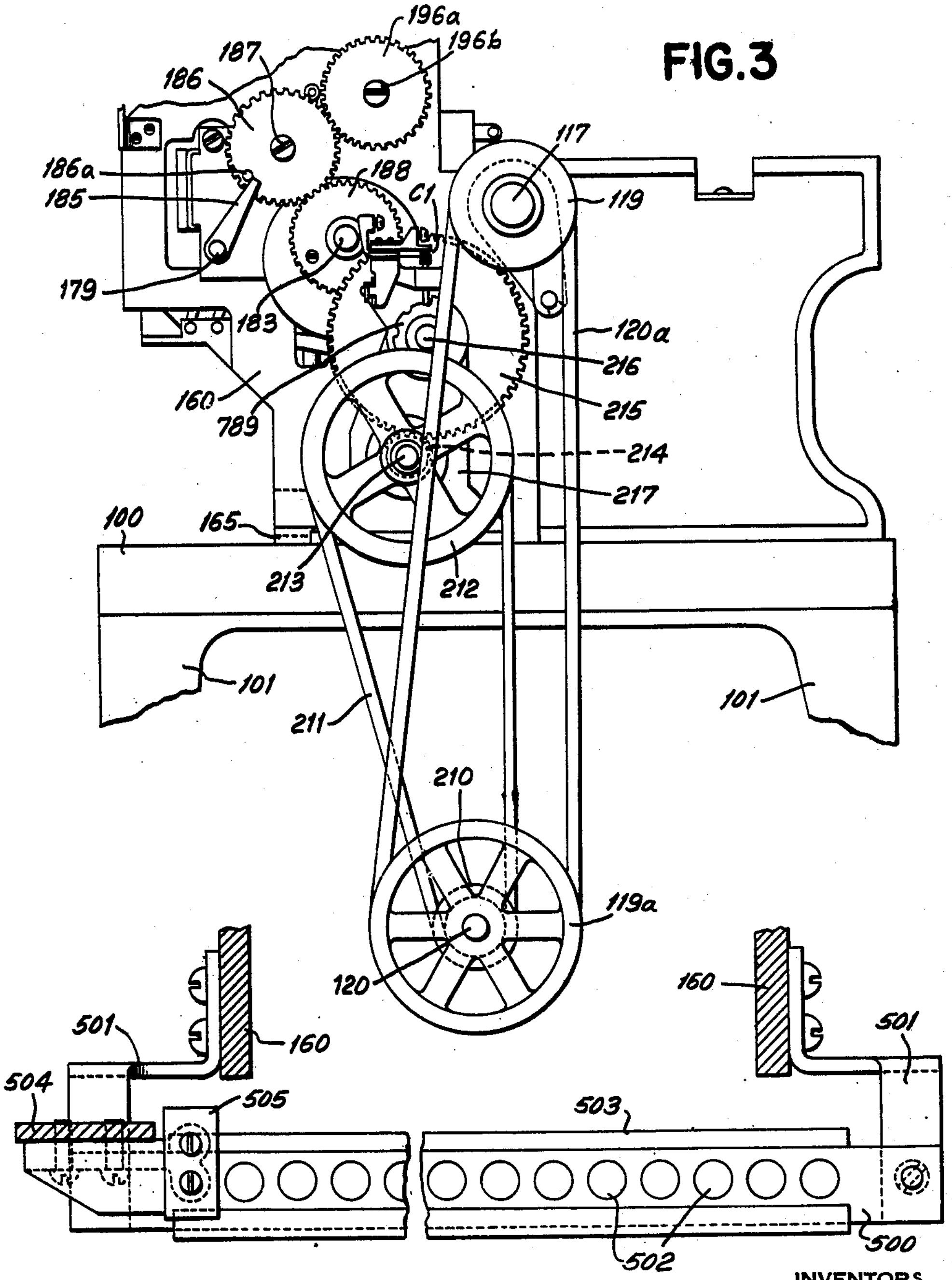
Fig. 3 is a view showing the main driving connections which are located at the left-hand end of the machine in Fig. 1.
Fig. 10 is a plan view of the commutator strip for one of the carriages.

Figs. 1, 2A, and 2B show the two carriages for the two two-part sections of the work sheet in which the left-hand carriage is designated LHC and the right-hand carriage RHC. These carriages are standard 20" typewriter carriages, each comprising the end plates 150 (see Figs. 12, 13, 19, and 20 also) which are joined by a channel shaped member 151 formed as a track for the bearings 152 slidably mounting the carriage on the front rail 153 and the rear rail 154. The carriage includes the usual rotatably mounted platen 155, the paper bail 156, and the paper table 157. Suitable pressure rollers 155a and paper deflector 155b (Fig. 13) of usual form cooperate with the platen 155 to press the two-part work sheet section against the platen and enable the latter to feed the work sheet section. The platen 155 in each case is provided with the usual platen rotating knobs 155c.

Figure 12:
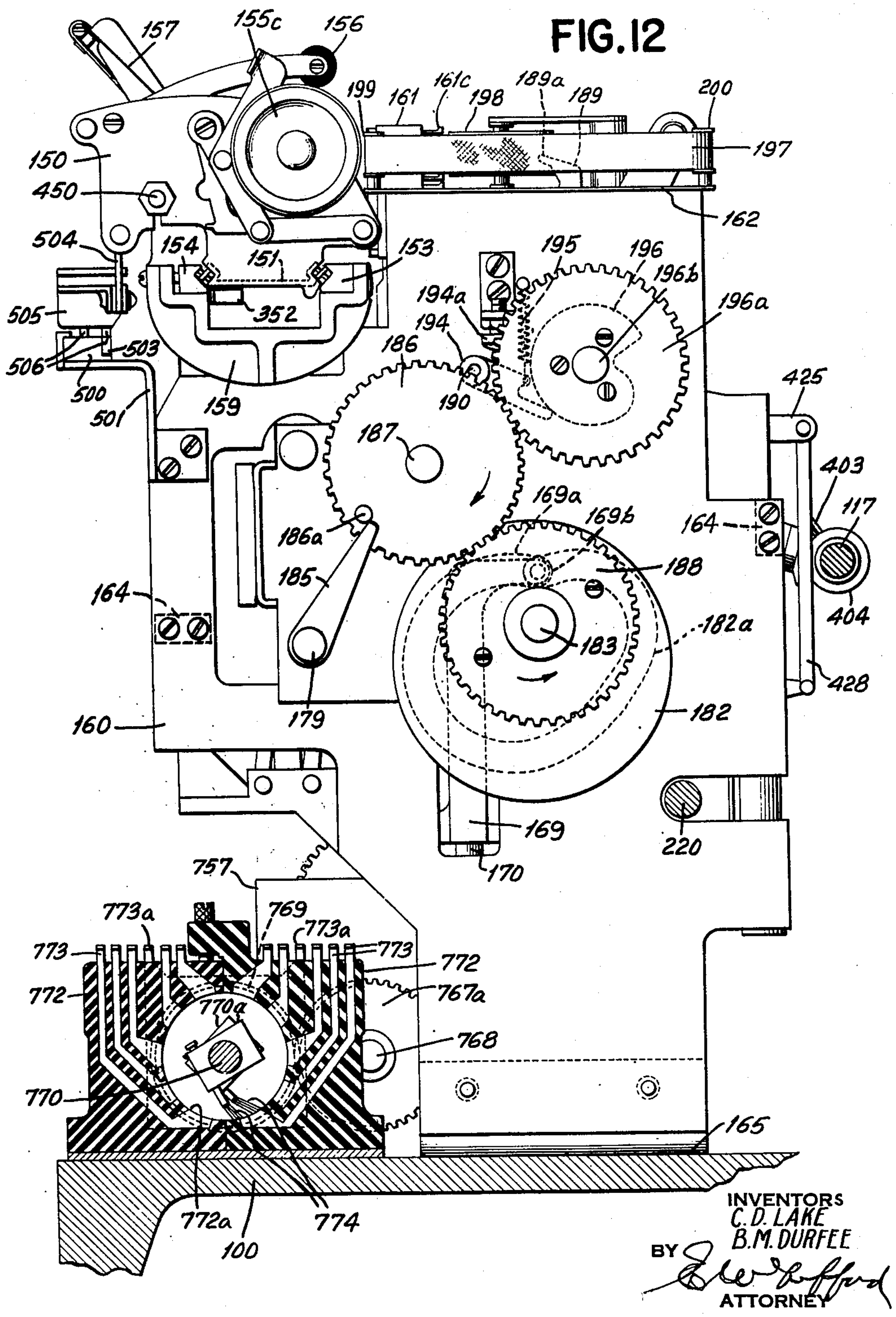
Fig. 12 is a vertical section on the line 12—12 in Fig. 2A.
Figures 19, 20:
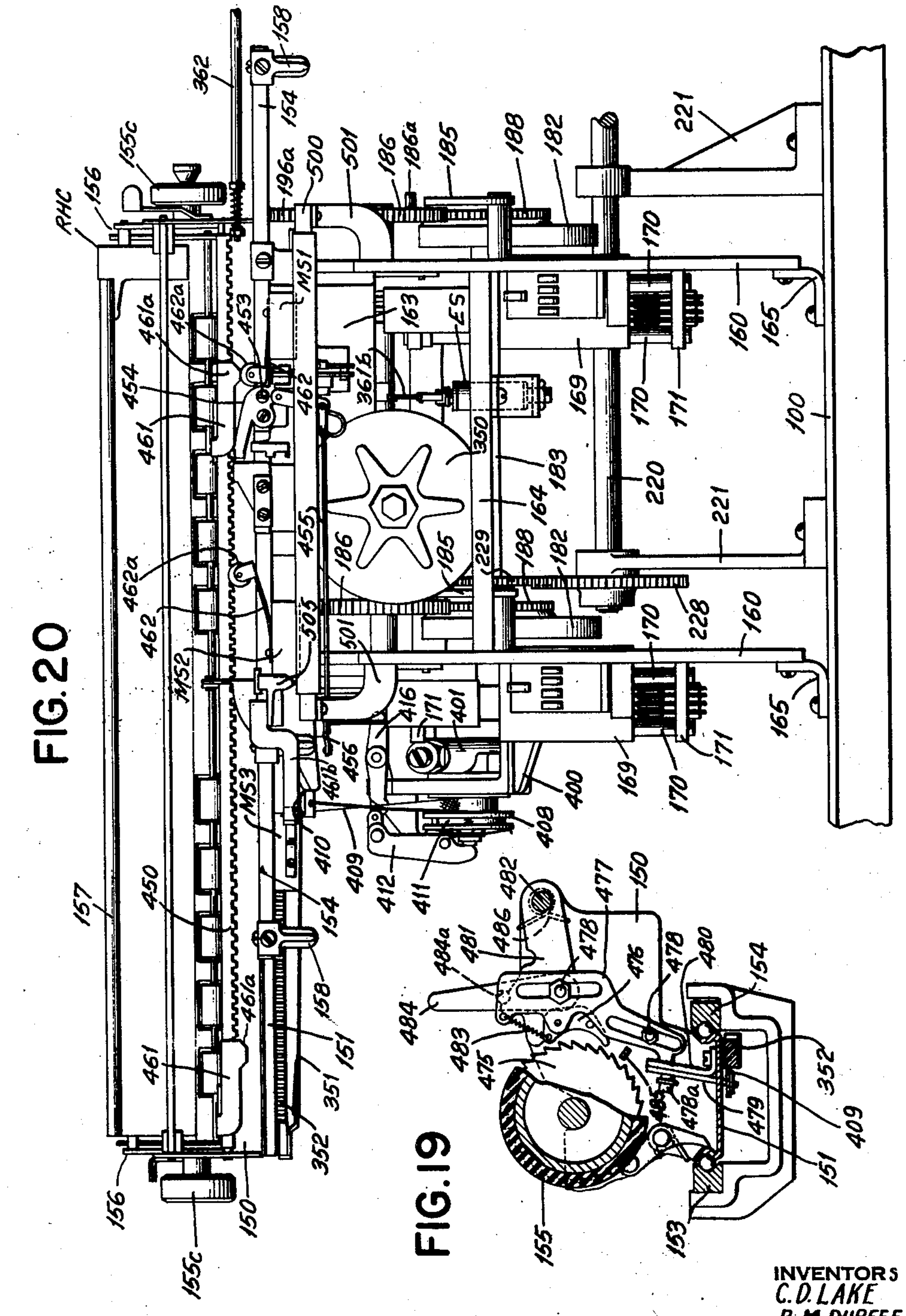
Fig. 19 is a view showing the line spacing mechanism for one of the carriages.
Fig. 20 is a rear elevation of the printing mechanism shown in Fig. 2A.

On account of the great length of the platen, the rails 153, 154 must be of considerable length and extend out from the supporting framework for the rails a considerable distance. In order to maintain rigid separation and accurate parallelism of the rails 153, 154, they are interconnected at their outer ends by yokes 158 (Figs. 12 and 19). The rails 153, 154 are secured to yokes 159 (Fig. 13), of which there are two for each carriage, and these yokes 159 are mounted on the support plates 160 for the printing banks. There are two printing banks for each of the carriages and consequently two plates 160, or four in all, each of which supports the mechanism for a printing bank comprising four type bars 161 for printing four-digit amounts.

Figure 42:
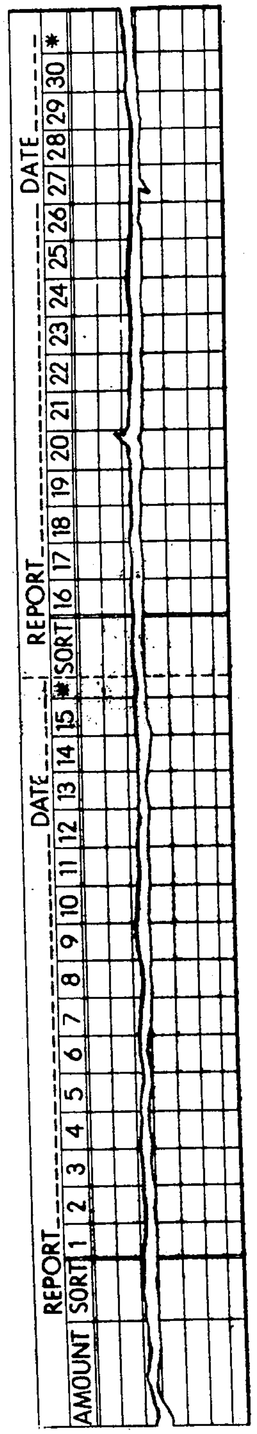
Fig. 42 shows a specimen of the form sheet.

Fig. 42 shows the layout of one two-part section of the form sheet and has a capacity as shown by the numbers 1 to 30 at the top for recording thirty unit counter totals. This two-part sheet may be inserted in the left-hand carriage LHC disclosed in Fig. 2B while an identical sheet may be inserted in the right-hand carriage and will be similar except that the columns will be numbered 31 to 60. Additional columns headed "Amount" and "Sort" and two columns headed with an asterisk are provided for a purpose which will be made clear hereinafter.

The plates 160 are spaced apart a distance such that the totals in counters 1, 16, 31, and 46, for example, will be printed simultaneously in a single print cycle in the correspondingly numbered columns of the two sections of the work sheet.

The four print banks are substantially identical in construction, therefore a description of one will suffice for all. The mechanism associated with each print bank is carried by the plates 160 corresponding to such banks. Figs. 12 to 15 and 20 serve to illustrate the mechanism associated with a single printing bank.

The two plates 160 associated with each carriage are joined together by a top plate 162, the two carriage rails 153, 154, a cross frame 163, and cross bars 164, and are secured to the base 100 by means of suitable brackets 165. The type bars 161 are of conventional form and each group is slidably mounted at their upper ends in spaced slots in a guide bracket 166 (Fig. 13) secured to the right-hand face of the associated plate 160. The type bars are provided with the usual zero pawls 167 pivoted on a block 168 carried by bracket 166. These pawls 167, in a well known way, cause automatic printing of zeros to the right of each significant figure.

At their lower ends each group of type bars 161 is slidably mounted in a frame 169 (Figs. 13, 14, and 15) which is vertically slidably mounted on two guide rods 170. The guide rods 170 are supported on the plates 160 by means of the blocks 171. Pivotally mounted on an extension of the frame 169 are the arms 172 of which there is one for each type bar 161. These arms have rounded ends and shroud plates engaging the lower ends of the type bars and are spring urged in a counterclockwise direction (Fig. 13) by the springs 172a anchored to a bracket 173 carried by the frame 169. If the frame 169 is raised, the type bars 161 will be carried along with the frame by virtue of the fact that the arms 172 hold stop lugs 161a formed in the type bars up against a part of the frame 169. If any of the type bars are stopped in positions indicating numerical values, the springs 172a for the stopped type bars are stretched, but the frame continues its upward travel.

The selective stopping of the type bars to represent different digits is effected by the print magnets PM, the armatures 174 (Figs. 13 and 14) of which have a latching relation with the stop pawls 175, each magnet PM having associated with it an armature 174 and a stop pawl 175. These stop pawls are pivoted on a stud 176 and urged in a clockwise direction by springs 175a. The pawls are normally latched in the position shown in Figs. 13 and 14 by the armatures of the associated magnets PM. Provision is made for initiating impulses at timed points in a cycle of operation of the machine to represent the various digits. If, for example, a "1" impulse is initiated, the magnet PM for the type bar which is to be operative will be energized at the "1" point in the cycle and release the associated pawl 175. The upward movement of the frame 169 is effected in a definite time relation to the emission of the digital pulses so that the type bar will be positioned at the time the "1" impulse occurs with its "1" type about to move to the printing line. Each type bar is provided with rack teeth 161b corresponding in number to the digital positions 0 to 9 and the release of the pawl 175 at "1" in the cycle will cause it to engage the proper tooth in the type bar to arrest it with the "1" type presented at the printing line.

After the printing has been effected, the tripped pawls 175 are restored to latching relation with their armatures 174, by means of a bail 177 (Figs. 13 and 14) which is pivoted on the stud 176 carrying the pawls 175. This bail is rocked in a counterclockwise direction by an arm 178 pivoted at 179 and engages one of the arms of the bail 177. The arm 177 is held in the position shown in Figs. 13 and 14, in engagement with a stop pin 180, by means of a spring 181. When the arm 178 is rocked clockwise, the bail 177 is rocked counterclockwise and engages those pawls 175 which have been tripped and restores them to latching relation with their armatures 174.

Figure 15:
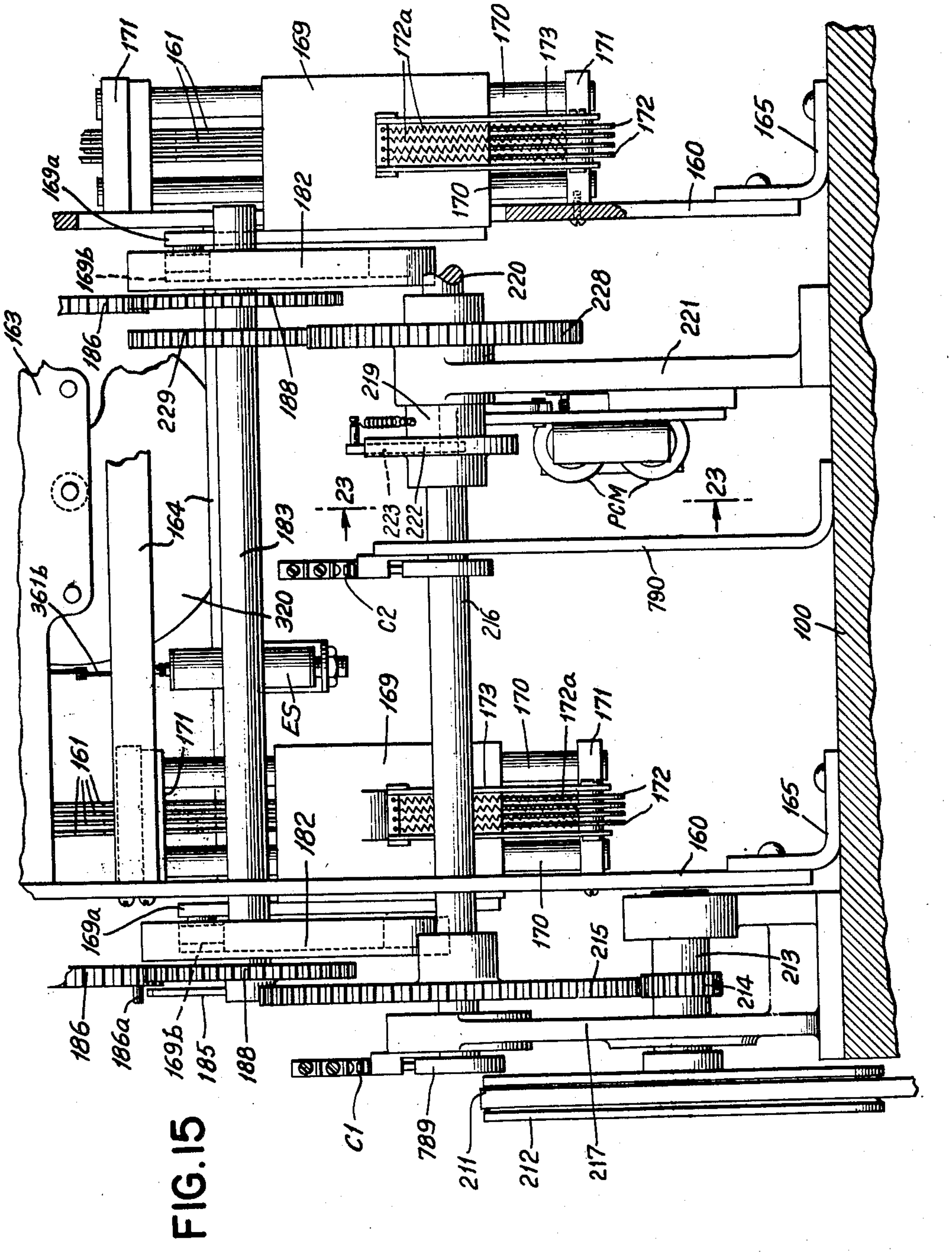
Fig. 15 is a front view of the lower part of the printing mechanism shown in Fig. 2B.

The frames 169 for a pair of printing banks are operated by means of cams 182 (Figs. 12 and 15). The cams 182 for two printing banks are fixed to a single shaft 183 which is journalled in a pair of the plates 160 associated with one of the carriages. Each frame 169 has an extension 169a (Figs. 12 and 15) carrying roller 169b cooperating with a cam slot 182a in the cam 182. The cam is so shaped that the frame 169 is raised at a uniform rate during the period in which the digital impulses are emitted to the print magnets PM then dwells for a period to permit operation of the printing hammers and finally provides for withdrawal downwardly of frame 169.

The pivot 179 for arm 178 comprises a short shaft which is journalled in the plate 160 and has secured to it an arm 185 (Figs. 2A, 2B, 3, 12, 15, and 20) cooperating with a pin 186a carried by a gear 186 journalled on a stud 187 carried by the plate 160. The gear 186 meshes with a gear 188 fixed to the shaft 183. It is apparent that, near the end of each operating cycle, the pins 186a will strike the ends of the arms 185 and rock them counterclockwise (Fig. 12) thereby rocking the arms 178 clockwise (Figs. 13 and 14) to actuate the pawl restoring bails 177 and restore the tripped pawls to latching relation with their armatures 174.

Figure 13:
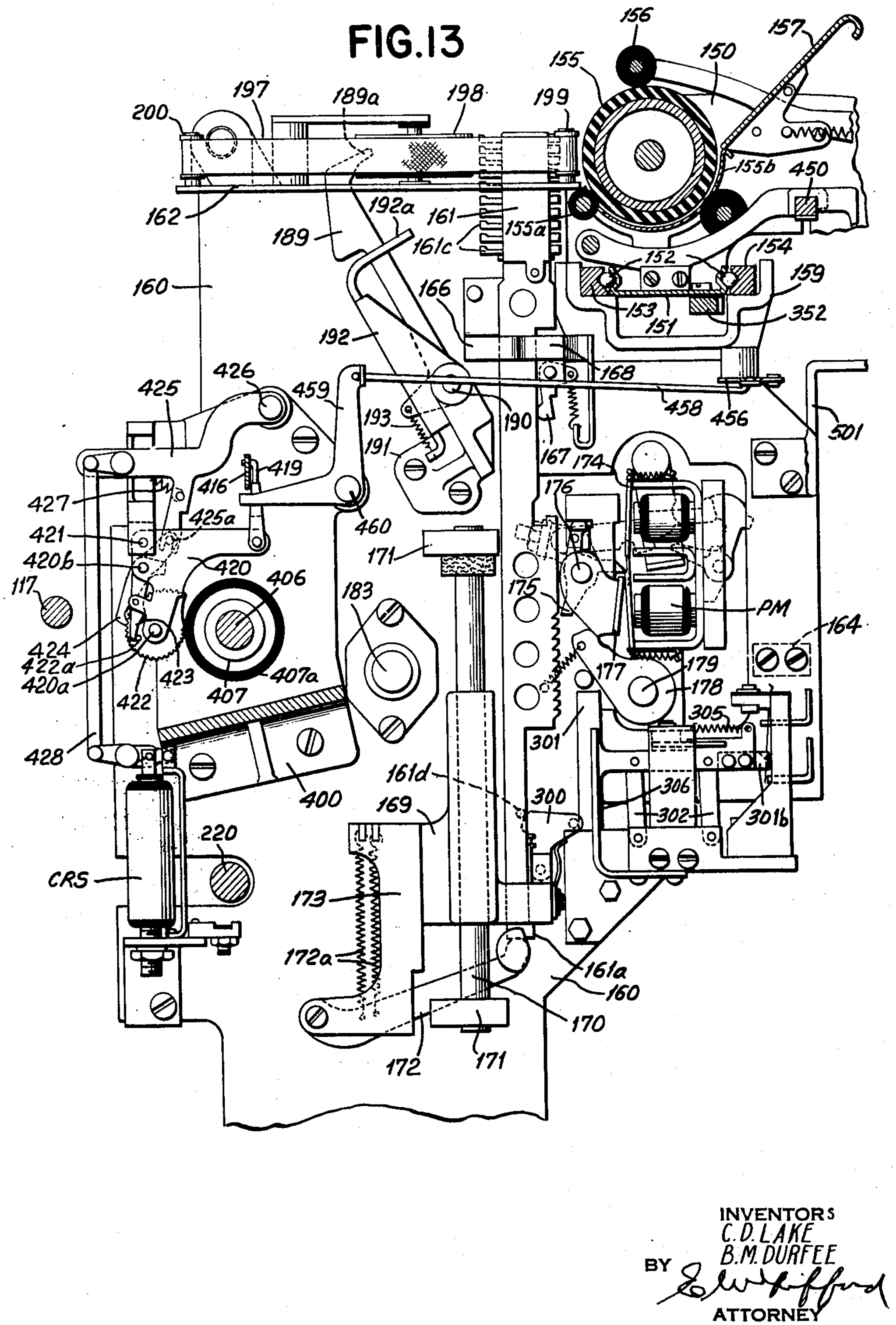
Fig. 13 is a vertical section on the line 13—13 in Fig. 2A.

For the purpose of printing from the types on the type bars 161 each printing block is provided with four printing hammers 189 (Figs. 2A, 2B, and 13) which are pivoted on a shaft 190 which is journalled in the plate 160 and in a bracket 191 (Fig. 13) also mounted on the plate 160. Secured to the shaft 190 is a hammer operating frame 192 formed with a guide comb 192a to space the printing hammers 189 apart and the ends of the slots act as stops for the printing hammers to limit counterclockwise rotation thereof under the influence of springs 193 anchored to arms forming part of the hammer and to the frame 192. Secured to the shaft 190, on the opposite side of plate 160 (Fig. 12), is a cam follower arm 194 which is urged in a counterclockwise direction by a spring 195 against the periphery of the hammer operating cam 196. This cam has a drop which, at the time in the cycle when the type bar operating cams 182 are dwelling, releases the arm 194 suddenly and allows the spring 195 to rock the shaft 190 and the frame 192 in a clockwise direction (Fig. 13). Each arm 194 is suddenly arrested by engagement with an adjustable stop 194a (Fig. 12) carried by plate 160 before the type bar operating projections 189a of the hammers 189 strike the heads of the type elements 161c, but the inertia of the printing hammers causes them to continue and drive the selected types against the paper through the inking ribbon 197. The cams 196 are secured to gears 196a journalled at 196b on the plates 160 and meshing with gears 186.

Separate ribbon feeding and reversing mechanisms are provided for each carriage which is common to the pair of printing banks associated with that carriage. The mechanism for the right-hand carriage RHC includes the ribbon spools 198 (Fig. 2A) which are suitably rotatably mounted on the top plate 162. The ribbon 197 passes from the right-hand spool (Fig. 2A) upwardly around a suitable rear guide roller 199 to the right, along the printing line for the right-hand bank, around a similar rear guide roller 199, thence forwardly to a guide roller 200 at the front right-hand corner of the plate 162, then to the left around a second front guide roller 199, across the printing line for the left-hand bank, and then to the left-hand spool 198.

The ribbon feeding and guiding mechanism for the left-hand carriage is similarly constructed. Any suitable ribbon feeding and reversing mechanism may be used and, since its specific construction forms no part of the present invention, the ribbon feeding mechanism will not be described in further detail.

Figures 22, 23, 26, 27:
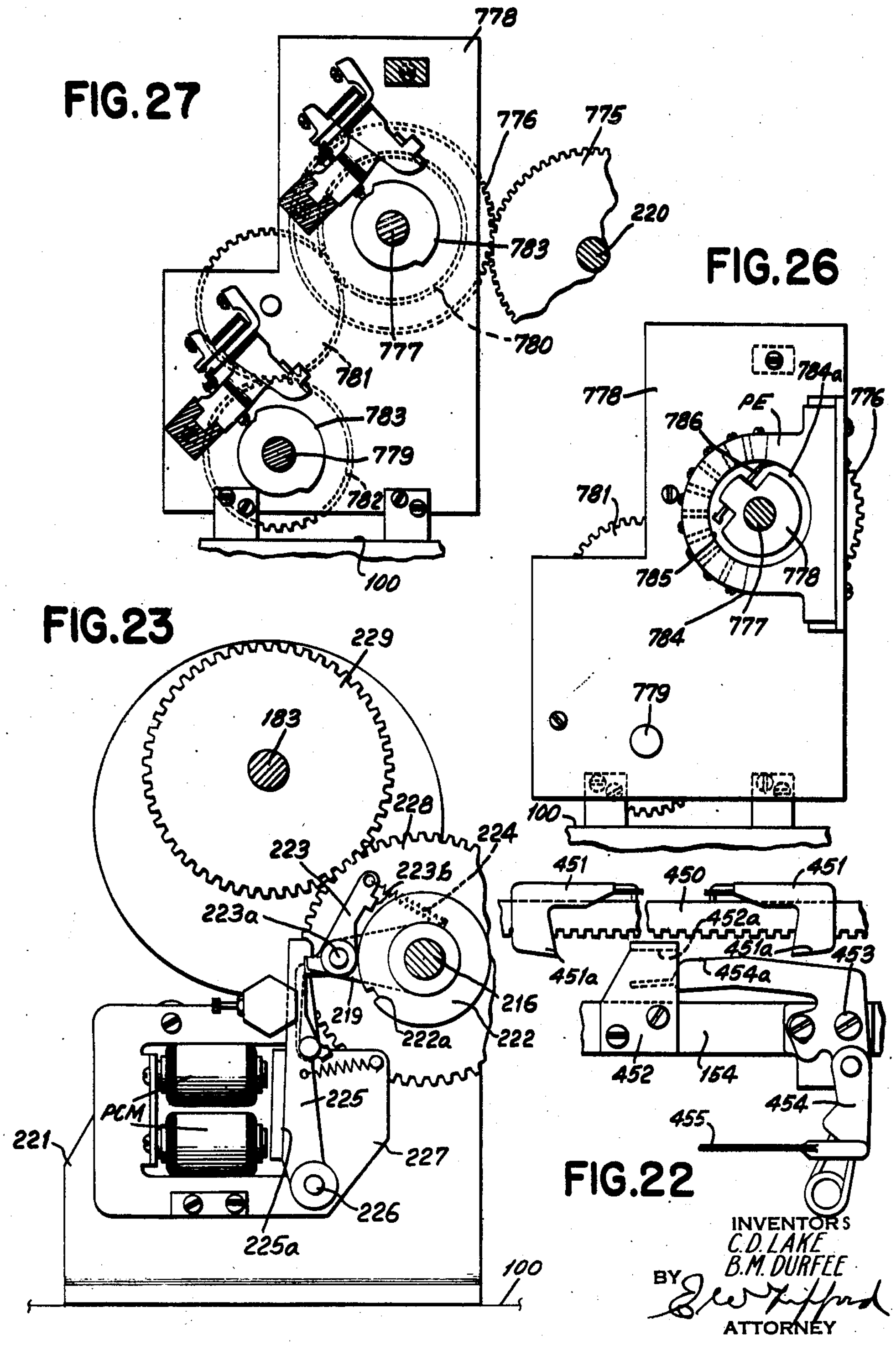
Fig. 22 is a view similar to Fig. 21 of the carriage return tripping mechanism and marginal stops for the carriage shown in Fig. 2B.
Fig. 23 is a vertical section on the line 23—23 of Fig. 15 and shows the print clutch.
Fig. 26 is a vertical section on the line 26—26 in Fig. 2B and shows the print emitter.
Fig. 27 is a vertical section on the line 27—27 in Fig. 2B and shows the low speed circuit breakers and their driving connections.

The printing mechanism is driven at a slower speed than the card feeding and distributing mechanism through driving connections which include a pulley 210 (Fig. 3) secured to the motor shaft 120, the belt 211 (see Figs. 2B and 15, also) and the pulley 212 secured to the shaft 213. The shaft 213 has secured to it a pinion 214 latching with a large gear 215 fixed to the shaft 216. The left-hand end of shaft 216 is journalled in a frame 217 at its left-hand end (Figs. 2A, 3, and 15) and at its right-hand end (Fig. 15) is journalled in the hub of a clutch arm 219 (Figs. 15 and 23) secured to a shaft 220 journalled in three bearing frames 221 (see Figs. 2B and 20, also). Secured to the left-hand end of shaft 216 (Fig. 15) is a clutch collar 222 having the notch 222a (Fig. 23). The clutch arm 219 has pivoted at 223a a clutch dog 223 provided with a tooth 223b shaped to enter the notch 222a. The dog 223 is urged in a clockwise direction so as to tend to engage the collar 222 by a spring 224 anchored to the dog and to a pin carried by the hub of the clutch arm. Normally the clutch dog 223 is held clear of the collar 222 by a latch arm 225 pivoted at 226 to a magnet support plate 227 secured to the frame 221. The latch 225 is formed with an armature 225a which cooperates with the coils of the print clutch magnet PCM carried by the plate 227.

When the magnet PCM is energized, the clutch dog 223 is released and ultimately the tooth 223b will engage in the notch 222a and couple the shafts 216 and 220. The mechanism shown in Fig. 23 is a conventional form of one-revolution clutch which is automatically relatched at the end of each single revolution and requires either a second impulse to the magnet PCM or that the magnet be maintained deenergized if more than one revolution of the shaft 220 is to be effected.

The shaft 220 has secured to it two gears 228 (Figs. 2A, 2B, 15, 20, and 23) which mesh with gears 229 fixed to the shafts 183 whereby the shafts 183 are driven by the shaft 220 whenever the shafts 216 and 220 are clutched together.

Associated with the printing banks are groups of checking contacts which are designed to close circuits representative of the actual stopping positions of the type bars. As will be made clear hereinafter, these circuits are utilized to check the accuracy of the printing of totals.

Figure 14:
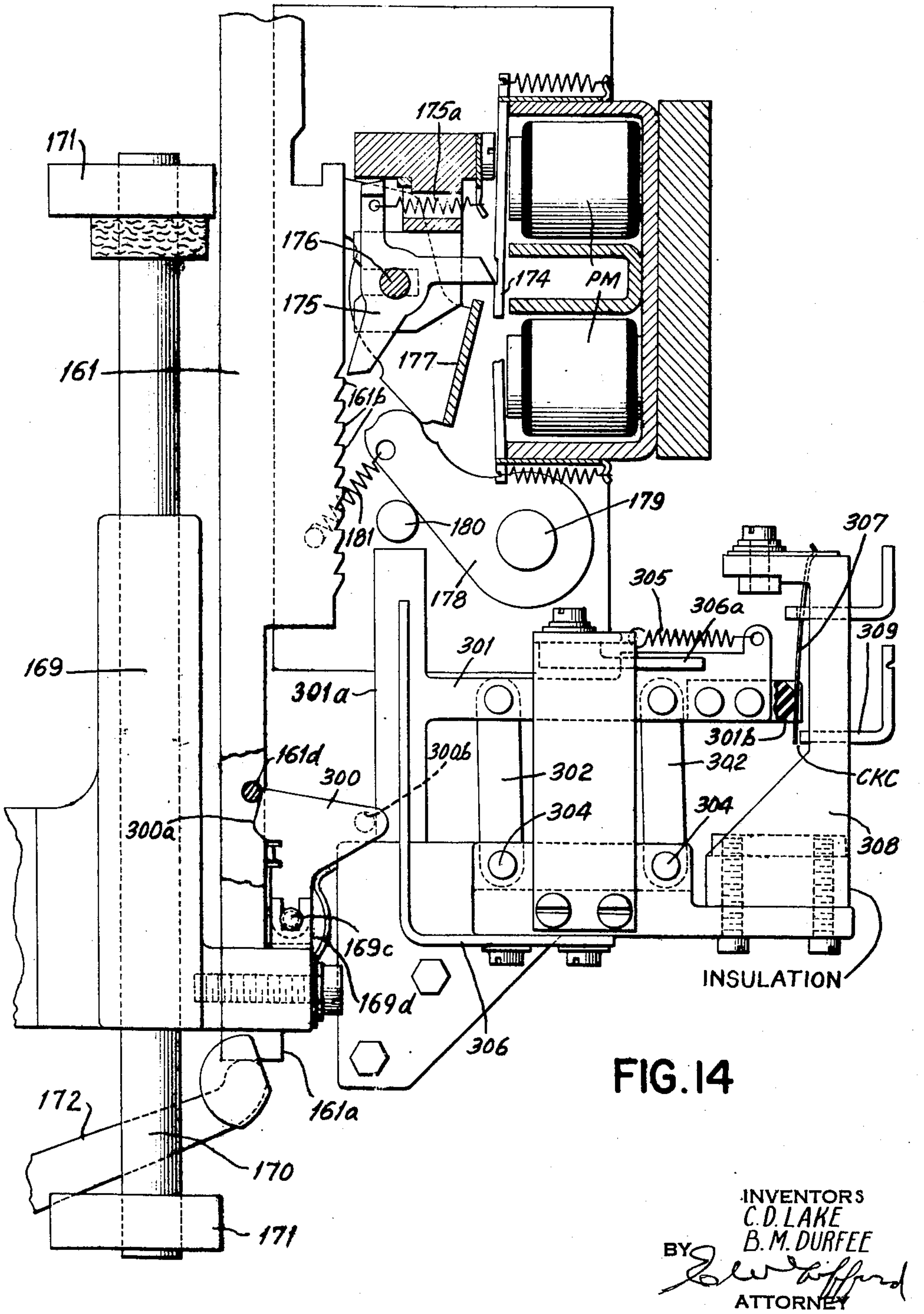
Fig. 14 is a large scale view of the type bar controlling mechanism and checking contact mechanism on a larger scale than in Fig. 13.

The contact mechanism is best shown in Figs. 13 and 14. Pivotally mounted at 169c, on a block 169d which guides the type bars 161 on frame 169, is a series of contact operating interposers 300 corresponding in number to the type bars. Each type bar has a shallow pin 161d coacting with a cam surface 300a formed in the adjacent interposer 300. Each interposer 300 also has a pin 300b engaging the vertical straight surface of a T-shaped contact operating plate 301. The T-shaped contact operating plates 301 are supported by pairs of parallel motion links 302 pivoted at 304 to a relatively fixed part of the machine so that, for the relatively short stroke of the contact operating plates 301, the latter move substantially linearly. Spring 305 anchored to the right-hand ends of the contact operating plates 301 urge the latter to the left to engage the vertical straight portions 301a of plate 301 with the pins 300b and press the interposers 300 to the left into engagement with the pins 161d on the type bars.

The contact operating members 301 are aligned with the type bars by means of a comb bracket 306 (Fig. 14) mounted in the framework supporting the links 302. A fixed comb 306a guides the longer, horizontal shanks of plates 301.

Secured to the rear end of each contact operating member 301 is an insulating block 301b having a vertical slot through which passes a contact wire 307. The contact wires 307 are supported vertically in a contact block 308 of insulating material secured to the framework supporting the links 302 and the combs 306, 306a. Coacting with each contact wire 307 is a fixed contact element 309. The contact elements 307, 309 comprise the checking contacts CKC.

When the type bars rise during the course of the printing operation, the interposers 300 remain in the coactive relationship with the pins 161d shown in Figs. 13 and 14 until a type bar is arrested by one of the pawls 175. This causes the pin 161d to come to rest but the coacting interposer 300 will continue movement vertically and will be cammed in a clockwise direction by the pin 161d thereby urging the contact operating plate 301 to the left and cause the contact wire 307 to engage the contact 309 and close contacts CKC. These contacts close a circuit which, with reference to the point in the cycle at which it occurs, will represent the value at which the type bar is stopped.

Figures 16, 17, 18:
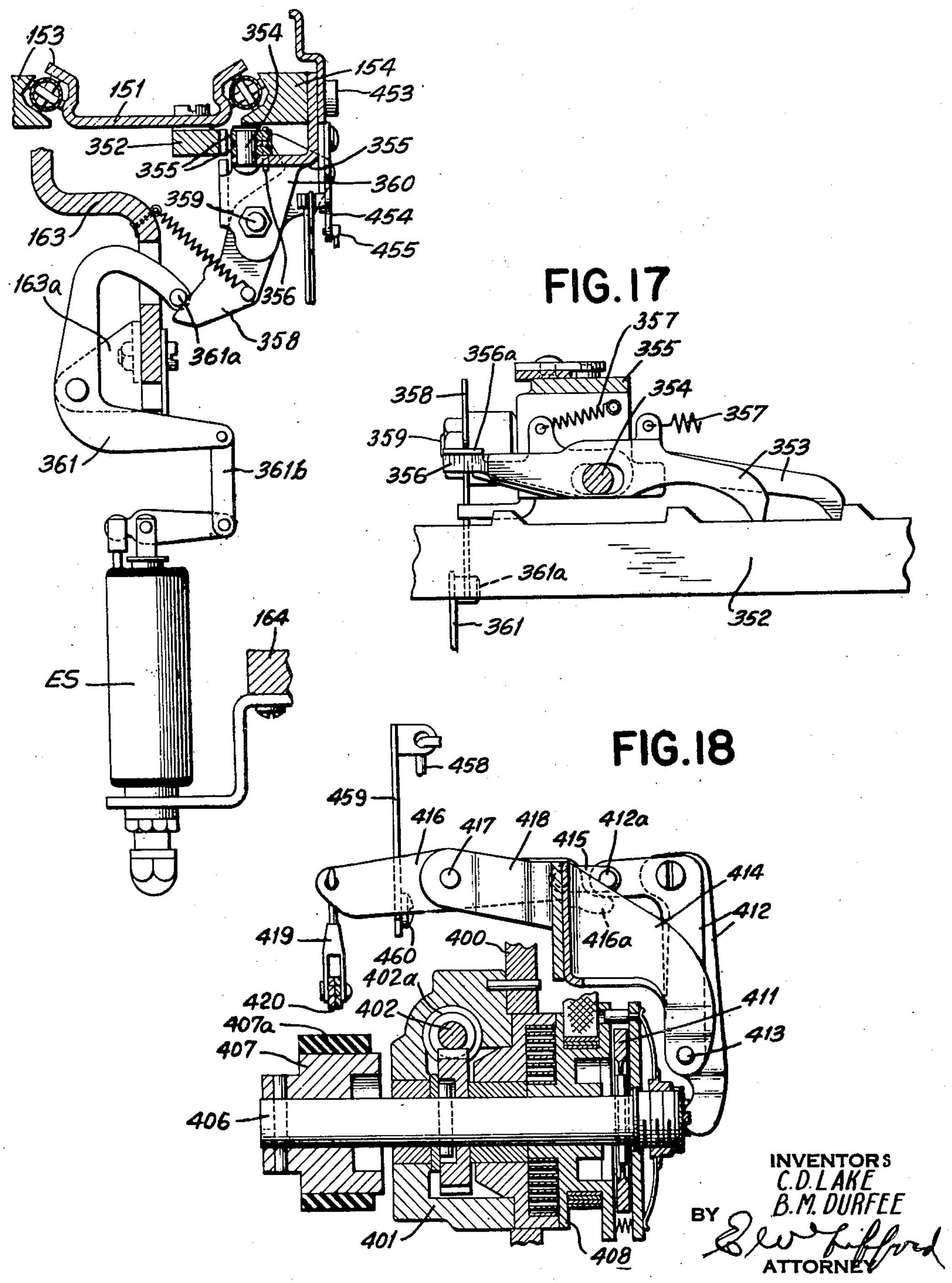
Fig. 16 is a large scale view of the escapement mechanism and its operating magnet.
Fig. 17 is a detail view showing the escapement pawls and rack.
Fig. 18 is a large scale vertical section of the carriage return clutch mechanism.

Two carriage feed mechanisms are provided for effecting the column by column shift of the carriages necessary to print in succession the totals on the work sheet. This mechanism for the right-hand carriage RHC consists of a conventional carriage feeding spring motor 350 (Fig. 20) which is connected to the carriage by means of a tape 351. These spring motors tend to feed the two carriages to the left in Figs. 1, 2A, and 2B, or to the right in Fig. 20. Each carriage is provided with an escapement rack 352 (Figs. 12, 13, 16, 17, and 20) with which cooperates a pair of conventional escapement pawls 353 (Fig. 17) which are pivotally slidably mounted at 354 on a bracket 355 carried by the rear rail 154 in each case. The rack is provided with teeth at intervals of 1" whereas the pawls 353 are capable of sliding movement a small fraction of this distance and differ in length by one-half of a tooth space or one-half inch.

Coacting with the tails of the pawls 353 is a pawl operating member 356 pivotally mounted on the same pivot 354 as the pawls 353. The pawls 353 are urged to the left and clockwise (Fig. 17) by separate springs 357 and normally one of the pawls always engages one of the teeth in the rack 352 while the other is approximately half way between such tooth and the next adjacent tooth on the right or left. In this position of the parts, the tail of the pawl which is engaging a tooth (illustrated by the bottom or back pawl in Fig. 17) will be pushed to the left against the pivot 354 by the tension of the carriage feeding spring motor 350, which is greatly superior in tension to the springs 357, thereby holding the tail of the pawl which is engaging a tooth in the path of the operating lug 356*a* on the member 356.

Coacting with the lug 356*a* is an operating arm 358 (Figs. 16 and 17) pivoted at 359 on a bracket 360 carried by the rear rail 154. Mounted on a bracket 163*a* carried by cross frame 163 is a bell crank 361 having a pin 361*a* engaging the lower end of the operating arm 358. This bell crank is actuated by a solenoid ES, which will hereinafter be termed the "escapement solenoid," through a link 361*b*.

When the solenoid ES is energized, it rocks the bell crank 361 clockwise (Fig. 16) thereby actuating the operating arm 358 counterclockwise. This rocks the operating member 356 counterclockwise (Fig. 17) and disengages the pawl 353 which happens to be engaging the tooth in the rack 352 (the rear pawl 353 in Fig. 17) from such tooth and allows the carriage to move one-half a tooth space. Before this movement is completed, the same tooth on the rack will engage the second, or front pawl in Fig. 17, pawl 353 and push it to the left as far as it will go against the tension of its spring 357 until stopped by the pivot 354. This moves the tail of the rear pawl 353 in front of lug 356*a*. As soon as the rear pawl 353 is released, it will be drawn to the right to a position a little more than half way between two teeth on the rack 352, clear of lug 356*a* in readiness for the next spacing operation. Thus, the pawls are alternately effective to space the carriage half the distance between the teeth or one column on the work sheets.

The carriages are always operated in unison by energizing both magnets ES together so that theoretically the carriages should always move in step in spacing the two sections of the work sheet so that the four totals which are simultaneously printed in a single cycle will be spaced by fifteen columns from each other on the work sheet. However, it is possible that one carriage might be incompletely returned and thus get out of step with the remaining carriage. For that reason, the two carriages may be intercoupled (Figs. 2A and 2B) by a tie rod 362.

Each carriage is provided with a carriage return mechanism which is mounted on a subframe 400 secured to the right-hand frame plates 160 in Figs. 2A and 2B, respectively. The two carriage return mechanisms are operated by power from the high speed shaft 117 and each includes a worm drive housing 401 (Figs. 2A, 2B, 18, and 20) secured to the frame 400 in which housing is mounted the worm drive shaft 402. The shafts 402 are provided with bevel gears 403 meshing with bevel gears 404 secured to the shaft 117. The worms 402 mesh with worm wheels 405 secured to the short shafts 406 journalled in the worm housing 401. Secured to the left-hand end (Fig. 18) of each shaft 406 is a stub power roller 407 having a resilient tread 407*a* preferably made of rubber.

The right-hand end of each shaft 406 has loosely rotatably mounted thereon a carriage return pulley 408 (Figs. 2A, 2B, 18, and 20) on which is wound the carriage return tape 409. This tape, for each carriage, extends upwardly (Fig. 20) around a pulley 410 carried by a suitable bracket mounted on the main framework and thence along the rear rail 154 to the left-hand end (Figs. 2A and 2B) or right-hand end (Fig. 20) of the carriage.

The right-hand ends of the shafts 406 are provided with a disk friction clutch 411 (Fig. 18) of well known form which is actuated by a two part lever 412 pivoted at 413 to a bracket 414 secured to the side of the frame 400. Each lever 412 is connected by a short toggle link 415 to a lever 416 pivoted at 417 to a bracket 418 secured to the frame 400 by the same screws as secure the bracket 414 thereto. The left-hand arm (Fig. 18) of each lever 416 is connected by a link 419 (see Fig. 13, also) to a power unit 420 of well-known form pivotally mounted at 421 in the frame 400. Each power unit 420 includes a single lobe spiral cam 422 rotatably mounted at 420*a* in the frame of the power unit.

Normally a spring operated arm 423 (Fig. 13), pivoted at 420*b* in the power unit 420 and engaging a pin 422*a* on the cam 422, tends to rotate the cam to engage the serrated tread thereof with the tread 407*a* of the stub power roller 407. Rotation of each cam 422, however, is normally prevented by a third lever 424 pivoted at 420*b* in the power unit 420.

Each lever 424 has a pin-and-slot connection 425*a* (Fig. 13) with a lever 425 pivoted at 426 in the frame 400 and urged in a clockwise direction against a suitable stop by means of a spring 427. Each lever 425 is connected by a link 428 with its own carriage return solenoid CRS mounted on the frame plate 160. When each solenoid CRS is energized, the link 428 is drawn downwardly thereby rocking the lever 425 counterclockwise and actuating the release lever 425 in a clockwise direction.

The release lever 424 has a lug (not shown) normally engaging a lug in the rim of the cam 422 to prevent it from rotating on its pivot 420*a*. When the lever 424 is rocked as aforesaid the lug therein is freed from the lug on the cam 422 allowing the spring operated arm 423 to rotate the cam 422 counterclockwise far enough to cause the tread 407*a* to grip the tread on the cam 422 and rotate the latter. Owing to the spiral nature of the tread on the cam 422, this will cause the power unit 420 to be rocked clockwise, drawing down the link 419 and staightening the toggle comprising the right-hand arm of lever 416 (Fig. 18) and the toggle link 414. This toggle is designed to move a little beyond dead center and lock, this being effected by means of the pivot pin 412*a* for the lever 412 and link 415 engaging an extension 415*a* on the lever 416 which permits the toggle to go a little beyond dead center. Owing to the reaction of the spring which is an incidental part of the clutch 411, the parts will be held in this position, with the clutch engaged, thereby clutching the carriage return pulley 408 to the shaft 406. As a result, the pulley 408 will wind the tape 409 and exert a pull on the carriage tending to draw it to the right in Figs. 2A or 2B or to the left in Fig. 20.

Means are provided for automatically releasing the clutches 411 after the carriages have reached the proper positions as determined by the marginal stops. The marginal stop mechanisms for the two carriages are substantially identical but the marginal stop mechanism for the right-hand carriage RHC shown in Figs. 2A and 20 has certain circuit closing functions which require modifications, although the operation of the marginal stop in so far as the tripping of the clutch is concerned, are identical. The carriages are provided with conventional marginal stop racks like 450 (Figs. 20, 21, and 22) which are secured to the side plates 150 and extend parallel with and slightly above the rear rails 154. The simpler marginal stop mechanism for the left-hand carriage LHC includes a pair of conventional marginal stops 451 (Fig. 22) which are adjustably mounted in a well known way on the marginal stop rack 450. These stops have lugs 451*a* which, by coaction with a lug 452*a* on a fixed plate 452 carried by the rear rail 154, limits carriage movement in both directions.

Figures 21, 24, 25:
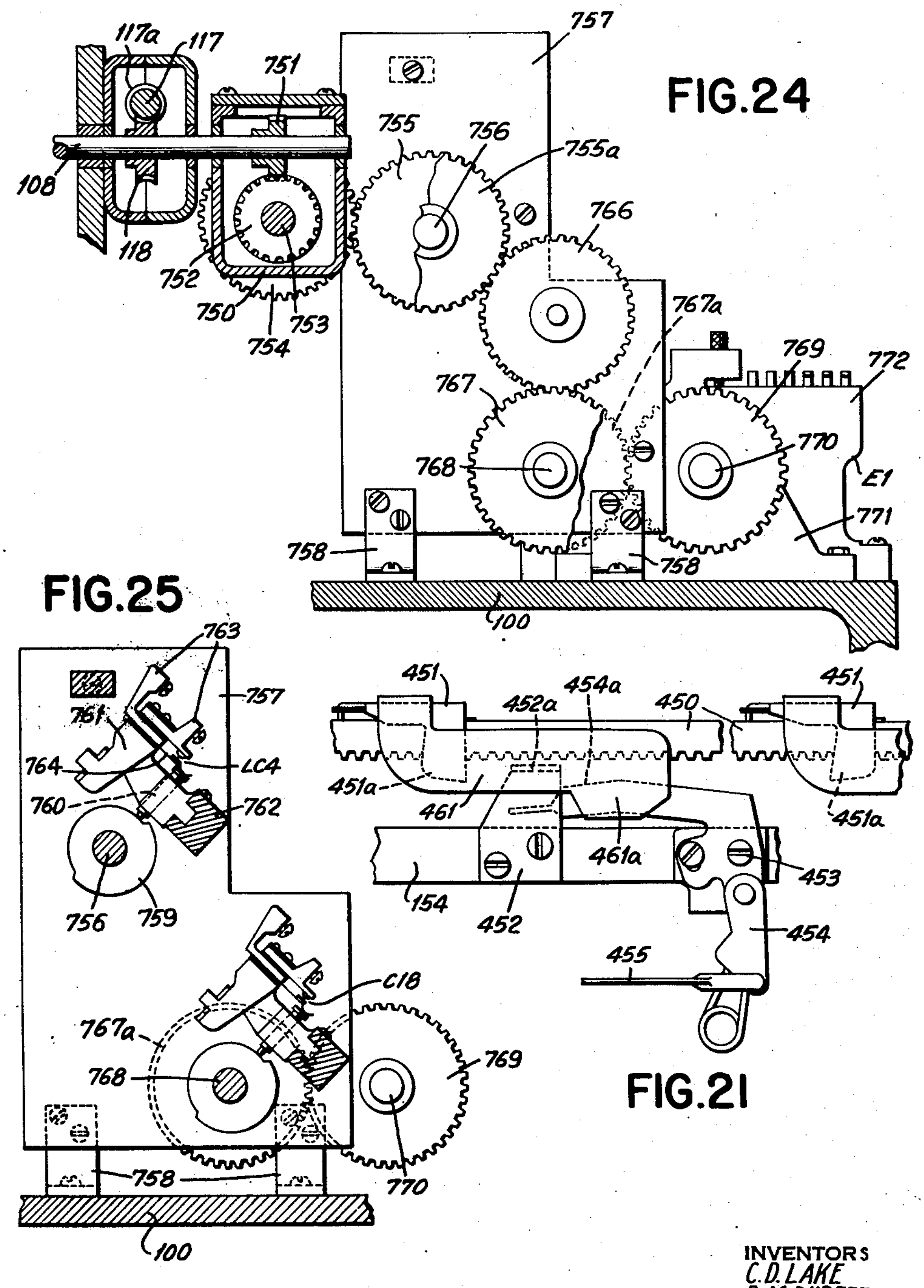
Fig. 21 is a detail view of the carriage return clutch tripping mechanism and the marginal stops for the carriage shown in Fig. 2A.
Fig. 24 is a vertical section on the line 24—24 in Fig. 2A and shows the drive gearing for the high speed emitter and circuit breakers.
Fig. 25 is a vertical section on the line 25—25 in Fig. 2A showing the high speed circuit breakers.

Pivotally mounted on each rear rail at 453 (Figs. 16, 20, 21, and 22) is a trip lever 454 having a cam surface 454*a*. The trip levers 454 are connected by links 455 to levers 456 pivoted to one of the frames 159. A second link 458 (Figs. 13 and 18) connects the lever 456 to a lever 459 pivoted at 460 to the frame 400. The lever 459 has an arm which extends horizontally underneath the left-hand end of lever 416 (Fig. 18) so as to be actuated by said lever when it is drawn downwardly as described above through the operation of the power unit 420. Normally the cam surfaces 454*a* on the trip levers 454 are at too low a level to be affected by the right-hand marginal stops (Figs. 21 and 22). However, when the lever 416 is actuated by the power unit 420, lever 459 will be rocked counterclockwise (Fig. 13) drawing the link 458 to the left and through the lever 456, drawing the link 455 to the left (Figs. 20, 21, and 22) thereby rocking the trip levers 454 clockwise to raise the cam surfaces 454*a* and hold them in the paths of the lugs 451*a* on the right-hand marginal stops. When the carriages almost reach the position determined by each right-hand marginal stop, the lug thereof engages the cam surface 454*a* and restores the lever 454. This exerts a restoring movement through the links 455, 458 and causes the horizontal arm of the lever 459 (Figs. 13 and 18) to rise and forcibly break the toggle 415, 416 thereby permitting the clutch 411 to release. The cam surfaces 454*a* are so proportioned and the parts are so adjusted that the clutches are disengaged before the carriages are actually stopped by the engagement of the marginal stops 451 with the lugs 452*a* so that the final movements of the carriages are effected by momentum.

The marginal stop mechanism for the right-hand carriage shown in Figs. 2A, 20, and 21 is substantially identical with the ones just described, but each marginal stop 451 has attached to it a cam plate or finger 461 having a cam lug 461*a*. The cam lugs operate two sensitive switches designated MS1, MS2 which are mounted on the rear rail 154, each switch having an operating lever 462 provided with a roller 462*a* in the path of movement of the lugs 461. The switch MS1 is actuated by the left-hand marginal stop with reference to Fig. 2A, that is, the right-hand one in Fig. 20, while the switch MS2 is actuated by the right-hand marginal stop (Fig. 2A) or the left-hand one in Fig. 20. A third sensitive switch MS3 is mounted on the rear rail 154 and actuated by a member 461*b* secured to the right-hand carriage RHC. The contacts of this switch are closed only when the carriage is in columns 1, 2 and 3.

The carriage return mechanisms, besides returning the carriage, also automatically operates the line spacing mechanism for the platens 155. The platens are provided with the usual line spacing ratchets 475 (Figs. 2A, 2B, and 19) with each of which cooperates a pawl 476 carried by a slide 477. The slides are vertically movable on studs 478 on the left-hand plates 156 (Figs. 2A and 2B) and each has a lug 478*a* engaged in a slot in the horizontal arm of a bell crank 479 which is pivoted on a bracket 480 carried by the channel-shaped member 151 forming part of the carriage framework. A spring (not shown) normally holds each slide upwardly in the position of Fig. 1 in which the tail of the pawl 476 engages the left-hand end of a line spacing control stop arm 481 pivoted at 482 in the carriage plate 150. In this position, a spring 483 attached to the tail of pawl 476 tends to rock the pawl into engagement with the line space ratchet 475 but such action is prevented by the arm 481.

The arm 481 is capable of assuming any one of three positions as determined by the line space control lever 484 (Fig. 19) pivoted on the upper stud 478 and having a pin 484*a* engaging one of three notches formed in the arm 481 at different levels. When the lever 484 is set in the position shown in Fig. 19, with the pin 484*a* in the highest notch, the slide 477 will be permitted to restore only one increment which, stated in terms of line spaces, permits a single line space. The carriage return tape 409 is anchored to the downwardly depending arm of the lever 479 so that initially, when tension is first applied to the tape 409 in beginning a carriage return cycle, the horizontal arm of lever 479 will be rocked downwardly to a fixed stopping position after which further movement of the lever 479 is prevented and thereafter the carriage is returned to the starting position. As soon as the tension on the tape relaxes, the spring operating the lever 479, restores the slide to the position shown.

On the down stroke of the slide 477, the tail of the pawl 476 moves away from the end of the arm 481, allowing the spring 483 to swing the pawl into engagement with the teeth of the ratchet 475, and advance said ratchet one tooth space until it is stopped by a fixed stop 485, this stop also being effective to force the pawl deeper into the teeth of the ratchet and thereby prevent overthrow of the platen 155. By setting the lever 484 in a clockwise direction to position the pin 484 in the middle or lower notch, the slide 477 will be allowed to restore far enough to enable the pawl 476 to move the ratchet two or three teeth, respectively. The arm 481 is held in engagement with the pin 484*a* by a suitable torsion spring 486 coiled around the pivot 482.

It will be seen from the foregoing that a carriage return operation is always automatically preceded by a line spacing operation.

For the purpose of controlling the printing of totals from the counters in accordance with the position of the carriages, the right-hand carriage RHC is provided with an emitter strip which closes circuits to select the counters and accumulators for total printing operations. This consists of a strip of insulating material 500 which is supported in the rear of the right-hand carriage RHC (Fig. 20), so as to extend parallel with the rear rail, by means of brackets 501 fixed to the two plates 160 associated with this carriage. The emitter strip has a series of conductive inserts 502 (Fig. 10) and a common contact strip 503 which extends the length of that part of the strip which has the contact elements 502. Secured to the carriage is a bracket 504 (see Fig. 20, also) on which is mounted a block 505 carrying a pair of electrically connected spring-pressed contact elements 506 one of which bears on the top surface of the common contact strip 503 and the other of which wipes over the conductive inserts 502. Each of the inserts 502 coincides to one of the columns of the work sheet whereby the movement of the carriage from column to column effects the selection of circuits which control the printing of totals from the accumulator sections and groups of unit counters corresponding to these carriage positions, it being remembered that four counters are associated with each carriage position, as determined by the teeth of rack 352, to enable sixty totals to be printed by movement of the carriage through only fifteen positions.

The machine is equipped with accumulating mechanism capable of receiving entries under control of the record cards and for cross footing purposes as a check on the accuracy of tabulation of items. This accumulating mechanism is similar to the one disclosed in application Serial No. 9,498, filed February 19, 1948, by C. D. Lake et al.

The accumulator mechanism in the present case comprises sixteen units or orders which may be divided into groups of four, each constituting a separate accumulator, for cross footing purposes. A self contained accumulator unit for a single order is shown in Figs. 28 to 35.

The parts and mechanism forming each of the accumulator units are carried by a support plate 600 which is mounted in a vertical plane in the machine. Carried by the plate 600 (Fig. 28) are two magnets consisting of a return magnet RM and an add magnet AM and interposed midway between the cores of these magnets is an armature 601 which is pivoted on a stud 602. In the normal position of the armature 601, the latter is against the core of the magnet AM, as in Fig. 28. The right-hand end of the armature 601 has a fork connection 603a with a lever 603 which is pivoted on a stud 604. Pivoted on a stud 605 carried by the lever 603 is an operating pawl 606 urged clockwise, into engagement with a tooth of a ratchet wheel 609, by a spring 607 which is anchored to the tail of the pawl 606 and to a pin carried by the lever 28.

Figures 28, 34:
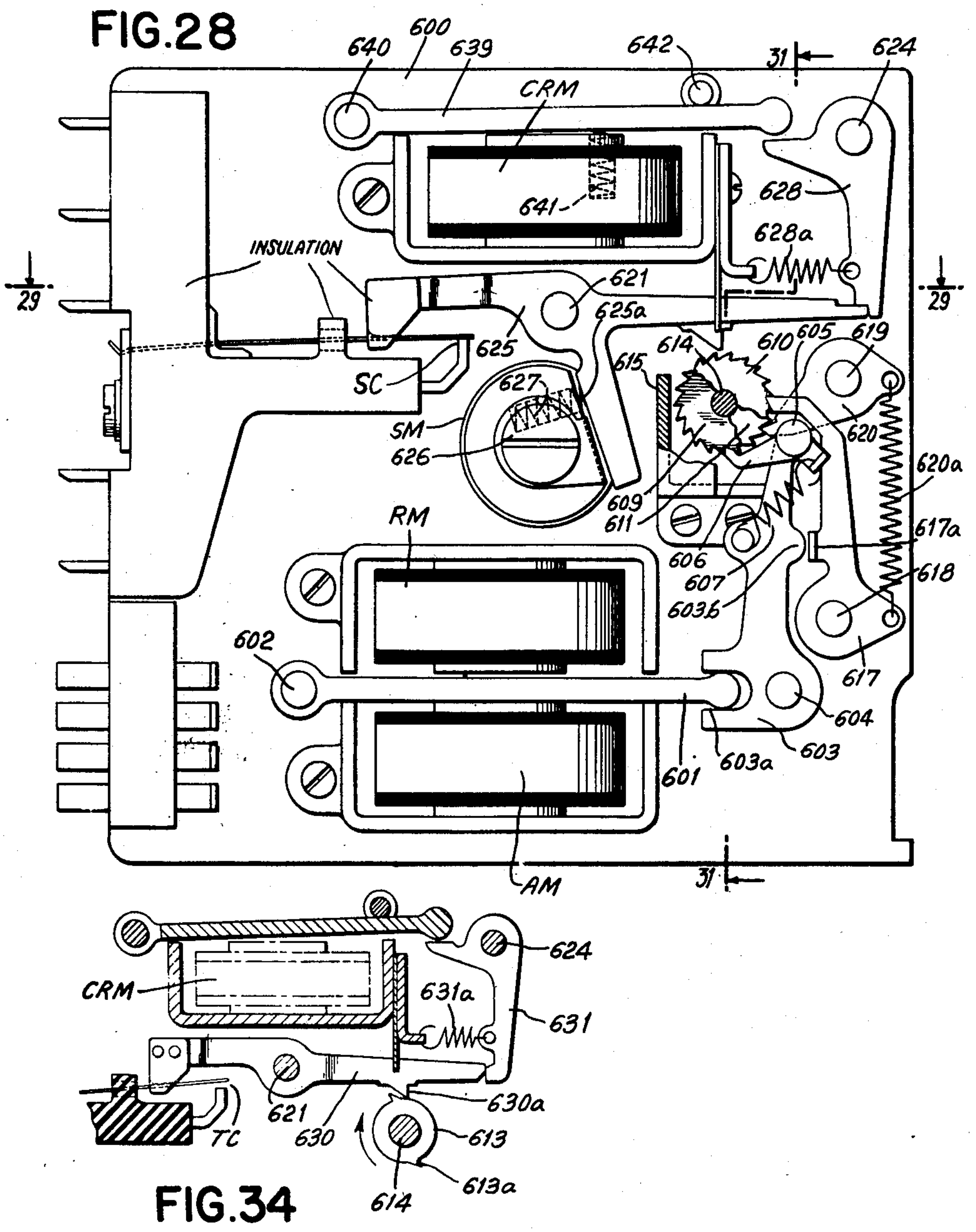
Fig. 28 is a vertical elevation of one of the accumulator units.
Fig. 34 is a vertical section on the line 34—34 in Fig. 29.
Figure 29:
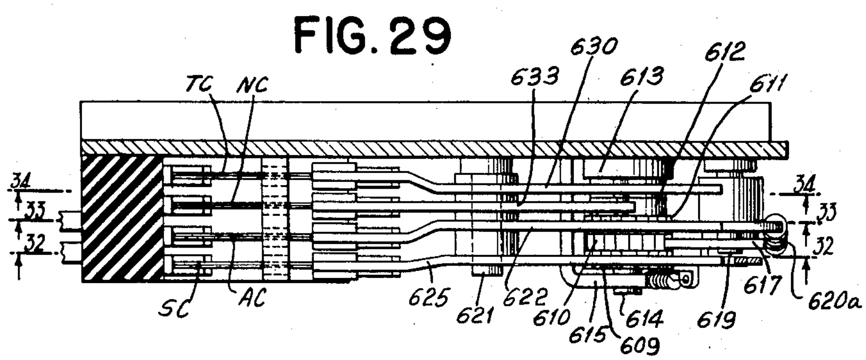
Fig. 29 is a horizontal section on the line 29—29 in Fig. 28.
Figure 30:
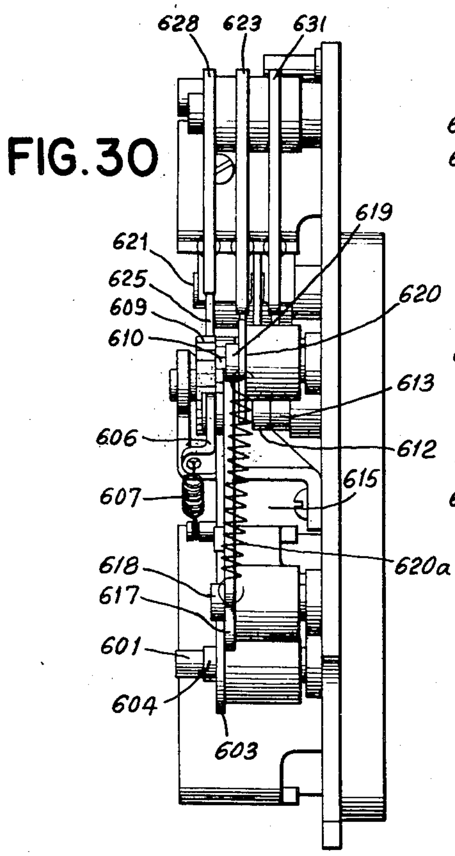
Fig. 30 is an end view of the accumulator unit.

It is evident that when the armature 601 is attracted by the core of the magnet RM the lever 603 will rock clockwise about its pivot 604 and pawl 606 will be moved to the right over the ratchet wheel 609 and move behind the next tooth to the right (Fig. 28). In such position, the pawl 606 is in a position to rotate the ratchet wheel 609 clockwise one tooth when the magnet RM is deenergized and the add magnet AM is energized. When the "add" magnet AM is energized after magnet RM is deenergized, the armature 601 will positively rock the lever 603 counterclockwise to effect a one-tooth revolution of ratchet wheel 609. In this manner a unit is entered for each oscillation of lever 603.

The accumulator wheel assembly for each order consists of the add ratchet wheel 609 (Fig. 31), a ratchet wheel 610 which is associated with the overthrow preventing mechanism, a ratchet wheel 611 used to latch a contact in closed position when the first unit is entered, and two control cams 612, 613 associated with the units carry mechanism. The three ratchet wheels 609, 610, 611 and the two cams 612, 613 are fastened together and to a shaft 614, one end of which is journalled in a bracket 615 which is carried by the plate 600. The plate 600 also carries a bushing 616 in which is journalled an enlarged portion 614a of shaft 614.

The overthrow preventing mechanism consists of a detent lever 617 (Figs. 28 and 29) which is pivoted upon a stud 618, this lever having a lug 617a engageable with a projection 603b of the lever 603. Pivoted on a stud 619 is a pawl 620 which cooperates with the ratchet wheel 611 (see Fig. 32, also). A spring 620a is interconnected between the tails of the pawls 617, 620 to engage the pawls with the associated ratchet wheels 610, 611.

When the lever 603 is initially rocked clockwise (Fig. 28), extension 603b will engage the lug 617a and withdraw the overthrow preventing pawl 617 out of engagement with the ratchet wheel 610, this occurring at the same time that the pawl 606 moves to engage the next tooth of the ratchet wheel 609. The attraction of armature 601 by the add magnet AM, assisted by the spring 620a, rocks the lever 603 counterclockwise and thus the overthrow preventing pawl 617 is rocked to engage the next adjacent tooth of the ratchet wheel 610. Extension 603b moves away slightly from the overthrow preventing pawl 617 when the latter engages the ratchet wheel 610. This insures that the overthrow preventing pawl 617 will be in the path of the next tooth of ratchet wheel 610 just before the pawl 606 has reached the limit of its travel in rotating the ratchet wheel 609 clockwise one tooth space.

Transmission of a succession of pairs of alternating impulses to magnets RM and AM will cause a repetition of the above described operations to either add or enter complements of numbers to effect subtraction and thus the accumulator unit will be advanced a number of steps commensurate with the number of effective pairs of impulses transmitted to the magnets. To enter the digit "1" only one pair of impulses is transmitted to said magnet RM and magnet AM, respectively, whereas, to enter the digit "3," for example, three pair of impulses will be transmitted to the magnets RM and AM.

Pivoted upon a stud 621 carried by plate 600 (Figs. 28 to 32) is a lever 622 having a tooth 622a coacting with the teeth of ratchet wheel 611. The left-hand end of the lever 622 (Fig. 32) carries a block of insulating material which actuates the spring blade of contacts AC. Upon the first clockwise step of rotation of the ratchet wheel 611 (Fig. 32), a tooth of the latter will act as a cam to rock the lever 622 counterclockwise to close contacts AC. Lever 622 will be latched in this position by a latch lever 623 which is loosely pivoted upon a fixed stud 624 and urged clockwise by a spring 623a. The contacts AC remain closed until the termination of the successive steps of operation of the associated accumulator wheel in adding or subtracting a digit.

Pivotally mounted on the stud 621 is a three-armed contact operating lever 625 (Figs. 28 to 31) having a block of insulating material actuating the contacts SC which are similar in construction to the contacts AC but are normally closed. The lever 625 has one of its arms formed as an armature 625*a* coacting with the pole piece of a subtract magnet SM which has its axis at right angles to the plate 600 and secured thereto by means of a suitable screw 626. A spring 627, received in a hole in the pole piece of the magnet SM, urges the lever 625 in a counterclockwise direction to maintain the contacts SC closed. The third arm of the lever 625 engages a shoulder formed in the end of a latch lever 628 urged clockwise by a spring 628*a* and pivoted on the stud 624.

When the magnet SM is energized, the lever 625 will be rocked clockwise (Fig. 28), thereby opening the contacts SC and permitting the end of the latch lever 628 to be drawn over the third arm of the lever 625 and hold it in the actuated position. As will be made clear hereinafter, the subtract magnet SM is energized under control of timed impulses representing digits, as for example, from a card sensing brush, to effect the subtraction of the digit represented by the impulse. The manner in which the magnet SM is effective to cause subtraction will be explained more fully hereinafter with reference to the wiring diagram.

Contact mechanism is provided for closing the units transfer circuit to effect carries from lower order accumulator wheels to higher order wheels. The ratchet wheel 609 has 20 teeth so that the accumulator wheel assembly makes one-half revolution for each ten units accumulated. The tens carry contact mechanism is shown in Fig. 34 and consists of a contact operating lever 630 similar to the lever 622 which operates the adding contacts AC in Fig. 32 and is provided with a similar projection 630*a* coacting with the cam 613. This cam has two sharp pointed lobes 613*a* located on diametrically opposite sides of the studs 614. The lobes 613*a* are so disposed that, when the accumulator wheel assembly is passing from a nine digital position to the zero digital position, the contacts TC, hereinafter termed the tens contacts, are closed, and the lever is latched by a latch lever 631 similar to the latch lever 628 and actuated by a spring 631*a* whereby the contacts TC remain closed.

Figure 33:
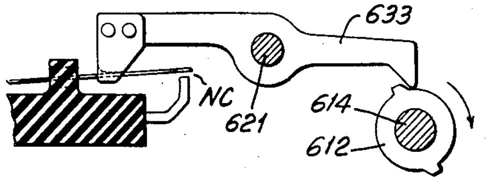
Fig. 33 is a vertical section on the line 33—33 in Fig. 29.

The nines carry contacts are designated NC in Fig. 33 and are operated by a lever 633 similar to the lever 622, except that it has no latch and it is operated by the cam 612 which has two lobes so placed that, whenever the accumulator wheel assembly stands at "9," the contacts NC will be maintained closed.

Figure 31:
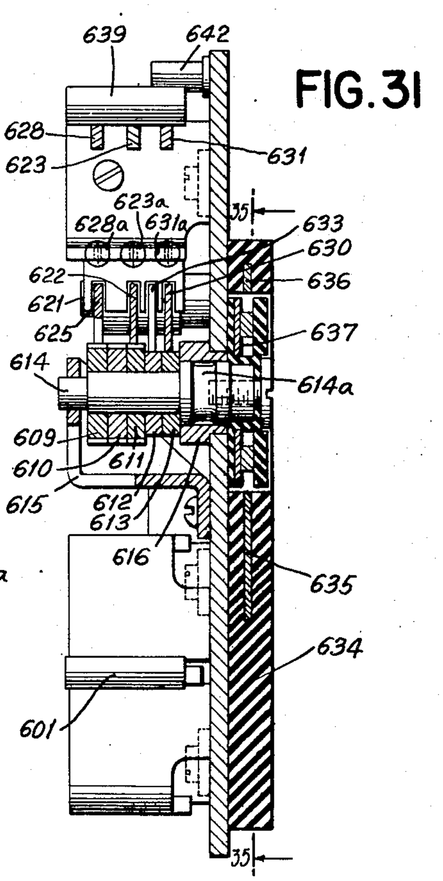
Fig. 31 is a vertical section on the line 31—31 in Fig. 28.
Figure 35:
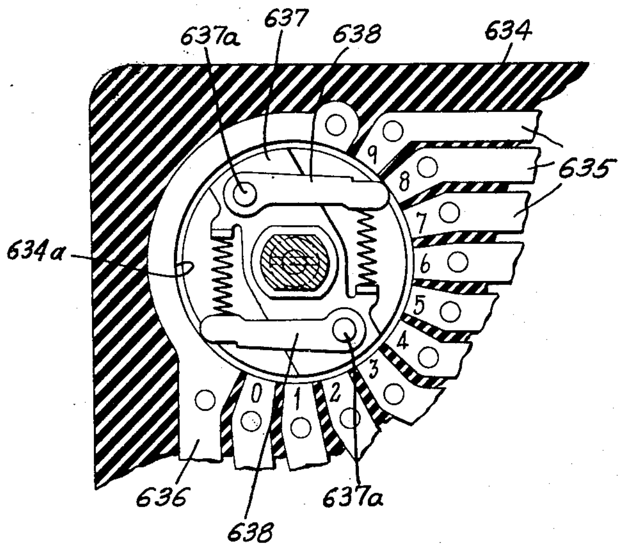
Fig. 35 is a vertical section on the line 35—35 in Fig. 31.

Each accumulator order is also provided with total readout mechanism constructed in accordance with conventional principles. This readout mechanism is shown in Figs. 31 and 35 and is located in a moulding 634 of insulating material secured to the opposite face of the plate 600, to that carrying the accumulator mechanism. The moulding 634 is provided with a series of ten conducting segments 635, the inner ends of which are disposed along the edges of a circular opening in the moulding 634 and spaced 18° apart. The moulding is also provided with a semi-circular common contact segment 636 which extends around the remaining portion of the circular opening.

Secured to and insulated from the left-hand end of the shaft 614, to the enlargement 614*a*, is a conductive contact supporting member 637 having pivoted at 637*a* two contact fingers 638, the free ends of which are arranged to ride along the inside surface of the circular opening 634*a* in the moulding 634 and are so disposed that, when the member 637 rotates counterclockwise (Fig. 35), one of the fingers wipes over the common segment 636 while the other finger wipes in succession over the segments 635 so as to progressively make connection thereto. Bearing in mind that the accumulator wheel assembly makes one-half revolution for every ten units added thereon, it is evident that a circuit will be closed by the fingers 638 to one of the segments 635 which represents the actual digital value at which the accumulator wheel is standing. These values are indicated by the small numbers 0 to 9 in Fig. 35. This mechanism is utilized to read out totals standing on the accumulator mechanism under various conditions which will be explained more fully hereinafter in conjunction with the wiring diagram.

Figure 32:
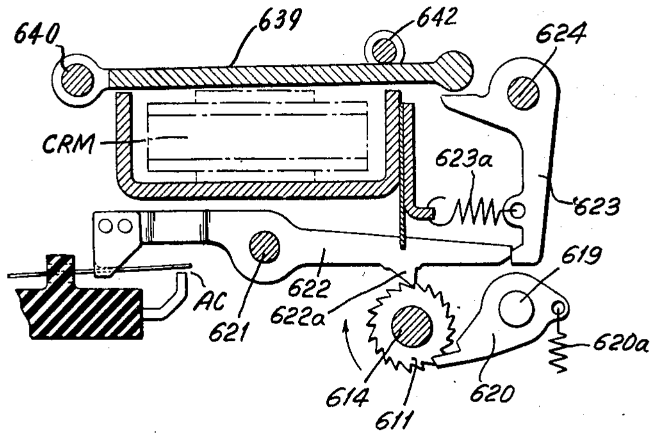
Fig. 32 is a vertical section on the line 32—32 in Fig. 29.

Provision is made for resetting the contacts AC, TC, and SC and is shown in Figs. 28, 32, and 34. It consists of a contact release magnet CRM secured to the face of the plate 600 and actuating an armature 639 pivoted on a stud 640. A spring 641, received in a bore in the pole piece of the magnet CRM, urges the armature in a counterclockwise direction against a stop pin 642 on the plate 600. The free end of the armature 639 is somewhat bulbous in shape and is wide enough to overlie the tails of all of the latches 623, 628, and 631 (Fig. 31). After the period of adding or subtracting has been completed, certain contacts close a circuit to energize the magnet CRM and releases the latches 623, 628, 631 to restore all of the contacts AC, SC, and TC to the positions shown in the drawings.

The machine is equipped with 60 unit or item counters, each comprising four denominational orders. In general, these item counters, up to a certain point, are constructed very similarly to the accumulator orders but are considerably simpler in construction and some of the features which are necessary in an accumulator are not necessary in an item counter.

A single denominational order unit of an item counter is shown in Figs. 38 to 40. This includes a base plate 650 similar to the plate 600 on which is mounted a counter magnet CM similar in function to the magnet RM of the accumulator mechanism. The magnet CM has associated with it a series of parts designated 651 to 671, including the ones designated with the suffix letters *a*, which are similar in shape, function, and operation to the parts designated 601 to 621 in Fig. 28. Since the magnet AM is omitted, the unit counter is provided with a stop 672 against which the armature 651 is held by a spring 673 received in a bore formed in the pole piece of the magnet CM, the spring urging the armature 651 in a clockwise direction.

When the magnet CM is energized, the spring 673 is compressed and the lever 653 rocked clockwise (Fig. 36) to draw the pawl 656 to the right as in the case of the accumulator unit (Fig. 28). This movement also operates an over-throw preventing element 667 in exactly the same manner as the element 617. Retrograde movement of the counter wheel assembly comprising the ratchet wheels 659, 660, 661 and the cams 662, 663 is prevented at this time by a pawl 670 similar to the pawl 620 and actuated by a spring 670a to engage it with the teeth of the ratchet 661. When the magnet CM is deenergized, the spring 673 assisted by the spring 670a, restores the parts to the position of Fig. 36, and the member 671 functions to prevent over-throw in exactly the same fashion as in the case of the parts shown in Fig. 28.

The mechanism is provided with nines carry contacts designated CNC (Fig. 39) hereinafter termed the counter nines contacts, which are actuated by the cam 663 through a lever 674 pivoted on stud 671. The cam 662, through lever 675, operates two sets of contacts, one designated CRC, termed the counter reset contacts, and the other CPC, hereinafter known as the counter print contacts.

Figure 45:
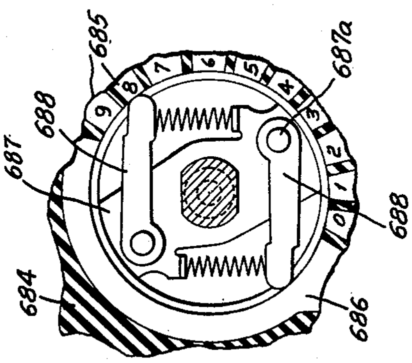
Fig. 45 is a view similar to Fig. 35, but showing one of the readout commutators for certain unit counters.

The cam 663 is arranged to hold the contacts CNC closed when the counter wheel assembly stands at the digital position 9 while the cam 663 is arranged to hold both the contacts CPC, CRC closed except when the counter wheel stands in the 0 position. As will be made clear hereinafter, the contacts CRC terminate the resetting impulses delivered to magnet CM during the operation of resetting counters to 0, while the contacts CPC cause impulses to be emitted to print the totals. With the exception of counters numbered 1 and 60, none of the unit counters are provided with readout commutators like the one disclosed in Fig. 35. Counter No. 1, has all four orders, and counter 60 has the units, tens, and hundreds orders provided with readout commutators similar to those shown in Fig. 35. These readout commutators include moulding 684 (Fig. 45); the readout segments 685, 686; support 687, and the contact fingers 688, which correspond to the parts designated 635 to 638 in Fig. 35.

Figure 43:
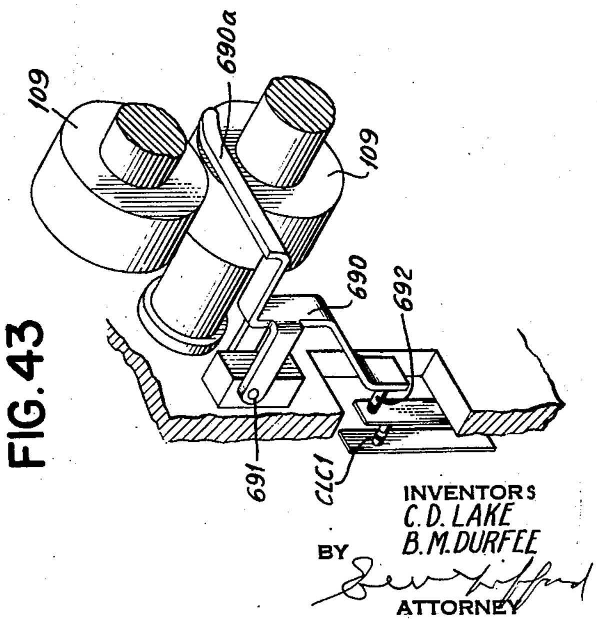
Fig. 43 is a large scale detail perspective view showing the first card lever contacts.

The machine is provided with two card lever mechanisms which actuate the first card lever contacts CLC1 and second card lever contacts CLC2, respectively, during the passage of the first card from the hopper H, to the sorting control mechanism. The two card lever mechanisms are quite similar in mode of operation by the card although differing specifically in the shape of the individual parts, for this reason only the mechanical construction of the first will be described in detail. This mechanism is shown in Fig. 43 and includes card lever 690 having a runner 690a designed to be engaged by the underside of a card passing from the hopper H to the contact roller CR. This rocks the card lever on its pivot 691 carried by suitable blocks fixed to the main framework and, through the agency of an insulating pin 692, closes the contacts CLC1 which are mounted on the outside of the framework carrying the pivot 691, the pin 692, projecting through a suitable hole in the frame and engaging one of the spring members carrying the contacts CLC1. The second card lever contacts CLC2 are similarly operated by a lever 693 (Fig. 5) having the shoe 693a riding on the card. This shoe is depressed by the passage of the first card and rocks the lever 693 thereby closing the contacts CLC2. The shoes 690a and 693a are long enough so that the card lever contacts CLC1 and CLC2 remain closed after the initial closure as long as cards continue to feed from the hopper H.

Figure 44:
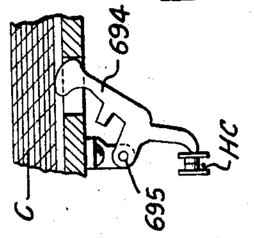
Fig. 44 is a view showing the card hopper contacts.

Hopper contacts designated HC are provided. These contacts are operated by a lever 694 (Fig. 44) pivoted at 695 underneath the hopper H. One arm of lever 694 extends through a slot in the bottom of the hopper and the weight of the cards C in the hopper rocks the lever 694 clockwise thereby closing the contacts HC. When the last card is ejected from the hopper, the contacts HC open.

The machine is equipped with circuit closing devices which are operative in timed relation to control the operation of the machine. There are two general groups of these devices, one of which is operated at high speed from the shaft 117 and is always operative when the machine is in operation, while the other group is driven by the shaft 220 and is operative only during printing cycles of the machine. The circuit closing devices operated by the shaft 220 are operated at a lower speed because of the fact that printing is effected at a lower speed than sorting, counting, and accumulating operations.

The high speed circuit closing devices are located in the rear right-hand corner of the machine on top of the base 100 and are disclosed in Figs. 2A, 24, and 25. The shaft 108 which operates the card picker mechanism and the card lifter mechanism (Fig. 5) extends to the rear of the machine, as best shown in Figs. 2A and 24, into a gear box 750 within which it is provided with the gear 751 meshing with a gear 752 secured to a short shaft 753 journalled in the gear box 750. Secured to the shaft 753 is a gear 754 which meshes with a gear 755 on a shaft 756 journalled in the plates 757 which are mounted on the base 100 by means of suitable angle brackets 758. Mounted on the shaft 756 are a series of fourteen cams 759 (Figs. 2A and 25) with each of which coacts a contact operating plunger 760 slidably mounted in a relatively thin block 761 carried by a cross bar 762 supported by the plates 757. Insulatably mounted on each block 761 are two terminal blocks 763 having terminal screws for connecting circuit wires thereto. One of the terminal blocks 763 contacts a spring contact member 764 which is spring biased into engagement with the plunger 760 so as to tend to hold the latter in engagement with the cam 759. The other terminal block carries a contact element coacting with a similar contact element on the member 764.

Figure 46:
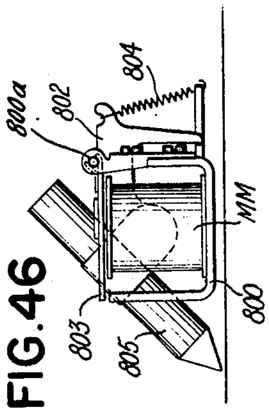
Fig. 46 is a view of the marking device.

These contacts are designated in the wiring diagram (Figs. 47A to 47X) and the timing chart (Fig. 46A) by the letters LC1 to LC6 and C7 to C15, respectively, and the cams 759 have their high portions proportioned to cause the associated contact elements to close for the periods denoted in the timing chart by the thick black lines, some of the cams being designed to cause intermittent closure of the contacts at regular intervals while others are designed to maintain a continuous closure of the contacts for varying periods of time.

The shaft 765 has a second gear 755a (Figs. 2A and 24) secured to it which meshes with an idler gear 766. The latter meshes with a gear 767 secured to a shaft 768 journalled in the plate 757. This shaft 768 drives a group of circuit closing devices C16 to C27 and CS3, CS4 similar to the devices LC1 to LC6, etc.

The shaft 768 has a second gear 767a (Figs. 24 and 25) which meshes with a gear 769 on a shaft 770 journalled in the bearings 771 (see Figs. 2A and 12, also) mounted on the base 100. The shaft 770 drives a series of high speed emitters, certain of which are designated E1 to E18 and E25 to E33 in the timing chart and wiring diagram.

Each emitter (Fig. 12) consists of a pair of fixed plates of insulating material 772 within which are moulded a series of contact segments 773, the ends of which are disposed in a semicircle about the edges of the plates 772 which are placed edge to edge and shaped so as to provide a large circular opening 772a. Each of the plates also has a common contact strip 773a which extends alongside the row of contact segments 773 for such plate and the shaft 770 is provided with pairs of electrically connected emitter brushes 774 mounted on blocks 770a carried by shaft 770, one pair for each emitter. One brush of each pair wipes over the two common contact strips 773a, which are externally electrically connected, while the other brush wipes over the segments 773 in succession so that the brushes 774 progressively close circuits through the segments of the emitters as shown in Fig. 46A.

The circuit closing devices which are driven by the print shaft 220 are shown in Figs. 2B, 26, and 27. Secured to the shaft 220 is a gear 775 meshing with a gear 776 secured to a shaft 777 journalled in the plates 778 mounted on the base 100. A second shaft 779 is journalled in the plates 778 and is driven by the shaft 777 through the train of gears 780, 781, and 782, and the shafts 777, 779, through cams 783 drive two groups of circuit closing devices similar to those shown in Fig. 25. These circuit closing devices are designated C2, C29 to C49, and C51 to C56 in Fig. 46B and the wiring diagram.

Secured to the left-hand plate 778 (Figs. 2B and 26) is a print emitter PE which consists of a semi-circular flat moulding 784 having a series of nine segments 785 which extend inwardly to a circular opening 784a in plate 784. A common contact ring 787 (Fig. 47H) is also disposed about the circular opening alongside of the segments 785 and the shaft 777 has secured to it a brush holder 788 carrying a pair of brushes 786 which wipe over the row of segments 785 and the common contact ring 788 so as to progressively close circuits as indicated at the top in Fig. 46B after the designation PE.

The shaft 216 (Figs. 2B, 3, and 15) is provided with two circuit breaking devices one of which is designated C1 and constructed similarly to the ones disclosed in Figs. 25 and 27 and actuated by the cam 789, the contacts being mounted on the bearing bracket 217 (Fig. 15). The other, designated C2, is mounted midway between plates 160 (Fig. 15) on a bracket 790. These circuit breakers operate continually as long as the machine is in operation; however, they operate at a slower speed than those driven by the shaft 117 on account of the speed reduction in the drive to shafts 216 and 220.

The machine is provided with a marking device designed to make a mark on cards to visually differentiate them from others in course of passage through the machine. This device is controlled by a marking magnet MM (Figs. 4, 46, and 48) mounted, with its yoke 800, on a card guide plate 801 suitably supported in the main framework. Pivoted at 800a (Fig. 46) on yoke 800 is a lever 802 to which is fixed the armature 803 of magnet MM. A spring 804 urges the lever 802 clockwise into engagement with a part of yoke 800 which acts as a stop. A marking pencil 805 is clamped to the lever 802 and adjusted so that its point will engage a card passing underneath whenever the magnet is energized.

Figure 49A:
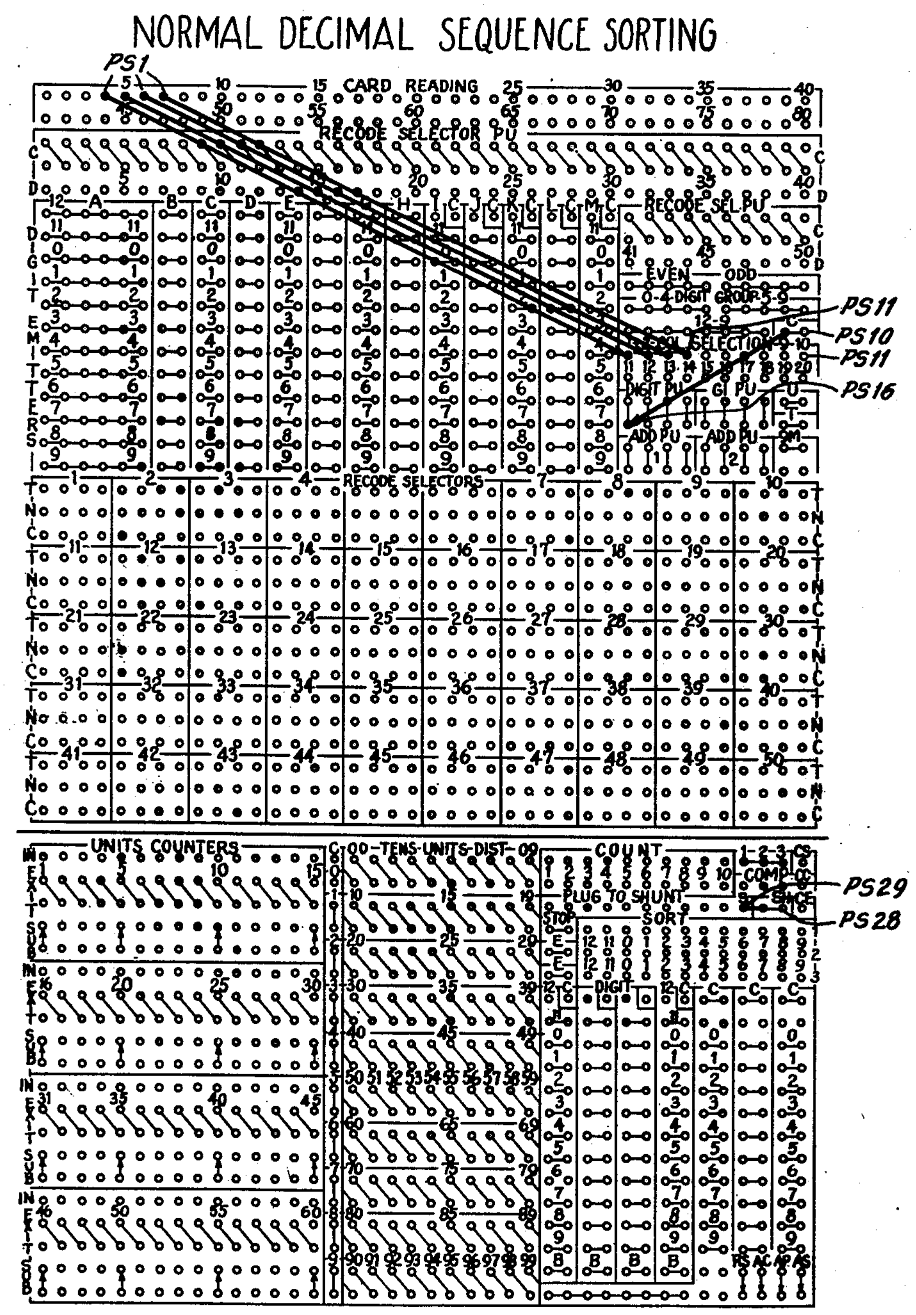

The operation of the machine and the flexible pluggable controls will now be described with reference to the plugboard (Fig. 41), the timing chart (Figs. 47A and 47B), the wiring diagram (Figs. 48A to 48X), and the plugboard charts (Figs. 49A to 49).

The separate sheets containing Figs. 48A, 48C, 48E, 48G, 48I, 48K, 48M, 48O, 48Q, 48S, 48U, and 48W, when arranged in a row, from left to right, in the order named, over Figs. 48B, 48D, 48F, 48H, 48J, 48L, 48N, 48P, 48R, 48T, 48V, and 48X in a similar row, with Fig. 48A over Fig. 48B, Fig. 48C over Fig. 48D, and so on, constitute a single wiring diagram of the machine.

The plugboard (Fig. 41) is provided with eighty plug sockets PS1, one for each card sensing brush B (Fig. 48Q) in the wiring diagram. When the machine is in operation, the plug sockets PS1 are outputs for timed impulses representing the different values punched in corresponding card columns. Once the machine is started in operation in a manner to be hereinafter described, the card lever relay contacts CLR2B close and the timing contacts LC5, LC6 (Fig. 47A) act as circuit breakers to emit short impulses to the contact roller CR through the common brush CB. These card brush impulses are traced from the positive side of the line P1 (Fig. 48Q), through the contacts LC5, LC6, and CLR2B, to the common brush CB, the contact roller CR, and the card brushes B to the plug sockets PS1. In order to simplify the tracing of the circuits and make the description as concise as possible, plug sockets PS1 will be considered as impulse sources or outputs controlled by the card and the tracing of circuits will begin with these plug sockets and be carried to or through the various pluggable devices and other controls.

The machine is provided with fifty "Recode selector" relays shown in Fig. 48O which are energized through the medium of impulses directed to the plug sockets PS2, PS3 which impulses control the recode electronic tubes V1 to V50, only a few of which are shown in Fig. 48O, but which are wired identically. Under most conditions, the plug sockets PS2 will be plugged to one or more of the plug sockets PS1 to cause the recode relays to be energized under control of the data designating holes in the record cards. The purpose of the plug sockets PS3 is to enable to recode relays to be rendered selectively effective only under certain prescribed conditions which may involve the use of impulses from the card sensing brushes B.

The recode relays are designated R27 to R36, R59 to R68, R97 to R106, R131 to R140, and R161 to R170. Each of the relays is associated with one of the recode selector tubes V1 to V50 which are gas tetrodes of a type commonly known as a "thyratron" and are of the screen grid type. Conveniently, a tube of the miniature type commercially designated 2D21 is used and are arranged so that it requires two simultaneous impulses on both the control grid and screen grid to render the tube conductive and energize the relay in its plate circuit. This is done by operating the control grid which is connected to the plug socket PS2 and the screen grid which is connected to the plug socket PS3, under such a bias that a change in the bias on one grid arising from an operating impulse being delivered thereto is insufficient to fire the tube unless a properly valued impulse is simultaneously therewith applied to the other grid. The recode tubes V1 to V50, therefore, act in a sense as impulse mixers which require specific pulse relationships before the tubes are rendered conductive or "fixed."

The manner in which the recode relays are utilized for specific purposes will be made clear hereinafter in reference to the plugboard charts which show how the machine may be set up for different types of operation.

In connection with the recode relays there are provided thirteen recode emitters designated E1 to E13 (Fig. 48O) of which eight E1 to E8 have their common brush 774 connected to the wire W3, while the other five emitters E9 to E13 have their common brushes connected to the plug sockets PS5 which are designated with the letter C. The segments of the emitters E1 to E13 are connected to the plug sockets PS4 and all are double plug sockets except the emitter E1 which has six plug sockets connected in common to each segment.

Figure 41:
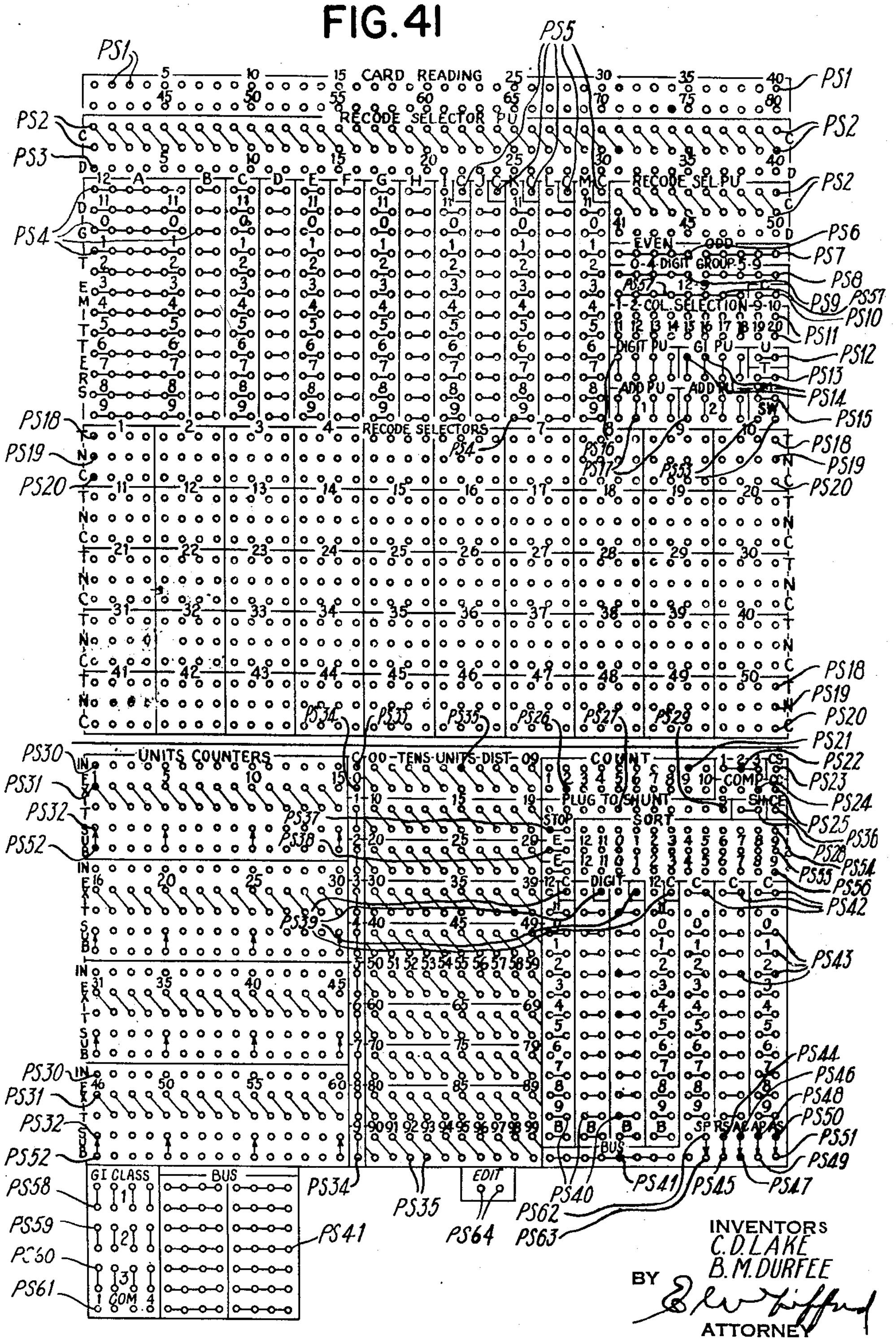
Fig. 41 is a view of the face of the plugboard.

The emitters E1 to E13 are distinguished from each other in Fig. 41 by the letters A to M over the rows of plug sockets PS4. This emitter A corresponds to emitter E1. It should be noted in Fig. 41 that the fine lines interconnecting the small circles on the plugboard indicate the fact that the plug sockets are electrically connected when so joined by a line. It will be noted in Fig. 41 that the plug sockets PS2 are so arranged that the insertion of a small double pronged plug between an upper and a lower plug socket PS2 will connect together the control grids of two of the tubes V1 to V50 so as in effect to render two adjacent recode relays operative. For example, if a plug is inserted at the extreme left in Fig. 41, to connect the extreme left-hand plug sockets PS2 together, the first condition will be set up for rendering the recode selector relays R27, R28, which are controlled by the tubes V1 and V2, operative.

Under normal conditions, one or more of the segments 773 of the emitters E1 to E13 will be connected to control the recode selector relays by one or more plug wires inserted between the plug sockets PS3 and PS4. For example, if it were desired to cause relay R27 for recode selector 1 to be energized under control of a "1" perforation in column 1 of the card, a plug wire will be inserted between PS1 for column 1 (Fig. 41) and extreme left-hand lower plug socket PS2. A second plug wire might be inserted between the extreme left-hand plug socket PS3 and one of the group of six plug sockets PS4 under the numeral "1" of recode emitter A. At the "1" point in the cycle, emitter E1 (Fig. 48O) will emit an impulse from wire W3 through its plug socket PS4 and the plug wire to the plug socket PS3 for tube V1 which will occur simultaneously with the pulse from the brush to the plug socket PS2 for this tube. This causes the tube V1 to fire, thereby energizing the recode relay R27. Of course, any one of the emitters A to M might be plugged to deliver the "1" impulse to recode selector 1 and any brush B might be plugged to the plug socket PS2. It is likewise apparent that any one of the recode selectors 1 to 50 might be rendered operative in this manner.

Each recode selector relay, as for example, the relay R27 (Fig. 48O), operates four sets of transfer contacts (Fig. 48P) which are designated R27A, R27B. These contacts are provided with plug sockets PS18, PS19, and PS20 and are grouped as shown in Fig. 41 under the title "Recode selectors." The common member of each set is designated with the letter "c" in Figs. 41 and 48P. The normally closed contacts, for example R27A (Fig. 48P), are designated with the letter "N" while "T" designates the normally open contacts R27B. Thus, if plug wires are inserted in PS19 and PS20, it will establish a normally closed control circuit through one set of contacts whereas plug wires inserted in PS18, PB20 will create a normally open circuit. The four sets of contacts associated with each recode selector relay are grouped together and the number of the recode selector indicated in Fig. 41 by the numerals 1 to 50 within the marked off squares on the plugboard enclosing the four sets of contacts.

For the purpose of emitting odd and even numbered pulses which correspond in time and value to the index-point positions in the card columns, there is provided the emitter E15 (Fig. 48S) which is wired so that the even numbered segments 773 are connected to the plug socket PS6 and the odd numbered segments to the plug socket PS7. The emitter E14 (Fig. 48U) on the other hand, is wired so that its "0" to "4" segments are connected in common to the plug socket PS9 and the remaining five segments to the plug socket PS8, whereby one-half of the emitter emits impulses from "0" to "4" while the other half emits impulses from "5" to "9."

Means is also provided for obtaining pulses through the entire period of analysis of the card, that is, from "9" to "12" through a plug socket PS57 (Fig. 48Q).

It is clear that the emitters E1 to E15 and the plug socket PS57 provide sources of impulses of any value of index point positions, odd impulses, even impulses, either half of the values 0 to 9, or all of the values 9 to 12 which may be used to control the recode selector tubes and relays and other pluggable controls. The advantage of the emitters E14 and E15 and the plug socket PS57 is that while the same results could be accomplished by plugging any one of the recode emitters A to M, it would entail a considerable amount of plugging which is simplified by inserting single plug wires in one of the sockets PS6 to PS9, inclusive, and PS57.

The machine is provided with a column selector switch S5 which is a dial type switch and is shown in Figs. 1 and 48U. This switch has both its wiper blade and its contact points connected to the plug sockets PS10, PS11, respectively, so as to be pluggable. Normally, the switch S5 will be used in alphabetical and numerical sequence sorting in which the plug sockets PS11 will be plugged to the plug sockets PS1 for the columns of the card field in which the alphabetic data or numbers are punched in the card while the plug socket PS10 will be plugged to energize the sorting magnet in a manner which will be clear hereinafter. By rotating the switch S5 one notch at a time with the switch so plugged, the operator can, in effect, change the brush position prior to each of the successive runs necessary to place a group of cards in alphabetical or numerical sequence. This switch has the same effect as the manual shifting of the single brush ordinarily used in a sorting machine.

The machine is provided with four columns of digit storage making it possible to store up to four single digit numbers or one four-digit number as limits. The digit storage circuits are shown in Fig. 48S and in the upper half of Fig. 48T and include the digit storage relays R41 to R56 and the tubes V67 to V82 of which the tubes and relays associated with only two columns are shown in Fig. 48S. Four plug sockets PS16 (Fig. 41) are provided, each of which is capable of controlling the storage of a single digit which may be any value from 1 to 9, 0, 11, and 12. Provision is also made in the digit storage for passing a pulse in case the card column is blank.

Each column of digit storage comprises four tubes and four relays, for example, V67 to V70 and R41 to R44 in Fig. 48S which are operated in the same manner as the recode selectors but are not provided with plug sockets for the screen grids. Instead, all of the control grids of the tubes V67 to V70 are connected in common to the plug sockets PS16, but the screen grids are wired to the emitters E15, E16, and E17 through the wires W16 to W19. If the plug socket PS16 is plugged to one of the plug sockets PS1 to receive an impulse at a definite index-point value under control of a perforation in the corresponding card column, such impulse will be delivered to the control grids of all of the tubes V67 to V70. The screen grids of these tubes are pulsed in various combinations under control of the emitters E15, E16, and E17 and a digit is stored in the group of four tubes by causing one or more of said tubes to fire and thereby energizes the corresponding relays of the group R41 to R44. For the purpose of storing values in the tubes, they are assigned the values 1, 2, 4, 8 as indicated in Fig. 48S, and these values are individually stored by rendering the corresponding tubes conductive. For example, if a card were perforated "8," the tube V70 will be fired and the relay R44 energized. It will be noted that wire W19 is connected to the "8" segment of emitter E17. Thus, at the time the "8" impulse is delivered to plug socket PS16 from the card brush and passes to the control grid of tube V70, an "8" impulse will be emitted to the screen grid of the same tube over the wire W19 thereby firing tube V70 and causing the relay R44 to be energized. None of the other relays R41, R42, or R43 can be energized at "8" since at this time only the emitter E15 is effective. Values other than the ones shown are stored by firing combinations of the tubes V67 to V70. For example, the digit "3" will be stored by rendering the tubes V67, V68 conductive at the "3" point in the cycle, when the "3" impulse is delivered to the control grids of all of the tubes V67 to V70. At the "3" point in the cycle, the emitter E15 emits an impulse through its "3" segment and the wire W16 to the screen grid of the tube V67. Likewise, at the "3" point in the cycle, the emitter E16 emits an impulse through the wire W17 to the screen grid of tube V68 thereby rendering both tubes conductive and energizing the relays R41, R42.

One of the characteristics of a thyratron tube or a gas triode or tetrode generally is that once the tube has been rendered conductive, it cannot be rendered non-conductive until the plate voltage applied to the tube is reduced to zero or interrupted. Thus, the digit stored in the group of tubes V67 to V70 will be held for one cycle.

The foregoing description of the manner in which the recode and digit storage tubes are rendered operative assumed that, during the period of pulsing of the grids of the tubes, the plate supply potential is applied coninuously. The plate supply potential is applied to the recode selector and digit storage tubes through the wires W4, W5, and W6 and the timing contacts C8, C9, and C10 (Fig. 48O) which, it will be noted in Fig. 47A, are closed except for a brief period near the end of the cycle to interrupt the plate supply and restore the recode selector and digit storage tubes to grid control.

The contacts of the digit storage relays are arranged in a cascade formation (Fig. 48T) so that energization of these relays singly or in combination to store particular digits will set up series circuits between the common plug sockets PS39 and the plug sockets PS40 which represent the different stored values.

The plug sockets PS40 are arranged in four vertical rows (Fig. 41) below the caption "Digit" with the plug sockets PS40 for the blank positions at the bottom and the plug sockets for the "12" positions at the top, the "12" position plug sockets PS40 being a single plug socket with a single "c" plug socket PS39 in horizontal alignment thereto at the right. The common plug sockets "c" PS39 is connected to an impulse source and, if it is desired to store and emit a given value, the plug socket PS40 corresponding to such value is plugged. Thus, a circuit will only be established through the plugged group when the digit storage relays corresponding to that group are energized to represent the plugged value. For example, in Fig. 48S, if it were desired to close a circuit only when the value "8" in a particular column is sensed, the plug sockets PS16 for the tubes V67 to V70 will be plugged to the plug socket PS1 for the selected column and plug wires will be inserted in the "c" plug socket PS39 and in the "8" plug socket PS40 which appears directly beneath the numeral "8" in the left-hand vertical row (Fig. 41). Under these conditions, the tube V70 will be rendered conductive when an "8" is sensed and energize relay R44. This allows a circuit to be traced from the plug socket PS39 (Fig. 48T) through contacts R41B, R42B, R43B, and R44A, to the plug socket PS40 corresponding to the numeral "8." For any other punched value in the card, no circuit will be traced to the "8" plug socket. Thus, the digit "8" will be stored until the end of the cycle. It is possible, therefore, to plug the digit storage relays in such a manner that a circuit is closed by a card having a specific number from one to four digits is sensed.

Provision is made for group indicating a number from one to four digits derived from the first card passed though the machine by means of a group of relays, tubes, and circuits similar to the digit storage circuits. The group indicate circuits are shown in Figs. 48I and 48Q and include the tubes V51 to V66 and the relays R81P to R96P. These tubes are divided into four groups of four each, each group being provided with a plug socket PS14 and the grids are wired to the emitters E15, E16, E17, through the wires W16 to W19 in the same manner as the digit storage tubes. The contacts of the relays R81P to R96P, however, are not pluggable but are connected in cascade (Fig. 48I) to the print emitter PE (Fig. 48H) through a cable CB5, the wires in the cable representing numerical values corresponding to the values of the plug sockets PS40 (Fig. 48T) except that no provision is made for 11, 12, or blank. These digit storage relays are of the latch type in which the pick up coil, designated with a P in the drawings, operates the contacts which are then latched in operated condition and will remain in that condition until the trip coils, designated with a T, are operated. For example, the pick up coil of relay R81 is designated R81P in Fig. 48Q and the trip coil is designated R81T in Fig. 48E.

During a printing cycle, the trip coils R81T to R96T are energized after the group number has been printed and the group indicate latch relays are restored to normal. Once the contacts have been latched in operated condition, there is no longer any need for keeping the tubes V51 and V66 in conducting condition and for that reason the plate potential for these tubes may be cut off at the same time as the plate potential for the recode and digit storage groups.

Provision is made for entering up to eight digits of values in eight of the sixteen accumulator orders. Since sensing of the cards takes place at a high speed of about 450 cards per minute, it is necessary to effect the actual adding at a slower rate. It will be noticed with respect to the timing chart (Fig. 47A) that the sensing of the numerical values in the card by brushes B takes place over 180° of the card feeding cycle. At 450 cards per minute this is too fast for reliable operation of the accumulator orders and provision is made for delaying the digital pulses which cause the adding so that the actual entry of digits into the accumulator orders is spread over practically the entire cycle. The timing of emitters E25 to E32 shows how the effect of the card pulses is delayed.

The plugboard is provided with eight plug sockets PS17 (Figs. 41, 48I, and 48K) designated "Add PU" arranged in two groups under the small numbers 1 and 2 which control 16 delay tubes V83 to V114 (Figs. 48I and 48K). These 16 tubes are divided in groups of four in a manner somewhat similar to the digit storage and group indicate tubes. The card impulses for each order are delivered by means of a plug wire inserted between a plug socket PS1 and one of the plug sockets PS17, each plug socket PS17 being connected to the control grids of four tubes.

The accumulator mechanism comprises sixteen positions in two groups of eight, each group being divided into two groups of four as shown in Figs. 48J and 48L, respectively, the division being down the center of the sheet in both cases. This forms four four-order accumulators numbered from 1 to 4. Fig. 48I matches Fig. 48J when placed above Fig. 48J and similarly Fig. 48K matches Fig. 48L. In Fig. 48I, the right-hand group of four tubes V83 to V86, the control grids of which are connected to the plug socket PS17 marked "Units," is associated with the units order of the right-hand accumulator captioned "Accumulator 2" in Fig. 48J, whereas the left-hand group of four tubes V95 to V98 is associated with the thousands order of accumulator 2 in Fig. 48J. Similarly the tubes V99 to V102, and V111 to V114 (Fig. 48K) are associated with the units and thousands orders, respectively, of the accumulator captioned "Accumulator 4" (Fig. 48L).

The small numbers 1 and 2 under "Add PU" in Fig. 41 refer to accumulators 2 and 4 when such accumulators are plugged to receive entries directly from the cards or other digital pulse sources. The numbering 1 to 4 for the accumulators in Figs. 48J and 48L is for convenience in explaining the cross footing operations. Accumulators 1 and 3 cannot receive entries from the cards or other digital sources which are pluggable. The accumulators serve two purposes, one to accommodate data from the cards and the other to check the accuracy of the counting and total printing of the units counts.

It will be noted with respect to Fig. 47A, that the emitter E33 (Fig. 48I) is timed to emit pulses almost in step with the emission of impulses from the card brushes B and is wired so that the screen grid of tube V83 for the units order, for example, is impulsed at "9," "7," and "4" over wire W10. Thus, if a card is punched "9," "7," or "4," the screen grid of the tube V83 will be impulsed simultaneously with the impulsing of the control grid under control of a card brush and such tube may be fired at any of these three index-point positions. Tube V84 is impulsed by emitter E33 over wire W9 at "8," "5," and "1" in the cycle. Thus, tube V84 can be energized under control of perforations in these index-point positions. The tube V85 can be energized only on the occurrence of a "2" or "6" perforation and tube V86 only can be energized by a "3" perforation.

In order to understand how the delay is effected by the tubes V83 to V86 for a single order, it first will be assumed that a "9" impulse is delivered to the plug socket PS17 under control of a card brush sensing a column in which a "9" is perforated. At "9" in the cycle (Fig. 47A), the control grid and the screen grid of tube V83 will be energized simultaneously one by the card brush and the other by emitter E33, which emits a pulse at "9" over wire W10, and the tube V83 will be rendered conducting in the same manner as the digit storage and group indicate tubes. This causes current to flow through the plate resistor of this tube which is connected to the wire W4 and causes a voltage drop to be developed across this resistor. It will be noted that the emitter E28, which is associated with this order, has its "9" segment 773 connected by wire W11 to the plate side of the plate resistor for the tube V83. Thus, when the tube V83 is fired, the emitter E28 will also electrically connect the relay R130P to the plate resistor of the tube V83 and cause the relay R130 to be energized at "9." Thus, on the sensing of a "9" hole, the relay R130 is energized immediately and, as will be made clear hereinafter, causes the entry of the value "9" in the units order of accumulator 2.

Now let it be supposed that the brush senses a "1" hole. At the "1" point in the cycle, all of the tubes V83 to V86 will be impulsed at their control grids, but at the "1" point in the cycle, emitter E33 impulses the screen grid of the tube V84 over wire W9. Thus, this tube is fired and the voltage drop developed across its plate resistor is applied to the "1," "5," and "8" segments 773 of emitter E28. At the "1" point in the cycle, however, the brush 774 for emitter E28 is just beginning to wipe over the "4" segment (Fig. 47A). Consequently, the relay R130 is not energized immediately but, recalling that the tube once fired remains fired until the plate potential is cut off, it is apparent that at approximately 300° of the cycle (Fig. 47A), the brush 774 of emitter E28 will engage its "1" segment and transfer the voltage drop across the plate resistor for tube V84 to the relay R130 and the accumulator add circuit will be closed and result in the addition of the digit "1." It is thus clear that the impulse for causing addition of one unit has been delayed from approximately 180° of the cycle to approximately 300° of the cycle. In a similar manner the other values are spread. For example, if the card were punched "5," the tube V84 will again be fired at approximately 90° of the cycle, since emitter E33 which is timed in synchronism with the card sensing brush, closes a circuit to the screen grid of tube V84 at "5" in the cycle. However, the emitter E28 is on the "7" segment 773 at "5" in the cycle and, at approximately 150° of the cycle, the emitter E28 will connect the plate resistor of tube V84 to the relay R130 and cause the addition of "5."

In order to simplify the drawing and avoid unnecessary complexity, only the units and thousands emitters and relays are shown wired to the corresponding tubes, but the remaining accumulator relays R129P, R128P and R158P, R159P are wired in identically the same way and each has an emitter for transferring the plate resistor drop to the associated relay, as noted in Figs. 48I and 48K. The plate resistors of the tubes V83 to V114 are connected to the wire W4 which is controlled by the timing contacts C8 to remove the plate voltage from the accumulator delay tubes at the end of each card sensing cycle exactly as in the case of the digit storage group indicate relays. As will be made clear hereinafter by way of a specific example, referring to a plugboard diagram, the accumulator relays R127P to R130P and R157P to R160P cause the connection of the return magnets RM and the add magnets AM to impulse sources which cause pairs of impulses to be delivered to these magnets to effect the entry of the values which were punched in the card. By spreading the actual operation of these magnets over practically the entire cycle, it is possible to make entries into the accumulator at higher speeds than would be the case if they were to be initially operated synchronously with the sensing of the card and pulsed at every index-point position.

The relays R127P to R130P and R157P to R160P are double coil relays and their hold coils are shown in Fig. 48Q. Once these relays are energized, they close their hold contacts, for example R160B, and energize hold coils, such as R160H, through the contacts C7. It will be noted (Fig. 47A) that these contacts open at the very end of the cycle in which a card is sensed and deenergize any of the accumulator relays which may have been energized in the manner described above.

The machine is provided with a device known as a units and tens distributor which is identified in Fig. 41 under the caption "Tens-units dist.," the plug sockets for which are designated PS33, PS34, PS35 and the pick up plug sockets of which are designated PS12, PS13. This device is shown in Figs. 48U and 48V and includes a group of tubes designated V115 to V122 and V127 connected similarly to the tubes for the digit storage and group indicate functions, with the exception of the tube V127. The units pick up plug socket PS12 (U in Fig. 41) controls the storage of digits by means of the four tubes V119 to V122, the screen grids of which are wired to the emitters E15, E16, and E17 in the same manner as the digit storage tubes. The units tubes V119 to V122 control the units storage relays R171 to R174 while the tens tubes V115 to V118 control the storage relays R175 to R178. The contacts of the tens relays R175 to R178 are connected in cascade formation to the plug sockets PS33, PS34 in the same manner as the digit storage contacts (Fig. 48T). The units relays contacts are wired in cascade in the same fashion as the tens relay but, instead of being connected to plug sockets PS34, are connected to the relays R180 to R188 so that these relays individually represent different digits, as noted by the small numbers to the right of the coils to correspond with similar numbering of the plug sockets PS34 at the left.

The relay R179 is controlled by the tube V127 (Fig. 48U) which is wired with the screen grid connected to the cathode so that only the control grid need be pulsed to fire the tube. Contacts C12 are connected to the plug socket PS12 so that if a card is punched "0," the tube V127 will be fired. For this purpose, contacts C12 (Fig. 47A) are timed to close at "0" in the card sensing cycle.

The contacts of the relays R179 to R188 are arranged in horizontal rows (Fig. 48U) and are electrically commoned vertically in grid fashion as shown in Fig. 48V and the common wires are connected to the plug sockets PS34. Thus, if a "0" is sensed in the units column of a card, the relay R179 will be energized and close all of its contacts R179A disposed in horizontal alignment in Fig. 48V. This will connect all of the plug sockets PS35 in horizontal alignment at the top through the vertical common wires for the contacts of the relays R180 to R188 to the respective plug sockets PS34 and the vertical rows of contacts for the relays R179 to R188 are designated with the numbers 1 to 10 to correspond with the designations of the plug sockets PS34.

If the value "20" were to be punched in the card, the tens relay contacts will close a series circuit from the C plug socket PS33 (Fig. 48V), through contacts R175B, R176A, R177B, R178B, to the "2" plug socket PS34, thence through the third vertical common wire from the left, through contacts R179A, to the plug socket PS35 corresponding thereto. This plug socket is marked "20" in Fig. 41. This circuit will not be closed for any other value than "20." The manner in which this units and tens distributor is used in the handling of practical problems will be made clear hereinafter in reference to a plugboard chart for a specific type of operation.

The plug board is provided with a plug socket PS15 which controls a tube V124 (Fig. 48G). This tube is operated like the digit storage tubes and its screen grid is connected to the "9" segment (Fig. 48S) of emitter E16 whereby relay R23 will be energized whenever a "9" impulse is delivered to the control grid. For this type of operation, the switch S3 must be closed so that the plug connection to the plug socket PS15 may be rendered effective. Ordinarily the plug socket PS15 will be plugged to a card column for the purpose of controlling the machine when that particular column is punched with a "9." The plug socket PS15 is identified under the caption "9M" in Figs. 41 and 48G, meaning "9 Master."

The plug sockets PS53 (Fig. 41) under the caption "SW' provide a means of plugging the switch S4 (Figs. 1 and 48G) which is mounted on the front of the machine adjacent the main control keys and signal lights to control switching of any function which may be plugged to said switch.

The plug sockets for controlling the 60 units counters are designated PS30, PS31, PS32, and PS52, respectively, under the caption "Units counters" (Fig. 41). The wiring of these counters is shown in Figs. 48M and 48N. The plug sockets PS30, PS31 are the "In" and "Exit" sockets when any given counter is to be rendered operative under a selected control impulse source or function. The impulse source which is selected to exercise control is plugged to the plug socket PS30 and the plug socket PS31 is also plugged to complete the circuit through the units counter magnet PM and such counter. Any impulse which is delivered to the plug socket PS30 passes through the units counter magnet CM and exits by way of the plug socket PS31 and the exit plug wire. A single impulse in this manner causes the counter to add one unit in the manner described hereinbefore in the description of the mechanical construction of the counter.

If the units order wheel of any counter, which is designated with the letter "U" in Figs. 48N and 48M, stands at "9," the counter nines contacts CNC immediately above, which are associated with that wheel, will also be closed and an impulse will be sent through the tens magnet CM, designated with the letter T, in parallel with the impulse to the units magnet thereby in effect transferring from the units to the tens order.

The hundreds and thousands orders are designated with the letters T and TH, respectively, and if the lowest three orders stand at "0," the counter pulses will be delivered to all of the magnets CM for that counter in parallel and cause the transfer of a unit to the tens, hundreds, and thousands orders.

The plug stockets PS32, PS52 (Fig. 41) control subtraction and are shown in Fig. 48F. The plug sockets PS32 for a group of fifteen counters are connected in common to the contacts C39 while the plug sockets PS52 are individually connected to the contacts CR3A, CR4A, etc., of the subtraction control relays CR3, CR4, etc., which contacts are arranged in a horizontal row at the bottom of Fig. 48F. When a two prong plug is inserted between any plug socket PS32 and the plug socket PS52 immediately below in Figs. 41 and 48F, closure of the subtraction control relay contacts will cause the subtract relay for that group of counters to be energized. In Fig. 48F only one subtract relay R126, for counters 1 to 15, is shown wired to subtraction control relay contacts. The relays R125, R155, R156 are associated with the other three groups of counters as noted in Fig. 48F, and each has a common group of plug sockets PS32 connected to the contacts C39 and the individual plug sockets PS52 connected to corresponding contacts of the relays CR3, CR4, CR5, CR13, CR14, CR15, CR23, CR24, CR25, CR33, CR34, CR35, CR43, CR44, CR45, exactly as for counters 1 to 15. For example, the subtraction control relay CR3 has four sets of contacts, one of which controls relay R125 as shown in Fig. 48F, while the other three control the three relays R123, R125, and R126.

The relays CR3, CR4 to CR44, CR45, as noted at the top of Fig. 48F, have their coils individually connected to the carriage emitter segments 502 corresponding to columns 1 to 15 of the form selection (Fig. 42). Thus, when the carriages are in a position corresponding to one of the columns numbered 1 to 15 of the work sheet (Fig. 42), one of the subtraction control relays CR3, CR4, etc., will be energized thereby closing the related contacts CR3, CR4, etc., as the case may be, and, if any of these contacts are plugged as described, the corresponding subtract relays R125, R126, R155, R156 will be selected. This, as will be seen hereinafter, will cause the totals in the corresponding counters to be subtracted in the associated cross footing accumulator.

The numbering of the segments 502 at the top in Fig. 48F does not correspond to the numbering of the counter groups, but to the number of columns, reading from left to right in Fig. 42 and counting the amount column as two columns, in which printing takes place by separate cycles.

At the bottom of the plugboard (Fig. 41) is a group of plug sockets of general utility. The plug sockets PS41 are captioned "Bus" and electrically connected in common, as shown by fine lines, but are not connected internally of the machine. These plug sockets are used for the purpose of avoiding split plug wires. For example, a single wire may be plugged to one of a group of the plug socket PS41 from an impulse source and one or more of the remaining plug sockets of the same group can be plugged to a plurality of different controls.

Under the caption "RS" there is a pair of plug sockets PS44, PS45 which are shown in Fig. 48H, and the plug socket PS44 is also electrically connected to the plug socket PS37 which is captioned "Stop" in Fig. 41. When a double plug is inserted between PS44 and PS45, the machine will stop and a card will be rejected. The plug socket PS27 can also be separately plugged to a control to cause the machine to stop at any desired condition.

Under the caption "AC" are the plug sockets PS46, PS47 (Figs. 41 and 48A) which are plugged with a double plug to keep relay R147 energized when accumulating operations are being performed.

The plug sockets PS48, PS49 captioned "AP" (Figs. 41 and 48A) are connected by a double plug whenever the machine is to automatically perform a print cycle at the end of a run of cards.

The plug sockets PS50, PS51 captioned "AS" (Figs. 41 and 48C) are plugged with a double plug whenever it is desired to automatically restart the feeding of cards after a sequence of printing cycles has taken place.

The readout commutators for units counter 60 (Fig. 48D) in the units, tens, and hundreds orders are individually pluggable both as to the common strips 686 and the individual segments, the plug sockets PS42 corresponding to the common strip and the plug sockets PS43 corresponding to the individual segments. In Fig. 41, the three pluggable orders of counter 60 are shown in the lower right-hand corner above the three letters C and the values of the respective segments 685 are identified by the small numbers "0" to "9" above the short connecting lines joining the double plug sockets. This arrangement makes it possible to obtain a control pulse when counter 60 reaches any value up to 999 determined by plugging the common strips 686 and the segments 685 for this counter in a series relation. For example, suppose it were desired to obtain a control pulse when counter 60 reached the value 987. The plug sockets PS43 corresponding to 9 in the hundreds order will be plugged to the plug socket PS42 for the common strip 686 in the tens order. Another plug wire will be inserted between the "8" plug socket PS43 for the tens order and the common plug socket PS42 for the units order. The common plug socket PS42 for the hundreds order and the "7" plug socket PS43 for the units order will be plugged to the impulse source and the controlled function, respectively. When counter 60 reaches 987, connections will be established in series through the units, tens, and hundreds orders to close a circuit which may be utilized for any desired control purpose. An illustration will be given hereinafter in reference to a plugboard diagram.

There is a group of plug sockets which can best be explained by way of specific examples. These include the group under the caption "Count," involving plug sockets PS21, PS26; "Plug to shunt," PS27; "Sort," plug sockets PS54, PS55, PS56; those designated "1–2–3," PS22; "CS," PS23; "COMP," PS24; "CC," PS25; "CE," PS36; "SH," PS28; "E," PS38; and "GI class," PS58 to PS61. These plug sockets are associated with controls which are internally wired to relay contacts which exert certain control functions, particularly during counting, sorting, comparing, and editing operations and their mode of operation and utility can best be brought out by way of specific example.

The plug sockets "SP," PS62, and PS63, when plugged, place the main print control circuit under control of the summary punch hopper and card lever contacts.

It will be convenient and easier to understand the operation of the machine hereinafter with reference to the plugboard charts if the various plug sockets which have been described so far in detail with their associated circuit connections and tubes are considered as impulse emitting or impulse receiving devices. The description of the operation with respect to specific examples will be simplified in some cases by tracing many of the circuits with reference to the plugboard, considering the different plug sockets as either impulse emitting or impulse receiving sources. This will save a great deal of repetitious tracing of circuits which in the case of the brush circuits particularly, would involve repeated retracing of the circuits through invariably operating or normally closed contacts such as the circuit breakers LC5, LC6 and the card lever contacts CLR2B (Fig. 48Q) which do not of themselves exercise any special control in the normal operation of the machine once the cards have started feeding.

The machine is provided with a power supply for the relays and electronic tubes which is connected to a power line through the main switch S1 (Fig. 48A) and comprises the power transformer T. This power transformer is provided with two full-wave, center-tapped, secondaries one of which develops 44 volts between the center tap and the ends of the secondary coil, the other of which develops 37 volts. These two secondaries are connected to the rectifiers R1, R2 in full-wave fashion to provide the positive D. C. voltages of 55 volts and 48 volts, respectively. The output of the two sets of rectifiers R1, R2, in each case, is delivered to a bank of fuses F which are bracketed in Fig. 48A with the letters P1, P2 designating positive potential source 1 and positive potential source 2. Both center taps of the two secondaries of the transformer T are connected through main fuses to a group of binding posts BP which are bracketed under the letter N1 and marked 0 volt. The majority of the relays, magnets, and tubes which control the operation of the machine are grounded to the points N1 through various of the binding posts and, in the different sheets comprising the wiring diagram, these ground connections are indicated by an arrow and the letter N1. In similar fashion, the different connections to the potential sources P1 and P2 are designated with these letters and numerals, where necessary. Thus, in Fig. 48B for example, the wiper of the switch S2 is connected to potential source P2 so that all of the relays controlled by the switch S2 are, in effect, connected between the points N1 and P2 of the power supply for operation by 48 volts D. C.

Besides the rectifiers R1, R2 which provide the principal current for operating the tubes, magnets, and relays, there is provided the negative potential source marked N2 (Fig. 48A) rectified by R4 to furnish −48 volts used for the grid bias potential and the negative potential source N4 rectified to −61 volts by R3, R4, R5 which is used for the grid bias potential of the tubes V129, V130 (Fig. 48G) which control the sorting control magnet SCM.

The cathodes of all of the electronic tubes except V129, V130 are connected to the N1 negative source and the screen and control grids of the bulk of the tubes are connected to the N2 source so that the grids are biased at −48 volts negative under normal conditions except the tubes V129, V130 in which the control grids are biased to −61 volts, as aforesaid and the cathodes connected to the N2 source.

All of the tubes except the tubes V129, V130 controlling the sorting control magnet SCM, are identically wired in respect to the screen resistors and the screen grid resistors. For example, the recode tube V1 has its control grid connected to the plug socket PS2 by a 100,000 ohm resistor and the aforesaid plug socket is connected to the wire W21 and source N2 through a 50,000 ohm resistor. Both grids of tube V1 are bypassed to the cathode with .002 mfd. condensers to prevent spurious responses from firing the tube. The plug socket PS3 also is connected to wire W21 and source N2 through a 50,000 ohm resistor and to the screen grid of tube V1 through a 100,000 ohm resistor.

The series plate resistors for the accumulator delay tubes V83 to V114 are 4,700 ohms the screen grids and control grids, like V1, being provided with 100,000 and 50,000 ohm resistors and .002 bypass condensers.

The tubes V129, V130 have their screen grids connected directly to the cathode while their control grids are wired to negative source N4 through 100,000 ohm and 50,000 ohm resistors as for the other tubes. Each of these tubes has a series plate resistor of 1000 ohms, each resistor being shunted with 20 mfd. condenser. While two tubes are shown operating in parallel, this is done because of the heavy current requirements for the sorting magnet and the two tubes could be replaced with a single tube of larger capacity, if desired. On account of the small size and greater compactness of the 2D21 thyratron, it is more convenient to use two of these tubes in parallel than to use a large tube of greater current capacity.

Because of the extreme complexity of the wiring making a great many criss-cross connections necessary between various groups of relays, it is impossible to show all of the wire connections complete on the wiring diagram without considerable confusion. In order to make the wiring clear and provide quick reference to the points where the connections are made, these criss-cross connections from one sheet to another are designated with an arrow and a reference to the figure and circuit element on the second sheet at which the connection is made and on the second sheet a cross reference is made back to the first sheet so that all connections may be readily traced from one sheet to the other with a minimum of difficulty.

For example, in Fig. 48A, the contacts CR6A of relay CR6 are connected to the timing contacts C22 which are found in Fig. 49P which also has a cross reference note back to Fig. 48A to facilitate tracing the circuit from wire W1, through the contacts C2, contacts CR6A and the coil of relay CR6 to wire W2.

A certain number of the relays are single coil relays and are designated with the letter R plus a numeral which denotes that the coil stands alone and is not connected with any other coil. Other relays are double coil relays in which one coil is usually used to pick up the relay and the other coil to hold it. The pick up coils for such relays are designated with the letter R, a numeral, and the letter P, signifying "pick up"; and the hold coil is designated with the same numeral and the letter H. For example, in Fig. 48E, relay R25P is a double coil relay, the hold coil of which is designated R25H, in Fig. 48D. Certain other relays are of the latch type in which a pick up coil operates the contacts to a latched position, in which they are held closed or open, as the case may be, and subsequently a trip magnet is energized to release the latch and restore the contacts to their original condition. The pick up coils of relays of this type are designated with a P and the trip coils are designated with the letter T instead of the letter H. Thus, the relay R12P (Fig. 48F) has its trip coil designated R12T.

The initial starting condition and the stopping of the machine when cards run out or the stop key is operated will first be described without reference to any particular type of operation in order to explain how the machine is started in operation and stops operation under the various conditions that may cause stoppage such as stop key depression, exhaustion of the cards from the hopper, or a pocket becoming too full.

The cards are placed in the hopper H face down with the 9's at the left (Fig. 5). When the main switch S1 is closed to apply power to the machine, it is desirable that the application of plate potential to the electronic tubes be delayed approximately 30 seconds in order to give time for the cathode heaters to heat. Current flows during this warm up period from the positive source P2 (Fig. 48A) through the normally closed contacts TRC of the thermal relay TR and the heater element H of this relay, to wire W2. The heater, through thermostatic action, causes the contacts TRA, TRB, and TRD of the thermal relay to close after the desired interval of time and the coil TR of this relay holds such contacts in closed condition as long as the main switch S1 is closed. The contacts TRC open and cut off the heater H, allowing the heater to cool, so that the contacts TRA, TRB, and TRD can immediately reopen if the switch S1 is opened.

The closure of contacts TRD connects the wire W1 to the potential source P2 thereby causing the idling light IL (Fig. 48B) to become lighted through contacts R199A, R200A (Fig. 48B) and indicate to the operator that the machine is in readiness for operation. This insures that the operator will not attempt to start the machine before the heaters of the electronic tubes have reached full heat.

When the starting key STK (Fig. 48C) is operated, the relays R8T, R19H are energized and the contacts of R19B close to keep the relays R19H, R8T energized through the contacts CLR1A, R18B. Contacts R19A close a circuit to relay R22 from line wire W1, through contacts R198B, R19A, R6A, and relay R22, to line wire W2 which is connected to the source N1. The relay R22 through its contacts R22C (Fig. 48A) closes a circuit to the motor relay MR between the line wires W1, W2. The contacts MRC close and start the main drive motor M1 of the machine. This starts the high speed shaft 117 turning and thereby drives the high speed emitters and timing contacts the timing of which are shown in Fig. 47A. Since the print clutch magnet PCM has not been energized, the low speed timing contacts shown in Fig. 47B and the print emitter PE will remain idle. The first card will be ejected from the hopper H and will close card lever contacts CLC1 (Fig. 48C) and these contacts will remain closed as long as cards continue to feed through the machine.

The card lever relay contacts CLR1A (Fig. 48C) close and charge the condenser C through the 1,000 ohm resistor and this condenser maintains its charge as long as cards continue to feed. The function of the condenser C will be brought out hereinafter in discussing the stopping conditions when cards become exhausted from the hopper H and feeding thereof is stopped.

The relay R22 will be kept energized through its contacts R22A (Fig. 48C) over a circuit which traces from line wire W1, through contacts CLR1A, FPC, R18C, R25B, R22A, and relay R22, to line wire W2 thus maintaining the motor relay MR in operation. The first card is brought into position where the brushes B start to sense the index-point positions in the card columns which will start at the beginning of the second card feeding cycle.

The contacts CLR2B (Fig. 48Q) connect the common brush CB to the positive source P1 through the circuit breaker contacts LC5, LC6, which pulse the common brush and the wire W3 with short overlapping impulses coinciding with the index-point positions of the card (Fig. 47A). Wire W3 is the common wire for the emitters which control the application of potential to the screen grids of most of the electronic tubes and, through the timing contacts C8, C9, C10, and wires W4, W5, W6, the plate potential for the electronic tubes. Thus, the electronic tube circuits are conditioned for operation in response to impulses from the card sensing brushes. The starting key STK may be released since the motor relay will now be kept energized through the contacts R22C as long as cards continue to feed.

It will be assumed that the machine is plugged for automatic starting of card feeding after each series of printing operations. Consequently, a plug will have been inserted in the "AS" plug sockets PS50, PS51 (Figs. 41 and 48C). The relay R19P will be pulsed during the last printing cycle of a series provided the hopper H contains cards. This circuit is traced from source P2 (Fig. 48H), contacts C35 to plug sockets PS50, PS51 (Fig. 48C) through the double plug contacts HC, R14A, and relay R19P, to line wire W2, assuming contacts R14A closed.

The reenergization of the relay CLR1, opening contacts CLR1A breaks the holding circuit for relay R19H. Consequently, unless the automatic starting control is plugged, operation of the machine must be resumed by manual depression of the start key.

The relay R14P, as will be explained hereinafter, is energized when the cross footing operations have been successfully concluded and accumulator 4 stands at "9999" at the end of a series of cross footing operations. Consequently, assuming the operation of the machine to be correct as to the cross footing operations, and assuming that cards remain in the hopper, the relay R19P will be impulsed to automatically start the feeding of cards. The relay R14P is a latch type relay which, once energized, remains in closed condition until the trip coil R14T is energized. The contacts C35 are operative only during a printing cycle, and are normally open when the printing mechanism is at rest with the clutch latched in the normal position.

If the hopper should become exhausted of cards, the contacts HC will open and prevent the energization of relay R19P and it will require a manual operation of the starting key STK to restart the feeding of cards.

During a second card feeding cycle, the card lever contacts CLC2 (Fig. 48C) close and energize last card relays LCR1, LCR2. The primary purpose of the relays LCR1, LCR2 is to maintain the control circuits while the last card is passing the sort checking inserts 145a and its destination is being selected by the sorting control magnet.

The energization of relay R19H, when the start key STK is operated, also closes contacts R19C (Fig. 48D) thereby impulsing the card feed magnet CFM2. This will unlatch the card lifter mechanism in the event that it is in latched condition and allow the cards to fall on the picker to permit the first card to be advanced from the hopper. When feeding of cards is started, the relay R22 opens its contacts R22B (Fig. 48D) and prevents energization of the card feed magnet CFM1, thereby preventing operation of the card lifter mechanism, when contacts R19D reclose. Thus, as long as the machine is feeding cards neither of the magnets CFM1, CFM2 can be energized except under certain special controlled conditions which are covered by the group of relay contacts (Fig. 48D) in parallel with the contacts R22B.

There are several conditions which might cause card feeding to stop through the operation of the magnet CFM1. One of these conditions is the blowing of a fuse in either of the fuse groups. The fuses F (Fig. 48A) are of the type which expel a spring contact when the fuse wire melts and connects the common buses for the rectifier sides of the fuses to the relays R199 or R200, according to the group in which the fuse blows. This is effected through the medium of a bus bar BS. The energization of relay R199 or R200 closes the contacts R199B or R200B (Fig. 48D) and thereby energize the card feed magnet CFM1 to render the card lifter mechanism operative. The opening of contacts R199A, R200A extinguishes the idling light IL and indicates that the fault is a blown fuse.

When the blown fuse is replaced, the machine may be manually restarted by means of the key STK and this will result in the energization of relay R19P which closes contacts R19C (Fig. 48D) to energize the magnet CFM2 and disable the card lifter mechanism, permitting the card picker to feed a card from the hopper.

Under certain conditions, it is desired to cause the machine to stop when a master card punched with a "9" in a predetermined column is sensed by the brush for that column. When this is desired, the "9M" plug socket PS15 (Figs. 41 and 48G) is plugged to the card brush sensing the column in which the "9" occurs and switch S3 is closed. The tube VI24 is rendered operative by a joint "9" impulse from the card and from the emitter E16 (Fig. 48S) and relay R23, when energized, closes the contacts R23C (Fig. 48D) to stop the feeding of cards.

For certain reasons which will be made clearer hereinafter, it is desired to limit the operation of the machine in a single run to less than 10,000 cards particularly in view of the limitation of the capacities of the units counters to four digits. Accordingly, provision is made to stop feeding of cards before the total number of cards counted reaches 10,000. Units counter 1 normally will be used to count the total number of cards passing through the machine as a check on the operation of the machine. As shown in Fig. 48D, the nine segment 685 of the thousands, hundreds, and tens orders and the common strips for these orders are wired so that when these three highest orders stand at "9" and the lowest order at "7," a series circuit can be established through to the nines segment of the tens order, the common strip 686 for the units order, and the "7" segment 685 for that order. This causes the relay R7P to be energized whenever the count in units counter 1 reaches 9997.

The circuit for the energization of relay R7P is traced as follows: positive source P2 (Fig. 48V), contacts C22, the common strips 686 Fig. 48D), segments 685, and the brushes 688 for the three highest orders of units counter 1 (Fig. 48D); the common segment 686, and "7" segment 685 for the units order, and relay R7P, to line wire W2. Relay R7P closes the contacts R7C (Fig. 48D) to energize the card feed magnet CFM1 and prevent the picker from advancing another card from the hopper.

Under certain conditions, the sorting operation is checked to insure that a card will actually be destined for the pocket corresponding to the operating impulse to the magnet SCM. Stoppage when this control function is exercised by the relay R25P in the manner to be made clear hereinafter. Relay R25P closes contacts R25C with the same effect as contacts R7C.

It is also possible to plug the machine to cause automatic stoppage under a prescribed condition determined by plugging of the machine in various ways. This can be effected by means of the "RS" ("rejected stop") plug sockets PS44, PS45 (Figs. 41 and 48H) or the "Stop" plug socket PS37. When the reject stop plug sockets PS44, PS45 are connected by a double plug and the relay R141P fails to energize in accordance with the control exercised thereon, a circuit will be established from positive source P2 (Fig. 48H), through the contacts CLR2A, C19, LCR1B, R141A, the relay R8P. This closes the contacts R8B, (Fig. 48D) and effects the operation of the card lifter magnet. The coil R8P will also be energized when an impulse source on the plugboard is plugged to the plug socket PS37. As will be made clear hereinafter, the relay R141P fails to energize under certain conditions when it is desired that a card be rejected and it may be desired to inspect this card immediately before continuing the running of the remaining cards and for this reason the RS control is provided.

When the RS and STOP controls are effective to energize relay R8P and stop card feeding, contacts R8A close and the iditing light EL (Fig. 48B) becomes lighted.

The print light PL also becomes lighted when card feeding stops under either 9997 or 9M control provided the two carriages are in the returned position holding the switch MS1 (Figs. 20 and 48B) closed. The carriages should be in the position of Figs. 2A, 2B, and 20 when card feeding operations are taking place. The print light tells the operator that the carriages are in proper position for the first print cycle of a series.

Mention was made of the fact that the condenser C (Fig. 48C) is charged when the card lever relay contacts CLR1A close and that it remains charged as long as cards continue to feed. At the end of a run, when the last card leaves the hopper and eventually the card lever contacts CLR1 open, the charging potential for condenser C is removed. Condenser C immediately starts to discharge through a closed circuit including the 1000 ohm resistance, the contacts FPC, R18c, R25B, R22A, and the coil of relay R22. The value of the charging resistance and the condenser C, which is very large, is chosen such that the relay R22 will be kept energized long enough for the last card to pass from the sort checking station to the "9" pocket before the relay R22 is deenergized to permit the motor M1 to stop by deenergizing the motor relay MR.

Whenever any sorting pocket becomes too full of cards, the full pocket contacts FPC (Fig. 48C) open and deenergize the relay R22 immediately thereby stopping motor M1 and preventing further feeding of cards.

The machine may also be stopped by depressing the stop key (Fig. 48A). This energizes the relay R18 and opens the contacts R18C (Fig. 48C) to deenergize the relay R22.

The energization of the relay R25P which is responsive to failure of a card to pass under the proper blade 114 in checking the sorting operation not only operates the card feed magnet CFM1 but also, by opening the contacts R25B (Fig. 48C), stops the feeding of cards.

When it is desired to manually initiate a printing operation, the print key PK (Fig. 48A) is operated. This closes a circuit from the line wire W1 (Fig. 48A), through the print key contacts, contacts R15A, R198A, LCR2C, and the relay R21, to line wire W2. The contacts C46 are normally closed when the print mechanism is not in use, consequently, a holding circuit can be established for the relay R21 through the contacts R21A and C46. Since the shaft 216 (Fig. 15) is always turning when the machine is running at all, contacts C1 close and energize the relays R6, R17 (Fig. 48A) and the print clutch magnet PCM in parallel. The relay R21 closes contacts R21B to energize relay CR6. Contacts CR6B close and energize motor relay MR to start motor M1.

As a result, the print clutch is engaged in the manner described hereinbefore and makes one revolution thereby operating the type bars and other mechanisms associated with the printing mechanism, including the print emitter PE. The manner in which the type bars are controlled to effect printing will be described in detail hereinafter with reference to a specific example.

If the summary punching mechanism is being used, the circuit for starting the printing operation is dependent upon the punch hopper contacts PHC (Fig. 48W) and the punch card lever relay contacts PLCRB which are in series parallel with the contacts R198A. When the summary punch is in operation, a double plug is inserted in the SP plug sockets PS62, PS63 thereby energizing relay R198. This opens the contacts R198A and puts the relay R21 in series with the punch hopper contacts PHC and the punch card lever relay contacts PCLRB making it impossible to effect a printing operation unless cards are present in the punch hopper and punching station.

When the automatic print or "AP" plug sockets PS48, PS49 (Fig. 48A) are plugged, an automatic printing cycle will be initiated whenever relays R23 or R7 are energized under control of a "9" punched master card or when the card count reaches 9997.

Whenever cards become exhausted or the card feed magnet CFM1 becomes operative to prevent the ejection of cards from the hopper H, the cards remaining in course of feed through the machine will be fed until the card lever contacts CLC2 (Fig. 48C) open which will occur near the middle of a cycle in which the last card is passing the sort checking station and having its destination determined by the sorting control magnet. After the last card has passed this point, the machine will stop, but the cards still in transit to the pockets will be conveyed thereto owing to the effect of condenser C.

When the card lever contacts CLC1 open, the relays CLR1, CLR2 will be kept energized for a short period longer due to a holding circuit maintained through the contacts C24. Then contacts CLC2 open and deenergize relays LCR1, LCR2. The contacts LCR2C (Fig. 48A) close as a result of the deenergization of the relay LCR2 and automatically initiate a printing cycle provided the AP plug sockets PS48, PS49 are plugged. If not, a manual printing cycle must be initiated by means of the printing key PK. The relay R7 is a latch type relay which remains in latched condition until its trip coil R7T (Fig. 48E) is energized. The relay R23 is controlled by the tube V124 which, once fired, under the control of a "9" punched card to effect the operation of the card feed magnet CFM1 remains in fired condition until relay R19 is energized to open the contacts R19E. The relay R19 is deenergized as soon as the relay CLR1 is operated in consequence of the first card passing the brushes B. Consequently, both the relays R7, R23, if energized, are maintained with their contacts in actuated position until either the trip coil R7T (Fig. 48E) is energized or relay R19 is energized in restarting the machine. When the printing mechanism is started either under control of the print key PK or the contacts LCR2C, the relay R21 is energized, closing contacts R21B to energize the relay CR6 (Fig. 48A) and motor relay MR to start motor M1 and engage the printing clutch.

Unless relay R142P is energized, holding contacts R142P (Fig. 48A) open, or the stop relay R18 has been energized by operation of the stop key SPK, holding contacts R18A open, the printing mechanism will operate continually for a series of cycles under control of the carriage emitter 502, 503, 506. The operation of relay R142 to stop the series of printing cycles at the proper point will be explained after the operation of the machine during these successive printing cycles has been explained.

It will now be assumed that a series of cards has been passed through the machine and that certain desired facts have been counted by the units counters and that data has been entered in accumulators 2 and 4 under control of the card brushes B.

The card feeding has stopped and a sequence of printing cycles initiated either manually or automatically as described. During this sequence of printing cycles, the totals in the four accumulators, the group number, and the totals in the sixty units counters will be printed. Finally, the totals in the accumulator will be rolled to effect a final check on the counting operations. After the first two cycles, the accumulators are reset and thereafter are used in conjunction with the contacts CRC controlled by the type bars to enter the totals of the counters in the accumulators as said totals are printed. It is these last totals which are rolled to effect a check. Since this sequence of printing cycles is a fixed sequence which is independent of the plugging of the machine, it now will be described in detail.

It will be assumed that the carriages are both in their extreme right-hand positions with respect to Figs. 2A and 2B or their extreme left-hand positions with respect to Fig. 20 whereby the contacts MS3 will be closed and the contacts MS2 are held transferred as shown in Fig. 48F. It was explained above that the relays R6, R17 are energized when the printing mechanism is started by means of the print key PK or the card lever contacts LCR2C. This causes the contacts R17A to close (Fig. 48F) and permit a circuit to be established by the contacts C38 which is traced from positive source P2, through contacts C38, R17A, R142D, or R16B, according to the condition of these relays R15C, contacts MS2, the emitter strip 503, emitter brushes 506, and the "1" segment 502 to relays R124 and R154.

The closure of contacts R6D, R21D, and R17C (Fig. 48G) causes the tube V123 to be fired due to the simultaneous application of plate potential, from source P1 through contacts R17C and relay R57, and screen potential from source P1, contacts C8 (Fig. 48O), R201G, R21D, and R6D. This energizes relay R57 and causes all of the contacts R57A to close (Fig. 48E). Relay CR134 (Fig. 48F) is also energized through the contacts MS3 and closes its contacts CR134C (Fig. 48E). The contacts MS3 remain closed during the first three printing cycles in which the brushes 506 are in contact with the first, second, and third segments 502 (Fig. 48F). of the carriage emitter 502, 503 during printing of the accumulated totals and the group number. The relay R17 closes its contacts R17D (Fig. 48H) and relays R124 and R154 close their contacts R124A (Fig. 48J) and R154A (Fig. 48L). This connects the common strips 636 of accumulator 1 to the cable CB1 and the common strip 636 of accumulator 3 to the cable CB3, thus conditioning printing banks 1 and 3 for printing the totals from accumulators 1 and 3 in the extreme left-hand columns (Fig. 42) to the left of the vertical dotted line on the two sections of the record sheet.

Thus, during the first printing cycle when the contacts C29, C30 close in alternation, a series of total printing pulses are delivered to the print emitter PE which are traced from positive source P2, contacts C29, C30 (Fig. 48H), the brush 786 of print emitter PE, the emitter segments 785, the contacts R148G of relay R148, the wires leading to the segments 635 for the readout commutators of accumulators 1 and 3 (Figs. 48J and 48L), thence through the readout brushes 688 and the common strips 636, the contacts R124A, R154A, the cables CB1 and CB3, the print magnets PM (Figs. 48M and 48N) for print banks 1 and 2, respectively, to wire W2 and negative source N1.

This causes the total standing in accumulators 1 and 3 to be printed in the extreme left-hand columns of the two form sections, to the left of dotted line in Fig. 42, only the first section being shown in Fig. 42.

The printing of a total in this manner is well known in the art and need not be described in detail. It will be understood that if any readout brush 638 for any order of any of accumulators 1 and 3 stands at a predetermined value, it will permit a digital pulse corresponding to that value to be emitted through the proper wire and impulse the proper printing magnet PM at a time when the type bar is in such position that the corresponding type is about to reach the printing line and will cause that type to be arrested at the printing point.

It will be understood, of course, that, when the motor M1 is started in the manner described and the shaft 220 is coupled thereto, the type bars 161 start to rise and move in such a timed relation to the rotation of the emitter PE that, as the successive values 9, 8, 7, etc., are emitted by the emitter PE, the magnets PM will be energized at times in correspondence to the values standing on accumulators 1 and 3.

During this first printing cycle, the contacts C44 close and energize the escapement solenoids ES (Fig. 48D) for both carriages through contacts R143A. During the early part of the first printing cycle, when contacts C39 close, the relay R143P is energized closing contacts R143A thereby permitting the contacts C44 to close the circuit through the solenoids ES toward the end of the first printing cycle. This causes the two carriages to escape to the second columnar position (Fig. 48F) and energize the relays R123, R153, which perform the same functions with respect to accumulators 2 and 4 as the relays R124, R154 do for accumulators 1 and 3 and the second cycle will be a repetition of the first with the exception that accumulators 2 and 4 will control print banks 1 and 3 to print the totals standing in accumulators 2 and 4.

During the second cycle, in which the totals from accumulators 2 and 4 are printed, solenoids ES are energized and the carriage escapes to the third column and energizes the relays R37, R38, R39, and R40 (Fig. 48F). During the second cycle, when relays R123, R153 are energized, the contacts C48 (Fig. 48H) close and energize the zero relays R191, R192 in parallel with the relay R153 over wire W24.

At zero in the second printing cycle, the print emitter PE closes circuits through its zero segment 785, the contacts R191A, R192A (Fig. 48H) and the cables CB6, CB7 to cause the printing of zeros in any position in which a type bar has not printed a significant figure. This is not necessary during the first cycle as the zero pawls 167 automatically cause printing of zeros to the left of a significant digit. Accumulators 1 and 3 take the overflow from accumulators 2 and 4 so that the totals in 1 and 2, and 2 and 4 also are really a single total.

The energization of the relays R37, R38, R39, R40, when the brushes 506 connect the emitter strip 503 with the third segment 502, conditions the machine for printing the group indication which is stored in the relays R81P to R96P in the manner described above in connection with the description of the plugboard. The group indicate circuits are shown in Fig. 48I and it will be assumed that the contacts of the relays R81P to R96P have been set up to store as many as four digits according to a form of binary system. Consequently, in each of the four orders shown in Fig. 48I identified by the words "Units," "Tens," etc., there will be a single closed circuit extending from the group of wires in the cable CB5 to CB4 which lead to the print magnets PM (Figs. 48M and 48N).

The closed denominational contacts of the relays R37 to R40 are connected in parallel to the group of four wires W42 leading to the contacts of relays R81P to R96P so that the same four-digit group number will be printed by all four of the printing banks. It will be noted, with reference to Fig. 42, that there are two columns headed "Sort." In each of these columns is printed the same group number and, since there are two sections to the report, it is necessary to print the group number four times. This form, as shown by the dotted lines in the center, is separable so that the two halves of each form section may be torn apart in each case making four separate forms having fifteen vertical rows of totals.

The cable CB5 connects to the print emitter PE (Fig. 48H) which functions during the third cycle to emit pulses through the contacts of the group indicate relays R81P to R96P in the same general manner as through the accumulator readouts in printing totals. For example, if the value "6" were stored in the units order (Fig. 48I), the wire identified by the small number "6" at the right will be connected by contacts R83C and R82C to the units wire W42 which is connected to all of the units magnets PM through units order contacts R37A to R40A. At the "6" time in the printing cycle, a pulse will travel through the emitter PE (Fig. 48H) and the "6" wire (Fig. 48I), through contacts R83C, R82C, R81B, R84D, units wire W42 and, in parallel through the extreme right-hand contacts R37A, R38A (Fig. 48J) and R39A, R40A (Fig. 48L), to all of the units print magnets PM (Figs. 48M and 48N), through the cables CB1 to CB4, to line wire W2. This causes the value "6" to be printed in the units order of all of the Sort" columns on the work sheets. In similar fashion other digits will be printed by the remaining print magnets. Zeros are printed by a separate circuit from the zero segment 786 (Fig. 48H) of the print emitter PE, through the zero relay contacts R191A, and cable CB6 which, it will be noted in Fig. 48J, has individual wire connections to both the contacts R123A and R124A. These zero impulses travel through the different wires of the cable CB6 to the left in Fig. 48J and thence upwardly to the contacts R37A and from there to the proper print magnets PM to cause zeros to be printed.

During the third cycle, the carriage escapement solenoids are energized, and the carriage escapes to the fourth segment 502 in readiness for printing the total of the first group of four units counters. Before this takes place, however, it is necessary to reset accumulators 1 to 4 as these accumulators are now to be used to check the totals on the units counters. Resetting is accomplished by advancing the accumulator wheels to zero by a series of pulses similar to adding pulses. It will be remembered that relays R119, R120, R148, R149, and R150 (Fig. 48F) were energized in parallel with relays R37 to R40 prior to beginning the third cycle in which the group number was printed.

Relays R119, R120, close their contacts R119B, R120B (Fig. 48J) and thereby connect the return magnets RM of accumulators 1 and 2 to the common strips 636 of the readouts for these two accumulators through the contacts R124B, R144F and R123D, R146F. Also (Fig. 48H), the relay R148 inverts the wiring of the print emitter PE so that it now emits the "10" complements of the digits 1 to 9. Thus, at "9" in the cycle, the emitter PE closes a circuit to the "1" wire whereas at "1" it closes a circuit to the "9" wire.

The relays R149 and R150 have the same effect in Fig. 48L as relays R119, R120 in Fig. 48J, the return magnets RM for accumulators 3 and 4 being connected to the common strips 636 of accumulators 3 and 4 through the contacts R150B, R145E, R154B, R149B, and R153C, respectively.

The reason for the inversion of the wiring to the readouts of the accumulators is that, if an accumulator wheel stands at "1," as the most extreme possibility, it requires nine pairs of impulses to magnets RM, AM to rotate the accumulator wheel to zero. If the emitter pulses were used in the normal way and a wheel stood at "1," the "1" impulse for resetting the accumulator wheel would occur at "1" when there is only one unit of time on a digital basis remaining to rotate the wheel to the zero position which, of course, would set the wheel at "2" and not at zero.

With the inverted emitter wiring, if any accumulator wheel stands at "1," its return magnet RM will be pulsed at "9" by a circuit which may be traced from the emitter PE (Fig. 48H), through the "9" segment 785 to the emitter wire at the bottom (Figs. 48H, 48J, and 48L) and thence it will seek out the orders which are standing at "1" and the readout brushes 638 will close a circuit between the common strip 636 and the "1" segment 635 in each case and the pulses will be emitted downwardly through the contacts R124B, R144F, and R120B in the case of accumulator 1; R123D, R146F, and R119B in the case of accumulator 2; R154B, R145E, and R150B in the case of accumulator 3; and R153C and R149B in the case of accumulator 4, to the return magnets RM of all of the orders in which the wheels stand at "1," these impulses being transmitted through the normally closed contacts R193B of accumulator 1, R194B of accumulator 2, R195B of accumulator 3, and R196B of accumulator 4.

As explained in the description of the accumulator, this will draw back the arms 603 (Fig. 28) and immediately thereafter the magnets AM will be impulsed by a circuit as follows: source P2, contacts C31, C32 (Fig. 47H), contacts R148C, R144D, R146D, contacts R126A, R125A, R156A, R155A, the wires W29 to W32 and thence through all of the magnets AM (Figs. 48J and 48L) which correspond to the orders in which a "1" stood on the wheel. These pulses occur immediately after the pulses which energize the magnets RM.

The initial steps of rotation of the wheels of the accumulators which stood at "1" causes their contacts AC to close as described above in reference to the mechanical construction of the accumulators. The continued rotation of the emitter PE delivers a succession of further impulses to the magnets RM for those orders which stood at "1" and, after each such pulse through a magnet RM, a corresponding pulse is delivered to the magnet AM over one of the wires W29 to W32 until nine pairs of impulses have been delivered to each magnet. This will be sufficient to rotate the accumulator wheels to zero. This, of course, will be reached at about the middle of the cycle (Fig. 47B) when the emitter PE ceases to emit pulses. The magnets AM will be impulsed idly a few times by the contacts C29, C30, but will have no effect.

Any intermediate values at which the accumulator wheels stand will be increased by the amount of the tens complement of that value which will result in the turning of the wheels to zero by similarly traced circuits.

During the third cycle, the escapement solenoids ES are energized as before and the carriage escapes to carry the brushes 506 onto the fourth segment 502. From this point, a series of fifteen identical cycles takes place to print the totals standing on the units counters four at a time, and to enter the totals as they are printed in accumulators 1 to 4 which now stand at zero for this operation. When the carriage moves to the fourth column position, the contacts MS3 open and relay CR134 is deenergized thus permitting the contacts CR134B to close and render the contacts KC effective.

During the printing of the accumulated totals and the group number, the contacts CKC will be closed and, if no means were provided to prevent it, this would cause entries to be made in the accumulators. In order to prevent this, the contacts CR134B (Fig. 48H) open and disconnect the wire W28, which is common to all of the adding contacts AC for all of the accumulators and to the contacts CKC of accumulators 2, 3, and 4, from the impulse source C29, C30. The contacts CR134D (Fig. 48J) open and prevent the contacts CKC for accumulator 1 from closing circuits to the return magnets RM. As it is desired to summary punch the totals appearing in accumulator 1, it is necessary that wire W27 be undisturbed during the cycles in which the totals of accumulator 1 are being printed. As will be made clear hereinafter, the closure of the contacts CKC of print bank 1 will cause the totals to be coded in the summary punch and automatically punched by a sequence of punching operations.

Relays CR1, CR2, CR3, CR51, and CR52 are now energized. This selects the counters 1, 16, 31, and 46 for the total printing and resetting operation, and the entries into accumulators 1 to 4, the counters selected being identified by the small numbers within the rectangles of the relay coils in Fig. 48F.

With reference to Figs. 48M and 48N, it will be noticed that relay CR1 closes its contacts CR1A to connect the printing magnets of print bank 1 to the counter print contacts CPC and unit counter 1. Similarly print banks 2, 3, and 4 are connected by the relays CR2A, CR51A, and CR52A to the printing contacts CPC of counters 16, 31, and 46. The counters are reset by repeatedly impulsing the magnets CM until each wheel arrives at zero in which case the contacts CPC close to energize the print magnet and the contacts CRC open to prevent further impulses to the associated magnet CM. The contacts CR1B, CR51B, connect the counter magnets CM for counters 1, 16, 31, and 46 to the wire W16 through the reset contacts CRC which will be closed in any order in which the counter wheels do not stand at zero. Thus, all of the counter magnets CM for counter wheels which do not stand at zero will be connected in parallel between the line wire W16 and the counter exit plug sockets PS31.

Ordinarily when the counters are plugged for a count operation, which may include a network of plug wires and recode selector relays for routing counting impulses to the IN plug sockets PS30, the exit plug sockets PS31 will be plugged to a return line which may be established by inserting one or more plug wires between the exit plug sockets PS31 (Figs. 41, 48M, 48N) and the plug sockets PS26 (Fig. 48E). It will be recalled that the tube V123 was initially fired, thereby energizing relay R57 closing the contacts R57A and establishing a return circuit for any pulses transmitted to the magnets CM which return circuit will be made from the plug sockets PS31 (Fig. 48M), the plug wires, plug sockets PS26, and contacts R57A, to line wire W2 and thence back to the negative source N1.

During the fourth cycle, while the type bars 161 are moving upwardly, a series of impulses are delivered to the wire W16 over circuits traced as follows: positive source P2 (Fig. 48H), the contacts C29, C30, contacts C40 (Fig. 48M), and wire W16. Thence the pulses will travel in parallel through the counter magnets CM of such orders as do not stand at zero thereby adding a succession of units to each of such orders until that order arrives at 9 and its contacts CRC open to cut off further adding pulses to that order. As an example, take unit counter 1 (Fig. 48M) and assume that the units order stands at "6." Four pulses will be delivered to the units counter magnet CM (Fig. 48M) through the contacts CRC for that order and contacts CR1B thereby rotating the counter wheel four units to zero at which point the units order contacts CRC will open and cut off further impulses to that order without interfering with the impulsing of any other order. The contacts CPC for the units order close at the moment the contacts CRC open and the timing of the contacts C29, C30 and the type bars is such that the type bar in the units order of print blank 1 will be about to bring the "6" type thereon to the printing line at the time contacts CPC close and such type bar will be stopped at 6 so that, when the printing hammer is operated, the value "6" will be printed from this type bar.

In a similar fashion all of the values standing on the four accumulators will be set upon the type bars and at the appropriate time in the cycle, the printing hammers will be released as explained above, and the four values printed on the work sheet in columns 1, 16, 31, and 46 immediately to the right of the group numbers which were printed during the preceding cycle. If any counter wheel stands at zero, a zero will be printed by the corresponding type bar owing to the action of the zero pawls 167 (Fig. 13), provided a higher order type bar has been positioned to print a significant digit.

As each type bar in each print bank is stopped at a significant digit, the associated contacts CKC are closed, thereby causing an entry of the corresponding digit in the accumulator order associated with that type bar. Accumulators 1 to 4 are associated with print banks 1 to 4, respectively. Let it be assumed that units counter 1 has the value "8" in the units order and that this value is printed in the manner described above. The timing of the type bar contacts CKC is shown in Fig. 47B and it will be noted that it does not coincide with pulses of the print emitter PE which is impulsed to print the totals standing in the accumulators. The reason for this is that there is a mechanical lag in the printing mechanism and the mechanism for actuating contacts CKC which causes the actual stopping of the type bars and closure of contacts CKC to take place an appreciable length of time after the reception of the correspondingly valued impulse from contacts CPC. While the impulses from CPC which stop the type bars, for example a "9" impulse (Fig. 47B), occurs at approximately 9° of the cycle, lost motion and the necessity for relative motion of parts is such that the contacts CKC will not actually close until approximately 45° of the cycle.

It will be noted that the timing contacts C29 to C32 cause pairs of overlapping impulses to be emitted between the digital values of the impulses emitted by the contacts CKC. The impulses produced by the contacts C29, C30 are utilized to energize the return magnets RM over wires W27, W28 and the impulses emitted by the contacts C31, C32 are used to energize the magnets AM over wires W29 to W32. The practical effect of the contacts C29, C30 is to emit a single impulse for each digital value and correspondingly the practical effect of C31, C32 is to immediately thereafter emit a second impulse and the two impulses together by energizing a given pair of magnets AM, RM causes the entry of a single unit in the accumulator order corresponding to the pair of magnets AM, RM. The principal reason for using a pair of timing contacts in each case instead of a single set is to obtain accurate timing since the point of beginning and the point of ending of each impulse can be very accurately adjusted.

At the instant of closure of the contacts CKC for the units order of counter 1, at "9," for example, an impulse will be emitted to the units order return magnet RM (Fig. 48J) over a circuit which is traced as follows: positive source P2 (Fig. 48H), the contacts C29, C30, C33, R17F, R148B, R144B, R146B, wire W27, contacts CKC (Fig. 48J) for the units order of accumulator 1, contacts CR134D, R126D, R120A, R193B, and the units order return magnet RM, to line wire W2, and back to the negative source N1. As explained in the description of the mechanical construction of the counter, this draws back the pawl carrying arm 603 and conditions the units order of accumulator 1 for the adding of a unit. This initial impulse occurs at approximately 45° of the cycle, in view of the aforementioned lag, and is immediately followed by an impulse from the contacts C31, C32 to the units order add magnet AM which is traced as follows: positive source P2 (Fig. 48H), contacts C31, C32, C34, R17H, R148D, R144D, R146D, and R126A, wire W32, and the units order add magnet AM (Fig. 48J) to line wire W2, and thence back to the negative source N1.

The initial "9" impulse to the units order wheel also causes the closure of the contacts AC (Fig. 32) in the manner explained above and these contacts remain latched in closed condition until the end of the cycle. In consequence of the closure of the contacts AC, the return magnet RM for the units order will thereafter receive a series of impulses from the wire W28 which is traced as follows: from contacts R146B through contacts CR134B, wire W28, the units order contacts AC, contacts R126F, R122B, R120A, R193B, and magnet RM, to line wire W2, the first part of the circuit being traced the same as the initial circuit through wire W27 and contacts CKC. The actual effect of the closure of the contacts AC is to connect wire W27 to the lower side of contacts CKC. As a result, the magnets AM and RM will now receive alternating impulses from contacts C29 to C32 which, starting with the ones marked "8" in Fig. 47B, will continue until each magnet has had 8 impulses, resulting in the addition of 8 units in the units order of accumulator 1. In a similar fashion, entries will be made in all of the accumulators through the contacts CKC and AC for such orders as may stand at a significant digit. The impulses to the add magnets AM will be transmitted to the respective accumulators by way of contacts R126A, R125A, R156A, R155A, and the wires W29 to W32.

Since the accumulators were reset to zero during the third printing cycle, when the totals on accumulators 1, 16, 31, and 46 are printed, there will be no need for a transfer from any order to a higher order. The carriage escapement solenoids ES will be energized during the fourth cycle by the closure of contacts C44 toward the end of the cycle and the carriages will escape to the fifth column position. The fifth cycle will be a repetition of the previous cycle with the exception that relays CR4, CR7, CR8, CR57, and CR58 will be energized to connect counters 2, 17, 32, and 47 to the printing mechanism and the totals on these counters will be printed and entered in the respective accumulators in the same fashion as described above. During this cycle, however, there is a possibility of a tens carry or transfer between orders since the total for example, on counter 2, will be added to the total of counter 1 which now stands on accumulator 1.

For the purpose of explaining the tens carry circuits, it will be assumed that accumulator 1 stands at 8 in the units order and that 2 is added in the units order, being derived from the units order of counter 2. The addition of 2 to 8 results in the units wheel of accumulator 1 turning to zero thereby closing the tens carry contacts TC. The one affected will be the fourth set of contacts TC from the left in Fig. 48J. This establishes a connection from the wire W25 to the contacts R193A of the low speed carry relay R193. At 216° of the cycle after the adding portion of the cycle has been completed, the contacts C35 (Fig. 47B) close and a circuit is established from positive source P2, through contacts C35, R148E, the coils of relays R193 to R196, to line wire W2, thereby closing the contacts R193A for all of the orders of accumulator 1. This allows a circuit to be established from positive source P2, contacts C36 (Fig. 17H), R17D, wire W25, through the tens contacts TC of the units order, thence through the low speed carry contacts R193A of the tens order, and magnet RM for the tens order of accumulator 1, to line wire W2. This has the same effect as an adding impulse. Immediately thereafter, the magnet AM for the tens order is energized over wire W32, from contacts C37 (Fig. 48H). Thus, two alternate impulses are delivered to the magnets RM and AM for the tens order which are one index-point position apart arising from the timing of contacts C36, C37, and a unit will be added in the tens order of accumulator 1. The relays R194, R195, and R196 condition accumulators 2, 3, and 4 for the carry operation and tens carry circuits will be traceable through the tens contacts TC of all of these accumulators in the same fashion as above, the only difference will be that the pulses to the magnets AM for accumulators 2, 3, and 4 will be by way of the contacts R125A, R156A, R155A, and the wires W31, W30, and W29, respectively.

If any accumulator wheel stands at 9 and a carry thereto is effected from the next lowest order wheel, the carry will be effected through the tens carry contacts TC to the wheel of the order standing at "9" and through the nines contacts NC of that wheel to the next higher order wheel to the one standing at "9." In Fig. 48J, let it be assumed that the tens order stood at "9" when the carry described above was effected. The tens order nines contacts NC, which are the third set from the left in Fig. 48J, will be closed when the tens order wheel of accumulator 1 reaches "9." Consequently, when the impulse is passed through the tens contacts TC of the units order wheel, the impulse will not only go to the magnet RM for the tens order, but will branch through the nines contacts NC for the tens order and thence will reach the magnet RM for the hundreds order. If the hundreds order also stands at 9, a third branch impulse will go to the magnet RM for the thousands order. The magnets AM for all orders automatically receives an impulse through the contacts C37 every printing cycle but, if the magnet RM for any order is not operative, the impulsing of the magnet AM for that order will be harmless.

At this point it is desired to explain that these operations are performed in the same way when entries are made directly from the cards through the operation of the accumulator delay tubes V83 to V114, as explained above. However, it will be remembered that adding is spread over practically the entire cycle when the entries are derived directly from the cards, and it is necessary that the timing of the transfer operations be different during a card feeding cycle. When accumulations are being effected under control of the cards, the automatic accumulate plug sockets AC (PS46, PS47), (Figs. 41 and 48A) are interconnected by a double plug thereby maintaining relay R147 energized. This closes the contacts R147D (Fig. 48H). Contacts C19 close at the very end of the card feeding cycle and energize the relays R121, R122, R151 and R152 over a circuit traced from positive source P2 (Fig. 48H), contacts CLR2A, C19, R147D, R17L, and the coils of said relays, to the line wire W2, and thence back to the negative source N1. The aforesaid relays close their contacts R122A for accumulator 1 (Fig. 48J), R121A for accumulator 2, R152A for accumulator 3 (Fig. 48L), and R151A for accumulator 4. Thus, the contacts C19 and the relays R121, R122, R151 and R152 perform the same function as, but at a different time in the cycle from, the contacts C35 and the relays R193 to R196.

The contacts C20 correspond, in effect, to the contacts C36 which delivers a pulse to the wire W25 for the tens carry contacts TC. The circuit for contacts C20 is established from positive source P2 (Fig. 48H), through contacts CLR2A, LC1, LC2, C20, R147E, and R17E to the wire W25.

Contacts LC3, LC4 correspond in function to C37 and close at about 18° (Fig. 47A) to energize the magnets AM for the carry operation.

After the carry operations have been completed during a printing cycle, the contacts C47 close at about 260° and establish a circuit as follows: line wire W1 (Fig. 48H), contacts C47, contacts R17J, wire W33, and all of the magnets CRM in parallel (Figs. 48J and 48L), to line wire W2. This conditions the accumulator orders for receiving further entries by releasing the latches 628 (Fig. 28) opening the adding contacts AC (Fig. 32) and the tripped tens contacts TC (Fig. 34) as explained in reference to the description of the mechanical construction of the accumulator orders. During a card feeding cycle, the same function is exercised by the contacts C21 (Fig. 48H) which close a circuit from positive source P2 through contacts CLR2A, C21, R147C, and R17K, to line wire W33.

Considering for the moment that the machine is feeding cards and that entries are being effected in the accumulators 2 and 4 under control of the cards, the selective and timed energization of any of the adding relays R127P to R130P (Figs. 48I and 48J) or R157P to R160P (Figs. 48K and 48L) to represent digital values will cause the magnets RM for accumulators 2 and 4 to be energized over the wires W37 and W38. The digital entry impulses are completed over circuits from source P2 (Fig. 48H), contacts LC2, LC1, C18, R147A, R17G, R148B, R144B, R146B, wire W27, any of contacts R127A to R130A (Fig. 48J) or R157A to R160A (Fig. 48L), wires W37 or W38, contacts R125D, R119A, R194B (Fig. 48J), or R155D, R149A, R196B (Fig. 48L) and magnets RM, to line wire W2.

The contacts AC for the orders in which entries are made are then closed and connect the magnets RM for such orders to the wire W28 to enable such orders to receive further impulses to the magnets RM as described above in reference to adding during a printing cycle. The successive impulses for the magnets RM in this case are transmitted from positive source P2 (Fig. 48H), through contacts LC2, LC1, C18, R147A, R17G, R148B, R144B, R146B, and CR134B, to wire W28. The impulses to magnets AM will be delivered by a circuit from positive source P2 (Fig. 48H), contacts CLR2A, LC4, LC3, R147B, R17I, R148D, R144D, R146D, R126A, R125A, R156A, and R155A, to the wires W32, W31, W30, W29 and magnets AM, to line wire W2.

During the fifth printing cycle, the carriage escapement solenoids ES are energized and the carriage escapes to the column 6 position energizing the relays CR5, CR9, CR10, CR59, CR60, and the preceding cycle will be repeated. The remaining cycles up to and including the eighteenth cycle, during which the totals on units counters 15, 30, 45, and 60 are printed, take place in the same fashion as cycles 4 and 5.

It may happen during one of the fifteen cycles in which the totals in the units counters are printed that one of the counters is plugged for a subtract operation. It was stated above that units counter 1 will be plugged to function as a total counter to count the total number of cards passing through the machine. Thus, the total standing on units counter 1 at the end of a series of card feeding operations may equal the grand total of the remaining counters. If the total in counter 1 were added positively in accumulator 1 under these conditions and ultimately transferred to accumulator 4 for a cross-foot check, it would be impossible to correctly total and cross-foot the totals in the remaining counters. In order to avoid this difficulty the total in counter 1 is entered in accumulator 1 by a subtracting operation leaving the accumulator with the nines complement of this total to which the totals of counters 2 to 15 thereafter are added.

In order to effect the subtraction of the total from counter 1 in accumulator 1, this counter is plugged for subtraction by inserting a double plug between the plug sockets PS32 and PS52 for counter 1. This is the extreme left-hand pair in Fig. 48F, between which the number 1 appears, or the extreme left-hand pair of the topmost two rows in Fig. 41 shown interconnected vertically by an arrow along side the abbreviation "Sub."

When the carriage moves from column 3 to column 4, after the third printing cycle, the subtraction control relay CR3 (Fig. 48F) is energized along with the relays CR1, CR2, CR51, and CR52. This causes the subtract relay R126 for accumulator 1 to be energized over a circuit traced as follows: positive source P2, contacts C38, R17A, R142D, R15C, switch MS2, contacts C39, the double plug between plug sockets PS32, PS52, contacts CR3A, and relay R126, to line wire W2 and the negative source N1. Relay R143 is also energized in parallel with relay R126 to condition the carriage spacing circuit as described above The relay R126 closes its contacts R126B (Fig. 48H) and transfers wire W32 to control by the contacts C29, C30, so that the adding magnets AM for accumulator 1 (Fig. 48J) will be impulsed from the beginning of the cycle. The contacts R126C close (Fig. 48J) and connect the contacts CKC of accumulator 1 to the subtract magnet SM.

The contacts R126E also close and connect all of the subtract contacts SC for accumulator 1 to the return magnets RM. This has the effect of energizing all of the return magnets RM for accumulator 1 by connecting them across the wires W26, W2. It will be noted that wire W26 (Fig. 48H) is connected through the contacts C34, C31, and C32 to the positive source P2. Since the contacts C31 and C32 have the effect of emitting a train of pulses, it is evident that the return magnets RM will be energized alternately with the add magnets AM with the result that all of the wheels of accumulator 1 start to turn immediately, being ratcheted forward continuously.

Let it be assumed that the value 8 stands on the units order of counter 1 and that, during the fourth cycle, the contacts CKC for the units order close as described above, during the operation of printing the total on counter 1. Instead of closing a circuit to the return magnet RM for the units order, as described above, a circuit will be closed to the units order subtract magnet SM, the circuit being traced from wire W27 (Fig. 48J), through the contacts CKC for the units order, the contacts CR134D, R126C, and magnet SM, to wire W2. The energization of the magnet SM in the units order causes the subtract contacts SC to open and thereby cut off further impulses to the magnet RM for this order from the line wire W26.

The timing is such that the magnet SM will be energized after the magnets RM and AM for the units order have received one pulse each, in other words, after the digit "1" has been added on the units order wheel. The value "8," however, will be printed by the units order type bar of print bank 1. In a similar fashion the other digits of the total in counter 1 will be printed and the nines complement thereof entered in accumulator 1.

When the carriage escapes to the column 5 position, the relay R126 will be deenergized and the next operation will be an adding operation, as explained above.

As will be explained later, in describing the cross-footing operations which are carried on as a check upon the accuracy of the tabulation, the complement standing in accumulator 1 when rolled into the totals standing on the other accumulators will cause accumulator 4 to stand at 9 in all of its orders and this fact is tested by a circuit which includes the relays R13P, R14P and permits the feeding of cards to be automatically resumed.

After the printing of the totals in counters 15, 30, 45, and 60 has taken place during the eighteenth cycle, the carriage escapes to the nineteenth column position and the switch MS2 is transferred by the right-hand marginal stop 461, shown at the left in Fig. 20. This initiates a series of three cross-footing and resetting cycles which take place before the carriage is returned and line spaced in readiness for the resumption of card feeding to tabulate the data on a new series of cards. This allows a circuit to be established from positive source P2 (Fig. 48F), contacts C38, R17A, R142D, R15C, the lower contacts of switch MS2, contacts R12C, and relays R144P, R145P. These two relays control the rolling of the total from accumulator 1 to accumulator 2 and from accumulator 3 to accumulator 4.

Relays R2T to R5T, R7T, and R69T to R96T (Fig. 48E) are energized at the same time in parallel with R144P, R145P over wire W23 and cause the restoration of the latched comparing relays and the group indicate relays, which it will be recalled, were energized during the first card cycle for storing the group number under control of the group indicate tubes. The functions of the comparing relays R69P to R80P will be explained hereinafter with reference to specific examples.

The energization of the relays R144P, R145P closes contacts R144E (Fig. 48J) to connect the readout common strips 636 for accumulator 1 to the return magnets RM for accumulator 2 through wires W37 and the closure of contacts R145E (Fig. 48L) connects the readout strips for accumulator 3 to the return magnets RM for accumulator 4 through the wires W38. During the 19th cycle, the print emitter PE functions to send impulses through the readout commutators of accumulator 1 to the return magnets RM of accumulator 2 and through the readout commutators of accumulator 3 to the return magnets RM in the same fashion as described in reference to printing totals from the accumulators.

A typical circuit is traced as follows: from positive source P2 (Fig. 48H), contacts C29, C30, the brush 786 and one of the segments 786 of the emitter PE, the corresponding one of the normally closed contacts R148G, one of the common wires for a segment 635 in, let us say, the units order of accumulator 1 (Fig. 48J), the common strip 636 for this order, contacts R124B, R144E, the units wire W37, contacts R125D, R119A, R194B, and the units order return magnet RM of accumulator 2, to the line wire W2, and thence to the negative source N1.

This initiates the adding operation in the same manner as described above and causes whatever value may have been standing in the units order of accumulator 1 to be transferred to the units order of accumulator 2 and added to the amount standing thereon. For example, if the units order of accumulator 1 stood at "9," the circuit will be transmitted to the top or "9" wire (Fig. 48J) and will enter "9" in the units order of accumulator 2 by initiating a train of nine pairs of impulses to each of the magnets RM, AM for this order. In a similar fashion, entries are made in the orders of accumulator 4 under control of the readout commutators of accumulator 3, in this case the transfer being effected through the contacts R145D and the wires W38.

After the adding operations have been effected near the end of the 19th cycle, the contacts C43 (Fig. 48F) closes circuits from source P2 to the relays R11P, R12P through the contacts R20F and R145C. The relays R11P, and R12P are latch type relays in which the contacts remain latched in actuated position until the trip coils R11T, and R12T are energized.

Relay R12P closes its contacts R12B (Fig. 48F) and energizes the roll control relay R146. The relays R143H, R144H, R145H are deenergized when contacts C42 open near the end of the cycle, and carriage spacing is suppressed. Relay R146 (Fig. 48J) closes contacts R146E (Fig. 48J) to connect wires W38 to the readout commutators of accumulator 2 and thereby connect these commutators to the magnets RM of accumulator 4.

The machine now goes through another cycle to transfer the total on accumulator 2 to accumulator 4. Thus, at the end of the 20th cycle, accumulator 4 will contain the grand total of all the individual totals on counters 2 to 60, plus the total of counter 1 which was entered in accumulator 1 during printing cycle 4 by a subtracting operation. Since this was entered as the nines complement, and since the total of accumulators 2 to 60 should equal the total on accumulator 1, accumulator 4 should stand at 9 in every wheel. This signifies that the cross footing operation has been successively carried out and that there have been no errors in effecting the counting in the various units counters or in printing and transferring the totals.

In order to test this condition during the 20th cycle, an impulse is sent through the four orders of accumulator 4 which for this purpose now have their common strips 636 and "9" segments 635 connected in a series relation by contacts R11A, R11C of relay R11P which, it will be recalled, was energized along with relay R146 at the end of cycle 19. This "9" impulse is from wire W1 (Fig. 48L), contacts C49, R12D; thence in series through the contacts R11A and R11C and all of the "9" segments 635 and common strips 636 of accumulator 4, wire W36, and the relays R13P, R14P (Fig. 48K), to line wire W2. The energization of these relays during the 20th cycle closes the contacts R14A (Fig. 48C) and permits automatic restarting of card feeding in the manner described above when the contacts C35 (Fig. 48H) close during the 21st printing cycle. Since relays MR, R6, CR6, R17, and R21 are still energized, a 21st cycle takes place during which the accumulators will be reset before card feeding is resumed automatically.

During cycle 20, contacts C44 close a circuit to latch type relays R15P, R16P through contacts R12A to prepare for stopping further printing cycles, the automatic resumption of card feeding, and resetting of the accumulators to zero. Contacts C38 (Fig. 48F) close at the very end of cycle 20 (Fig. 47B) and energize the restoring relays R119, R120, R140, R149, R150 over a circuit from source P2, contacts C38, R17A, R16B, R15D, R14D, and relays R119, R120, R148, R149, R150 to line wire W2 and source N1. Relays R119, R120, R148, R149, R150 cause the accumulators to be reset during cycle 21 in the same fashion as described above for printing cycle 3.

Relay coils R11T, R12T (Fig. 48F) are energized during cycle 21 through contacts R20F, R145B, and R15B thus restoring latch relays R11P, R12P to unlatched condition. During this cycle, contacts C29, C30 (Fig. 48H) and C45 (Fig. 48K) close a circuit through contacts R20G, R15F to relays R142P, R197P. Contacts R142A (Fig. 48A) are opened at about 180° of this cycle and, at about 288°, contacts C46 open to deenergize relays R6, R17, R21 and the print clutch magnet PCM. Contacts C2 (Fig. 48P), however hold relay CR6 for another half-cycle to keep motor M1 running long enough to complete the carriage return operation. It is clear that further printing cycles cannot follow the 21st cycle automatically.

Contacts C44 (Fig. 48D) close a circuit to the carriage return solenoids CRS and the restoring coils R15T, R16T during cycle 21 to return the carriage and restore relays R15P, R16T to normal. At about 300° of cycle 21, contacts C49 (Fig. 48L) close a circuit to coils R142T, R197T through contacts R6B to restore latch relays R142P, R197P.

Contacts C53 close at about 215° of cycle 21 and restart the feeding of cards provided cards are present in hopper H.

Relays R13P, R14P are restored by closing contacts C43 after contacts C35 have restarted card feeding operations. Zero control relays R189P, R190P are also energized at this time.

Assuming that accumulator 4 stood at "9" when the test impulse was sent through the readouts to energize relays R13P, R14P circuits are closed to cause a "0" to be printed in each column headed with "*" (Fig. 42) during cycle 21. This circuit is closed from source P2, contacts C30, C29 (Fig. 48H), C45 (Fig. 48K), R13A to magnets PM for the hundreds orders of all printing banks (Figs. 48M, 48N). This signifies that the totals on the first line cross foot correctly.

If the totals do not cross foot correctly and relays R13P, R14P are not energized during cycle 21, relays R15, R16 will be energized as described above to cause the printing cycles to cease. Since contacts R14D (Fig. 48F) are open at this time, relays R119, R120, R148, R149, R150 cannot be energized and the accumulators will not be reset during cycle 21. Contacts R14A (Fig. 48C) prevent automatic resumption of card feeding when the printing mechanism stops. Contacts R14B (Fig. 48D) prevent returning the carriage. Relays R11P, R12P will be reset by energizing latch coils R11T, R12T (Fig. 48F) as before.

A printing cycle now must be initiated manually to print the total on accumulator 4 since it now has an amount other than "9" but it is possible that this accumulator stands at zero. Before initiating this printing cycle, the operator will insert a sheet of paper in front of the work sheet at print bank 3 to receive the total.

Depression of the print key PK (Fig. 48A) energizes relay R20 and the closure of contacts R20A causes relay R21 to be energized and starts the print cycle in the same manner as described above. Contacts R20D (Fig. 48F) cause relay R153 to be energized over a circuit from source P2, contacts C38, R17A, R16B, R15D, R9E, R20D, and relay R155, to wire W2 and source N1. This closes contacts R153C (Fig. 48L) to connect print bank 3 to the readouts for accumulator 3 and the total will be printed. Contacts R20G (Fig. 48K) prevent energizing relays R142P, R197P during this cycle.

Contacts R20E allow contacts C43 to energize latch type relay R9 near the end of the cycle and this relay latches contacts R9A, R9B, R9D, R9F closed. This allows the reset relays R119, R120, R148, R149, R150 to be energized and all of the accumulators will be reset in the same manner as described above. Relays R142P, R197P will cause the return of the carriages and resetting of relays R15P, R16P. Relay R20 will be deenergized along with the relays R6, R17, and R21 when these relays are deenergized to stop the operation of the print mechanism.

When a series of printing cycles is taking place, the sequence can be interrupted by depressing the stop key SPK. This opens contacts R18A and deenergizes relays R6, R17, and R21 when contacts C46 open.

The editing light EL will be lighted whenever the machine stops after failure to establish a circuit for relays R13, R14 on a nines test of accumulator 4. This is due to the fact that relay R21 is deenergized while relay R16 is latched holding contacts R16A (Fig. 48B) closed.

The sort compare light SCL (Fig. 48B) becomes illuminated every time relay R25 is energized in consequence of a failure of a card to sort correctly and the edit light EL is illuminated when relay R8 is energized due to the "Stop" or reject stop "RS" plugging becoming effective.

The print light PL is illuminated when the "9M" master control is effective (relay R23) or the card count reaches 9997 (relay R17P), provided the carriages are in returned position (Figs. 2A, 2B, and 20). This warns the operator to take a print sequence before proceeding with feeding more cards.

In order to simplify the explanation of the total printing operations from accumulators 2 and 4 during the second printing cycle of the machine, it was assumed that the contacts R189A, R190A (Fig. 48E) of the zero control relays were closed so that zero relays R191, R192 would be energized when contacts C48 close. It was assumed that the totals accumulated in accumulators 2 and 4 during card feeding cycles exceeded the capacity of accumulators 2 and 4, which would normally be the case if a very large number of cards involving large amounts punched in the cards were tabulated, always causing an overflow from the highest orders of accumulators 2 and 4 to the units orders of accumulators 1 and 3. It is quite possible, however, that "run" comprising a relatively small number of cards entailing relatively few small items are accumulated in accumulators 2 and 4 so that the totals might be less than four digits in which case it is not desired to print a zero in the thousands order of column 2 of the work sheet section.

On account of the fact that two accumulator sections are combined to make one large accumulator of eight orders and the fact that the type bars are divided into four separated groups, there is no mechanical provision for effecting an automatic printing of zeros in the thousands orders of accumulators 2 and 4 when the type bars of printing banks 1 and 3, corresponding to the units orders of accumulators 1 and 3 are moved to print a significant digit during the first cycle and the zero relays R191, R192 are provided to cause zeros to be printed automatically in the next or lower orders of columns 2 of the work sheet section corresponding to the higher orders of accumulators 2 and 4 in which a type bar did not move to a significant figure. If it were not for this feature a grand total like "80678" would be printed "8 678" and it would be necessary for the work sheet to be interpreted mentally to supply the missing zero every time it is studied which, of course, would be very confusing. The zero relays R191, R192 cause the missing zeros in the higher orders to be automatically printed. If the value accumulated in accumulators 2 or 4 during the run of the cards was "0678," for example, it is not desired that the zero be printed.

The machine is arranged so as to be normally set to suppress zero printing under control of the relays R189P, R190P so that the mechanical automatic zero printing control exercised by the type bars alone will be effective to print zeros. This mechanical control of zero, however, cannot be depended upon for printing the zero in an amount like "80678" because there is no mechanical connection between the highest order type bars of print banks 1 and 3 and the lowest order type bars which would cause a zero to be printed in the highest order during the second cycle when the second half of the total is printed.

The relays R189P, R190P are latch type relays and, at the time when the trip coils R13T, R14T (Fig. 48F) of the nines test relays R13P, R14P are energized to restore the latch relays R13P, R14P, the relays R189P, R190P are energized and open contacts R189A, R190A to normally prevent energization of relays R191, R192 during a printing cycle, and these relays stay in this condition while the cards are feeding and amounts are being entered in accumulators under control of the cards. The relays R189P, R190P close the contacts R189B (Fig. 48J) and R190B (Fig. 48L), respectively, so as to connect the trip coils R189T, R190T in parallel with the return magnets RM in the units orders of accumulators 1 and 3, respectively.

During the accumulation of items from the cards, if the thousands order of either of accumulators 2 or 4, or both, passes through zero, a transfer will take place to the units order of accumulator 1 or 3, and, besides energizing the return magnet RM to cause the units order of either accumulators 1 or 3, or both, to add a unit, will energize the associated relay trip coil R189T, R190T, which will restore one or both of these relays to normal and reclose one or both of the contacts R189A, R190A, permitting either or both of the zero relays R191, R192 to be energized in preparation for the second printing cycle. If either of these relays is energized, it will close the zero printing circuits through the respective contacts R191A, R192A and zero will be automatically printed by print banks 1 and 3 during the second cycle. However, if no transfer occurs in either or both of the thousands orders of accumulators 2 and 4, either or both of the trip coils R189T, R190T will not be energized and the corresponding relays R191, R192 will not be energized thereby suppressing electrical zero printing on either print banks 1 or 2 but the mechanical automatic zero control will remain effective.

Means is provided for summary punching the totals appearing in counters 1 to 15 during a sequence of printing cycles which take place in the manner described above. The record cards contain only 80 columns and, since each units counter has a capacity of four digits, it would require 240 columns to record all of the totals in counters 1 to 60 and twelve more columns to record the totals in accumulators 1 to 4 and the group number. For this reason, the capacity of the machine for punching totals is restricted to fifteen counters, the totals in accumulators 1 and 2, and the group number.

In order to punch the totals, a standard "IBM" motor operated duplicating key punch is used which is constructed very similar to the one disclosed in Patent No. 1,976,618 modified to the extent of equipping the carriage with a punch carriage emitter PCE (Fig. 48X) similar in principle to the one disclosed in Patent No. 2,016,706. The punch disclosed in Patent No. 1,976,618 also has been improved to the extent of supplying it with punch hopper contacts PHC (Fig. 48W), similar in principle to the contacts HC, and with punch card lever contacts PCLC which are located at the punch station and remain closed whenever any part of a card is in the punching station.

The machine is also provided with automatic start contacts ASC, the purpose of which will be made clear hereinafter. When the machine is being used with the summary punching feature operative, the SP plug sockets PS62, PS63 are connected by a double plug (Figs. 41 and 48A). This causes the relay R198 to be energized and opens the contacts R198A thereby placing the punch hopper contacts PHC and the contacts PCLRB of the punch card lever relay PCLR in series with the relay R21 in the manual and automatic print control circuits. Thus, it will be impossible to initiate a series of printing and summary punching cycles unless the punching mechanism has correctly operated in the usual way to feed a card from the punch hopper to the punch station and cards remain in the punch hopper.

It will be assumed that the summary punch has operated in the normal way through the driving motor M2 to feed a blank card from the hopper and place it in position for punching the first column. In Fig. 48X is shown the punch emitter PCE under this caption and it will be noted that it is provided with punch emitter brushes PEB which are advanced by the card carriage one column at a time over the common contact strip 900 and segments 901, of which there is one for each card column, during the operation of punching successive digits in the fields of the card. The segments 901 of the punch emitter are arranged in staggered fashion in four horizontal rows and beginning with the ninth to twelfth segments, the segments in each row are connected in common.

It will be understood that the punch carriage is provided with a suitable skip bar which causes the carriage to skip automatically to the column 9 position after a card has been fed into the punching station so that the punch is in readiness to punch the first digit of the total in accumulators 1 and 2 which, it will be remembered, function as a single accumulator under the control of data punched in the cards. It will now be assumed that the cards have all been tabulated and that a series of automatic printing cycles have been initiated in the manner explained above and that the printing carriages are in the first column position energizing the relays R124, R154 (Fig. 48F).

At this point it should be explained that the summary punch may be connected to the main part of the machine through a suitable cable, not shown, and various plugs which are designated JP1 to JP24 in the drawings, the mating connections being designated with like numbers. For example, JP1 in Fig. 48X refers to the cable and plug connection which is established in Fig. 48P to the similarly designated terminal, whereby the contacts C51 in the main part of the machine will close a circuit to the relay CR63 (Fig. 48X) at about 40° of the printing cycle (Fig. 48B). It should also be made clear that the punch operates on a successive column basis to punch the digits one at a time in a well-known way. It is necessary, therefore, to coordinate the total printing operations and punching operations by a storage and coding system which enables the punch to successively punch four digits while the printing mechanism is going through one printing cycle. On account of the fact that two cycles are necessary to print the 8 digit total in accumulators 1 and 2, the punching of the total is broken into two cycle sequences of four digits each to correspond to the printing cycles.

When the type bars rise during the printing of the first four digits in accumulator 1, the contacts CKC (Fig. 48J) close circuits to the coding relays CR63 to CR66 (Fig. 48X) at times in the cycle corresponding to the printing of the different digits. For example, if a type bar is positioned to print the digit 1, the contacts CKC close a storage circuit which, it will be seen, causes the value 1 to be temporarily stored until it can be punched. With reference to Fig. 47B, it will be noted that the contacts C51 to C54 close circuits in certain combinations during the period the type bars are being set. At the time any impulse from 1 to 9 is emitted through a pair of contacts CKC, the contacts C51 to C54 will be closed in different combinations which correspond to the digital timing of the contacts C29, C30 in controlling the printing of the digits 9 to 1. Thus, the coding relays CR63 to CR66 will be energized singly and in different combinations in synchronism with the traverse of the type bars and the selective closure of the contacts CKC. The purpose of relays CR63 to CR66 is to code the single digital impulses which are emitted through the plug and cable connections JP9 to JP12 and enable the storage of the digital values in accordance with a code which is similar to the code used for digit storage and group indicating.

The relays CR63 to CR66 control a series of storage relays designated CR101 to CR116 (Fig. 48X), there being four relays, such as CR101P to CR104P, associated with each order of accumulator 1, the group just mentioned corresponding to the thousands order. The eight relays CR105P to CR112P for the tens and hundreds orders are not shown but it will be understood that the relays CR63 to CR66 are provided with contacts in series with the two groups of relays which are not shown through the contacts CR74A, CR75A arranged in the same fashion as the contacts CR63A to CR66A.

It will be recalled that digital values were stored in the digit storage and group indicate circuits by a form of binary code involving the values 1, 2, 4, 8. These values are shown in association with the coils of relays CR101P to CR104P and CR113P to CR115 and their contacts.

Now let it be assumed that the thousands order of accumulator 1 has a "9" standing therein. At approximately 45° of the first printing cycle, contacts C29, C30 (Fig. 48H) will emit an impulse through contacts C33, R17F, R148B, R144B, R146B; wire W27, the contacts CKC in the thousands order, the connections JP12; the contacts CR73A, CR63A (Fig. 48X); wire W41; the connections JP13, JP14 (Fig. 48W); and the contacts LCR1A (Fig. 48A), to source N1. The reason this circuit is established is that at "9" in the printing cycle, the contacts C51 are closed (Fig. 47B) which, through the connections JP1 (Figs. 48P and 48X) energizes the relay CR63. Thus, the digit "9" is partly stored by energizing the storage relay CR101P. At the same time that relay CR101P is energized, the relay CR104P is energized through the contacts CR66A, since at "9" of the printing cycle contacts C54 also are closed, thereby energizing relay CR66 in parallel with relay CR63. Thus, by energizing the two relays CR101P, CR104P, the digit "9" is stored through the printing cycle. If the digit to be stored happens to be a "3," the relays CR101P, CR102P, will be energized by the operation of relays CR63, CR64. At "3" in the printing cycle, the contacts C51, C52 are closed, thus enabling the storage of "3" in these two relays.

The relays CR101P to CR116P when energized, close their contacts CR101B to CR116B and thereby energize the holding coils CR101H to CR116H, the holding circuit being maintained through the connections JP5 and contacts C55 (Fig. 48P) which, it will be noted (Fig. 47B), are maintained into the early part of the next printing cycle and are interrupted before "9" in the printing cycle to deenergize the storage relays to prepare for another storage operation.

The relays CR101P to CR116P also close contacts CR101A, CR116A to energize the relays CR73P to CR76P. Thus, if a digital value is stored by the relays CR101P to CR104P, for example, the relay CR73P will be energized and, by opening the contacts CR73A, will cut off further impulses from accumulator 1. The relays CR101P to CR116P close contacts CR101C to CR116C and open contacts CR101D to CR116D (Fig. 48X) in combinations, according to the value stored, in the same manner as the digit storage and group indicate relays.

The punch carriage, as stated, has been positioned in column 9 with one of the brushes PEB on the column 9 segment. Thus, at approximately 200° of the printing cycle, the contacts C56 (Fig. 48P) close a circuit which is traced from source P2 (Fig. 48A), contacts TRD, the connections JP16, JP17 (Fig. 48W), switch S7, wire W39, the "9" punch key magnet PKM (Fig. 48X), the closed contacts CR104P of relay CR104C, contacts CR103D, CR102D, CR101C, the connections JP7 (Fig. 48P), contacts C56, R143C, connections JP6, the emitter segment 901 for column 9 (Fig. 48X) and brushes PEB, common strip 900, the wire W42, the punch floating cam contacts FCC (Fig. 48W), the punch card lever relay contacts PCLRA, the last column contacts LC1 of the punch, switch S7, the connections JP13, JP14 (Fig. 48A) and contacts LCR1A, back to source N1. This causes the "9" punch key magnet PKM to be energized and the punch operates in a well known way to punch the value "9" in column 9 of the card.

The floating cam contacts FCC open during this first punching operation and the punch carriage escapes, reclosing the contacts FCC, and the brushes PEB move into contact with the punch emitter segment 901 for column 10. The punching cycle is now repeated independently of contacts C56 to punch the stored digit which was derived from the hundreds order of accumulator 1. These operations are repeated until all four digits, representing the total in accumulator 1, have been punched, the different punch key magnets PKM being selectively energized according to the combinations of contacts set up by the relays CR101P to CR116P. Only four digits per printing cycle can be punched owing to the fact that the first digit of a series of four depends upon the closure of the contacts C56 in each printing cycle which occurs only after the values standing on the four orders of the accumulator or counter have been coded in the manner described above.

Thus, during printing cycles 1, 2, and 3, the total in accumulators 1 and 2 and the group number will be punched in the first twelve columns of the card and, during printing cycles 4 to 18, the individual totals in the counters will be punched four digits at a time.

When the key magnets PKM (Fig. 48X) are energized to position the punch interposers in a well known way, the punch magnet contacts PMC are closed and cause the punch operating magnet POM to operate the selected punch. After the last digit of the final total in counter 15 is printed and punched, the punch carriage escapes once more, thereby closing the last column contacts LCC energizing the last column relay LCR3. This closes the contacts LCR3C and LCR3B, thereby energizing the card stacker magnet CSM which renders effective the card stacking mechanism. During the stacking operation, the contacts ASC close and energize the punch trip magnet PTM across the wires W39, W41, through the switch S7, the contacts LCR3B, and brush magnet contacts BMC1. This also energizes relay R10P (Fig. 48A) through the connections JP22. This closes the contacts R10A (Fig. 48C) and permits the resumption of card feeding at the proper time after the cross-footing operations have been completed and contacts R6A reclosed. The punch trip magnet PTM causes the engagement of a clutch to allow the punch motor M2 to return the carriage and feed a blank card out of the magazine in readiness for another sequence of printing cycles.

The latch contacts LC1, LC2 are operated as a result of the tripping of the clutch and the contacts LC2 close a circuit for the motor M2. The power for motor M2 is provided by the connections JP20, JP21 and JP23, JP24 shown in Fig. 48A, the punch M2 being operated by alternating current in parallel with the motor M1. At the end of the punching cycle the latch contacts LC1, LC2 are restored to the condition shown in Fig. 48W and the punch is in readiness for another series of cycles after the carriage has automatically skipped to the column 9 position.

It may be desired to punch certain fixed data in the first eight columns of the card under control of a master card, in which case the master card is placed on the duplicating carriage and the door closed, thereby closing the door contacts DC. This energizes the brush magnet BM and the automatic punching of the first eight columns or any desired portion thereof proceeds before the carriage reaches the column 9 position. This mode of operation is well known in the art and need not be described in detail. In this automatic punching operation the punch brushes PB, in cooperation with the punch contact roll PCR, establish selective control circuits to the punch key magnets PKM from line wire W39 (Fig. 48X), through said magnets, the cable CB8, the punch brushes PB (Fig. 48W), punch contact roll PCR, punch common brush PCB, floating cam contacts FCC, contacts PCLRA, LC1 and switch S7 to wire W1.

The network of contacts CR101C, CR101D to CR116C, CR116D of the storage relays CR101P to CR116P is so arranged that, if none of these relays has been energized in consequence of the printing of a significant digit by the time the contacts C56 close, zero punching circuits will be established to the zero punch key magnet PKM. The storing of the digits in the relay network (Fig. 48X) is effected while the type bars are moving vertically and taking settings representative of the digits of totals standing in the counters and this storage operation should be completed by zero in the cycle. The punching of the four digits of a total is accomplished while the type bars are restoring. The punching starts at approximately zero time in the printing cycle and is completed before the next series of digits are set up on the type bars during the following printing cycle. This makes it possible to use a single storage device for the digits to enable a four digit total to be punched successively.

The basic operation of the circuits under relatively fixed operating conditions, such as starting, stopping, total printing, punching, and crossfooting, and the manner in which the cards control the majority of the pluggable functions and devices having been described in detail, with certain exceptions which are best considered with reference to specific problems, the operation of the machine to perform various types of operations will now be described in detail with reference to plugboard charts and, in the case of certain more complicated pluggings, with reference to supplemental charts which primarily show the manner of plugging the contacts of recode relays.

Since the specific operation of the machine with respect to the recode selectors, recode or digit emitters, units counters, units-tens distributor, and accumulating mechanism under record card control has been described in detail, most of the description hereinafter will be in reference to the plugboard charts treating the various plug sockets for the various pluggable functions and devices as impulse outputs or inputs, in order to avoid a great deal of repetitious tracing of circuits.

The first operation to be described will be the very common one of placing cards in decimal sequence and will be described with reference to Fig. 49A which shows the plugging for serially arranging the cards according to a four digit number. While this type of operation is not new, it is performed in a new way and means are provided in the machine for not only testing the continuity of the sorting control circuits, but at the same time testing the accuracy of the sort in reference to the selection of the sorting pockets. These two features are novel features of the machine.

It will be assumed that the serial number is punched in columns 4 to 7 of the card. These four columns are plugged to the first four positions of the column selection switch S5 (Fig. 48U), identified by the small numbers 1 to 4, in that figure under the plug sockets PS11, these four being topmost and numbered from the left in Figs. 41 and 49A under the caption "Col. selection." A plug wire is also inserted between the C plug socket PS10 (Figs. 48U and 49A) and the extreme left-hand plug socket PS16 of the digit storage group ("Digit PU" Fig. 48S). The operator will set the column selection switch S5 to position 4, the cards will be placed in the hopper face down, and the machine started with start key STK in the manner described above. The four runs necessary to place the cards in serial order may start with either the highest order or the lowest order and it is immaterial whether the switch S5 is placed in position 1 and advanced progressively to position 4 one step for each successive run or initially set to 4 and set back one step for each run. In the present case, the setting of the switch S5 to position 4 will cause the initial run to be effected on the units column to place all cards in numerical order by the digits of the units order.

Let it be assumed for the moment that the first card is designated "9" in the units order. This card establishes a circuit at "9" in the cycle extending through the plug wire from plug socket PS1 for column 7 through the fourth position of switch S5 and the plug wire between the C plug socket PS10 and plug socket PS16 to energize the "1" and "8" relays for the highest order of the digit storage group thereby storing the value 9 which will be effected by energizing the relays R41, R44 (Fig. 48S). This completes a connection between the C plug socket PS39 (Fig. 48T) and the 9 plug socket PS40 through the contacts R41A, R42B, R43B, R44A, to the cable CB9, which cable leads to the group of sorting relays R107 to R118, and the wire from the 9 plug socket PS40 connects to the contacts R203A, the transfer member of which connects to the 9 sorting relay R107P.

In order to perform the operation of normal sorting, the switch S2, which will hereinafter be termed the "phase" switch, must be set to the N position (Fig. 48B). This energizes the relays R201, R202 and contacts R201A close and energize relay R203. Thus, the relays R201, R202, R203 remain continuously energized throughout the entire operation of placing the cards in serial order and the contacts R201B, R201D, R202A (Fig. 48E) remain closed. Also, the contacts R203A (Fig. 48R) which were mentioned before will be closed.

At approximately 280° of the cycle (Fig. 47A), the contacts C11 close a test circuit from source P1 (Fig. 48E), contacts LCR2A, C11, the 1,000 ohm resistor, contacts R201B, R24D, R201D, R202A, R41A (Fig. 48T), R42B, R43B, R44A, the "9" plug socket PS40, the "9" wire of cable CB9, the contacts R203A (Fig. 48R), relay R107P, contacts R24A (Fig. 48E), R57B, the S plug socket PS29, the double plug between the S plug socket PS29, and the SH plug socket PS28 (Fig. 48G), contacts R6E, the grid resistor of the tube V123, to wire W21 and back to the negative source N2. At the same time, this impulse is applied to the grid of the tube V123, potential is applied to the plate of the tube from the timing contacts C8 (Fig. 48O), through the contacts R201F, the relay R24, and the tube V123, to wire W20 and thence back to the source N1. This fires the tube V123 and energizes the relay R24.

This impulse applied to the "9" sorting relay R107P is a relatively weak impulse owing to the 50,000 ohm grid resistor for tube V123 (Fig. 48G) and is far from sufficient to energize the relay F107P. The purpose of this impulse is to test the continuity of the sorting control circuit to make sure that during this cycle an impulse will be possible to select a pocket for the card. If this impulse should fail owing to, for instance, lack of a hole in the card or failure of one of the relays to make sufficient contact or failure of a plug wire to seat properly or poor contact, and for other reasons, which may include either incorrect punching of the card or electrical failure internally of the machine, the card will be rejected and will be the object of inspection to determine why it failed to sort properly. This test, as will be seen hereinafter, is made in every case to determine if a pocket is selected or a counter or other control has a complete operative circuit.

At this point, it should be explained that in the application of punched cards to statistical work, it is necessary that every possible perforation in the card should be accounted for and if it is not accounted for, or is in the wrong place, the card should be rejected for investigation before being counted or sorted. Otherwise, the card may become mislaid or the count may cause an error which may be very difficult to locate. An illustration of how every perforation must be accounted for, may be taken in the case of a population census card where the cards are classified by sex and it is obvious that each card must be punched either male or female and there are several possible errors which might occur. One of these errors is that the card might be punched both male and female. Another error is that neither might be punched. But there must be a hole in either the male or female index point positions of the card. Similarly, on a serial number sorting operation there must be one hole in each column since it is the usual custom to punch all columns either zero or with a significant digit to account for every column. Thus, if a single figure is not punched, a zero (in some cases "11") must be punched and, in the present case failure of any hole to appear in a card column means the card should be rejected and investigated before it is erroneously sorted with the possibility of becoming lost.

Now assuming that the test impulse traced above has fired the tube V123, the relay R24 will be energized. This closes the contacts R24B and connects the common wire for the sorting control relays R107P to R118P (Fig. 48R) to the line wire W2 and, by closing contacts R24C, transfers the initial circuit for relay R107P from the contacts C11 to the contacts C15. This allows the contacts C15, closing at approximately 310° of the cycle (Fig. 47A) to establish an operating circuit for the "9" relay R107P which is traced from positive source P2; contacts C15, R24C, R201D, R202A; thence through the relay R107P by way of the contacts of the digit storage relays, as previously traced, the coil of the relay R107P, and back through the contacts R24B (Fig. 48E), to the line wire W2, and the negative source N1. This impulse, however, is a full impulse strong enough to energize the relay R107P which closes its contacts R107E (Fig. 48T).

At "9" during the following card feeding cycle, the emitter E18 will close a circuit from the positive source P1 (Fig. 48Q), contacts LC5, LC6, the "9" segment 773 of emitter E18 (Fig. 48T), the contacts R107E, wire W22 to the grid resistors of the tubes V129, V130 (Fig. 48G), and thence back to negative source N4, thus firing the tubes V129, V130. The contacts C13 (Fig. 47A) are closed throughout most of the cycle and during this period the plates of the tubes V129, V130 have full potential applied to them and at "9" an impulse of current will surge through the plate condensers PC and cause the sorting control magnet SCM to be energized. The condensers PC are large enough to offer a very low impedance to the sharp peaked pulse through the magnet SCM, but rapidly charge to peak and the current must then pass through the plate resistors PR.

It is well known that, once a magnet or relay has attracted its armature, it requires a relatively weak current to maintain the armature in attracted position and the effect of the resistors PR and condensers PC is to permit an initially heavy pulse to energize the magnet SCM but prevent operating the tubes V129, V130 with a heavier current than is necessary to maintain the sorting control magnet SCM energized.

The operation of the sorting control magnet SCM by attracting its armature (Fig. 6) permits all of the sorting blades 114 to drop and allows the "9" punched card to pass over the top blade for eventual deposit in the "9" pocket.

In a similar fashion, cards designated with other values in column 7, will be deposited in the correspondingly designated pockets.

A further test is made, however, to determine if the card is actually going to be sorted into the "9" pocket. It is quite possible, for example, that the sorting magnet might fail to be energized, in which case the card would be rejected and this would cause the card to be inspected to determine the reason for its rejection. However, it is also possible that the card might not be fed properly. In other words, it might be either too far advanced or not advanced far enough when the sorting impulse occurs or two of the sorting control relays R107P to R118P might be energized.

It should be explained that there is a certain amount of lag between the time the sorting impulse representative of a digit is emitted and the time the sorting magnet SCM becomes fully energized and a passageway opened for the card. This lag varies in different machines and is ordinarily adjusted by varying the timing of the card picker and other parts and for present purposes it may be conveniently assumed to be as much as one index point position. In other words, referring to Fig. 48G which shows diagrammatically the arrangement of the sort checking segments 145*a*, it may be assumed that a card which is correctly fed and which is punched "9" will have its leading edge as far to the right of the "9" blade 114 as the spacing between the segments 145*a* in that figure. This is assumed solely for convenience in explaining the operation of the sort checking feature. Thus, by the time the leading edge of the card reaches the end of the sorting blade which leads to the "9" pocket resting on the 9 segment 145*a*, such blade will be down and the card will pass over all of the blades 114. Just before "12" time, which is approximately 240° of the card cycle (Fig. 47A), the contacts C14 close and permit circuits to be established through the blades 114 and the segments 145*a* to the B and C contacts of the sorting control relays R107P to R118P (Fig. 48G).

In the case of the "9" punched card, the contacts R107C will be closed and R107B, R107D opened. Thus, when contacts C14 close, a circuit will be established from source P1 (Fig. 48G), through contacts C14, the "9" blade 114 and segment 145*a*, the contacts R107C, R26B, through the grid resistor of the tube V125 to wire W21, back to negative source N2. At the same time, the contacts C8 (Fig. 48O) will be closed and plate potential will be applied to the tube V125 causing this tube to fire and energize relay R26. This signifies that the proper pocket was selected for the card and that the card is actually over the blade leading to the pocket.

If the card was too far advanced at the time the "9" impulse was emitted, it will pass under the "9" blade 114 and insulate the "9" segment 145*a*, and, at "12" time in the cycle, the tube V125 will not be fired and relay R26 will remain unenergized. Owing to the fact that the contacts R107D are open, the tube V126 cannot be fired and the relay CR26 will not be energized.

The energization of relay R26 coupled with failure to energize relay CR26 indicates that the proper passage has been selected and that the card is neither too far advanced nor lagging behind its correct position at "12" time in the cycle. Contacts C27 close while C14 are still closed and, if the card is lagging behind its proper position and none of the sorting control relays R107P to R118P has been energized, a series circuit will be established through all of the contacts R107D to R118D and the contacts CR26C, CR16A, and the grid resistor of tube V126, to wire W21, and negative source N2. Plate potential is applied to the tube V126 by the contacts C10 (Fig. 48O) and the tube V126 will be fired energizing relay CR26.

The energization of the relay CR26 closes its contacts CR26B (Fig. 48E) and connects the sort non-check relay R25P and marking magnet MM to contacts C16. This relay, it will be recalled, is operative to stop feeding of cards by energizing the card feed magnet CFM1. The circuit for the relay R25P and the marking magnet MM extends from the source P2 (Fig. 48E), contacts C16, CR26B, magnet MM, and relay R25P in parallel, to line wire W2, and back to the negative source N1. The marking magnet causes the marking pencil 805 (Fig. 46) to be drawn downwardly into contact with the card which is passing the blades 114.

The tube V126 is energized when two of the relays R107P to R118P are energized, even when tube V125 is properly fired due to one of the relays being correctly energized with the card feeding properly. Let it be assumed relays R111P, R112P were both energized and that R111P is correctly energized. Tube V125 will be fired through contacts R111C, R110B, R109B, R108B, R107B. This signifies a correct sort in this case, but the operator does not know this fact. Tube V126 also is fired through contacts R112E and R113D to R118D. The operator does not know which is correct and the machine must be stopped since a pocket, which may be the wrong one, was selected and, if the cards are not examined immediately, this card will become misplaced and difficult to find.

If relay R112P happened to be correct and relay R111P incorrect, tubes V125, V126 will not be fired since contacts R111B, being now open, prevent firing tube V125, and contacts R112D prevent firing tube V126.

If no relay R107P to R118P is energized and the card is in its correct position at "12" time, only tube V125 will be fired through contacts R107B to R118B in series. This card will be rejected in any case and will not be mislaid.

If both of the tubes V125, V126 fail to fire, the contacts R26A will remain closed and the closure of contacts C16 will cause the mark magnet MM and the relay R25P to be energized. It is only when the tube V125 is fired and tube V126 fails to fire that the energization of the sort non-check relay R25P and the mark magnet MM is prevented. Let it be assumed that the card is advanced too far when, for example, an "8" impulse energizes the magnet SCM. Relay R108P will be energized in this case. The emitter E18 will emit an impulse to fire the tubes V129, V130 at a time when the leading edge of the card is passing under the end of the "6" blade 114 and the card will be guided to the "7" pocket. At "12" time in the cycle, the "9" segment 145*a* will be in contact with the blade 114 leading to the "9" pocket and only the tube V126 will be fired by a circuit through contacts R108E and R109D to R118D. Tube V125 cannot be fired in this case because the "8" segment 145*a* is insulated from its blade 114 and relay R109 was not energized.

It is apparent that relay R25P and magnet MM is energized whenever (*a*) the blade operation does not agree with the sorting control relay selected, (*b*) when the card has been fed so as to lead the sorting pulse, i. e., fed too far, (*c*) when the card lags behind the sorting impulse, and (*d*) when two sorting control relays are energized.

This feature, which enables the physical position of the card in the sorting blades 114 to be checked with the emitted sorting impulse, is of considerable importance because of the fact that in a large number of the types of operations described herein the distribution of the cards to the pockets bears no direct or constant relation to the actual value of any specific hole in the cards, but may be based on certain arbitrary plugging to cause the cards to sort in accordance with one or more different combinations of designations or data which may vary during the run. This makes it impossible to check a sorting operation by sight or by the use of a needle since the cards accumulated in any one pocket will not necessarily have any single index point position identically perforated in all the cards as would ordinarily be the case in simple sequence sorting where all of the cards punched with a "9," for example, in a specific column, are deposited in the "9" pocket.

It will be noted in Figs. 41 and 48E that there is provided a plug socket PS22 designated "Sort." The normal sorting circuit which accomplishes the simple result of placing cards in the pockets in accordance with the actual values of the digits punched in a single column is connected between the contacts R202A and the contacts R24A. Where sorting is effected in accordance with arbitrary classifications in which the sorting impulse bears no relation numerically to the original data punched in the cards, as where sorting is effected under control of combinations of data which vary during a run, the source of sorting impulses will be the plug socket PS22 which will be plugged to a control network made up of the contacts of the recode selectors, the digit storage groups, and other pluggable controls, and the terminus of these impulses will be in one of the three rows of plug sockets PS54, PS55, PS56, and the test impulse mentioned above will be emitted from the plug socket PS22 (Fig. 48E), traverse the control network and ultimately will enter one of the plug sockets PS54, PS55, PS56 (Fig. 48R) and traverse downwardly, through the phase switch relay network, to the common wire of the relays R107P to R118P and thence will return to Fig. 48E through the contacts R24A, R57B, to the plug socket PS29, the double plug between PS29 and PS28, the contacts R6E, and the grid resistor of tube V123, to wire W21, thence back to the negative source N2. For sorting, therefore, the test impulse either goes through the contacts R202A and column 1 of the digit storage contacts directly to the relays R107P to R118P via the cable CB3 or from the plug socket PS22 externally through a relay control network to the plug sockets PS54, PS55, or PS56 and thence through the network of contacts for the phase switch relays in Fig. 48R to the relays R107P to R118P. As will be seen later, the test impulse will not only traverse a sorting network connected between the plug socket PS22 and the plug sockets PS54, PS55, PS56, but it will also traverse in series all of the counting and other control networks which may be set up and rendered operative by the perforations in a particular card, so that the continuity of all control circuits which are supposed to be operative with respect to any single card will be tested in series.

Figure 49B:
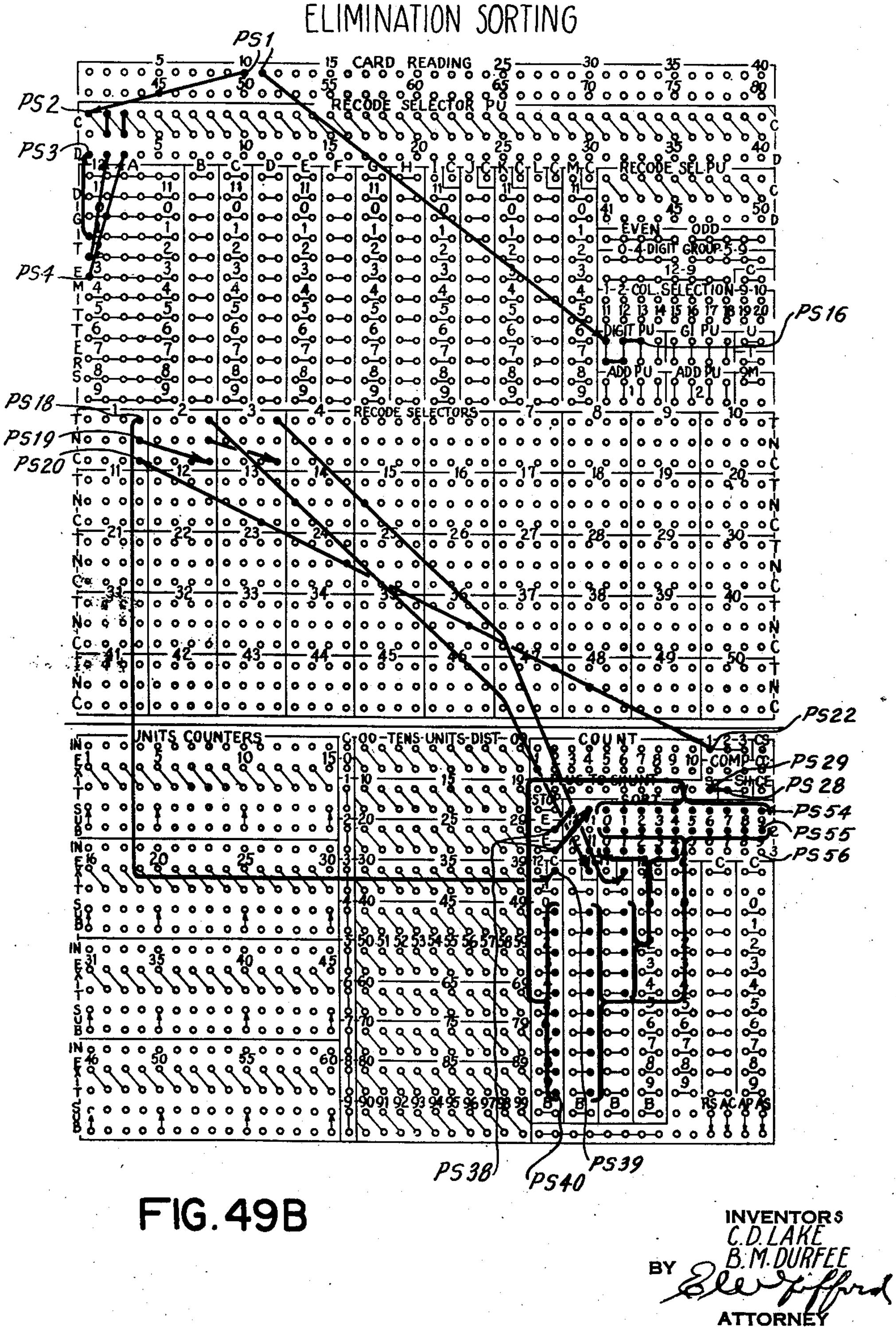

In order to illustrate this somewhat more involved circuit tracing to establish a test pulse through a relay network, which is a characteristic feature of the present machine, reference may be made to Fig. 49B which illustrates the operation of elimination sorting.

The type of operation accomplished by the plugging shown in Fig. 49B is the sorting of cards into a series of groups in serial order in three runs of the machine, such that repeated resorting of all of the cards to place them in serial order may be eliminated and, during the first run of the machine, one group of cards which is lowest in sequence is placed in complete order and then, in the succeeding two runs of the machine, the next two succeeding groups in ascending order are placed in order directly. This accomplishes a considerable saving of time since it avoids the necessity for passing all of the cards through the machine once for each column. In order to explain this type of operation it may be assumed that the card classification numbers are punched in columns 10 and 11 and that they range from 10 to 34, this being a purely arbitrary range selected solely for purposes of explanation. It is desired to sort the cards punched 10 to 19 into the pockets so that all cards punched 10, for example, fall in the "0" pocket and all cards punched "19" fall in the "9" pocket with the remaining cards of the groups 11 to 18 in the intervening pockets. The cards punched 20 to 29 will be deposited in the "12" pocket and the cards punched 30 to 34 will be deposited in the "11" pocket for resorting in two separate runs. The recode selectors 1, 2, and 3 are plugged to the "A" digit emitter so that they are operative when cards punched "1," "2," and "3" in the tens column are sensed. For example, if a card is punched "10," recode selector 1 will be energized. This is due to the fact that the brush for column 10 is plugged to the plug socket PS2 for selector 1 and the corresponding plug socket PS3 is plugged to the "1" segment of the digit emitter "A" which, it will be remembered, is designated E1 on the wiring diagram (Fig. 48O). Thus, when the card punched "10" is sensed, both the screen and control grids of the tube V1 of recode selector 1 will be impulsed together and the normally open contacts of relay R27 for recode selector 1 will be closed to establish a circuit from one of the C plug sockets PS20 to the corresponding "T" plug socket PS18.

This phase switch S2 (Fig. 48B) is set in phase 1 position. This allows the sorting test impulse to be established from source P1 (Fig. 48E); contacts LCR2A, C11; the 1,000 ohm resistor; contacts R201C, R58D, R212D, R201E; plug socket PS22 through the normally open contacts of selector 1, thence to the C plug socket PS39 of the extreme left-hand digit storage group, through the contacts of the digit storage relays. This pulse emerges from one of the plug sockets PS40 (in this case the "1" plug socket) according to the values stored in the digit selector. Thence, the impulse travels by way of a plug wire to the correspondingly valued plug socket PS54 (in this case the "1" plug socket) and downwardly (Fig. 48R) through the phase switch relay network, to one of the sorting relays (in this case relay R115P). Thence, the circuit is traced backwardly in the same manner as for the normal sorting impulse described previously through the contacts R24A (Fig. 48E) and the double plug between plug sockets PS29, PS28 to the tube V123.

At this point it should be explained that, on account of the large number of wires required to show the actual plugging between the plug sockets PS40 and PS54, PS55, PS56, the groups involved have been bracketed and a single line used to interconnect the brackets, this signifies that the plug sockets PS49 are interconnected by plug wires 0 to 0, 1 to 1, etc., up to 9 to 9. For example, the lowest plug sockets PS40 in Fig. 49B are connected to the extreme right-hand or "9" plug sockets PS54, PS55, respectively. The brush for column 11 is connected by one plug wire from the column 11 plug socket PS1 to the extreme left-hand plug socket PS16 captioned "Digit PU" and the two adjacent plug sockets PS16 for this group are connected to each other and to the first mentioned plug socket PS16 by double plugs. Consequently, any value punched in column 11 of the card will be entered in three columns of the digit storage and retained therein until the end of the cycle. This makes it possible in effect to store all of the numbers from 10 to 34 in the three columns of digit storage and the three recode selectors 1, 2, and 3. The phase switch S2 is set in position 1 which will be termed "phase 1" hereinafter.

Now let it be assumed that the first card is punched "10." The "1" in column 10 of the card will cause recode selector 1 to be energized, thereby permitting the aforesaid test circuit from plug socket PS22 to traverse the plug wires to and from the normally open contacts of recode selector 1 to the C plug socket PS39, thence from the "1" plug socket PS40 to the "0" plug socket PS54 (Fig. 49B) which is located between the plug sockets PS54 for the "1" and "11" positions in Fig. 48R. The test pulse will travel downwardly, through phase switch relay contacts similar to the contacts R207B, R204B, R203B, to the "0" relay R116P and from there to the tube V123, as in the case of a simple sorting pulse and will fire this tube to signify that the circuit is complete.

This allows the relays R57, R58 (Fig. 48G) to be energized over a circuit traced from contacts C8 (Fig. 48O) through contacts R201G and R21E and through contacts R17B and R197A. The relay R58 closes contacts R58C (Fig. 48E) to enable the contacts C15 to close a positive operating impulse to the sorting control relay R116P which is energized and through the operation of the emitter E18 causes the card punched "10" to be deposited in the "0" pocket in the manner described above with reference to Fig. 49A. At this point, it should be explained that because of the face that the phase switch S2 is set on position 1, none of the relays in Fig. 48B controlled by this switch is energized. Consequently, the test impulse established by the contacts C11 will traverse the 1,000 ohm resistor (Fig. 48E) through the normally closed contacts R201C, R58D, R212D, and R201E to the plug socket PS22 instead of going through the contacts of relays R201, R24.

The purpose of the relays R57, R58 is to initially enable the counting and sorting circuits to be connected in a single series circuit by the plug wires for the different types of operation, and then when the test impulse is completed correctly, to convert the test circuit into a series of parallel circuits to enable the operation of the sorting relays and counter magnets by parallel impulses. This is necessary because the connection of all the different relays and magnets which may be involved in a series of control circuits in a single series circuit may result not only in a variable resistance circuit, but the resistance may be very high. It is for this reason that an electronic tube is used to detect the completion of the test impulse rather than a relay since the tube can respond instantaneously to a mere change of potential which does not require any appreciable current.

Any card punched from "10" to "19" has the same effect insofar as the tracing of circuits is concerned. Since each of these cards will be punched "1" in the tens column and from "0" to "9" in the units column, only recode selector 1 and the extreme left-hand column of digit storage will be involved.

If a card is punched from "20" to "29," recode selector 2 will be energized and the circuit from plug socket PS22 will travel through the normally closed contacts of the selector 1 through the normally open contacts of selector 2 and will be delivered to the C plug socket PS39 of the second digit storage group from the left (Fig. 49B). The second digit of this card will be entered in the digit storage in all three orders. Assuming that this card is punched "20," the impulse will enter the C plug socket PS39 and will come out the "0" plug socket PS40. Thence, it will travel through the plug wire to the "0" plug socket PS55. This time, however, the pulse will go through a pair of contacts R209B (Fig. 48R) and emerge at the upper E plug socket PS38, when it will go to the "12" plug socket PS54. The pulse then travels downwardly through the contacts R207B, R204B, R203B, R212F, and "12" relay R118P, the remaining part of the circuit being traced as before with the result that the card punched "20" will be diverted to the "12" pocket, the tube V123 being fired and relays R57, R58 energized as before. The same thing happens if a card is punched "29" for example, the only difference being that the "9" plug socket PS55 will be involved instead of the "0" plug socket PS55, and the relay R118P will be again energized.

It is apparent, then, that on the first phase of the sorting that any card punched "20" to "29" will be deposited in the "12" pocket.

In very much the same way, the cards punched "30" to "34" are deposited in the "0" to "4" pockets, respectively. It will be noted in Fig. 49B that the third digit storage group from the left (Fig. 49B) is plugged to the row of plug sockets PS56 in the same fashion as the plug sockets PS54, PS55 and that the E plug socket PS38 for this row is plugged to the "11" plug socket PS54. Consequently, the cards punched "30" to "34" will cause the energization of recode selector 3 and through the third digit storage group will select pockets "30" to "34." For example, supposing a card is punched "31," recode selector 3 will be energized and the impulse from PS22 will travel through the normally closed contacts of recode selectors 1 and 2, through the normally open contacts of recode selector 3 to the C plug socket PS39, and out the "1" plug socket PS40 of the third digit storage group, thence to the "1" plug socket PS56 downwardly (Fig. 48R), through the contacts R206A, the lower E plug socket PS38, to the "11" plug socket PS54 downwardly through contacts R207B, R204B, R203B, to the "11" sorting control relay R117P. This circuit, of course, will be tested by the tube V123 and the relays R57, R58 will operate to cause an operating impulse to follow the test impulse and energize the relay R118P.

At the end of the first run, all of the cards punched "10" to "19" will have been sorted into pockets "0" to "9" and may be stacked 2 on top of 1, 3 on top of 2, etc., to place them in the order 10 to 19 from the bottom upwardly. These cards are properly sorted and do not have to be run again.

For the second phase run, the phase switch S2 is set in phase 2 position. This energizes the groups of relays R207 to R210 and CR93. The cards which were deposited in the "12" pocket are removed and replaced in the hopper. These cards are not in order but are to be placed in numerical order by the phase 2 run of the machine.

The effect of setting the phase switch S2 on the phase 1 position is to disconnect the plug sockets PS54 from the sorting relays R107P to R118P and to substitute in their place the plug sockets PS55. The plug sockets PS56 remain undisturbed since relay R206 was not energized. When the cards punched "20" to "29" are rerun, no further circuits will be set up under control of recode selector 1 since none of the cards is punched "1" in the tens column. During this run, however, the cards punched "20" to "29" will have the same effect with respect to the second digit storage group and recode selector 2, acting through the plug sockets PS55, as cards "10" to "19," acting on the recode selector 1 and the first digit storage group, had on the plug sockets PS54. For example, let it be assumed that a card is punched "24." This will cause the recode selector 2 to be energized and the test pulse from PS22 will travel through the normally closed contacts of selector 1 through the normally open contacts of selector 2, thence will enter the C plug socket PS39 of the second digit storage group and will emerge from the "4" plug socket PS40 and will enter the "4" plug socket PS55 from which it will travel downwardly (Fig. 48R) through contacts R209B, R207B, R204B, and R203B, to "4" relay R112P. Thus, the "4" pocket will be selected for this card. In a similar fashion, the remaining cards will be deposited in the "0" to "9" pockets and complete the numerical order of the second group which may be added to the first group.

For the third phase run, switch S2 is set in phase 3 position, thereby energizing relays R204, R205, R206, R211 and, through the contacts R211A, relay R209.

The energization of relay R206, closing contacts R206B (Fig. 48R), switches the plug sockets PS56 to the sorting relays R107P to R118P. Thus, during the third phase sorting operation, the cards will be distributed to the "0" to "4" pockets in the same general fashion as described before, except, in this case recode selector 3 and the third digit storage group from the left in Fig. 49B will be used.

For example, assume that a card is perforated "31." Owing to the "3" punched in column 10, recode selector 3 will be energized and complete a circuit from the plug socket PS22 through the normally closed contacts of recode selectors 1 and 2, the normally open contacts of recode selector 3, thence to the C plug socket PS39 of the third digit storage group and out the "1" plug socket PS40. From there the circuit will continue to the "1" plug socket PS56 (Fig. 48R), through contacts R206B, R208B, R204A, R203B, and relay R115P. This circuit will test complete and, through the operation of tube V123 and relays R57, R58 an operating pulse will be sent to relay R115P, and the card designated "31" will be deposited in the "1" pocket.

It will be seen that it is possible, in three complete runs of the machine, to place all of the cards designated "10" to "34" in numerical order and it will have been necessary to run only the cards from the "11" and "12" pockets twice.

Where the size of the respective groups, that is, the relative quantity of cards according to different numbers, is known in advance, it is possible to plug the machine so that the groups which contain the largest number of cards, or the most common group number, will be selected and put in order during the first run. The operation selected for purposes of illustration assumes placing the cards in order beginning with the lowest and ending with the highest number, but it is possible to plug the machine to start with, say, the highest and more common group numbers and terminate it with the lowest or least group numbers as it may happen that higher numbered groups may be more common or have larger numbers of cards per control number than the first group. For example, in the previous example illustrated in Fig. 49B, there might be a great many more cards designated "30," for example, than "10." Consequently, it might be advantageous to invert the plugging shown in Fig. 49B and sort the cards designated "10" to "19" into the "11" pocket and sort the cards designated "30" to "34" into numerical order first. This may be especially advantageous where there are a greater number of active detail cards, for example, in the higher numbered groups. An illustration is in a business organization where the higher number account numbers may be more active and have a larger number of transaction movements than some of the older accounts which may be sporadically active.

Under certain conditions it may be desired to stop the machine when the test circuit is not completed. The relays R57, R58 have contacts R57C (Fig. 48E) which are in series with the contacts C16 and the relay R141P. If the test circuit is properly established, both relays R57, R58 will be energized closing their contacts R57C, R58C and energizing relay R141P at the time the counting and sorting impulses are initiated to cause the energization of the sorting control relays R107P to R118P and/or such counter magnets as may be plugged to the plug sockets PS21, PS26. If the reject stop plug sockets PS44, PS45 (Figs. 41 and 48H) are plugged, the energization of relay R41A under these conditions will prevent energizing of the reject stop relay R8P. This does not happen, however, when the stop relay R8P is directly plugged through plug socket PS44 since, under these conditions, the impulse for energizing the relay R8P will not go through the contacts R141A (Fig. 48H) of the relay R141P, but may originate in the network of recode selectors. If relays R57, R58 are not energized, relay R141P will not be energized and relay R8P will be energized to stop the machine.

Fig. 49B illustrates the plugging for a complete series of numbers from 10 to 34, but it is clear that any number of the plug connections between the digit storage groups and plug sockets PS54, PS55, and PS56 might be omitted if there are no cards punched with some of these numbers. For example, if there are no cards punched "22," the plug wire for the "2" plug socket PS40 to the "2" plug socket PS55 can be omitted.

In the example shown in Fig. 49B, it was assumed that the initial sorting of the cards arranged them in all of the groups necessary in three runs and that during the second and third runs it was not necessary to effect other than a serial number arrangement of the cards in the "12" and "11" pockets, respectively, and that, during the phase 2 and phase 3 runs, there was no need for distribution of the cards in the "11" and "12" pockets, although the E plug socket PS38 for the row PS56 is plugged to the "11" plug socket PS54.

Figure 49C:
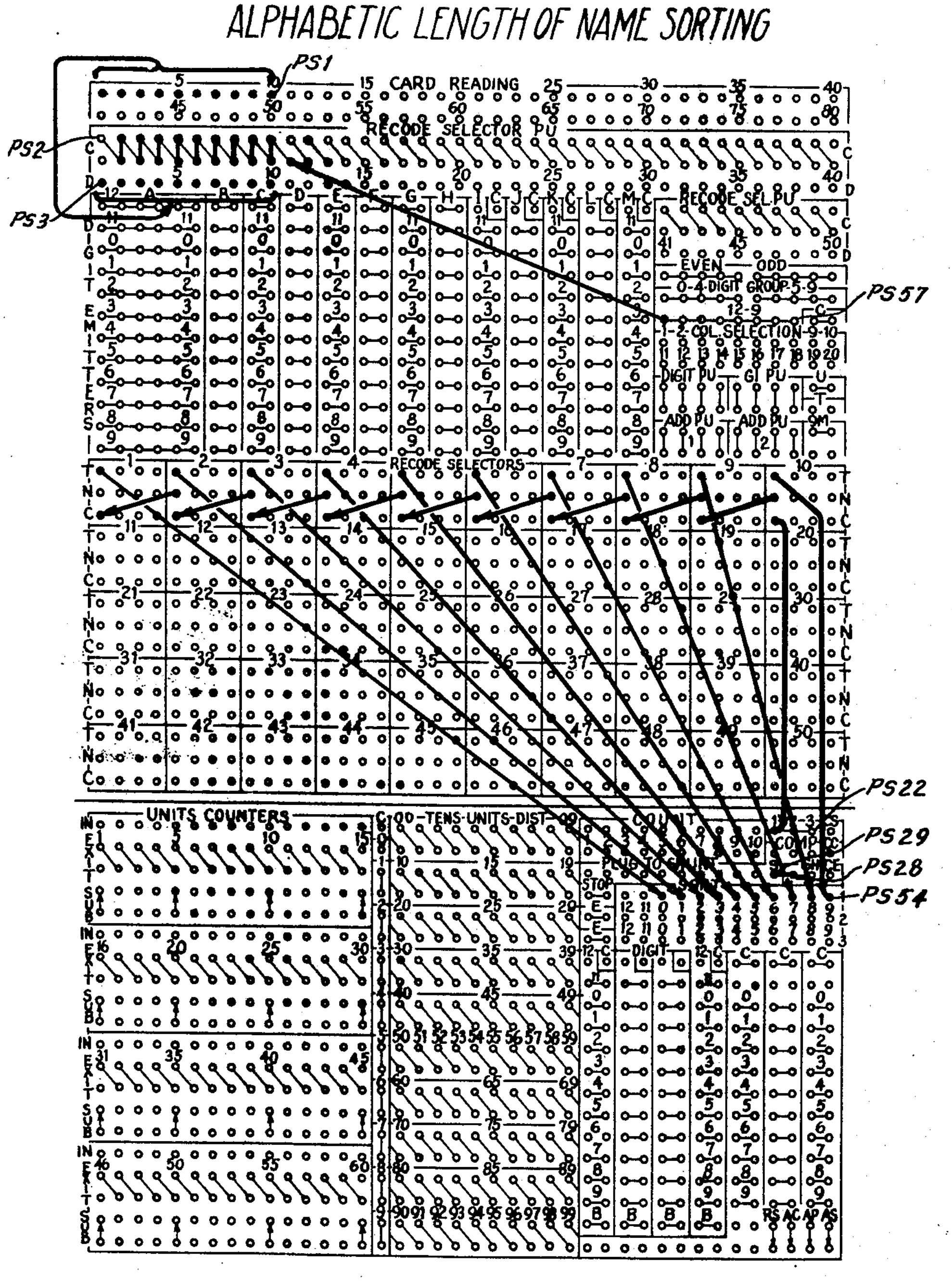

Fig. 49C shows how the operation of alphabetic length of name sorting can be accomplished. The object of this operation is to reduce the amount of time required to sort into alphabetic sequence by avoiding the repeated passage of the cards with the short names through the machine for those columns of the alphabetic field which are not punched owing to the fact that the name is short.

On account of the fact that many very common names are quite long, alphabetic sequence sorting requires a very large number of passes of each card through the sorting machines, making this type of sorting very slow and requiring a lot of machine time. For this reason, any saving in machine time is quite important.

It will be assumed that columns 1 to 10 are devoted to the surname with the initial letter of the surname in column 1. Thus, the name "Smith" would be punched in columns 1 to 5. The plug sockets PS1 for columns 1 to 10 are individually plugged to plug sockets PS3 so that recode selector 1 will be energized by any perforation in column 1 and, at the other extreme, recode selector 10 will be energized by any perforation in column 10. The plug socket PS2 for recode selectors 1 to 10 are interconnected by double plugs and the one for column 10 is connected by a plug wire to the 12–9 plug socket PS57. Since plug socket PS57 is an output for a pulse for every index-point position from "0" to "9," "11," and "12," each of the recode selectors 1 to 10 will be energized whenever any perforation appears in the corresponding card column. For example, the recode selector 10 will be energized when any perforation appears in column 10 and likewise for the other recode selectors. The normally closed contacts of the recode selectors are connected in series to the plug socket PS22 and the normally open contacts are individually connected to the plug sockets PS54 which, it will be recalled, enable the sorting relays R107P to R118P to be energized. The tube V123 is rendered operative by a double plug between the S plug socket PS29 and the SH plug socket PS28. The phase switch may be set in either "off" or phase 1 position for this operation.

Let it be assumed that the first card has a perforation in column 10 signifying that the field is completely punched with the longest name. At this point, it should be explained that in the "IBM" system, each letter is designated with a combination of two perforations so that actually there should be two perforations in column 10, but either one will be effective and the one which is sensed first by the brush B for column 10 will be the one which will actually cause recode selector 10 to be rendered operative. This allows the test impulse from plug socket PS22 to pass through the normally open contacts of recode selector 10 to the "9" plug socket PS54 (Fig. 48R) and ultimately permits the energization of the "9" sorting control relay R107P in the same manner as previously described. As a result, a card having a perforation in column 10 will be deposited in the "9" pocket. If the card has been perforated in column 9 but not in column 10, recode selector 9 will be energized and the "8" pocket will be selected. The test impulse starts at the right and travels to the left until it reaches a recode selector having its normally open contacts closed and that recode selector will determine the distribution of the card. Each time a circuit is established in the manner described, the test impulse will first determine if there is continuity in the circuit and if there is no continuity, the tube V123 will not be fired and the card will be rejected for investigation, as explained above.

Figure 49D:
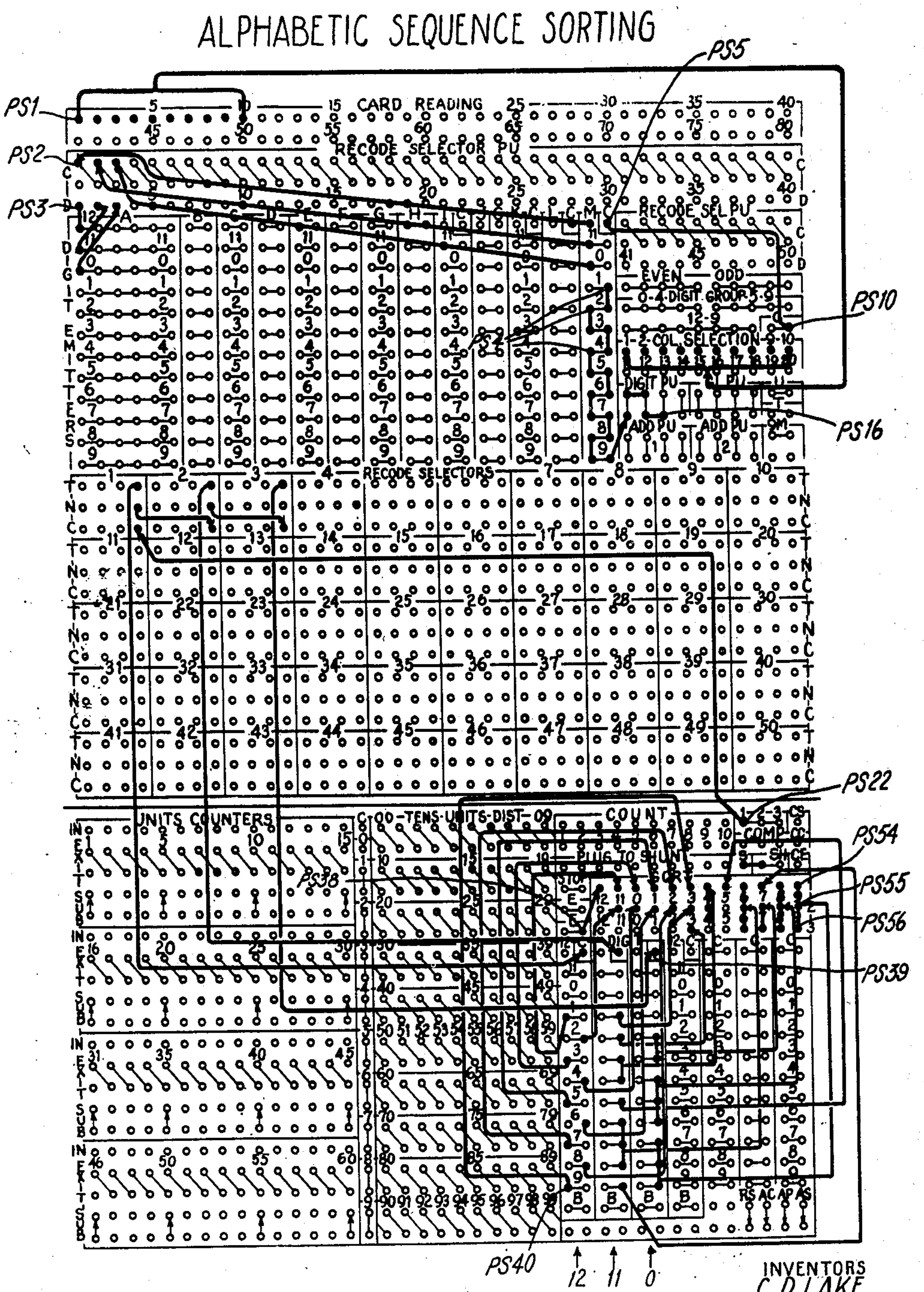

Fig. 49D shows how the machine is plugged for the operation of alphabetic sequence sorting in which the problem is to place cards in order by alphabetic sequence. The letters of the alphabet are designated with two combinations of two perforations in accordance with the following code:

TABLE I

*Alphabetic code*

| | | |
|---|---|---|
| A-12, 1 | J-11, 1 | S-0, 2 |
| B-12, 2 | K-11, 2 | T-0, 3 |
| C-12, 3 | L-11, 3 | U-0, 4 |
| D-12, 4 | M-11, 4 | V-0, 5 |
| E-12, 5 | N-11, 5 | W-0, 6 |
| F-12, 6 | O-11, 6 | X-0, 7 |
| G-12, 7 | P-11, 7 | Y-0, 8 |
| H-12, 8 | Q-11, 8 | Z-0, 9 |
| I-12, 9 | R-11, 9 | |

It should be explained that under ordinary conditions, using a conventional sorting machine it is necessary to pass each card through the machine twice for each column to first segregate the cards by the "0," "11," and "12" perforations, commonly called the zone holes, and then pass the cards through again to sort them into order by the "1" to "9" perforations, commonly called the numerical holes. It is unnecessary to do this in the present machine as, with the arrangement of plugging shown in Fig. 49D, the letters of most frequent occurrence will be placed in correct alphabetic order in one run and need not be sorted again in very much the same fashion as in elimination sorting (Fig. 49B), the machine being plugged to reject cards having certain letters of less frequent occurrence and place the others in the "12" pocket so that the remaining cards only require two runs through the machine to place them in alphabetic order. The cards in the "0" to "9" pockets are left in the pockets after the first and second runs and will be found to be in alphabetic order for completion of the third run. It is thus possible to save a very considerable amount of time in alphabetic sorting which is not possible with present commercial numerical sorting machines.

In Fig. 49D it will be noted that the column selection switch has been plugged to columns 1 to 10, which comprise the name field in the card, the initial letter of the name as in the case of Fig. 49C being perforated in column 1. Thus, column 1 is connected to position 1 of the column selection switch and column 10 to position 10. In order to obtain the benefits of length of name sorting, the sorting operation ordinarily starts with the highest column of the name field which, in the present case, will be column 10 and the column selection switch will be set in position 10. Recode selectors 1, 2, and 3 are plugged to the M emitter E13 on the wiring diagram so that "0," "11" and "12" impulses will cause recode selectors 1, 2, and 3 to be energized provided holes appear in these index-point positions of the selected card columns. The C plug socket PS5 of the M digit emitter is plugged to the C plug socket PS10 of the column selection switch. The 1 to 9 plug sockets PS4 of the M emitter are interconnected by a series of double plugs and a plug wire to three of the digit storage groups so that the numerical portion of the code in any column with respect to which sorting operations are carried out will be stored in all three digit storage groups.

Let it be assumed that column 10 is perforated "A" calling for the combination of a 12 hole and a 1 hole. Two impulses will be emitted by the brush B for column 10 which will emerge from the plug sockets PS1 for column 10 and will pass through position 10 of the column selection switch and emerge from plug socket PS10, then will enter the C plug socket PS5 of the M emitter. At 1 in the cycle, owing to the "1" perforation, an impulse will be emitted through the 1 plug socket PS4 by the M emitter E13 and this impulse will enter all three of the digit storage pick up plug sockets PS16 and cause the digit 1 to be stored in all three of the digit storage groups. At "12" in the same cycle, the "12" hole will cause a somewhat similar circuit through the "12" segment of the M digit emitter which will emerge from the "12" plug socket PS4 and will cause recode selector 1 to be fired because at this time the A digit emitter E1 will deliver an impulse to the screen grid of recode selector 1, while the aforementioned "12" impulse from plug socket PS4 is applied to the control grid. This causes the normally open contacts of recode selector 1 to be closed. Recode selectors 2 and 3 will not be energized for this card since it has neither an "11" nor "0" perforation.

As a result, the test impulse from PS22 will go through the normally open points of recode selector 1 and pass to the C plug socket PS39 of the first digit storage group on the left (Fig. 49D). The impulse will then exit from the "1" plug socket PS40 of the first digit storage group on the left (Fig. 49D) above the numeral "12" and arrow, and will go to the "11" plug socket PS54 to cause the energization of the 11 relay and the sorting of the card punched "A" into the "11" pocket. In a similar manner, cards punched "A," "C," "E," "G," "I," which call for a "12" hole in combination with an odd numbered hole will be deposited in the "11," "0," and "1" to "3" pockets, respectively.

Although there are gaps, these cards are in alphabetical order horizontally from the "11" to the "3" pocket and they may be left in the pockets.

If the card is punched "B" calling for the combination of a "12" and a "2," the test impulse will again travel to the "C" plug socket PS39 and will try to pass from the "2" plug socket PS40 to the "11" plug socket PS55 but the "E" plug socket PS38 in this case is not plugged and the circuit cannot be completed for the card punched "B" and it will be rejected. The same thing happens when cards are punched "D," "F," "H," calling for combinations of a "12" hole and even numbered holes. This is due to the fact that the middle row of plug sockets PS55 does not have the "E" plug socket PS38 plugged so that no circuits can be completed to the tube V123 through plug sockets PS55 during the phase 1 run and the cards will be rejected in each case.

If a card is punched "L," "N," "O," or "R," which involve "11" holes, recode selector 2 will be energized and the test impulse from plug socket PS22 will pass through the normally closed contacts of recode selector 1 and the normally open contacts of recode selector 2 to the "C" plug socket of the digit storage groups above the numeral "11" and arrow (Fig. 49D) in Fig. 48D. In the case of the letter "L," represented by "11" and "3" holes, the impulse will travel from the "3" plug socket PS40 to the "4" plug socket PS54 and the card punched "L" will be deposited in the "4" pocket. In similar fashion, cards punched "N," "O," and "R" will be deposited in pockets "5," "6" and "7." The cards punched "J," "M," and "P" will be rejected because the "1," "4," and "7" plug sockets PS40 for the "11" digit storage group are connected to the "3," "4," and "6" plug sockets PS55.

Cards punched "K" and "Q" will be deposited in the "12" pocket since the "2" and "8" plug sockets PS40 are connected to the "3" and "6" plug sockets PS56 above the "11" and arrow (Fig. 49D), respectively, which permits a circuit through the plug wire between the plug socket PS38, the "12" plug socket PS54 in the manner described above.

A typical circuit for selection of the "12" pocket may be traced for the letter "K" calling for the combination of "11" and "2" holes, respectively. Recode selector 2 will be energized in this case and the test impulse will find a complete circuit through the normally closed contacts of selector 1 and the normally open contacts of selector 2 to the "C" plug socket PS39 of the second or "11" digit storage group from the left. Thence, the impulse will emerge from the "2" plug socket PS40 and travel to the "3" plug socket PS56. From there it will go to the "E" plug socket PS38 for the row of plug sockets PS56 and will enter the "12" plug socket PS54 to determine disposition of the card in the "12" pocket.

Cards which are punched "U" and "X" calling for the combinations of "0" holes and "4" and "7" holes, respectively, will be deposited in pockets "8" and "9." In this case recode selector 3 is energized and the test impulse will travel through the normally closed contacts of recode selectors 1 and 2 and the normally open contacts of recode selector 3 to the "C" plug socket PS39 for the "0" digit storage group above the "0" and arrow in Fig. 49D. The "4" plug socket PS40 for the aforementioned digit storage group is connected to the "8" plug socket PS54 and the "7" plug socket PS40 is connected to the "9" plug socket PS54, thus allowing the test circuit to be completed through these respective plug sockets to cause cards punched "U" and "X" to be deposited directly in the "8" and "9" pockets, respectively. Cards punched "S," "V," and "Y" will be rejected since the "2," "5," and "8" plug sockets PS40 are connected to the "7," "8," and "9" plug sockets PS55. Cards punched "T," "W," and "Z" will be deposited in the "12" pocket since the "3," "6," and "9" plug sockets PS40 are connected to the "7," "8," and "9" plug sockets PS56.

It will be noted that the three recode selector relays 1, 2 and 3, in combination with the three digit storage groups designated "12," "11," and "0" with arrows, provide means of closing circuits which represent the individual letters and that during the phase 1 run of the machine, the cards will be distributed in three groups, one in alphabetical order, the other two groups not being in order but deposited in the "11" and reject pockets, respectively. The phase switch is now set to phase 2 position and the cards which were deposited in the reject pocket are now rerun.

The effect of the relays controlled by the phase switch here is the same as in the case of Fig. 48B of shifting the sorting connections for energizing the sorting relays from the top row of plug sockets PS54 to the middle row PS55 so that, during the phase 2 run of the cards, the circuits which terminated in the plug sockets PS55 for lack of a connection from the "E" plug socket individually to the "12" or "11" plug sockets PS54, now establish direct circuits to the "0" to "9" pockets and cause the cards designated "B," "D," "F," "H," "J," "M," "P," "S," "V," and "Y" to be placed in alphabetical order to the "0" to "9" pockets.

Now the phase switch is placed in phase 3 position and the cards which were placed in the "12" pocket during the phase 1 run are now rerun and will be sorted into the "3" and "6" to "9" pockets, respectively. The "11" group of cards in the pockets may now be manually stacked in proper order, the column selection switch is moved back from position 10 to position 9, the phase switch is reset in phase 1 position, and the series of operations started over again to place the cards in alphabetical order according to the perforations in column 9, the cards being run through the machine in ascending alphabetical order with respect to column 10.

During the three runs of the machine for column 9, the cards are combined with the cards which were previously sorted by the length of name operation and found to have a perforation in column 9, but not in column 10. Thus, a considerable saving of time is effected, not only with respect to the sorting of the cards into alphabetical order under control of the plugging shown in Fig. 49D, but also a saving is effected by not running during the column 10 phases, those cards which are not punched in column 10 but are punched in column 9.

After three runs with respect to column 9, the column switch is set back to column 8, the phase switch reset to phase 1, the cards which are punched only up to column 8 are added, and three phase runs again made. These sequences of operation are repeated down to and including column 1 to complete placing all the cards in alphabetical order.

During the phase 1 sorting operation, cards perforated "A," "C," "E," "G," "I," "L," "N," "O," "R," "U," and "X" are horizontally arranged in that order in the "11" and "0" to "9" pockets and are left there. During the phase 2 operation, the cards punched "B," "D," "F," "H," "J," and "M" will be horizontally arranged in that order to the "11" and "0" to "4" pockets and the cards punched "P," "S," "V," and "X" will be arranged in that order in the "6" to "9" pockets. During the phase 3 run, the cards punched "K" will be deposited in the "3" pocket and the cards punched "Q," "T," "W," and "Z" in the "6" to "9" pockets, respectively. The cards will be deposited in the pockets face down so that in pocket "11," for example, the "A" cards will be at the bottom with the "B" cards on top and in the "0" pocket the "C" cards will be on the bottom and the "D" cards will be on the top. Thus, by first removing the cards from the "11" pocket and then stacking the cards in the remaining pockets on top thereof in the order 0 to 9, it will be found that the cards are in complete order from bottom upwardly.

Under average conditions, it is found that the first group of cards sorted, which are arranged in alphabetical order during the phase 1 run comprise 67% on the basis of frequency of occurrence. The cards sorted into the "11" to "9" pockets during the phase 2 run comprises 21% in frequency and the cards sorted during the last run constitute only 12%. It would be possible, theoretically, to effect a further saving in time by transferring a few of the letter selections from the phase 2 run to the phase 1 run in place of certain letter selections because some letters in the second group are more frequent in occurrence than a few in the first group. This, however, would make it necessary to shift other letters from phase 1 to phase 2 or from phase 2 to phase 3 which would reduce the effectiveness of the sort to save time.

By plugging the digit storage out-puts PS40 to the phase switch controlled inputs PS54, PS55, PS56 in the manner shown in Fig. 49D a compromise is effected which places the cards in true sequence with a requirement of only about 1.33 runs per card column as compared with 2 runs per column for normal alphabetic sorting on a simple commercial sorting machine. Thus, a saving in time of approximately 33% is effected through the use of the phase switch and the digit storage selectors in comparison with the fastest commercial equipment, at present.

By comparing Fig. 49D with Fig. 49B, it will be noted that there is a considerable resemblance between the two operations, particularly in the use of the phase switch and digit storage groups. The principal difference between these two operations, however, is that the phase switch controlled inputs PS54, PS55, and PS56 and the digit storage outputs PS40 are symmetrically plugged in the case of Fig. 43B, so that the cards are deposited in true and complete numerical sequence during the first run whereas, in the case of Fig. 49D they are deposited in sequence but with gaps and on the basis of frequency of occurrence so that the most frequently occurring letters or their equivalent numbers are sorted into sequence first. If it were desired to sort into numerical sequence on the basis of frequency of numbers, it can be done by utilizing the plugging above the recode selector contact groups in Fig. 49B in combination with a plugging of the recode selector contacts and digit storage groups very similar to the plugging shown in Fig. 49D.

Considering the cards as numbered from 10 to 34, the principal condition to be satisfied in combining these two different forms of plugging for a true ascending sequence is that the plugging of the digit storage outputs and phase switch control inputs in Fig. 49D must be arranged so that, in successive phase runs, the card numbers will not only be horizontally in order in the sorting pockets but must be vertically in order, bottom to top.

In order to analyze a problem of this nature to facilitate the plugging of the machine, the range of numbers or letters to be sorted is first analyzed to determine the relative frequency of the occurrence of the letters. This is then divided into three groups comprising the most frequent, next most frequent, and least frequent letters or numbers. The first group is arranged horizontally in numerical or alphabetical sequence under the pocket headings "11" and "0" to "9." The next most frequent groups are arranged in another line underneath the first with the letters or numbers in sequential order left to right and also vertically top to bottom. The least frequent group is then arranged in sequence horizontally left to right and vertically top to bottom underneath the letters or numbers previously distributed. For example, the alphabetic sequence sorting operation (Fig. 49D) may be laid out in the form of a table like the following, which represents the actual distribution of the cards in accordance with the plugging arrangement shown in Fig. 49D to the respective pockets during the three phase runs:

TABLE II

| Pockets | 11 | 0 | 1 | 2 | 3 | 4 | 5 | 6 | 7 | 8 | 9 |
|---|---|---|---|---|---|---|---|---|---|---|---|
| Phase 1 | A | C | E | G | I | L | N | O | R | U | X |
| Phase 2 | B | D | F | H | J | M | ---- | P | S | V | Y |
| Phase 3 | ---- | ---- | ---- | ---- | K | ---- | ---- | Q | T | W | Z |

From inspection of this table, it is clear that if, for example, the letter "I" happened to be a very infrequently occurring letter, it could be shifted down in the table to be deposited in pocket "2" during the phase 3 run and if, at the same time, the letter "J" happened to be more frequent than "I," it could be shifted up to the phase 1 run in place of "I" and deposited in pocket "3." This merely entails a change in the plug wires between the output plug sockets PS40 and the input plug sockets PS54, PS55, and PS56. It will be noted, however, that it is not desirable in this case to merely interchange "I" and "K" because this would place the cards out of order in the "3" pocket.

The foregoing table might not be very desirable for a language other than English because in certain languages, such as Spanish, the vowels and the constants *r*, *s*, and *l* predominate in frequency and for Spanish it might be necessary to rearrange the letters in the table so that some of the more frequently occurring letters in Spanish are in the top and second lines. By arranging the letters or numbers several times by trial in a table of this nature and then plugging the digit storage groups to correspond, it is possible to effect a considerable saving in time by placing the bulk of the cards in sequential order during the first run of the machine.

If the cards numbered 10 to 34 were to be run through the machine with the aforementioned combined plugging of Figs. 49B and 49D, the cards will fall into the pockets during the respective phase runs as shown in the following table:

TABLE III

| Pockets | 11 | 0 | 1 | 2 | 3 | 4 | 5 | 6 | 7 | 8 | 9 |
|---|---|---|---|---|---|---|---|---|---|---|---|
| Phase 1 | 11 | 13 | 15 | 17 | 19 | 23 | 25 | 26 | 29 | 34 | ---- |
| Phase 2 | 12 | 14 | 16 | 18 | 21 | 24 | ---- | 27 | 32 | ---- | ---- |
| Phase 3 | ---- | ---- | ---- | ---- | 22 | ---- | ---- | 28 | 33 | ---- | ---- |

It will be noted that cards punched "10," "20," and "30" will not be sorted with this specific sorting arrangement because in Fig. 49D, the zero outputs PS40 for the digit storage groups are not plugged to any of the inputs PS54, PS55, PS56. However, by a relatively slight change in the plug wires, following this table, it is possible to provide for the cards having zeros in the units order position.

One of the advantages of the form of plugging shown in Fig. 49D is that the number of manual operations in collating the cards is reduced to a minimum which is quite important in alphabetical sorting because of the very large number of runs necessary to place a given batch of cards in alphabetical order. There is also a further important reason why this type of plugging is advantageous. It will be noted with reference to Table II and the description of the manner in which the cards are distributed to the pockets that the operator did not have to do more than remove the cards from the pockets and stack them one on top of the other in proper order. In the case of the operation covered by Fig. 49B, the cards are distributed to pockets in accordance with the following table:

TABLE IV

| Pockets | 0 | 1 | 2 | 3 | 4 | 5 | 6 | 7 | 8 | 9 |
|---|---|---|---|---|---|---|---|---|---|---|
| Phase 1 | 10 | 11 | 12 | 13 | 14 | 15 | 16 | 17 | 18 | 19 |
| Phase 2 | 20 | 21 | 22 | 23 | 24 | 25 | 26 | 27 | 28 | 29 |
| Phase 3 | 30 | 31 | 32 | 33 | 34 | ---- | ---- | ---- | ---- | ---- |

and it will be recalled that the operator not only has to collate them after each phase run but also must again collate them a fourth time after the third phase run to combine the three groups of cards in the three runs. This may result in errors due to the operator's failure to stack the cards properly after any one of the phase runs. For example, after the phase 1 run, the operator might place the cards from the "3" pocket on top of the cards from the "1" pocket instead of taking the cards from the "2" pocket. Thus, the cards punched "13" would occur in the sequence before the cards punched "12." In the case of Table II and operation 49D, the operator merely has to collate the cards horizontally after the third phase operation is completed instead of collating them both horizontally and vertically as in the case of Fig. 49B and Table IV.

Operation 49B was selected as a very simple and easy to understand way of explaining the use of the phase switch although for the above reasons the distribution of the cards in this manner is not quite as desirable as the form of distribution effected by operation 49D. The following table shows how the numerical sequence sorting problem solved by operation 49B may be arranged to eliminate the horizontal collation of cards after each phase run:

TABLE V

| Pockets | 0 | 1 | 2 | 3 | 4 | 5 | 6 | 7 | 8 | 9 |
|---|---|---|---|---|---|---|---|---|---|---|
| Phase 1 | 10 | 13 | 16 | 19 | 22 | 25 | 28 | 31 | 34 | ---- |
| Phase 2 | 11 | 14 | 17 | 20 | 23 | 26 | 29 | 32 | ---- | ---- |
| Phase 3 | 12 | 15 | 18 | 21 | 24 | 27 | 30 | 33 | ---- | ---- |

With this arrangement, instead of plugging the digit storage groups vertically as in Fig. 49B, they will be plugged in a staggered relation somewhat similar to Fig. 49D so that, during the phase 1 run, the cards punched "10," "13," "16," "19," "22," "25," "28," "31," and "34" are distributed to the "0" to "9" pockets. In order to effect this result with respect to the cards punched "13," for example, it will be necessary to shift the plug wire, which in Fig. 49B leads from the "3" plug socket PS40 of the left-hand digit storage group to the "3" plug socket PS54, to the "1" plug socket PS54, so that all cards punched "13" will be deposited in the "1" pocket. The cards punched "11" should be deposited in the "12" pocket and accordingly the plug wire leading from the "1" plug socket PS40 will be shifted to the "0" plug socket PS55 so that a card punched "11" will be deposited in the "12" pocket during the phase 1 run and in the "0" pocket during the phase 2 run.

In a similar manner, the plug wire from the "2" plug socket PS39 will be shifted to the zero plug socket PS56. Under these conditions cards punched 10 will be deposited in the "0" pocket, cards punched 11 will be deposited in the "12" pocket, and cards punched 12 will be deposited in the "11" pocket. During the phase 2 run, the cards punched 11 will be deposited in the "0" pocket and during the phase 3 run the cards punched 12 will be deposited in the "0" pocket.

Thus, in the three successive phase runs, the cards punched 10 will be at the bottom of the "0" pocket and cards punched 12 will be at the top with the cards punched 11 in-between and it is unnecessary to horizontally collate these cards as it was in the case of operation 49B.

As will be shown later hereinafter in dealing with a more complex problem, it is possible to allocate the cards to the different pockets numerically or alphabetically without regard to their actual numerical or alphabetical sequence, since it only requires one plug wire inserted between one of the plug sockets PS40 and one of the plug sockets PS54, PS55, PS56 to determine, first, the pocket in which the card is to be ultimately deposited and, second, the phase run in which such disposition will take place.

As a simple illustration, with reference to Table V, by interchanging the plug connections for, say, the cards punched 11 and the cards punched 22, it is possible to deposit the cards punched 22 in the "0" pocket during the phase 3 run and the cards punched 11 in the "4" pocket during the phase 1 run. This type of operation is desirable when cards must be in a certain order other than pure numerical or alphabetical sequence.

Figure 49E:
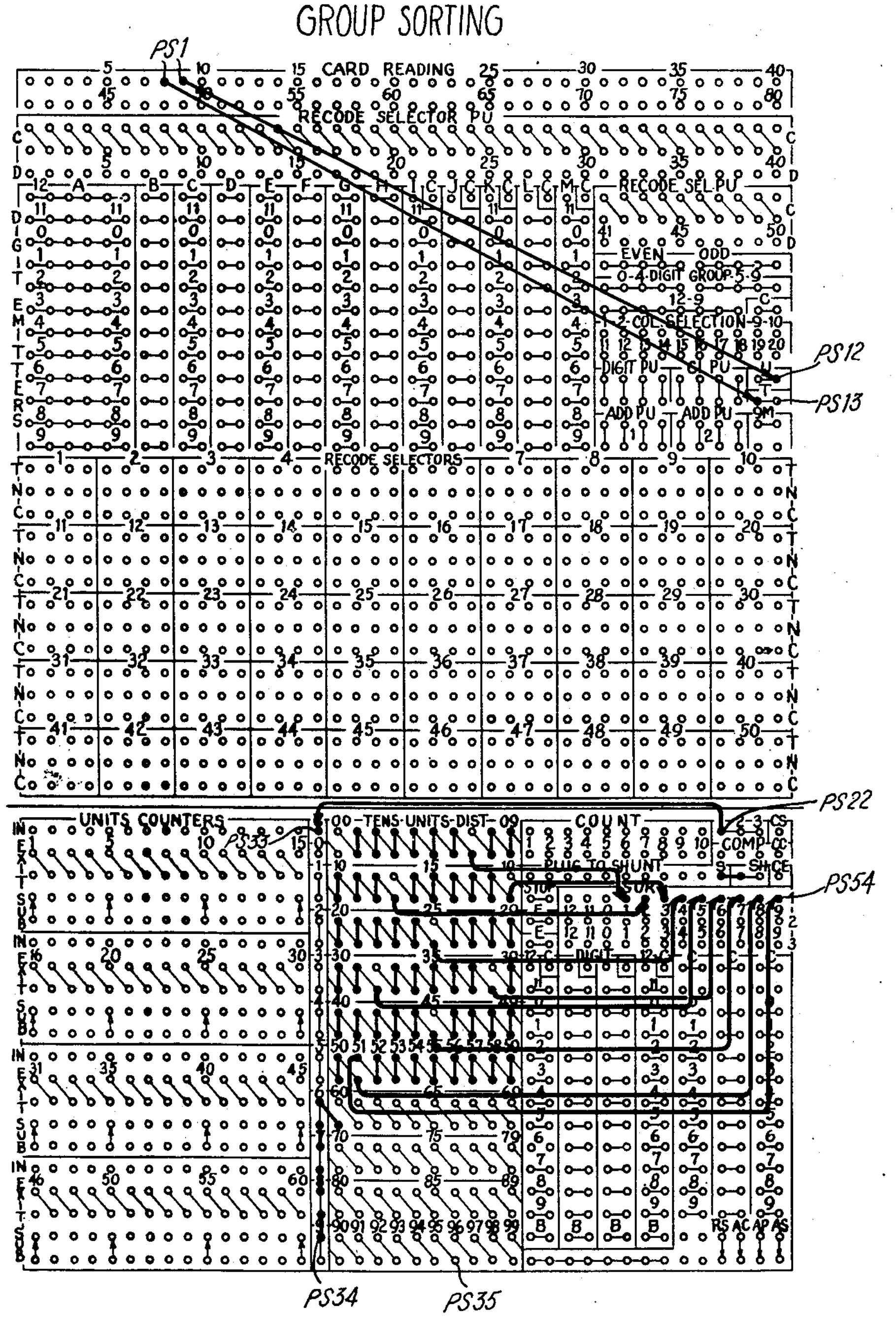

In Fig. 49E is shown the plugging for a form of group sorting operation which illustrates the use of the units-tens distributor. The phase switch is set in "off" or phase 1 position for this operation. The object of this operation is to sort the cards into nine pockets according to age groups. Ages under one year and from one to six years will be sorted into the "1" pocket, seven to twelve in the "2" pocket, thirteen to nineteen in the "3" pocket, twenty to twenty-four in the "4" pocket, twenty-five to thirty-one in the "5" pocket, thirty-two to thirty-seven in the "6" pocket, thirty-eight to forty-four in the "7" pocket, forty-five to fifty in the "8" pocket and all ages from fifty-one to ninety-nine into the "9" pocket. The age is punched in columns 8 and 9 of the card and these columns are plugged to the "T" (tens) and "U" (units) input plug sockets PS12 and PS13, respectively. From the description of the operation of the units-tens distributor, it is apparent that the number punched in the card will be stored in the units-tens distributor and a circuit wlil be completed to one of the plug sockets PS35 according to the value punched in the card. For example, if the card were punched 09 a circuit will be completed from the C plug socket PS33 (Figs. 48V and 49E) to the plug socket PS35 immediately under the marking 09 in the top row of the units-tens distributor portion of the panel in Fig. 49E.

With reference to Fig. 48V the plug socket PS35 for the number 09 appears in the lower left-hand corner. This requires the energization of "9" relay R188 which, it will be seen at the upper right of this figure, is energized whenever units relays R171, R174 are energized in consequence of a "9" in column 9. This closes all of the contacts R188A. The digit "0" punched in column 8 of the card causes tens relays R176, R178 to be energized, thereby closing a circuit from the C plug socket PS33 through contacts R175B, R176A, R177B, and R178A to the "0" or "10" plug socket PS34, thence down through the extreme left-hand common wire to the extreme left-hand contacts R188A, to the "09" plug socket PS35, thereby storing the value 09 in the units-tens distributor.

It will be noted in Fig. 49E that all of the double plug sockets corresponding to the values 07 to 12 are interconnected by a plug wire and double plugs to the plug socket PS54. Consequently, the test impulse from plug socket PS22 will travel to C plug socket PS33, thence, as traced above in Fig. 48V, to the "09" plug socket PS35, at which point it emerges from the panel and goes to the "2" plug socket PS54. As was made clear in other operations described herein, this will cause any card punched 09 to be deposited in the "2" pocket, the test impulse being first made, the tube V123 fired, and then the final operating impulse being sent through the same circuit to cause the sorting magnet to be operated during the cycle following the one in which the card punched 09 passes the brushes B. In a similar manner, any one of the numbers in the same group such as 07, 08 or 10 to 12 will cause cards so designated to be deposited in the "2" pocket.

Other cards designated in other age groups will be deposited in one of the other pockets according to the age grouping. For example, take the age forty-five. The test impulse in this case will travel from plug sockets PS22 to PS33 and will emerge from the panel through the "45" plug socket PS35, thence the impulse will go to the "6" plug socket PS54 to energize the relay R110P which controls sorting to the "8" pocket.

All cards punched over fifty will be deposited in the "9" pocket. It is evident that each of these cards will have one of the perforations 5 to 9 in the tens column coupled with one of the perforations 0 to 9 in the units column. Let it be assumed that a card is perforated 60. The pulse will travel from plug socket PS22 to plug socket PS33. Thence, in Fig. 48V, it will travel through contacts R175B, R176A, R177A, to the "6" plug socket PS34. Then the pulse will emerge from the panel by way of the plug wire to the "59" plug socket PS35, thence through the plug wire between the "51" plug socket PS35 and plug socket PS54. This is possible because the lowest and extreme left-hand plug socket PS35 just over the number 70 in Fig. 49E is electrically connected to the upper plug socket PS35 appearing just under the number 59. This manner of arranging the units and tens plug sockets makes it possible at either end of any row to insert a double plug which establishes a connection between two consecutively numbered pairs of plug sockets PS35. For example, under the number 10 (Fig. 49E) the double plug which extends vertically connects together the "10" plug socket PS35 and the "09" plug socket PS35. In this fashion, the nineteenth and twentieth, the twenty-ninth and thirtieth, the thirty-ninth and fortieth, and the forty-ninth and fiftieth plug sockets PS35 are connected together. Thus, the plug wire in the "6" plug socket PS34, in effect, establishes a common connection to the "51" to "59" plug sockets PS35.

In a similar fashion, due to the interconnection of the "6," "7," "8," and "9" plug sockets PS34 by double plugs, any of the values "6" to "9" punched in the tens column will establish a circuit in exactly the same fashion as just described to cause cards punched "61" to "99" to be deposited in the "9" pocket.

In the present case, the break in the numbers is between fifty and fifty-one and for that reason it is necessary to plug the whole series "51" to "59" in order to differentiate "50" from "51" to "59." If the break had been between "49" and "50" then it would not be necessary to plug "51" to "59" and, instead of inserting the plug wire from the "9" plug socket PS54 in the "51" plug socket PS35, it could be inserted in the "5" plug socket PS34 and a double inserted between the "5" and "6" plug sockets PS34.

Figure 49F:
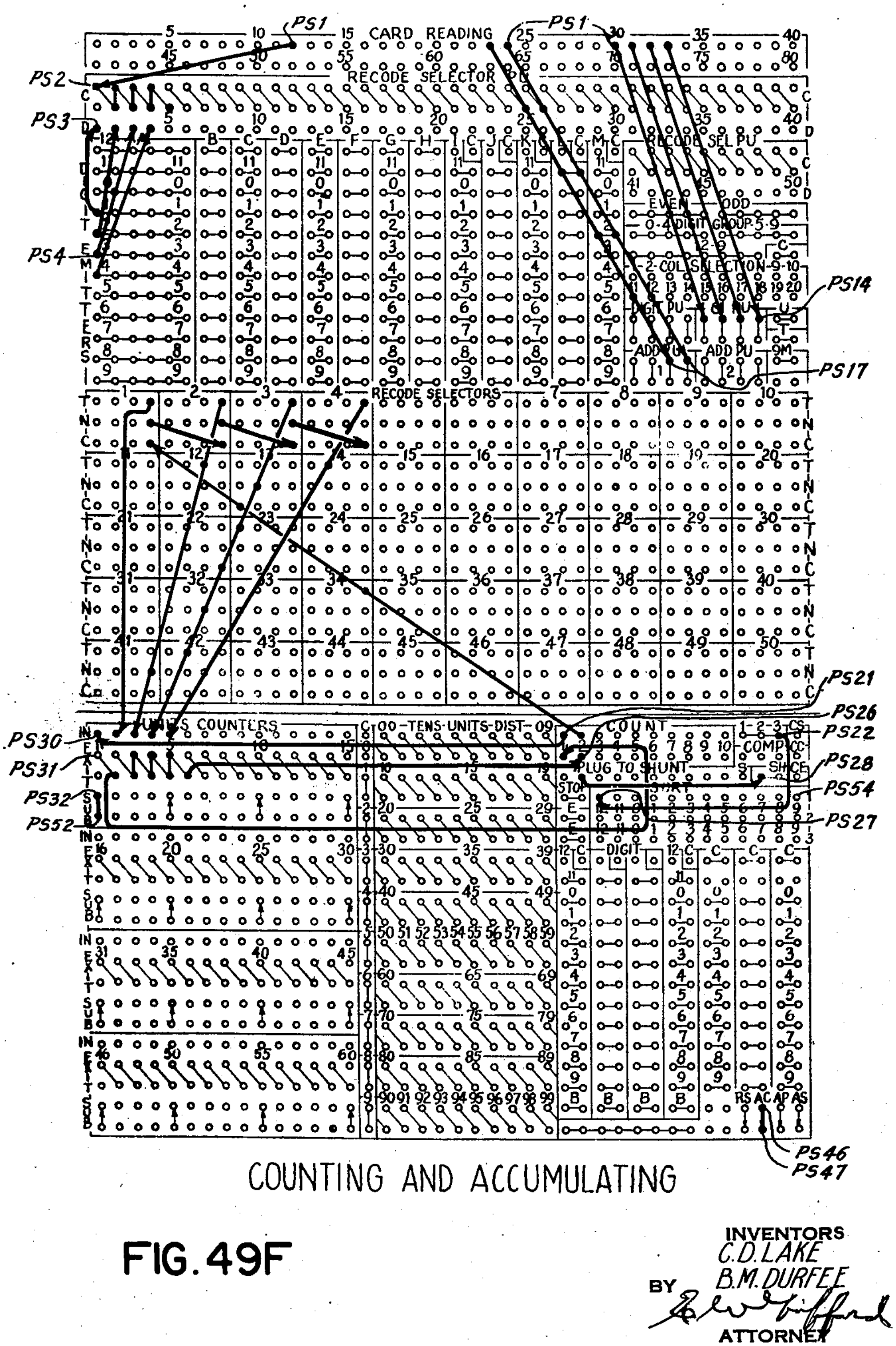

Fig. 49F illustrates an operation in which both accumulating under control of the cards and counting are being effected in a single run of the machine. It is desired to count the number of males in accordance with their marital status, which is divided into four groups: (1) single, (2) married, (3) divorced, (4) widowed. Besides counting the number in each of these groups it is desired to total the ages for the purpose of enabling the average age to be determined by a separate calculation, not involving the use of the present machine. The cards are perforated with the marital status in column 12, a perforation in one of the index-point positions 1 to 4 denoting the marital status in the order listed above. The age, which may range from one to ninety-nine in the illustrated case, is punched in columns 23 and 24 and these columns are plugged to the "Add PU" plug sockets PS17 to add the age in the units and tens orders of accumulators 1 and 2 which functions as a single accumulator for this operation and is differentiated by the numeral "1" under the caption "Add PU" for the left-hand group of four plug sockets PS17. In columns 30 to 33 there is punched a control number which identifies the entire group which is being sorted. For example, this control number might have a geographical significance, being a code, for example, of a state and county, county and village, or like geographical identification. This number is used for the purpose of identifying the totals printed on the work sheet. In the present case, due to the small number of counters involved, it will be assumed that one one-half a sheet, such as disclosed in Fig. 42, is necessary.

Recode selectors 1 to 4 are plugged to the "A" digit emitter to be rendered operative under control of perforations in the "1" to "4" positions, respectively. The phase switch is set in "off" or phase 1 position.

During the first cycle of the machine, the group number in columns 30 to 33 will be entered into the machine through the opertaion of the group indicate circuits, which have already been explained, and will remain stored therein until this group number has been printed during the third printing cycle. These circuits need not be traced in view of the detailed explanation of the group indicate features hereinbefore. The age will be entered in the units and tens orders of accumulator 2 by circuits which have been traced in explaining the manner in which the accumulator receives entries from the cards. It remains only to trace the circuits for effecting the counting.

The phase switch is set in "off" or phase 1 position for operation 49F.

Let it be assumed that the first card is punched "3" signifying a divorced male. This causes recode selector 3 to be rendered operative. In this case the test impulse is traced as follows: source P1 (Fig. 48E), contacts LCR2A, C11, the 1,000 ohm resistor, contacts R201C, R58D, R212D, R201E, plug socket PS22, the plug wire to the "12" plug socket PS54 (Fig. 49F), through the "12" relay R118P by way of the network of relays (Fig. 48R) of the phase switch, contacts R24A (Fig. 48E), R57B, R58B to plug socket PS21, thence to the "in" plug socket PS30 (Fig. 49F) for units counter 1, through the counter magnet CM for this counter to the "exit" plug socket PS31, the plug wire to the "1" plug socket PS26

(Fig. 48E), contacts R57B, R58B, the "2" plug socket PS21, through the normally closed contacts of recode selectors 1 and 2 in series, through the normally open contacts of recode selector 3, the plug wire to the plug socket PS30 for the counter 4, through the counter magnet CM for this counter to the exit plug socket PS30, the plug wire to the "2" plug socket PS26, through the contacts R57B to the "2" plug socket PS27, through the plug wire to the SH plug socket PS28. This circuit is complete, the tube V123 will be fired and relays R57 and R58 energized, as described above, thereby closing all of contacts R57A and R58A. It will be noted that this will connect the plug wire in the "2" plug socket PS21 which traces through recode selectors 1, 2, and 3 directly to the contacts C15 and then an impulse will be emitted thereby which will emerge from the "2" plug socket PS21 and traverse the normally closed contacts of recode selectors 1 and 2 and the normally open contacts of selector 3 to the counter magnet CM for counter 4 and back to the "2" plug socket PS26, thence through contacts R57A to line wire W2 and back to the negative source N1.

It will be noted that in this case the test impulse has traversed the entire network of recode relays and all of the counter magnets which were involved but when the tube V123 is fired and relays R57, R58 are energized, the counter magnet CM for units counter 4 is connected directly across the portions of the line extending from contacts C15 and line wire W2 in Fig. 48E. The counter magnet CM for units counter 1 which is plugged to plug sockets PS21, PS26 likewise will be energized in parallel with the counter magnet for the units counter 4.

It is evident that since units counter 1 is plugged directly to the "1" count plug socket PS21 that this counter will be operative during every cycle in which a card passes the machine and the test circuit is completed. Similar circuits may be traced when either recode selectors 1, 2, or 4 are energized. The only difference will be that units counters 2, 3, or 5 will be selected instead of units counter 4.

It will be noted in this case that units counter 1 is plugged for subtraction by inserting a double plug in the subtract plug socket PS32, PS52 for this counter, and the automatic accumulate plug sockets PS46, PS47 must be plugged to render the accumulating mechanism operative. At the end of the run of cards, the sequence of printing cycles will be initiated automatically or by hand in the manner described hereinbefore, and the totals in units counters 1 to 5 will be printed and added. The combined total in accumulators 1 and 2 will be printed and the group number stored in the group indicate relays will be printed as described above. In the present case, since only five counters are involved requiring the use of only a five-column work sheet, it is undesirable to go through the entire sequence of twenty-one printing cycles, of which the majority would be purely idle cycles. Consequently, the right-hand marginal stop, which is the left-hand one in Figs. 20 and 21, will be set at the column 9 position to cause the machine to automatically cross-foot when the carriage escapes from column 8 position after printing the total in units counter 5.

Fig. 49F illustrates a very simple case which was selected primarily for the purpose of illustrating how the counters are plugged for counting or totaling the number of cards and for testing both the counting and recode selector network for continuity. In actual practice, a much more complex plugging would be used involving a large number of counters which might entail the use of practically every recode selector and plugging of every one of the counters to obtain the maximum capacity of the machine, which was assumed to be the case when describing the printing operations. It is evident that to use all of the fifteen counters associated with print bank 1, it is only necessary to plug recode selectors 5 to 14 with their normally closed contacts in the same series relation with selectors 1 to 4, and, with their normally open contacts plugged to the input plug sockets PS30 for counters 6 to 15, thus filling the entire top row of plug sockets PS30 in Fig. 49F. Correspondingly, all of the plug sockets PS31 will be double plugged to the end of the row and the only effect will be to shift the left-hand end of the plug wire in the "2" plug socket PS26 all the way to the right to the last plug socket PS31.

In the present case, since only one counter at a time, other than the grand total counter 1, is being used, it is possible to common the exit plug sockets PS31.

In order to insure the rejection of a card not counted, the machine is plugged so that all counted cards are deposited in the "12" pocket, this circuit being established through the plug socket PS22 (Figs. 49E and 49F), the plug wire to the "12" plug socket PS54, and thence through the network of relay contacts controlled by the phase switch to the sorting relay R118P and back to contacts R24A. When relays R57A, R58 are energized due to the firing of the tube V123, the plug socket PS22 is connected directly to the contacts C15 through contacts R58C and the return line for the sorting relays R107P, to R118P is connected to the line W2 through the contacts R57A so that the sorting magnet is operated and the card which tested correctly is deposited in the "12" pocket. If the card does not test correctly, then it will be deposited in the reject pocket for investigation.

One of the most important features of the machine described herein, is the system of checks which is provided to insure absolute accuracy in respect to the sorting and counting of the cards. This is a very important feature of a machine designed for statistical work as distinguished from a machine primarily designed for accounting work. In statistical and survey work, the original data is recorded on schedules or questionnaires on which the census takers or survey personnel note the various facts which are desired. These schedules and questionnaires are subject to errors of entry and a possibility for error also exists in the transcribing of the original schedules or questionnaires into punched cards for performing the various statistical operations necessary to obtain tabulations, percentages, ratios, and the like.

In census work, the punched cards are run and rerun many times both through the sorting machine and other machines, such as tabulators, which prepare tabulations of the facts or prepare the cards for a subsequent operation. As a result the cards become considerably worn after repeated use and become so damaged that trouble is often experienced with them due to failure to feed properly. Owing to repeated passage through the different machines, the cards become scuffed at their leading edges due to the action of the throat block in the card hopper with the result that the cards may become so badly scuffed that they may actually pass over a selected blade in the sorting mechanism instead of under. For example, a card which is to be selected for the "5" pocket may actually jump over one of the near blades such as the "9" blade, for example, and be guided to the "9" pocket instead of the "5" pocket. As a result, it is very easy for a card to become missorted and lost particularly in a machine of this type where distribution of the cards is based on arbitrary combinations of data in preparation for a subsequent tabulation and a missort is not obvious since the control is based on an arbitrary coded combination determined by the plugging and an error is not readily apparent except upon careful inspection of the card. In any event, if the card is not rejected, the operator would have no reason to suspect that anything is wrong. The provision of a check which is determined by the actual position of the cards in the sorting blades immediately tells the operator that something has gone wrong in the operation of the machine and offers an immediate opportunity to find the card which failed to sort correctly and rectify the error.

The continuity test is extremely valuable in detecting errors in punching the cards and failures to set up the proper circuits, but the test circuit might be established correctly since the holes in the cards might be at their proper places but owing to the aforementioned damage to the card it might not actually sort as determined by the plugging and the data actually punched in the card.

On the other hand, it is possible that the card might sort correctly and the test circuit might be completed properly, but one of the counters might stick for example, or miss a count so that in the final tabulation that particular counter would cause the printing of an incorrect total. When this happens, it has been seen, the failure to cross foot correctly signifies that something is wrong in the totaling of the cards and the error will immediately be discovered and confined to a small enough number of cards so that checking to determine the error is not too burdensome or time consuming.

The three features of testing for correctness of sort, testing for continuity of the circuits, and the fact of establishment of a control circuit, and the cross foot check make it practically impossible for an error to occur other than an error in punching which is consistent with the facts which, of course, no machine can be capable of detecting.

In accounting practice a great many errors are easily detected because the most important facts are amounts of money which, in some manner or other, ultimately must be detected as, for example, when a trial balance is taken in an audit. In the invoicing procedure, any error in price or the total on the bill will probably be noted very quickly since such items will be closely checked by several different groups of persons who are primarily interested in verifying the accuracy of such figures. For example, if an error is made in an invoice, there are at least two possible ways in which it may be discovered. One by the seller's auditing staff during one of their periodical checks of the books and second by the customer's clerical staff or by the customer's auditors. Thus, the importance of preventing errors is very considerably greater in statistical work due to the fact that there is less likelihood that an error will be detected owing to the nature of the data, the use of the cards, and their subsequent disposition after tabulations are completed. In statistical work there is less repeated rechecking at intervals by different people having different motives and interests than there is in accounting practice where items most commonly refer to money transactions in which people with different interests are involved, each having their own auditing and verifying systems to prevent overcharging, undercharging, and fraud.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record distributing machine, means to feed records having data representations, means to analyze said representations, record distributing mechanism including means for diverting records to different destinations under control of said representations, destination determining storage means set under control of said analyzing means, means controlled by the record after it has been diverted to designate its actual destination, means to compare the actual destination as indicated by the manifesting means with the selected destination as designated by the storage means, and means to mark a record whose actual destination is different from the selected destination.

2. In a record distributing machine, record distributing mechanism capable of selecting at least two different destinations for a record, record analyzing means, means controlled by the analyzing means for causing the record distributing mechanism to select a given destination, means controlled by the record after its destination has been determined for designating its actual destination, control means controlled by said designating means and by the causing means for indicating the fact that the record will actually reach the selected destination, and means rendered operative by the control means for marking a record, the actual destination of which is different from the selected destination.

3. In a record distributing machine, a record distributing mechanism having provision for determining any one of a plurality of destinations for a record having data representations, means to feed records to said mechanism, means to analyze said representations, means set under control of the analyzing means to store a representation of a destination, means controlled by said storing means for rendering the distributing means operative to select the stored destination, means controlled by the record after its actual destination has been determined by said distributing mechanism for designating its actual destination, means controlled by the storing means and designating means for comparing the stored representation with the actual destination, and means controlled by the checking means for marking a record when its selected destination fails to agree with its actual destination.

4. In a record distributing machine, means to feed records having data recorded therein by means of data representations, means to sense said representations, record distributing mechanism, means controlled by the analyzing means for controlling the distribution mechanism to select a distribution for each record in accordance with the analysis of such record, means for detecting the actual distribution, means controlled by the detecing means to stop the machine when the selected destination and actual destination fail to agree, and means rendered effective by the detecting means for marking a record which is distributed differently from the selected distribution.

CLAIR D. LAKE.
BENJAMIN M. DURFEE.

REFERENCES CITED

The following references are of record in the file of this patent:

UNITED STATES PATENTS

| Number | Name | Date |
|---|---|---|
| 1,862,032 | Pierce | June 7, 1932 |
| 2,103,559 | Silver | Dec. 28, 1937 |
| 2,120,233 | Doly | June 14, 1938 |
| 2,229,451 | Gulliksen | Jan. 21, 1941 |
| 2,434,512 | Page | Jan. 13, 1948 |